(12) United States Patent
Nishioka et al.

(10) Patent No.: US 6,618,209 B2
(45) Date of Patent: Sep. 9, 2003

(54) OPTICAL APPARATUS

(75) Inventors: Kimihiko Nishioka, Hachioji (JP);
Tetsuhide Takeyama, Hachioji (JP);
Tetsuo Nagata, Hachioji (JP);
Kazuhito Hayakawa, Hachioji (JP);
Toshiyuki Nagaoka, Akishima (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/923,793

(22) Filed: Aug. 8, 2001

(65) Prior Publication Data

US 2002/0041445 A1 Apr. 11, 2002

(30) Foreign Application Priority Data

| Aug. 8, 2000 | (JP) | ................................ 2000-239629 |
| Oct. 11, 2000 | (JP) | ................................ 2000-310922 |
| Oct. 11, 2000 | (JP) | ................................ 2000-310923 |
| Oct. 11, 2000 | (JP) | ................................ 2000-310924 |
| Jan. 18, 2001 | (JP) | ................................ 2001-009823 |
| Jan. 18, 2001 | (JP) | ................................ 2001-009824 |
| Jan. 18, 2001 | (JP) | ................................ 2001-009825 |

(51) Int. Cl.[7] .................. G02B 15/14; G02B 17/00; G02B 26/00
(52) U.S. Cl. .................. 359/676; 359/726; 359/291
(58) Field of Search .................. 359/290, 291, 359/676, 678, 685, 694, 318, 295, 824

(56) References Cited

U.S. PATENT DOCUMENTS

| 4,784,479 A | 11/1988 | Ikemori .................. 359/666 |
| 4,820,028 A | 4/1989 | Suda et al. .................. 359/676 |
| 4,836,661 A | 6/1989 | Ikemori .................. 359/676 |
| 6,437,925 B1 * | 8/2002 | Nishioka .................. 359/726 |
| 6,464,363 B1 * | 10/2002 | Nishioka et al. .................. 359/846 |
| 2002/0018407 A1 * | 2/2002 | Kamoto .................. 369/44.23 |
| 2002/0041445 A1 * | 4/2002 | Nishioka et al. .................. 359/627 |
| 2002/0101646 A1 * | 8/2002 | Ide et al. .................. 359/245 |
| 2002/0102102 A1 * | 8/2002 | Watanabe et al. .................. 396/89 |
| 2002/0118126 A1 * | 8/2002 | Nishioka .................. 359/726 |
| 2002/0118464 A1 * | 8/2002 | Nishioka et al. .................. 359/642 |
| 2002/0136150 A1 * | 9/2002 | Mihara et al. .................. 369/125 |

FOREIGN PATENT DOCUMENTS

JP         53087727 A      8/1978    .......... G02B/17/02

OTHER PUBLICATIONS

Vdovin, G.; "Quick Focusing of Image Optics Using Micromachined Adaptive Mirrors," Optics Communicaitons, 140 (1997), pp. 187–190. (Best Available Date).

* cited by examiner

Primary Examiner—Georgia Epps
Assistant Examiner—David N. Spector
(74) Attorney, Agent, or Firm—Pillsbury Winthrop LLP

(57) ABSTRACT

The invention provides an optical apparatus enabling diopter adjustment, etc. to be achieved using, for instance, a reflection type variable-optical property optical element or a variable-optical property mirror but without recourse to any mechanical moving part. The variable-optical property mirror 9 comprises an aluminum-coated thin film 9a and a plurality of electrodes 9b. Via variable resistors 11 and a power source switch 13 a power source 12 is connected between the thin film 9a and the electrodes 9b, so that the resistance values of the variable resistors 11 can be controlled by an operating unit 14. The shape of the thin film 9a as a reflecting surface is controlled by changing the resistance value of each variable resistor 11 in response to a signal from the operating unit 14 in such a manner that the imaging capability of the variable mirror is optimized.

18 Claims, 58 Drawing Sheets

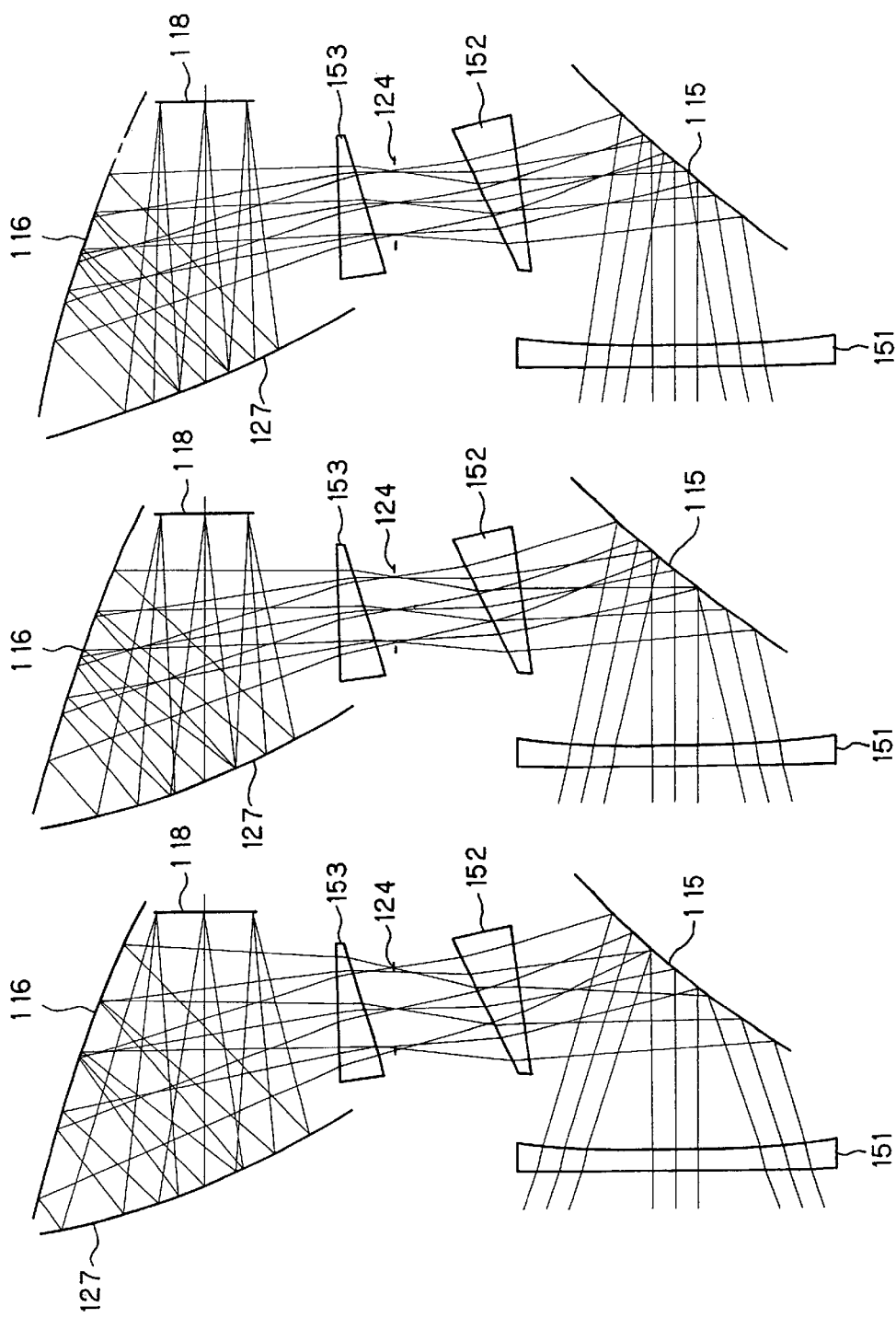

OPTICAL APPARATUS

This application claims benefit of Japanese Application No. 2000-239629 filed in Japan on Aug. 8, 2000; Nos. 2000-310922, 2000-310923 and 2000-310924 filed in Japan on Oct. 11, 2000; and Nos. 2001-9823, 2001-9824 and 2001-9825 filed in Japan on Jan. 18, 2001, the contents of which are incorporated by this reference.

BACKGROUND OF THE INVENTION

The present invention relates generally to an optical apparatus, and more particularly to an optical apparatus comprises, for instance, an optical system for making visual observations or an image pickup optical system.

For a Keplerian finder used with digital cameras, etc., it is required to gain diopter control according to the diopter of an observer. In a prior art finder comprising an objective lens 902, a Porro II prism 903 and an eyepiece lens 901 as shown in FIG. 80, this is carried out by the back-and-forth movement of the eyepiece lens 901 for the reason mentioned above. However, one grave problem with this is that there must be some space for the mechanical structure needed for the back-and-forth movement of the lens.

SUMMARY OF THE INVENTION

In view of such problems with the prior art, it is an object of the present invention to provide an optical apparatus that enables diopter control, etc. to be achieved by use of a reflection type of variable-optical property optical element, a variable-optical property mirror or the like but without recourse to any mechanical moving part.

For instance, the optical apparatus of the present invention include such embodiments as set forth below.

(1) A variable-optical property optical element.

(2) A variable-optical property mirror.

(3) The variable-optical property according to (2) above, characterized by use of electrostatic force.

(4) The variable-optical property mirror according to (2) above, characterized by use of an organic material or synthetic resin.

(5) The variable-optical property mirror according to (2) above, characterized by use of electromagnetic force.

(6) The variable-optical property mirror according to (2) above, characterized by comprising a permanent magnet to make use of electromagnetic force.

(7) The variable-optical property mirror according to (2) above, characterized by comprising a coil and a permanent magnet to make use of electromagnetic force.

(8) The variable-optical property mirror according to (2) above, characterized by comprising a permanent magnet and a coil integrated with a mirror substrate to make use of electromagnetic force.

(9) The variable-optical property mirror according to (2) above, characterized by comprising a coil and a permanent magnet integrated with a mirror substrate to make use of electromagnetic force.

(10) The variable-optical property mirror according to (2) above, characterized by comprising a plurality of coils and a permanent magnet integrated with a mirror substrate to make use of electromagnetic force.

(11) The variable-optical property mirror according to (2) above, characterized by comprising a plurality of coils and a permanent magnet to make use of electromagnetic force.

(12) The variable-optical property mirror according to (2) above, characterized by comprising a permanent magnet and a plurality of coils integrated with a mirror substrate to make use of electromagnetic force.

(13) The variable-optical property mirror according to (2) above, characterized by comprising a coil to make use of electromagnetic force.

(14) The variable-optical property mirror according to (2) above, characterized by comprising a plurality of coils to make use of electromagnetic force.

(15) The variable-optical property mirror according to (2) above, characterized by comprising a ferromagnetic material to make use of electromagnetic force.

(16) The variable-optical property mirror according to (2) above, characterized by comprising a coil located in opposition to a ferromagnetic material to make use of electromagnetic force.

(17) The variable-optical property mirror according to (2) above, characterized by comprising a ferromagnetic mirror substrate and a coil to make use of electromagnetic force.

(18) A variable mirror characterized by being driven by a fluid.

(19) A variable-optical property mirror, characterized by being driven by a fluid.

(20) A variable-optical property mirror, characterized by comprising a variable-optical property lens and a mirror combined therewith.

(21) An optical element, characterized by having variable properties and comprising an extended curved surface.

(22) A variable-optical property optical element, characterized by comprising a plurality of electrodes.

(23) A variable-optical property mirror, characterized by comprising a plurality of electrodes.

(24) The variable-optical property mirror according to (23) above, characterized in that said plurality of electrodes are located on different planes.

(25) The variable-optical property mirror according to (23) above, characterized by comprising a plurality of electrodes located on a curved surface.

(26) The variable-optical property optical element, variable-optical property mirror, and optical element according to any one of (2) and (20) to (23) above, characterized by being driven by electrostatic force.

(27) The variable-optical property optical element, variable-optical property mirror, and optical element according to any one of (2) and (20) to (23) above, characterized by use of a piezoelectric material.

(28) A variable-optical property lens, characterized by comprising a plurality of electrodes.

(29) The variable-optical property optical element, variable-optical property mirror, and variable-optical property lens according to any one of (1), (20) to (22) and (28) above, characterized by use of a liquid crystal.

(30) The variable-optical property optical element, variable-optical property mirror, and variable-optical property lens according to (29), characterized in that the orientation of the liquid crystal is varied by changing frequency.

(31) A variable-optical property mirror, characterized in that the surface shape thereof in a certain state is close to a part of a quadratic surface of revolution.

(32) The variable-optical property mirror according to (31) above, characterized in that a deviation of the surface shape thereof in a certain state from said part of quadratic surface of revolution satisfies expression (2).

(33) The variable-optical property mirror according to (31) above, characterized in that a deviation of the surface shape thereof in a certain state from said part of quadratic surface of revolution is within 1 mm.

(34) The variable-optical property mirror according to (31) above, characterized in that a reflection surface thereof has a portion at which light is not reflected.

(35) The variable-optical property mirror according to (31) above, characterized in that a member located in opposition thereto is provided on its surface with an electrode.

(36) The variable-optical property mirror according to (31) above, characterized in that shape control information is stored in a memory.

(37) An optical system, characterized in that the refractive index of an optical element located in opposition to a variable-optical property mirror satisfies expression (1).

(38) An optical system, characterized by comprising the variable-optical property optical element, variable-optical property mirror, variable mirror, optical element, variable-optical property lens or optical system according to according to any one of (1) to (37) above.

(39) The optical system according to (38) above, characterized by further comprising an extended curved surface prism.

(40) The optical system according to (38) above, characterized by further comprising a variable-optical property mirror, in which a light ray is obliquely entered.

(41) The optical system according to any one of (38) to (40) above, characterized by comprising an optical element using a synthetic resin or a frame using a synthetic resin.

(42) An optical system, characterized in that changes in an imaging sate thereof are compensated for by changing the optical properties of a variable-optical property optical element.

(43) An optical system, characterized in that at least one of a temperature change, a humidity change, a fabrication error, a shake, a focus and a diopter thereof is primarily compensated for by changing the optical properties of a variable-optical property optical element.

(44) An optical system, characterized by comprising a variable-optical property optical element, and preventing system shake.

(45) An optical system, characterized by comprising a variable-optical property optical element, and improving resolving power.

(46) An optical system, characterized by comprising a variable-optical property optical element, and having a zooming function or a vari-focus function.

(47) An optical system, characterized by comprising at least one of a variable-optical property optical element or an extended curved surface prism, and having a signal transmitting or processing function.

(48) An optical system, characterized by comprising an even number of variable-optical property mirrors.

(49) An optical system having an even number of reflecting surfaces, characterized by comprising an even number of variable-optical property mirror.

(50) An optical system having an even number of reflecting surfaces, characterized by comprising an even number of variable-optical property mirror driven by electrostatic force or a fluid.

(51) An optical system having an even number of, and at least four, reflecting surfaces, characterized by comprising an even number of variable-optical property mirrors driven by electrostatic force or a fluid.

(52) An optical system, characterized by comprising a plurality of variable-optical property mirrors and satisfying expression (8).

(53) The optical system according to any one of (42) to (52) above, characterized by comprising an optical system as recited in any one of (38) to (41) above.

(54) An optical system, characterized by comprising a variable mirror and preventing system shake.

(55) An optical system, characterized by comprising a variable lens and preventing system shake.

(56) An imaging optical system, characterized by comprising a variable-optical property mirror and an optical element having a rotationally symmetric surface.

(57) An optical system for an electronic image pickup apparatus, characterized by comprising a variable-optical property mirror and an optical element having a rotationally symmetric surface.

(58) A lateral- or oblique-vision type optical system for an electronic endoscope, characterized by comprising an variable-optical property mirror and an optical element having a rotationally symmetric surface.

(59) A lateral- or oblique-view type optical system for an electronic endoscope, characterized by comprising a variable-optical property mirror, an optical element having a rotationally symmetric surface and a prism.

(60) An imaging optical system, characterized by comprising a plurality of variable-optical property mirrors and an optical element having a rotationally symmetric surface.

(61) An optical system for an electronic image pickup apparatus, characterized by comprising a plurality of variable-optical property mirrors and an optical element having a rotationally symmetric surface.

(62) An optical system for an electronic image pickup apparatus, characterized by comprising a plurality of variable-optical property mirrors and an optical element having a rotationally symmetric surface, and having a zooming function.

(63) An optical system, characterized by a variable-optical property optical element capable of performing switchover between a plurality of focal lengths.

(64) An image pickup apparatus, characterized by comprising the variable-optical property optical element, variable-optical property mirror, variable mirror, optical element, variable-optical property lens, optical system or imaging optical system according to any one of (38) to (63) above.

(65) An electronic image pickup apparatus, characterized by comprising the variable-optical property optical element, variable-optical property mirror, variable mirror, optical element, variable-optical property lens, optical system or imaging optical system according to any one of (38) to (63) above.

(66) A viewing apparatus, characterized by comprising the variable-optical property optical element, variable-optical property mirror, variable mirror, optical element, variable-optical property lens, optical system or imaging optical system according to any one of (38) to (63) above.

(67) An optical apparatus, characterized by comprising the variable-optical property optical element, variable-optical property mirror, variable mirror, optical element, variable-optical property lens, optical system or imaging optical system according to any one of (38) to (63) above.

(68) An imaging apparatus, characterized by comprising the variable-optical property optical element, variable-optical property mirror, variable mirror, optical element, variable-optical property lens, optical system or imaging optical system according to any one of (38) to (63) above.

(69) An optical apparatus, characterized by an optical system having an odd number of reflecting surfaces, an variable-optical property mirror and an image flipping portion.

(70) An image pickup apparatus, characterized by an optical system having an odd number of reflecting surfaces, a variable-optical property mirror and an image flipping portion.

(71) A Keplerian viewing apparatus, characterized by using a variable-optical property mirror.

(72) A Galilean viewing apparatus, characterized by using a variable-optical property mirror.

(73) A finder, characterized by using a variable-optical property mirror.

(74) A finder for a camera, a digital camera, a TV camera, a VTR camera or the like, characterized by comprising a variable-optical property mirror having a viewing direction within 20° from the thickness direction of the camera, digital camera, TV camera, VTR camera or the like.

(75) A Galilean finder or telescope, characterized by using a variable-optical property mirror.

(76) A Keplerian finder or telescope, characterized by using a variable-optical property mirror.

(77) A single-lens reflex image pickup apparatus, characterized by using a variable-optical property mirror.

(78) A telescope, characterized by using a variable-optical property mirror.

(79) A viewing apparatus, characterized by using a variable-optical property mirror.

(80) A viewing apparatus, characterized by having a locally variable diopter.

(81) A viewfinder, characterized by using a variable-optical property mirror.

(82) A head-mounted display, characterized by using a variable-optical property mirror.

(83) A head-mounted display, characterized by using a variable-optical property mirror having a locally variable diopter.

(84) The head-mounted display according to (83) above, characterized by having a line-of-sight sensing function.

(85) An optical element, characterized by having a photonic crystal on the surface of the optical element.

(86) An optical element, characterized by comprising an extended curved surface prism or an optical element and a transmission or reflection type photonic crystal.

(87) An optical apparatus, characterized using a transmission or reflection type photonic crystal.

(88) A viewing apparatus, characterized by using a transmission or reflection type photonic crystal.

(89) A head-mounted display, characterized by using a transmission or reflection type photonic crystal.

(90) A head-mounted display, characterized by using an extended curved surface prism, mirror or optical element and a transmission or reflection type photonic crystal.

(91) An optical apparatus, characterized by using an extended curved surface prism, mirror or optical element and a transmission or reflection type photonic crystal.

(92) A measuring method, a measuring instrument or an object measured, characterized in that interference is produced on an inverted wavefront, thereby measuring an optical element or optical system having an extended curved surface in combination with image processing.

(93) A measuring method, a measuring instrument or an object measured, characterized in that interference is produced on an inverted wavefront and a part of the wavefront is removed, thereby measuring an optical element or optical system having an extended curved surface in combination with image processing.

(94) A method or instrument for the optical measurement of a sample, or an object measured, characterized by using a canceller having a shape substantially reverse to the optical surface of the sample.

(95) A method or instrument for the optical measurement of a sample, or an object measured, characterized by using a canceller having a shape substantially reverse to the optical surface of the sample, thereby finding at least one of the refractive index, refractive index profile and refractive index change of the sample.

(96) A method and instrument for the optical measurement of a sample, or an object measured, characterized by using a canceller having a shape substantially reverse to the optical surface of the sample, thereby finding at least one of the refractive index, refractive index profile, refractive index change and decentration of the sample from the results of a plurality of measurements.

(97) The optical system comprising a variable mirror as recited in any one of (1) to (38) above, characterized in that said variable mirror is located in the vicinity of a stop in said optical system.

(98) An optical system, characterized by transforming a variable mirror, thereby performing focus adjustment, scaling, zooming, correction of system shake, correction of an optical apparatus change, correction of a subject change, and correction of a viewer change.

(99) An optical system, characterized by substantially fixing the peripheral area of a variable mirror with respect to at least one of other optical elements and transforming the variable mirror, thereby performing focus adjustment, scaling, zooming, correction of system shake, correction of an optical apparatus change, correction of a subject change, and correction of a viewer change.

(100) An optical system, characterized by substantially fixing the center area of a variable mirror with respect to at least one of other optical elements and transforming the variable mirror, thereby performing focus adjustment, scaling, zooming, correction of system shake, correction of an optical apparatus change, correction of a subject change, and correction of a viewer change.

(101) An optical system, characterized by comprising a free-form surface variable mirror and transforming the variable mirror, thereby performing focus adjustment, scaling, zooming, correction of system shake, correction of an optical apparatus change, correction of a subject change, and correction of a viewer change.

(102) An optical system, characterized by comprising a variable mirror having a rotationally asymmetric surface or a decentered rotationally symmetric surface and transforming the variable mirror, thereby performing focus adjustment, scaling, zooming, correction of system shake, correction of an optical apparatus change, correction of a subject change, and correction of a viewer change.

(103) An optical system, characterized by comprising a variable mirror having a rotationally asymmetric surface or a rotationally symmetric surface and transforming the variable mirror, thereby performing focus adjustment, scaling, zooming, correction of system shake, correction of an optical apparatus change, correction of a subject change, and correction of a viewer change.

(104) An optical system, characterized by comprising at least one variable mirror for focus adjustment.

(105) An optical system, characterized by comprising at least two variable mirrors for both scaling and focus adjustment.

(106) An optical system, characterized by comprising at least one extended curved surface and a variable mirror.

(107) An optical system, characterized by comprising an optical element having a free-form surface and a variable mirror.

(108) An optical system, characterized by comprising a free-form surface prism and a variable mirror.

(109) An optical system, characterized by comprising an optical element having a rotationally asymmetric surface or a decentered rotationally symmetric surface and a variable mirror.

(110) An optical system, characterized by comprising a prism or mirror having a rotationally asymmetric surface or a decentered rotationally symmetric surface and a variable mirror.

(111) An optical system, characterized by comprising a prism or mirror having a rotationally symmetric surface and a variable mirror.

(112) An optical system, characterized by comprising a variable mirror on one side of the longitudinal direction of an optical element comprising an extended curved surface.

(113) An optical system, characterized by comprising a variable mirror on each side of the longitudinal direction of an optical element comprising an extended curved surface.

(114) An optical system, characterized by comprising an optical element having an extended curved surface with three or less reflecting surfaces, and a variable mirror.

(115) An optical system, characterized by comprising an optical surface having only one symmetric surface and a variable mirror.

(116) An optical system, characterized by comprising an optical surface having only two symmetric surfaces and a variable mirror.

(117) An optical system, characterized in that any optical element having a beam-converging or diverging action is not located in front of a variable mirror.

(118) An optical system, characterized in that an optical element having a beam-converging or diverging action is located in front of a variable mirror.

(119) An optical system, characterized by comprising an optical element having at least one extended curved surface, at least one rotationally symmetric surface and a variable mirror.

(120) An optical system, characterized by comprising an optical element having at least one extended curved surface, an optical element and a variable mirror.

(121) An optical system, characterized by comprising an extended curved surface prism or an extended curved surface reflecting surface, an optical element and a variable mirror.

(122) An optical system, characterized by comprising an extended curved surface prism or an extended curved surface reflecting surface, a lens and a variable mirror.

(123) An optical system, characterized by comprising an optical element having an extended curved surface, a convex lens, a concave lens and a variable mirror.

(124) An optical system, characterized by comprising an optical element having an extended curved surface, a concave lens and a variable mirror.

(125) An optical system comprising a plurality of variable mirrors, characterized in that the directions of the normals to at least two variable mirrors have a twisted relation to each other.

(126) An optical system comprising a plurality of variable mirrors, characterized in that the directions of the normals to at least two variable mirrors are substantially on the same plane.

(127) An optical system, characterized in that an optical element is located on an optical path between at least two of a plurality of variable mirrors.

(128) An optical system, characterized in that there is no optical element on an optical path between at least two of a plurality of variable mirrors.

(129) An optical system, characterized in that there is an optical element having a beam-converging or diverging action on an optical path between two variable mirrors.

(130) An optical system, characterized in that there is no optical element having a beam-converging or diverging action on an optical path between two variable mirrors.

(131) An optical system, characterized in that there is a plane-parallel plate between two variable mirrors.

(132) An optical system, characterized in that there is no plane-parallel plate between two variable mirrors.

(133) An optical system, characterized by comprising a prism or mirror having a rotationally symmetric surface, a variable mirror and at least one optical element.

(134) An optical system, characterized by comprising a prism or mirror having a rotationally symmetric surface, a variable mirror and at least two optical elements.

(135) An optical system, characterized by comprising a prism or mirror having a rotationally symmetric surface, a variable mirror and at least one lens.

(136) An optical system, characterized by comprising a prism or mirror having a rotationally symmetric surface, a variable mirror and at least two lens.

(137) An optical system, characterized by comprising a prism or mirror having a rotationally symmetric non-plane and a variable mirror.

(138) An optical system, characterized by comprising a prism or mirror having a rotationally symmetric non-plane, a variable mirror and at least one optical element.

(139) An optical system, characterized by comprising a prism or mirror having a rotationally symmetric non-plane, a variable mirror and at least two optical elements.

(140) An optical system, characterized by comprising a prism or mirror having a rotationally symmetric non-plane, a variable mirror and at least one lens.

(141) An optical system, characterized by comprising a prism or mirror having a rotationally symmetric non-plane, a variable mirror and at least two lenses.

(142) An optical system, characterized by comprising an optical element having a rotationally symmetric optical surface and a variable mirror.

(143) An optical system, characterized by comprising an optical element having a rotationally symmetric optical surface and a plurality of variable mirrors.

(144) An optical system, characterized by comprising a plurality of optical elements having a rotationally symmetric optical surface and a variable mirror.

(145) An optical system, characterized by comprising a variable mirror, a free-form surface prism and an optical element.

(146) An optical system, characterized by comprising a variable mirror, a free-form surface prism and a lens.

(147) An optical system, characterized by comprising a variable mirror, a free-form surface prism and a rotationally symmetric optical element.

(148) An optical system, characterized by comprising a variable mirror, a free-form surface prism and a rotationally symmetric lens.

(149) An optical system, characterized by comprising a lens on one side of the longitudinal direction of an optical element having an extended curved surface.

(150) An optical system, characterized by comprising a concave lens on one side of the longitudinal direction of an optical element having an extended curved surface.

(151) An optical system, characterized by comprising a convex lens on one side of the longitudinal direction of an optical element having an extended curved surface.

(152) An optical system, characterized by comprising a plurality of lenses on one side of the longitudinal direction of an optical element having an extended curved surface.

(153) An optical system, characterized by comprising a lens on each side of the longitudinal direction of an optical element having an extended curved surface.

(154) An optical system, characterized in that a variable mirror is located on one side of the longitudinal direction of an optical element having an extended curved surface and a lens is provided on the other side thereof.

(155) An optical system, characterized in that a variable mirror is located on one side of the longitudinal direction of an optical element having an extended curved surface and a lens is provided on the same side.

(156) An optical system, characterized in that a variable mirror is located on one side of the longitudinal direction of an optical element having an extended curved surface and an image pickup device is provided on the other side thereof.

(157) An optical system, characterized in that a variable mirror and an image pickup device are located on one side of the longitudinal direction of an optical element having an extended curved surface.

(158) An optical system, characterized in that there is no optical element having a beam-converging or diverging action on an optical path between an image pickup device and a variable mirror.

(159) An optical system, characterized in that there is an optical element having a beam-converging or diverging action on an optical path between an image pickup device and a variable mirror.

(160) An image pickup system, characterized in that an image pickup device is located on one side of the longitudinal direction of an optical element having an extended curved surface and an optical element is provided on the other side thereof.

(161) An image pickup system, characterized in that an image pickup device and an optical element are located on the same side of the longitudinal direction of an optical element having an extended curved surface.

(162) An image pickup system, characterized in that an optical element is provided between an image pickup device and an optical element having an extended curved surface in the longitudinal direction of an optical element having an extended curved surface.

(163) An image pickup system, characterized in that an image pickup device is located on one side of the longitudinal direction of an optical element having an extended curved surface and a lens is provided on the other side thereof.

(164) An image pickup system, characterized in that an image pickup device and a lens are provided on the same side of the longitudinal direction of an optical element having an extended curved surface.

(165) An image pickup system, characterized in that a lens is provided between an image pickup device and an optical element having an extended curved surface in the longitudinal direction of an optical element having an extended curved surface.

(166) An image pickup system, characterized in that a variable mirror and an image pickup device are located on one side of the longitudinal direction of an optical element having an extended curved surface and an optical element is provided on the other side thereof.

(167) An image pickup system, characterized in that an optical element and an image pickup device are located on one side of the longitudinal direction of an optical element having an extended curved surface and a variable mirror is provided on the other side thereof.

(168) An image pickup system, characterized in that an optical element and a variable mirror are located on one side of an optical element having an extended curved surface and an image pickup device is provided on the other side thereof.

(169) An image pickup system comprising a variable mirror, characterized in that the longitudinal direction of an image pickup device is not parallel with the symmetric surface of an optical system.

(170) An image pickup system, characterized in that the longitudinal direction of an image pickup device is not at a right angle with the symmetric surface of an optical system.

(171) An optical system, characterized by comprising a variable mirror wherein a principal curvature approximately defining the mirror surface shape thereof changes from positive to negative or negative to positive in a certain state.

(172) An optical system, characterized by comprising a variable mirror wherein a principal curvature approximately defining the mirror surface shape thereof changes from positive to negative or negative to positive in a certain state, and other optical element.
(173) An optical system, characterized by comprising a variable mirror wherein a principal curvature approximately defining the mirror surface shape thereof changes from nearly zero to minus (concaveness).
(174) An optical system, characterized by comprising a variable mirror wherein a principal curvature approximately defining the mirror surface shape thereof changes from nearly zero to minus (concaveness), and other optical element.
(175) An optical system, characterized by comprising a plurality of variable mirrors wherein the mirror surface shapes of at least two variable mirrors change in opposite directions in a certain state.
(176) A scaling optical system, characterized by comprising a plurality of variable mirrors wherein the mirror surface shapes of at least two variable mirrors change in opposite directions in a certain state.
(177) An optical system, characterized by comprising a plurality of variable mirrors wherein the mirror surface shapes of at least two variable mirrors change in the same direction in a certain state.
(178) A scaling optical system, characterized by comprising a plurality of variable mirrors wherein the mirror surface shapes of at least two variable mirrors change in the same direction in a certain state.
(179) An optical system comprising a variable mirror, characterized by satisfying at least one of expressions (12) to (13-1) in a certain operating state.
(180) An optical system comprising a variable mirror, characterized by satisfying at least one of expressions (14) to (15-1) in a certain operating state.
(181) An optical system comprising a variable mirror, characterized by satisfying at least one of expressions (16) to (17-2) in a certain operation state.
(182) An optical system comprising a variable mirror, characterized by satisfying at least one of expressions (18) to (19-2) in a certain operating state.
(183) An optical system comprising a variable mirror, characterized by satisfying expression (20) or (20-1).
(184) An optical system comprising a variable mirror, characterized by satisfying expression (21) in a certain operating state.
(185) An optical system comprising a variable mirror, characterized by satisfying at least one of expressions (22) to (22-1).
(186) An optical system comprising a variable mirror, characterized by satisfying at least one of expressions (16-3) or (17-3) in a certain operating state.
(187) An optical system comprising a variable mirror, characterized by satisfying at least one of expressions (23) to (24-1) in a certain operating state.
(188) A variable-optical property mirror, characterized in that its surface shape in a certain state is close to a part of a quadratic surface.
(189) A variable-optical property mirror, characterized in that a deviation from a quadratic surface approximately defining its surface shape in a certain state satisfies expression (2).
(190) A variable-optical property mirror, characterized in that a deviation from a quadratic surface approximately defining its surface shape in a certain state is within 1 mm.
(191) A variable-optical property mirror, characterized in that a deviation from a quadratic surface approximately defining its surface shape in a certain state is within 10 mm.
(192) An optical system, characterized in that a variable mirror is located in front to, in the rear of or in the vicinity of a stop, so that the variable mirror can be operated for focusing.
(193) An optical system, characterized in that a variable mirror is located in front to, in the rear of or in the vicinity of a stop, so that the variable mirror can be operated for zooming.
(194) An optical system, characterized in that there is a stop on an optical path between at least two of a plurality of variable mirrors.
(195) An optical system, characterized by comprising a variable mirror at a position where the height of a chief ray is higher than that of a marginal ray.
(196) An optical system, characterized by comprising a variable mirror at a position where the height of a chief ray is lower than that of a marginal ray.
(197) A variable mirror, characterized by comprising a stop at the peripheral area of a variable mirror.
(198) An optical system, characterized by at least one variable mirror in a moving group.
(199) An optical system, characterized in that at least one of the transformation of the variable mirror or the movement of an optical element is performed for zooming, and at least one of the movement of the optical element or the transformation of the variable mirror is performed for focus adjustment.
(200) An optical system, characterized in that an optical element is moved for zooming, and at least one of the movement of the optical element or the transformation of the variable mirror is performed for focus adjustment.
(201) An optical system comprising a variable mirror, characterized in that an optical element is moved for zooming, and at least one of the movement of the optical element or the transformation of the variable mirror is performed for focus adjustment.
(202) An optical system comprising a variable mirror, characterized in that at least one of the transformation of the variable mirror, the movement of a lens or the movement of the variable mirror is performed for zooming, and at least one of the movement or transformation of the lens or variable mirror or the transformation of the variable mirror is performed for focus adjustment.
(203) An optical system comprising a variable mirror, characterized in that a lens is moved for zooming, and at least one of the movement of the lens or the transformation of the variable mirror is performed for focus adjustment.
(204) An optical system comprising a variable mirror, characterized in that the variable mirror is moved for zooming, and at least one of the movement of the lens, the movement of the variable mirror or the transformation of the variable mirror is performed for focus adjustment.

(205) An optical system comprising a variable mirror, characterized in that the variable mirror is transformed for zooming, and at least one of the movement of the lens or the transformation of the variable mirror is performed for focus adjustment.

(206) An optical system comprising a variable mirror, characterized in that a lens is moved for zooming, and the variable mirror is transformed for focus adjustment.

(207) An optical system comprising a variable mirror, characterized in that a lens is moved and the variable mirror is transformed for zooming, and the variable mirror is transformed for focus adjustment.

(208) A variable-optical property mirror, characterized in that the surface shape thereof is changed with electrostatic force.

(209) A variable-optical property mirror, characterized in that the surface shape thereof is changed with electromagnetic force.

(210) A variable-optical property mirror, characterized by comprising a permanent magnet, wherein the surface shape thereof is changed with electromagnetic force.

(211) A variable-optical property mirror, characterized by comprising a coil and a permanent magnet, wherein the surface shape thereof is changed with electromagnetic force.

(212) A variable-optical property mirror, characterized by comprising a permanent magnet and a coil integrated with a mirror substrate, wherein the surface shape of the variable mirror is changed with electromagnetic force.

(213) A variable-optical property mirror, characterized by comprising a coil and a permanent magnet integrated with a mirror substrate, wherein the surface shape of the variable mirror is changed with electromagnetic force.

(214) A variable-optical property mirror, characterized by comprising a plurality of coils and a permanent magnet integrated with a mirror substrate, wherein the surface shape of the variable mirror is changed with electromagnetic force.

(215) A variable-optical property mirror, characterized by comprising a plurality of coils and a permanent magnet, wherein the surface shape of the variable mirror is changed with electromagnetic force.

(216) A variable-optical property mirror, characterized by comprising a permanent magnet and a plurality of coils integrated with a mirror substrate, wherein the surface shape of the variable mirror is changed with electromagnetic force.

(217) A variable-optical property mirror, characterized by comprising a coil, wherein the surface shape of the variable mirror is changed with electromagnetic force.

(218) A variable-optical property mirror, characterized by comprising a plurality of coils, wherein the surface shape of the variable mirror is changed with electromagnetic force.

(219) A variable-optical property mirror, characterized by comprising a ferromagnetic body, wherein the surface shape of the variable mirror is changed with electromagnetic force.

(220) A variable-optical property mirror, characterized by comprising a ferromagnetic body and a coil located in opposition thereto, wherein the surface shape of the variable mirror is changed with electromagnetic force.

(221) A variable-optical property mirror, characterized by comprising a ferromagnetic mirror substrate and a coil, wherein the surface shape of the variable mirror is changed with electromagnetic force.

(222) An optical system, characterized by comprising a plurality of reflecting surfaces, wherein at least one surface thereof is a variable mirror with an entrance optical axis making an angle of up to 30° with an exit optical axis.

(223) An optical system, characterized by comprising a plurality of reflecting surfaces, wherein at least one surface thereof is a variable mirror with an entrance optical axis making an angle of up to 30° with an exit optical axis and a distance between both optical axes being within 20 mm.

(224) An optical system, characterized by comprising a plurality of reflecting surfaces, wherein at least one surface thereof is a variable mirror and the absolute value of the imaging magnification thereof is 0.5 to 2 inclusive.

(225) A vari-focus optical system, characterized by comprising a plurality of variable mirrors and a lens.

(226) A vari-focus optical system, characterized by comprising a variable mirror and a lens.

(227) An optical system, characterized by comprising a plurality of variable mirrors and a lens, wherein zooming or scaling is performed.

(228) An optical system, characterized by comprising a variable mirror, wherein the entrance angle of an optical axis with respect to the variable mirror is 5° to 60° inclusive.

(229) An optical system, characterized by comprising a variable mirror and a lens, wherein the entrance angle of an optical axis with respect to the variable mirror is 5° to 60° inclusive.

(230) An optical system, characterized by comprising a variable mirror, wherein the entrance angle of an optical axis with respect to the variable mirror is up to 44°.

(231) An optical system, characterized by comprising a variable mirror and a lens, wherein the entrance angle of an optical axis with respect to the variable mirror is up to 44°.

(232) An optical system, characterized by comprising a plurality of variable mirrors and a lens, wherein the entrance angle of an optical axis with respect to the variable mirrors is 5° to 60° inclusive.

(233) An optical system, characterized by comprising a plurality of variable mirrors and a lens, wherein the entrance angle of an optical axis with respect to the variable mirrors is 5° to 60° inclusive, and zooming or scaling is performed.

(234) An optical system, characterized by comprising a plurality of variable mirrors and a lens, wherein the entrance angle of an optical axis with respect to the variable mirrors is 5° to 44° inclusive.

(235) An optical system, characterized by comprising a plurality of variable mirrors and a lens, wherein the entrance angle of an optical axis with respect to the variable mirrors is 5° to 44° inclusive, and zooming or scaling is performed.

(236) An optical system comprising a variable mirror, characterized in that when an entrance optical axis and an exit optical axis for the optical system or a part of the optical system are projected on a certain plane, they cross each other.

(237) An optical system, characterized by comprising, in order from its object side, a first group having negative refracting power and a second group having positive refracting power, wherein one reflecting surface is interposed between the first group and the second group, said reflecting surface being a variable-shape mirror wherein the focal length thereof is changed by transformation.

(238) The optical system according to (237) above, characterized in that when an object point is nearly at infinity, the variable-shape mirror takes a substantially planar form.

(239) The optical system according to (237) above, characterized in that the surface shape of the variable-shape mirror is a free-form surface.

(240) An optical system, characterized by comprising, in order from its object side, a first group having negative refracting power, a second group having a plurality of reflecting surfaces and a third group having positive refracting power, wherein at least one reflecting surface in the second group is a variable-shape mirror wherein the focal length thereof is changed by transformation.

(241) The optical system according to (240) above, characterized in that when an object point is nearly at infinity, the variable-shape mirror takes a substantially planar form.

(242) The optical system according to (240) above, characterized in that the surface shape of the variable-shape mirror is a free-form surface.

(243) The optical system according to (240) above, characterized in that the second group comprises, in order from its object side, a first reflecting surface, a second reflecting surface and a third reflecting surface, wherein the second reflecting surface is a variable-shape mirror whose focal length is changed by transformation.

(244) An optical system, characterized by comprising a gradient index lens having a refractive index profile in a lens medium and at least one reflecting surface, wherein said at least one reflecting surface is a variable-shape mirror whose focal length is changed by transformation.

(245) The optical system according to (244) above, characterized in that the gradient index lens has positive refracting power.

(246) An optical system, characterized by comprising at least one reflecting surface that is moved when the optical system is collapsed, and at least one variable-shape mirror.

(247) The optical system according to (246) above, characterized in that said reflecting surface is a variable-shape mirror whose focal length is changed by transformation.

(248) An optical system, characterized by comprising at least three reflecting surfaces, wherein at least one reflecting surface is a variable-shape mirror whose focal length is changed by transformation, and when the optical axis of the optical system is defined by a light ray through the center of an image plane at an imaging position, the direction of said optical axis entered on the first surface of the optical system is substantially in coincidence with that of the optical axis entered on said imaging position.

(249) The optical system according to (248) above, characterized in that said optical system is made up of a prism having a lens action and reflecting surfaces.

(250) An optical system, characterized by at least three reflecting surfaces to guide an incident light ray on one optical fiber to another optical fiber, wherein at least one reflecting surface is a variable-shape mirror whose focal length is changed by transformation.

(251) The optical system according to (250) above, characterized in that said optical system is made up of a prism having a lens action and reflecting surfaces.

(252) An optical system, characterized by comprising at least three reflecting surfaces to form an image substantially with life-size, wherein at least one reflecting surface is a variable-shape mirror whose focal length is changed by transformation.

(253) The optical system according to (252) above, characterized in that said optical system is made up of a prism having a lens action and reflecting surfaces.

(254) An optical system, characterized by comprising a plurality of lens groups and a reflecting surface defined by at least one variable-shape mirror whose focal length is changed by transformation, wherein scaling is performed by the movement of at least one lens group on the optical axis of the optical system and a displacement of a focus position with scaling is corrected by said variable-shape mirror.

(255) The optical system according to (254) above, characterized in that the optical system comprises, in order from its object side, a negative, first group, a positive, second group and a subsequent group, wherein the second lens group is moved on the optical axis for scaling.

(256) The optical system according to (254) above, characterized in that a reflecting surface is interposed between the first group and the second group.

(257) The optical system according to (254) above, characterized in that when an object point is nearly at infinity, the variable-shape mirror takes a substantially planar form.

(258) The optical system according to (254) above, characterized in that the surface shape of the variable-shape mirror is a free-form surface.

(259) An optical system, characterized by comprising lens groups and a variable mirror, where at least one lens group is moved on the optical axis of the optical system for scaling, and displacements of the focus position of the optical system with object distance changes or scaling or fluctuations of aberrations with object distance changes or scaling are corrected by said variable mirror.

(260) An optical system, characterized by comprising lens groups and a variable mirror, wherein at least one lens group is moved on the optical axis of the optical system for zooming, and when focus adjustment is performed, the action of said variable mirror on the reflection of light rays changes.

(261) An optical system, characterized by comprising lens groups and a variable mirror, where at least one lens group is moved for scaling, and displacements of the focus position of the optical system with object distance changes or scaling or fluctuations of aberrations with object distance changes or scaling are corrected by said variable mirror.

(262) An optical system, characterized by comprising lens groups and a variable mirror, wherein at least one lens group is moved for zooming, and when focus adjustment is performed, the action of said variable mirror on the reflection of light rays changes.

Throughout the above-enumerated embodiments of the present invention, the aforesaid expressions may be replaced by mathematically equivalent conditions.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 61 is illustrative in section of the optical system according to Example O of the present invention at its wide-angle end, standard setting and telephoto end.

DESCRIPTION OF THE PREFERRED EMBODIMENTS

Embodiments of the optical apparatus according to the present invention are now explained.

Figure 1:
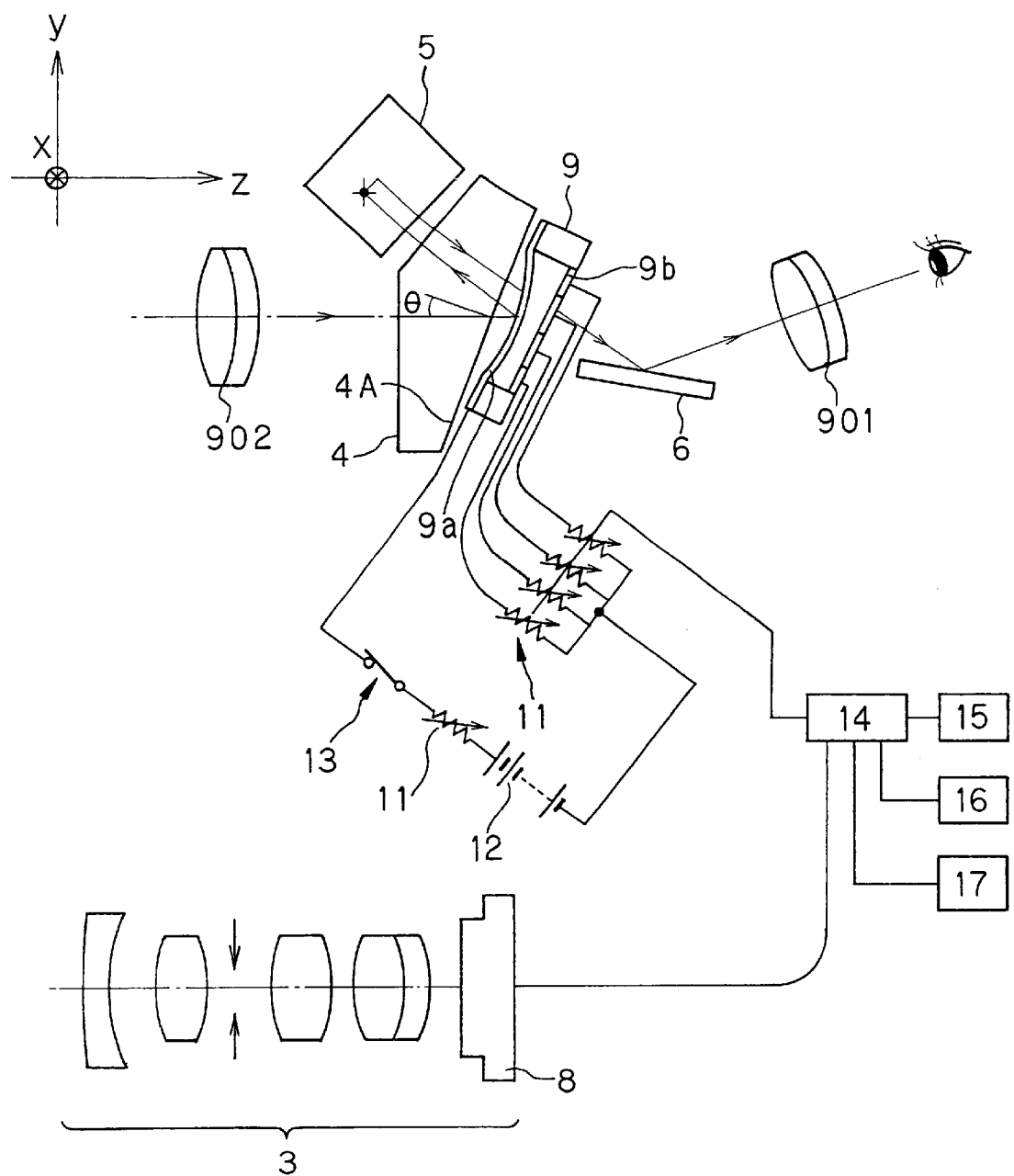
FIG. 1 is illustrative of the construction of one embodiment of the optical apparatus according to the present invention.

FIG. 1 is illustrative of the construction of one specific embodiment of the optical apparatus according to the present invention. An exemplary digital camera finder using an variable-optical property mirror 9 is shown in FIG. It is understood that this apparatus may also be used on a silver-salt film camera. The variable-optical property mirror 9 is now explained.

The mirror 9 having variable optical properties (hereinafter called a variable mirror for short) comprises an aluminum-coated thin film (reflecting surface) 9a and a plurality of electrodes 9b. Reference numeral 11 represents a plurality of variable resistors connected to the respective electrodes 9b, 12 a power source connected between the thin film 9a and the electrodes 9b via the variable resistors 11 and a power source switch 13, 14 an operating unit for controlling the resistance values of a plurality of variable resistors 11, and 15, 16 and 17 stand for a temperature sensor, a humidity sensor and a distance sensor, respectively, each connected to the operating unit 14. These elements are arranged as shown to construct one specific optical apparatus according to the present invention.

It is here noted that the respective surfaces of an objective lens 902, an eyepiece lens 901, a prism 4, an isosceles right-angle prism 5 and a mirror 6 are defined not only by planar surfaces but also by other desired surfaces such as spherical surfaces; rotationally symmetric aspheric surfaces; spherical surfaces, planar surfaces and rotationally symmetric aspheric surfaces eccentric with respect to the optical axis of the optical apparatus; aspheric surfaces having a plane of symmetry; aspheric surfaces having only one plane of symmetry; plane-of-symmetry free aspheric surfaces; free-form surfaces; and surfaces having an undifferentiable point or line. In addition, reflecting surfaces or refracting surfaces, too, may be used provided that they have some influences on light. In the following disclosure, these surfaces will be collectively called the extended curved surfaces.

As is the case with membrane mirrors set forth typically in P. Rai-choudhury, "Handbook of Microlithography, Micromachining and Microfabrication", Volume 2: Micromachining and Microfabrication, page 495, FIG. 8.58, SPIE Press and "Optics Communication", Vol. 140 (1997), pp. 187–190, the thin film 9a is transformed by electrostatic force generated when voltage is applied between it and a plurality of electrodes 9b, resulting in the transformation of its surface shape. In turn, this does not only enable focus adjustment to be done according to the diopter of a viewer, but also makes it possible to reduce changes in the shape and refractive index, due to temperature and humidity changes, of the lenses 901, 902 and/or the prism 4, isosceles right-angle prism 5 and mirror 6 or reduce a lowering of the imaging capability of the optical apparatus due to the expansion and contraction, and deformation of a lens barrel and assembly errors of parts such as optical elements, barrels, etc., so that focus adjustment can always be properly achieved with correction of aberrations caused by focus adjustment.

According to this embodiment, light coming from an object is refracted at the respective entrance and exit surfaces of the objective lens 902 and prism 4, then reflected at the variable mirror 9, then transmitted through the prism 4, then reflected at the isosceles right-angle prism 5 (in FIG. 1, the + symbol in the optical path indicates that light rays propagate toward the rear side of the paper), then reflected at the mirror 6 and finally entered into the eye of the viewer via the eyepiece lens 901. Thus, a viewing optical system for the optical apparatus of this embodiment is constructed of the lenses 901 and 902, prisms 4 and 5, and variable mirror 9. By optimizing the surface shape and thickness of each optical element, it is possible to minimize aberrations of an object image.

More specifically, the shape of the thin film 9a acting as the reflecting surface is controlled by varying the resistance value of each variable resistor in response to a signal from the operating unit 14, thereby optimizing the imaging capability. To this end, signals of the magnitude commensurate with ambient temperature and humidity and the distance to the object are entered from the temperature sensor 15, humidity sensor 16 and distance sensor 17 into the operating unit 14 so that, on the basis of these input signals, the operating unit 14 produces signals for determining the resistance values of the variable resistors 11. Thus, a voltage for determining the shape of the thin film 9a is applied on the electrodes 9b, thereby making up for any possible lowering of the imaging capability due to the ambient temperature and humidity conditions and the distance to the object, so that the thin film 9a is transformed by the voltage applied on the electrodes 9a, i.e., electrostatic force. It is accordingly possible for the thin film 9a to assume on various shapes inclusive of aspheric shape as occasion may demand. It is here noted that the distance sensor 17 may be dispensed with. In this case, however, it is understood that an image pickup lens 3 of a digital camera is moved in such a way that the high-frequency component of image signals from a solid-state image pickup device 8 is substantially maximized. Then, if the object distance is calculated from that position to transform the variable mirror, it is then possible to adjust the focus to the eye of the viewer.

More preferably, the thin film 9a should be formed of synthetic resins such as polyimides because it can be largely transformed even at low voltages. It is here noted that the prism 4 and variable mirror 9 may be integrated into a unit that is one specific example of the optical apparatus according to the present invention.

Although not illustrated, it is acceptable to provide the solid-state image pickup device 8 integrally onto the substrate of the variable mirror 9 by means of a lithography process.

If the lenses 901, 902, prisms 4, 5, and mirror 6 are formed by plastic molding, etc., they can then be easily fabricated with any desired curved surfaces. In the image pickup system according to this embodiment, the lenses 901 and 902 are spaced away from the prism 4. However, if the prisms 4, 5, mirror 6 and variable mirror 9 are designed in such a way that aberrations are eliminated without recourse to the lenses 901 and 902, the prisms 901, 902 and variable mirror 901 then provide an easy-to-assemble single optical block. It is also acceptable to use glasses for a part, or the whole, of the lenses 901, 902, prisms 4, 5, and mirror 6. In this case, it is possible to achieve an image pickup system having much more improved precision.

In the embodiment of FIG. 1, the operating unit 14, temperature sensor 15, humidity sensor 16 and distance sensor 17 are so provided that the changes in the temperature, humidity, distance and so on can be compensated for by the variable mirror 9. However, this is not essential. For instance, it is acceptable to dispense with the operating unit 14, temperature sensor 15, humidity sensor 16 and distance sensor 17; it is acceptable to make correction for only the change in the diopter of the viewer with the variable mirror 9.

When the variable mirror 9 is located in opposition to a prism surface 4A of the prism 4, it is required that light rays transmit through the prism surface 4A with no total reflection thereat, and be then incident on the variable mirror 9. In other words, the following expression (1) must be satisfied:

$$1/n > \sin \theta \quad (1)$$

Here n is the refractive index of the prism 4, and θ is the angle of incidence of light rays on the surface 4A within the prism 4. Expression (1) also goes true for an optical element other than the prism 4 located in opposition to the variable mirror 9.

Referring here to the surface shape of the variable mirror 9, it assumes planar shape in the absence of applied voltage. When voltage is applied on the variable mirror 9, however, it should preferably be transformed according to a part of a hyperboloid of revolution, as depicted by a thick line in FIG. 2, for the reason mentioned below.

Figure 2:
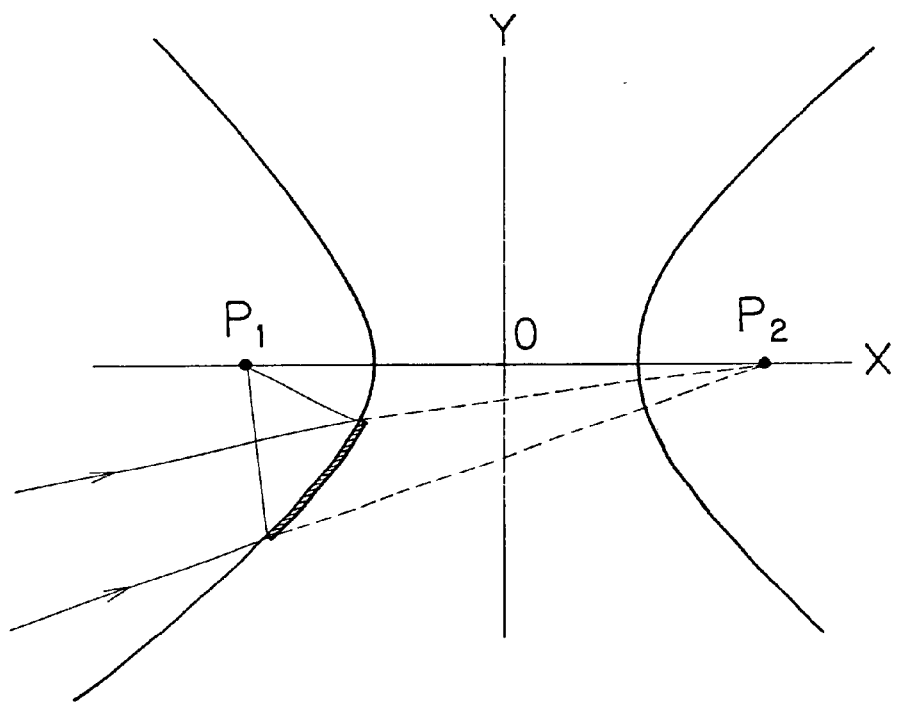
FIG. 2 is illustrative of a hyperboloid of revolution used for the surface shape of the variable mirror.

In FIG. 2, $P_1$ and $P_2$ are the focuses of a hyperbolic surface. To focus a light beam from the objective lens 902 on point $P_1$ with no aberrations when the light beam propagates toward the focus $P_2$, the shape of the variable mirror 9 should preferably be defined by a hyperboloid of revolution with focuses $P_1$ and $P_2$. In this regard, see Hiroshi Kubota, "Optics", pp. 136–137 (Iwanami Shoten, Publishers; Dec. 20, 1965).

When the objective lens 902 is not used, the shape of the variable mirror 9 should preferably be defined by a part of a hyperboloid of revolution, because a parallel light beam is incident on the variable mirror 9.

Figure 3:
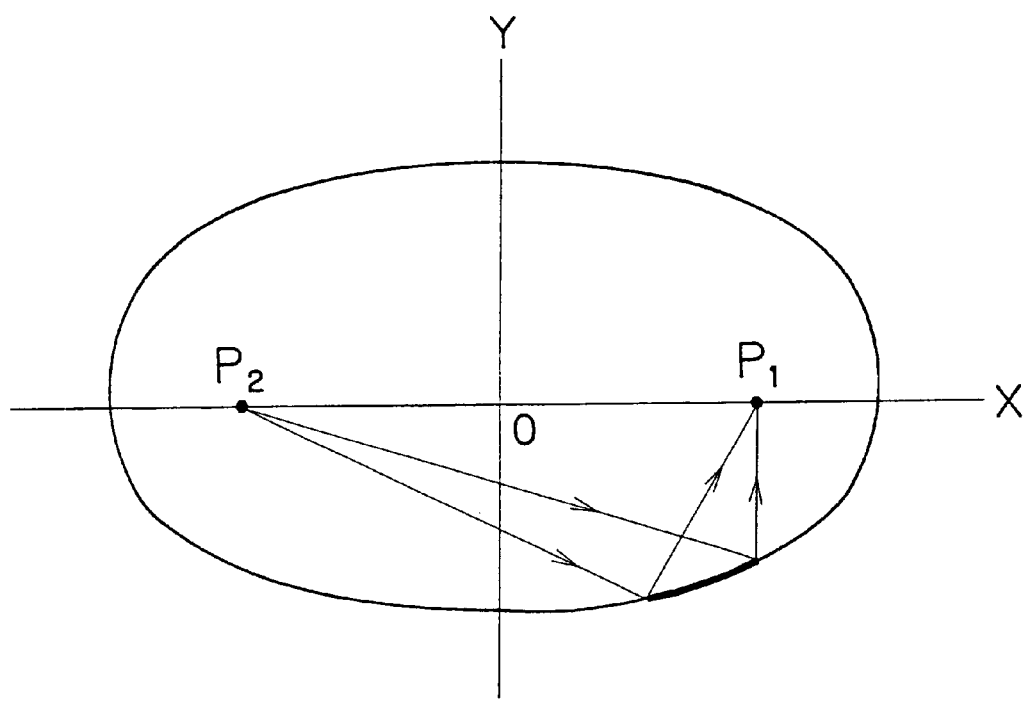
FIG. 3 is illustrative of an ellipsoid of revolution used for the surface shape of the variable mirror.

When the objective lens 902 is a concave lens, the variable mirror 9 should preferably be defined by a part—indicated by a thick line in FIG. 3—of an ellipsoid of revolution, because an image of the concave lens is formed on $P_2$ on the left side of the variable mirror 9.

When the light beam has the form of a divergent beam after reflected at the variable mirror 9, it is understood that the surface shape of the variable mirror 9 should be defined by a part of the hyperboloid of revolution.

In applications where high precision is not needed or aberrations can be cancelled by other optical element, or in consideration of the ability of the variable mirror 9 to form images of off-axis object points, etc., it is acceptable to use spherical surfaces, toric surfaces, and rotationally asymmetric quadratic surfaces (e.g., ellipsoids of revolution, paraboloids of revolution and anamorphic surfaces) as surfaces approximate to the aforesaid three aspheric surfaces (the ellipsoid of revolution, paraboloid of revolution, and hyperboloid of revolution).

Herein the four surfaces, i.e., the spherical surface, ellipsoid of revolution, paraboloid of revolution, and hyperboloid of revolution are collectively called the quadratic surface of revolution, all revolving around an X-axis. The X-axis is understood to refer to an axis where a focus exists, as shown in FIGS. 2 and 3.

Further herein, both the rotationally symmetric quadratic surface and the rotationally asymmetric quadratic surface are called the quadratic surface. The quadratic surface used herein is understood to refer to a curved surface represented by a quadratic expression with respect to x, y and z. In equation terms, this surface is given by $$\sum_{i=0}^{2}\sum_{j=0}^{2}\sum_{k=0}^{2} C_{ijk} x^i y^j z^k = 0 \qquad (1\text{-}1)$$

where i, j and k are each any one of 0, 1 or 2.

The foregoing conditions are provided to focus a light beam from an object point on the optical axis with no aberrations. In actual applications, however, it is required to take the formation of images of off-axis object points and aberrations due to other optical elements into consideration, and so the best shape of the variable mirror 9 deviates from the quadratic surface of revolution. The quantity of this deviation varies with optical systems. However, when a quadratic surface approximate to the shape of the variable mirror 9 is found as by the method of least squares, it is preferable that the deviation Δ from that quadratic surface is 1 mm at most in the range of light beam transmission. As the quantity of deviation exceeds the upper limit, there are a lot of problems such as a lowering of the ability of the variable mirror to focus the light beam on the optical axis.

In applications where high performance is not needed for optical systems, Δ should preferably be within 10 mm.

Otherwise, the following condition should preferably be satisfied for the same reason.

$$\Delta < (1/5) \times D \qquad (2)$$

where D is the diameter of a circle having the same area as the area of a portion of the variable mirror 9 through which the light beam transmits.

Almost generally throughout the present invention, the light rays should preferably be obliquely incident on the surface of the variable mirror 9 (i.e., in the oblique incidence mode). This is because when the light rays are vertically incident on that surface, the light reflected thereat propagates vertically with respect to the surface, going back through the optical system through which they have already passed.

The construction of the variable mirror 9 is now explained.

Figure 4:
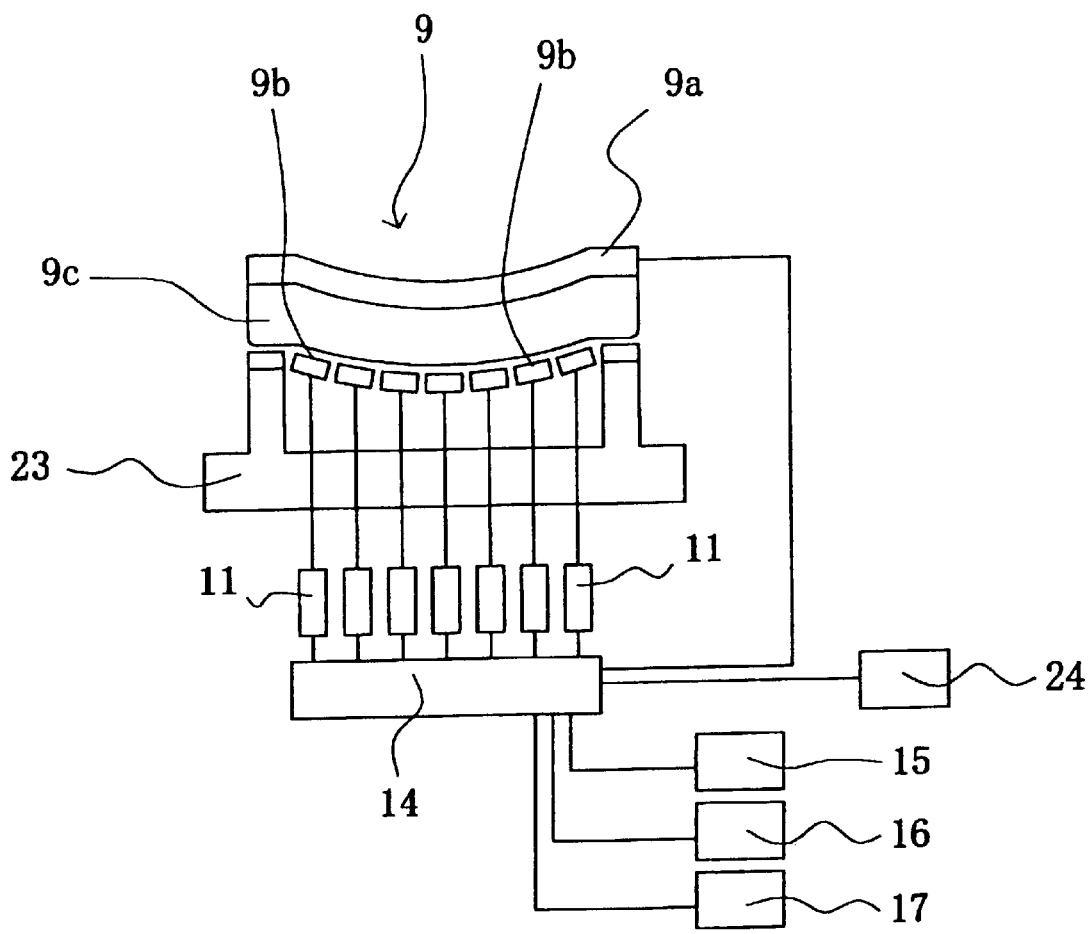
FIG. 4 is illustrative of another embodiment of the variable mirror.
Figure 5:
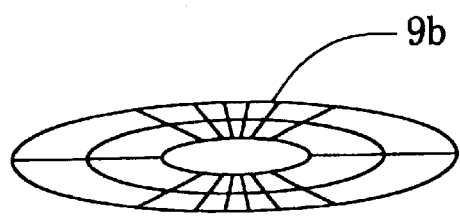
FIG. 5 is illustrative of a concentrically divided electrode.
Figure 6:
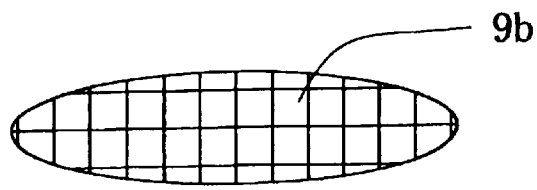
FIG. 6 is illustrative of a rectangularly divided electrode.

FIG. 4 is illustrative of another embodiment of the variable mirror 9, wherein a piezoelectric element 9c is interposed between a thin film 9a and an array of electrodes 9b, all mounted on a support 23. Voltage applied on the piezoelectric element 9c is varied for each electrode 9b to give locally different expanding and contracting actions on the piezoelectric element 9c, so that the shape of the thin film 9a can be changed. The electrode 9b may be configured in such a way that it is concentrically divided as shown in FIG. 5 or rectangularly divided as shown in FIG. 6. Other configurations, too, may be used, if they are proper. In FIG. 4, reference numeral 24 stands for a shake (blur) sensor connected to an operating unit 14. For instance, this shake sensor senses digital camera shake to change the voltage applied on the electrodes 9b via the operating unit 14 and variable resistors 11, so that the thin film 9a can be transformed to make up for an image blurred by the camera shake. At the same time, signals from a temperature sensor 15, a humidity sensor 16 and a distance sensor 17, too, are taken into account for the purposes of focus adjustment, temperature and humidity compensation, etc. In this case, stresses in association with the transformation of the piezoelectric element 9c are applied on the thin film 9a. It is thus preferable that the thin film 9a has a certain thickness enough to ensure reasonable strength.

Figure 7:
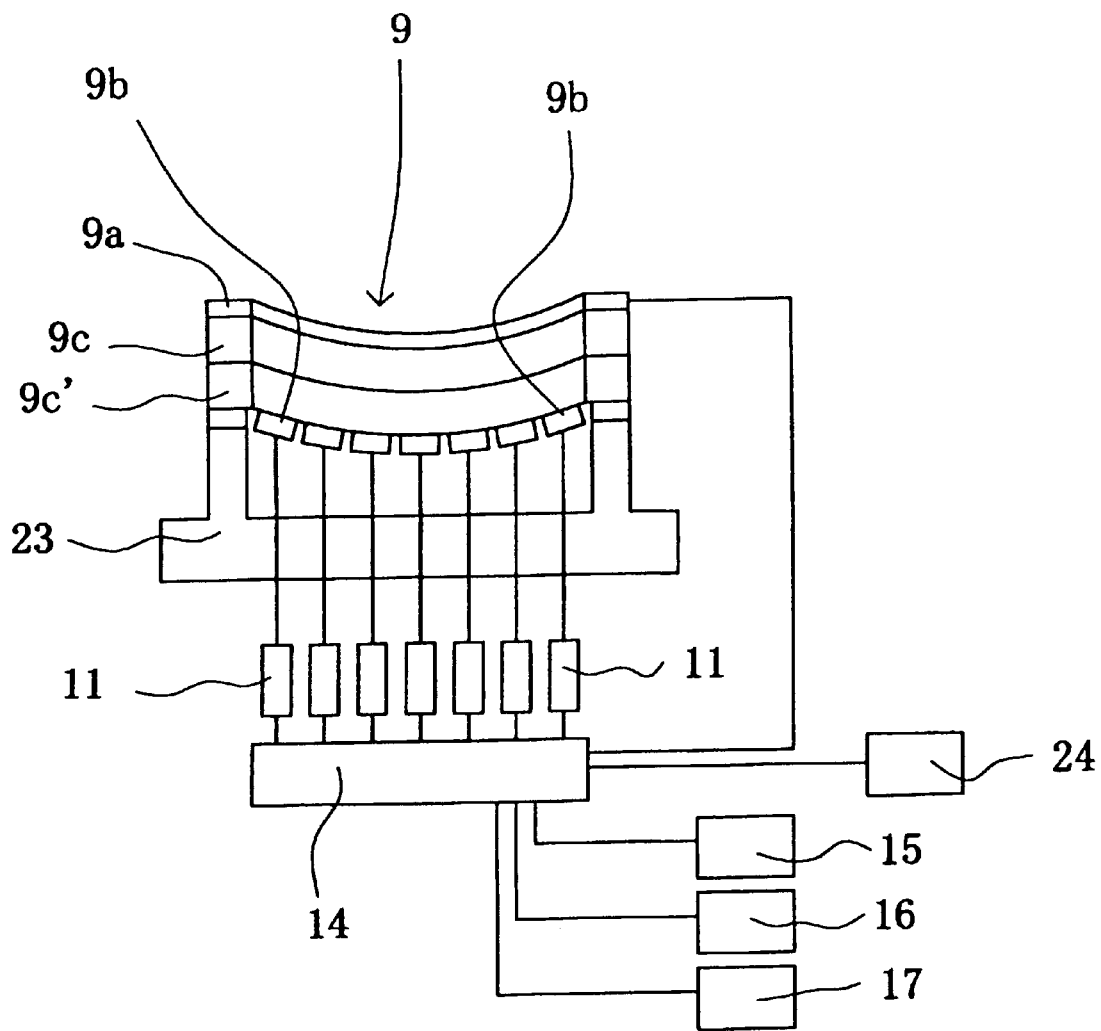
FIG. 7 is illustrative of yet another embodiment of the variable mirror.

FIG. 7 is illustrative of yet another embodiment of the variable mirror 9. This embodiment is different from that shown in FIG. 4 in that a piezoelectric device interposed between a thin film 9a and an array of electrodes 9b comprises two piezoelectric elements 9c and 9c' formed of materials having piezoelectric properties in opposite directions. If the piezoelectric elements 9c and 9c' are made of ferroelectric crystals, they should then be positioned in such a way that the direction of one crystal is reverse to that of another. The advantage of this embodiment is that the force for transforming the thin film 9a is larger than that in the FIG. 4 embodiment, so that the surface shape of the mirror can be largely changed, because the piezoelectric elements 9c and 9c' expand and contract in opposite directions upon the application of voltage thereon.

Materials used for the piezoelectric elements 9c and 9c', for instance, include piezoelectric materials such as barium titanate, Rochelle salts, rock crystals, tourmaline, potassium dihydrogen phosphate (KDP), ammonium dihydrogen phosphate (ADP) and lithium niobate, polycrystals and crystals of these piezoelectric materials, piezoelectric ceramics such as $PbZrO_3/PbTiO_3$ solid solutions, organic piezoelectric materials such as polyvinyldifluoride (PVDF), and other ferroelectric materials, among which the organic piezoelectric materials are most preferred because they have a Yonug's modulus so low that they can be largely transformed even at low voltage. It is here noted that when these piezoelectric elements are used, it is preferable to make their thickness uneven because the thin film 9a in the aforesaid embodiments can be properly transformed.

Figure 8:
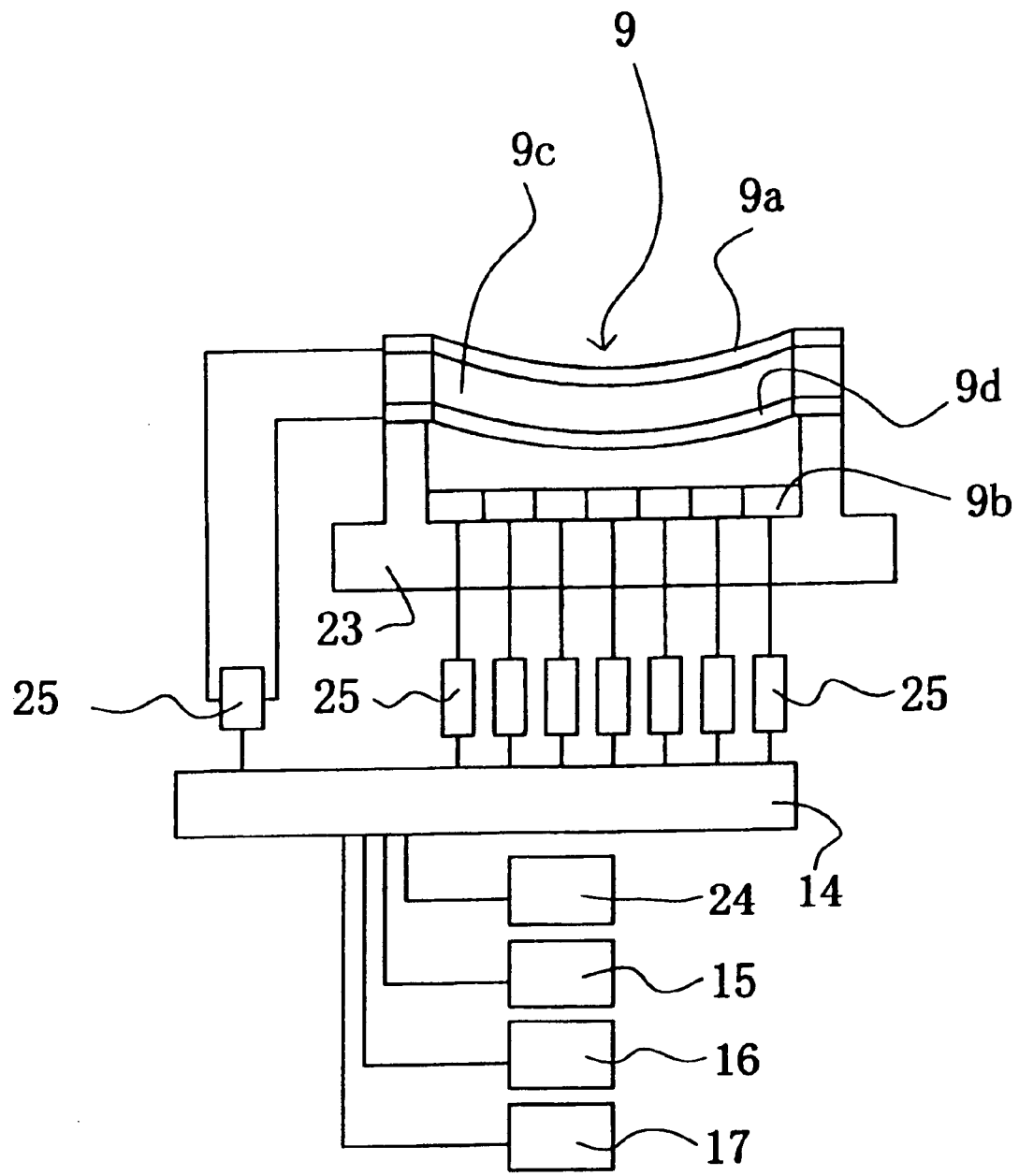
FIG. 8 is illustrative of a further embodiment of the variable mirror.

FIG. 8 is illustrative of a further embodiment of the variable mirror 9. In this embodiment, a piezoelectric element 9c is sandwiched between a thin film 9a and an electrode 9d to apply voltage between the thin film 9a and the electrode 9d via a driving circuit 25 controlled by an operating unit 14, and voltage is applied as well to an array of electrodes 9b via the driving circuit 25 controlled by the operating unit 14. Apart from this, voltage is also applied on the electrodes provided on a support 23 via the driving circuit 25 controlled by the driving circuit 25. Accordingly, the advantage of this embodiment is that much more patterns and much faster responses are achievable than could be possible with the aforesaid embodiments, because electrostatic force resulting from the voltage applied between the thin film 9a and the electrode 9d and the voltage applied to the electrodes 9b causes dual transformation of the thin film 9a.

Figure 9:
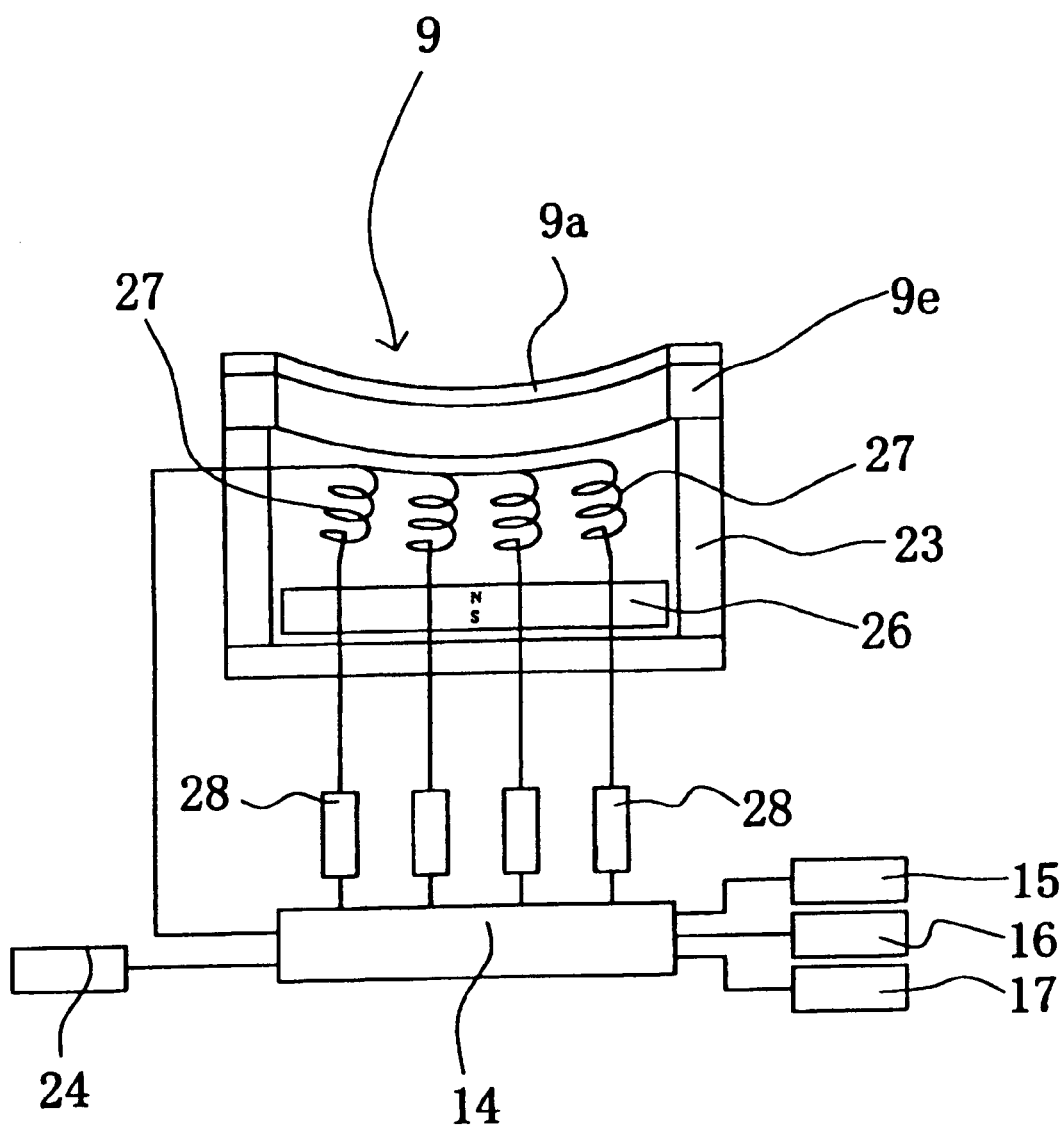
FIG. 9 is illustrative of a further embodiment of variable mirror.

FIG. 9 is illustrative of a further embodiment of the variable mirror 9, wherein the shape of its reflecting surface can be changed by use of electromagnetic force. The variable mirror 9 comprises a support 23, a permanent magnet 26 mounted on the inner bottom thereof, a substrate 9e which is formed of silicon nitride, polyimide or the like and whose peripheral edge is fixedly placed on the top surface thereof, and a thin film 9a added onto the surface of the substrate 9e and formed of an aluminum or other metal coat. The substrate 9e is provided on its lower surface with a plurality of coils 27, which are in turn connected via the respective driving circuits 28 to an operating unit 14. Accordingly, when proper currents are supplied from the respective driving circuits 28 to the respective coils 27 in response to output signals from the operating unit 14, which correspond to changes in the optical system, said changes being found from signals from sensors 15, 16, 17 and 24 in the operating unit 14, the respective coils 27 are repelled away from or sucked onto the permanent magnet 26 due to electromagnetic force occurring therebetween, so that the substrate 9e and thin film 9a can be transformed.

In this case, it is acceptable to feed different amounts of currents to the respective coils 27, or use one single coil 27. The coils 27 may be mounted on the inner bottom side of the support 23 while the permanent magnet 26 is added to the substrate 9e. Each or the coil 27 should preferably be formed as by lithography, and provided therein with a ferromagnetic core as well.

Figure 10:
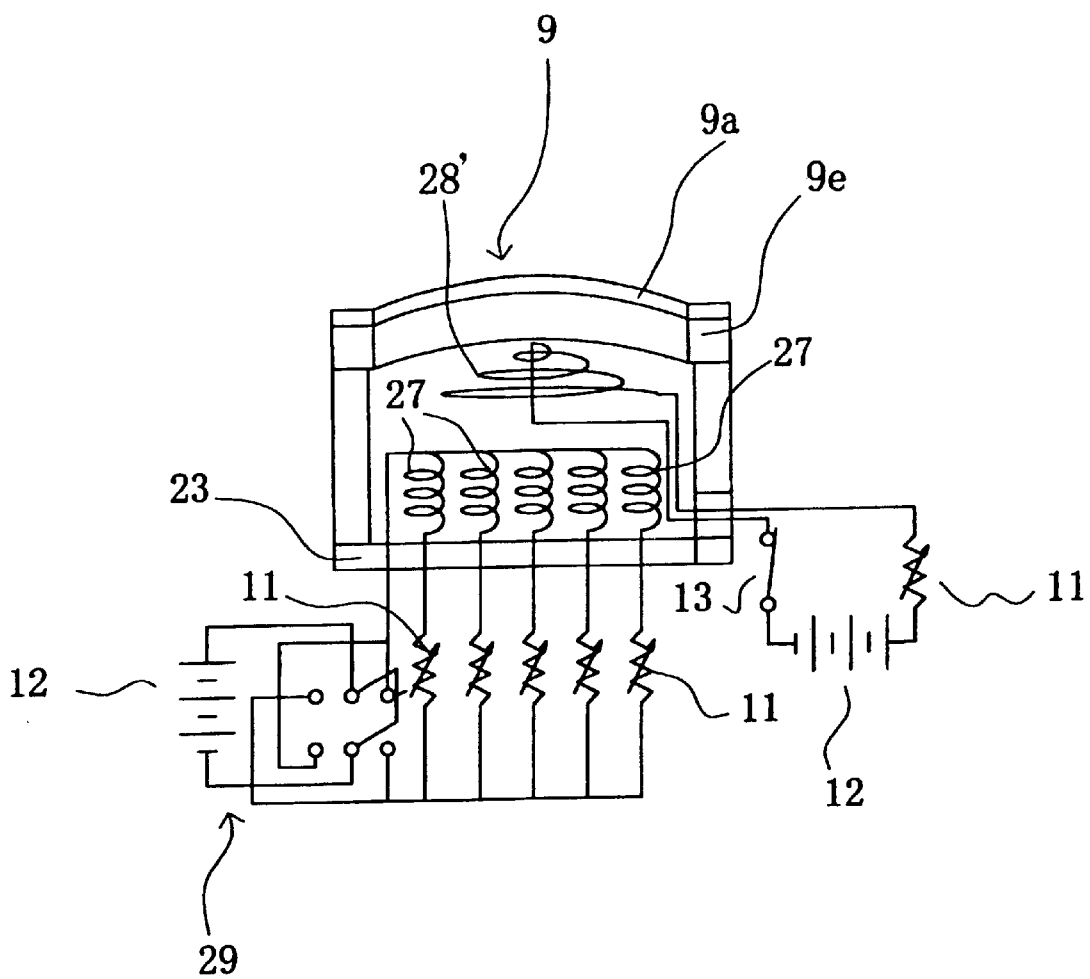
FIG. 10 is illustrative of a further embodiment of the variable mirror.

FIG. 10 is illustrative of a further embodiment of the variable mirror 9, wherein a substrate 9e is provided on its lower surface with a thin-film coil 28' and a support 23 is provided on its inner bottom with a plurality of coils 27 in opposition to the coil 28'. The thin-film coil 28' is connected with a variable resistor 11, a power source 12 and a power source switch 13 for feeding currents to the thin-film coil 28', if required. Each coil 27 is connected with an associated variable resistor 11, and there are provided a power source 12 for feeding currents to each coil 27 and an associated variable resistor 11 and a combined switchover and source open/close switch 29 for changing the direction of a current flowing through the coil 27. According to this embodiment, if the resistance values of the variable resistors 11 are respectively varied, it is then possible to change electromagnetic force occurring between each coil 27 and the thin-film coil 28' so that the substrate 9e and thin film 9a can be transformed into a movable mirror. If the switch 29 is flipped over to change the direction of the current flowing through the coil 27, it is then possible to transform the thin film 9a into a concave surface or a convex surface.

Figure 11:
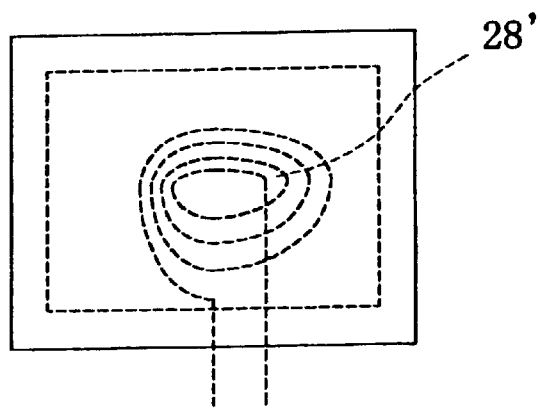
FIG. 11 is illustrative of how the winding density of the thin-film coil varies depending on location.
Figure 12:
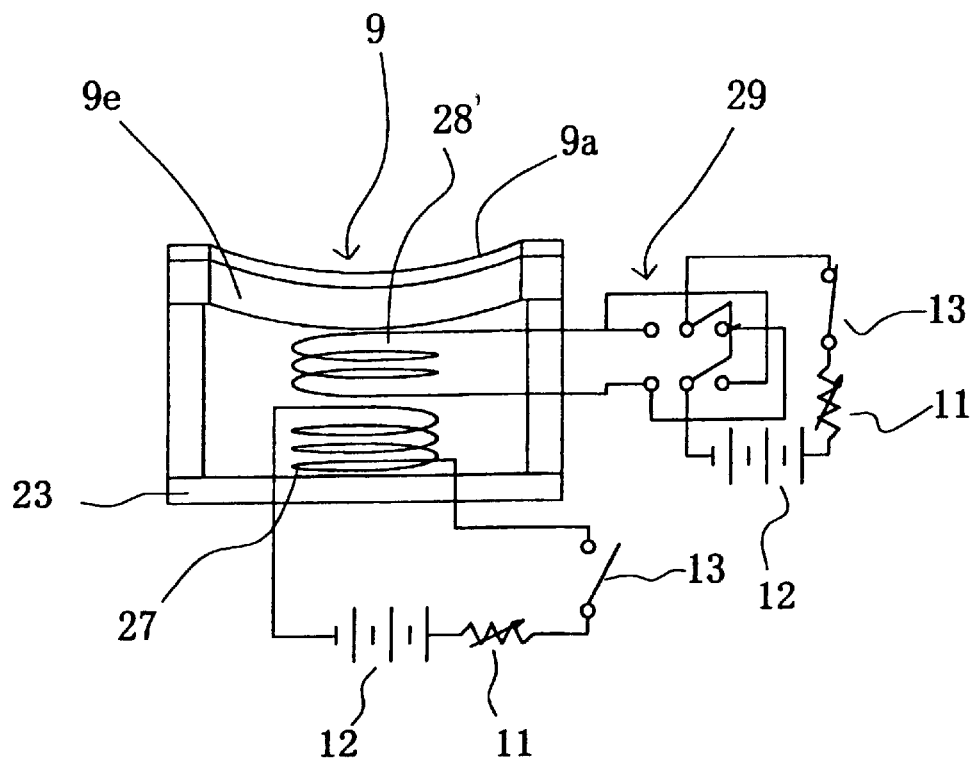
FIG. 12 is illustrative of one arrangement wherein one single coil is used.

In this case, if the winding density of the thin-film coil 28' is varied in a location-depending manner as shown in FIG. 11, it is then possible to provide any desired transformation of the substrate 9e and thin film 9a. As shown in FIG. 12, it is acceptable to use one single coil 17 or insert ferromagnetic cores in these coils 27. In addition, if the space defined by the support 27 is filled with a magnetic fluid, the electromagnetic force is then further augmented.

Figure 13:
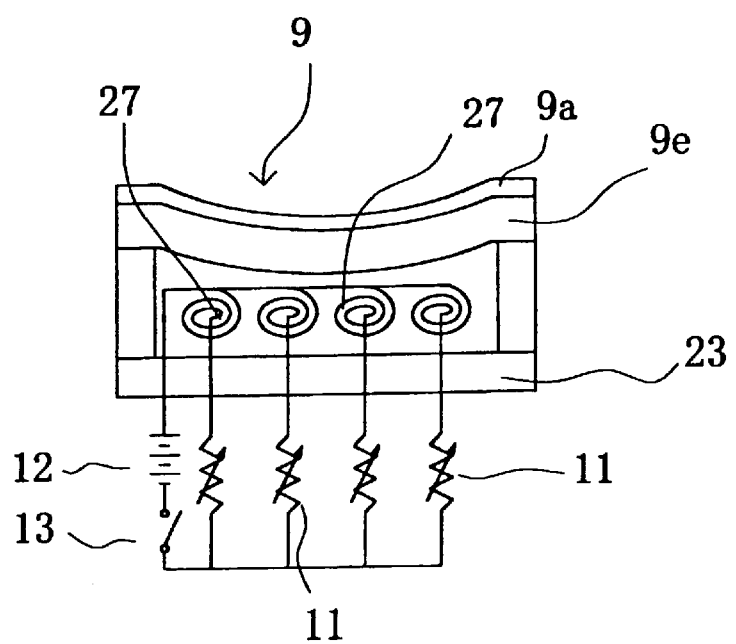
FIG. 13 is illustrative of a further embodiment of the variable mirror.
Figure 14:
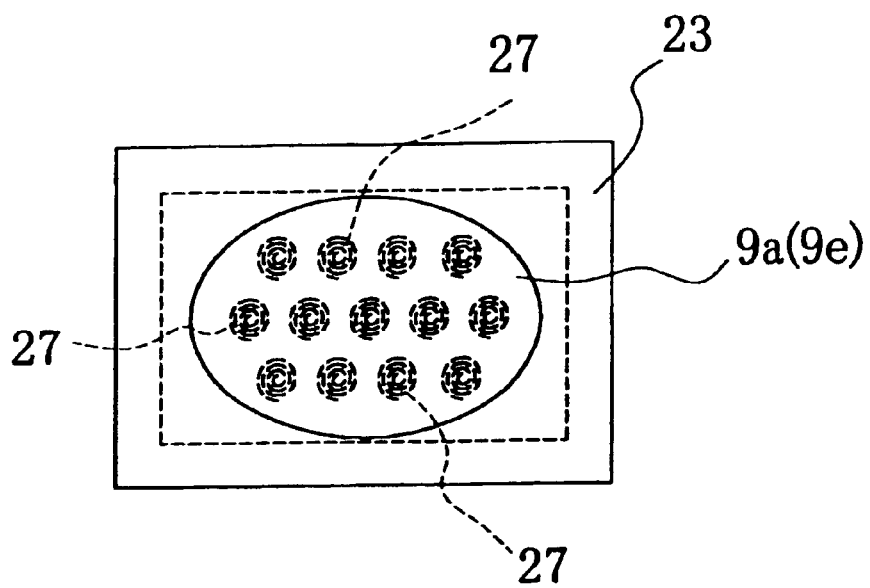
FIG. 14 is illustrative of one arrangement of the coils.
Figure 15:
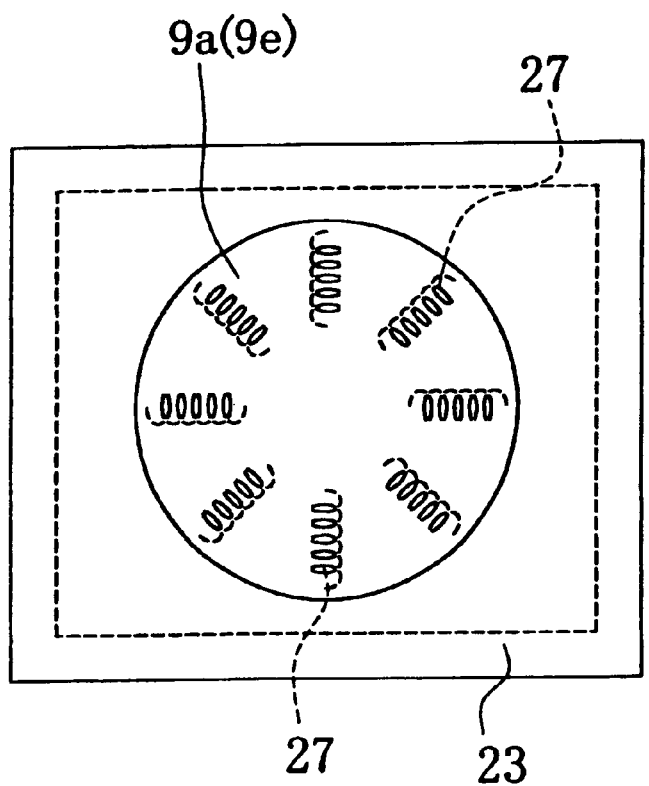
FIG. 15 is illustrative of another arrangement of the coils.
Figure 16:
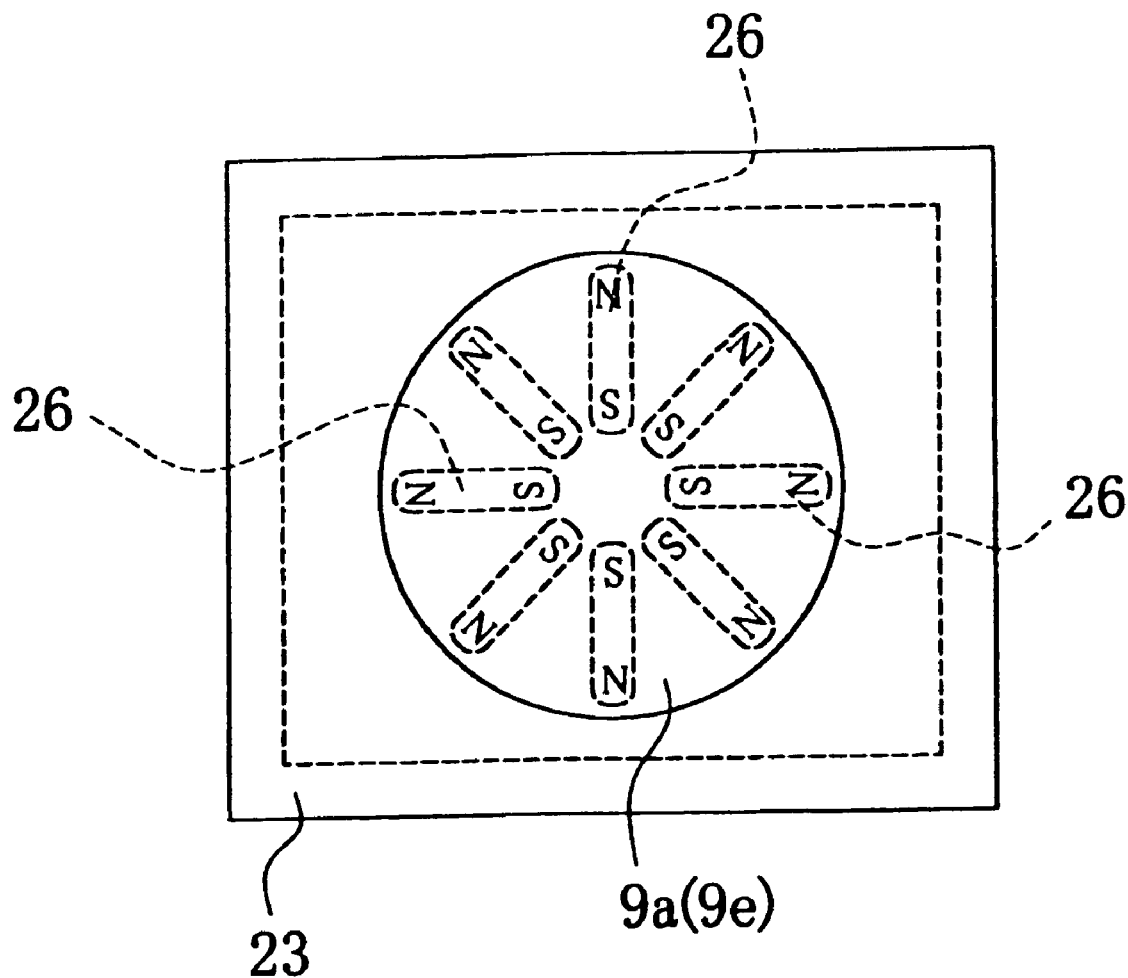
FIG. 16 is illustrative of how the permanent magnets are arranged in the embodiment of FIG. 9.

FIG. 13 is illustrative of a further embodiment of the variable mirror 9, wherein a substrate 9e is formed of a ferromagnetic material such as iron, and a thin film 9a acting as a reflecting surface is made up of aluminum or the like. Since, in this case, there is no need of providing any thin-film coil, this embodiment is simpler in construction and lower in fabrication cost than that shown in FIG. 10 as an example. If a combined switchover and power-source open/close switch 29 (see FIG. 10) is used in place a power source switch 13, it is then possible to change the direction of currents passing through the coils 27 and, hence, transform the substrate 9e and thin film 9a as desired. FIG. 14 is illustrative of one arrangement of the coils 27 in this embodiment, and FIG. 15 is illustrative of another arrangement thereof. It is here noted that these arrangements may also be applied to the embodiments shown in FIGS. 9 and 10. FIG. 16 is illustrative of one arrangement of permanent magnets 26 suitable for the FIG. 15 arrangement of the coils 27 in the FIG. 9 embodiment. If the permanent magnets 26 are arranged in such a radial manner as shown in FIG. 16, it is then possible to achieve a more delicate transformation of the substrate 9e and thin film 9a than could be possible with the FIG. 9 embodiment. An additional advantage of such embodiments (FIG. 9, 10 and 13 embodiments) wherein the substrate 9e and thin film 9a are transformed by use of electromagnetic force is to enable lower voltage driving as compared with the use of electrostatic force.

Figure 17:
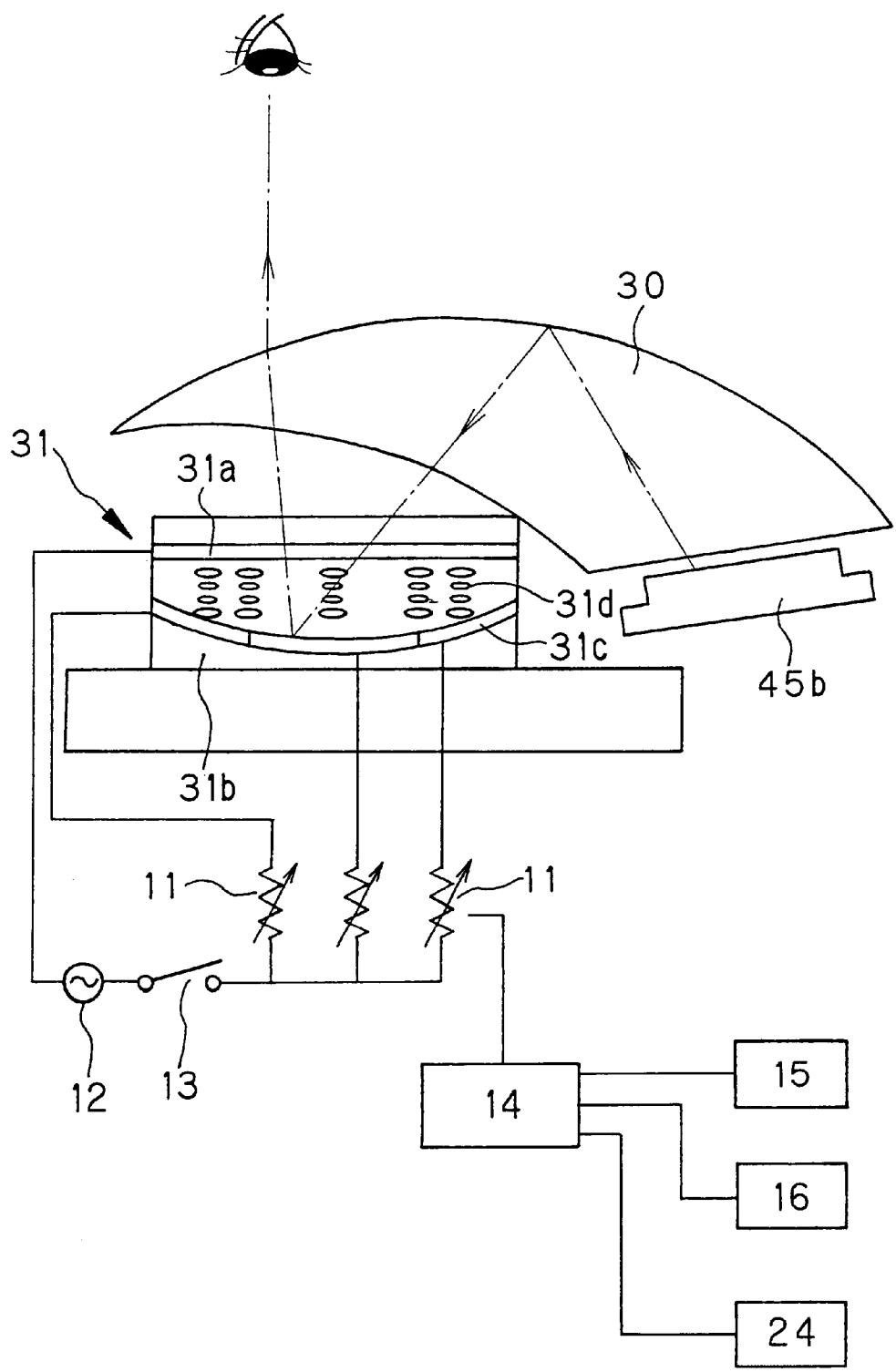
FIG. 17 is illustrative of the construction of the second embodiment of the optical apparatus according to the present invention.

FIG. 17 is illustrative of the second embodiment of the optical apparatus according to the present invention, viz., an electronic viewfinder. A difference between this embodiment and the aforesaid embodiment is that a liquid crystal variable mirror 31 comprising a mirror and a liquid crystal vari-focus lens located in front thereof is used to guide light from an LCD (liquid crystal display) 45 to the eye of a viewer via a prism 30. The liquid crystal variable mirror 31 is one example of the variable mirror. The liquid crystal variable mirror 31 is constructed by packing twisted nematic liquid crystals 31d between a transparent electrode 31a and a split electrode 31c coated on the surface of a curved surface form of substrate 31b and serving as a mirror as well. The helical pitch P of the twisted nematic liquid crystals 31d is designed to conform to $$P < 5\lambda \tag{3}$$

Here $\lambda$ is the wavelength of light. For visible light, $\lambda$ is equal to about 380 nm to 700 nm. With the twisted nematic liquid crystals 31d conforming to expression (3), it is possible to achieve a blur-free vari-focus mirror without recourse to any polarizing plate, because they have a substantially isotropic refractive index irrespective of the polarization direction of incident light.

It is here noted that when this optical apparatus is used in the form of an electronic viewfinder for low-cost digital cameras, it is practically often acceptable to use even twisted nametic liquid crystals 31d having a helical pitch P given by $$P < 15\lambda \tag{4}$$

Instead of the twisted nematic liquid crystals, liquid crystals having a helical structure capable of meeting expression (3) and (4), e.g., cholesteric or smectic liquid crystals or polymer-dispersed or stabilized liquid crystals may be used. Instead of the twisted namatic liquid crystals, it is also acceptable to use substances with electrically variable refractive indices.

Exemplary liquid crystal materials used as the liquid crystals are cholesteric liquid crystals, smectic liquid crystals, smectic C* liquid crystals, ferroelectric liquid crystals, antiferroelectric liquid crystals, tolan liquid crystals, difluorostilbene low-viscosity liquid crystals, banana type liquid crystals and discotic liquid crystals as well as polymer-stabilized or dispersed liquid crystals using these liquid crystals, among which the polymer-stabilized liquid crystals are most preferred because the orientation of liquid crystal molecules is easily controlled.

The ferroelectric, and antiferroelectric liquid crystals are also preferred because they have a response speed so high that even rapid shakes can be corrected.

Figure 18:
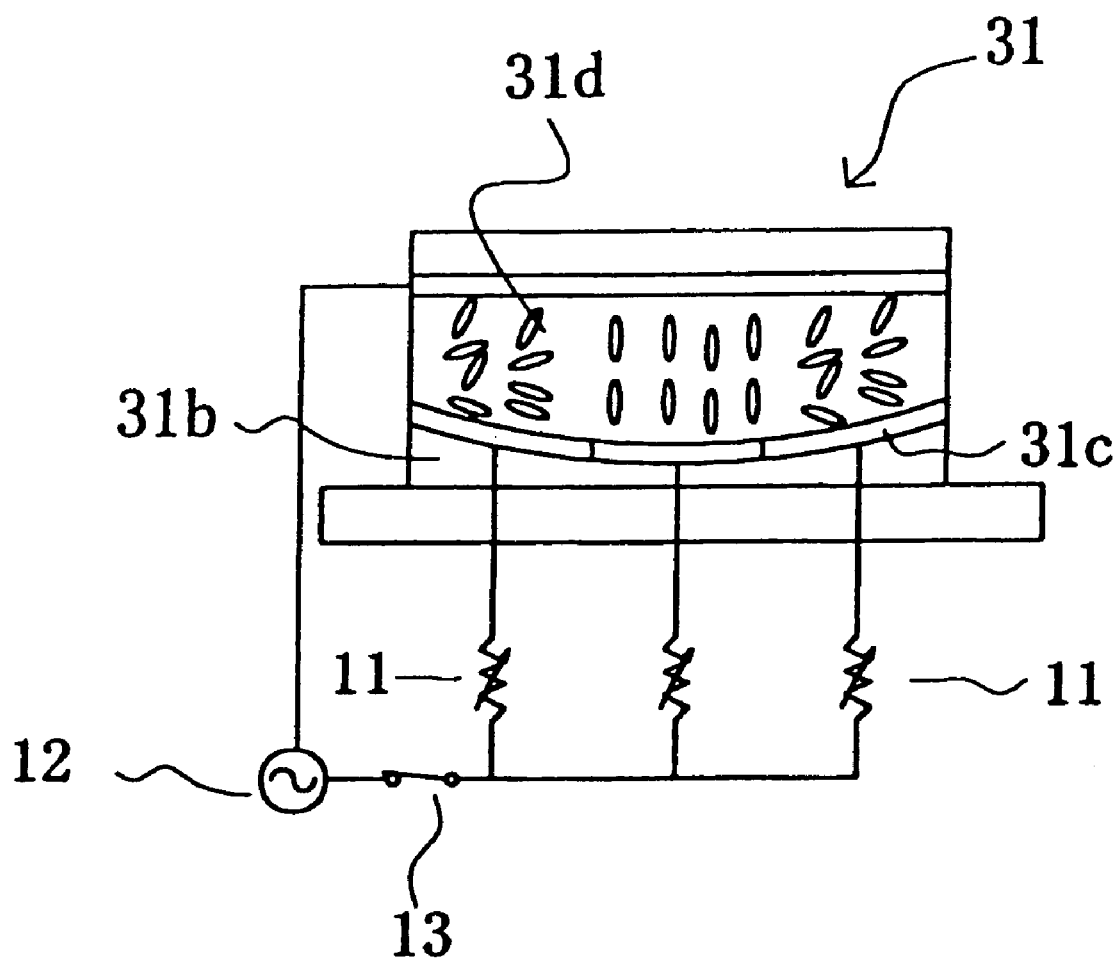
FIG. 18 is illustrative of the construction of a liquid crystal variable mirror.

When voltage is applied between the electrodes 31a and 31c in the aforesaid liquid crystal variable mirror 31, the direction of the liquid crystals 31d changes and so the refractive index of the liquid crystals with respect to incident light decreases as shown in FIG. 18, resulting in changees in the reflecting action, e.g., focal length of the liquid crystal variable mirror 31. Accordingly, if, with diopter adjustment, the resistance value of each variable resistor 11 is properly adjusted depending on temperature changes and mirror shake during phototaking, it is then possible to compensate the prism 30 for temperature changes and prevent mirror shake during observation. Instead of varying the voltage applied between the electrodes 31a and 31c, it is acceptable to vary the frequency of the applied voltage. It is thus possible to change the lineup of liquid crystal molecules and, hence, achieve a vari-focus.

Figure 19:
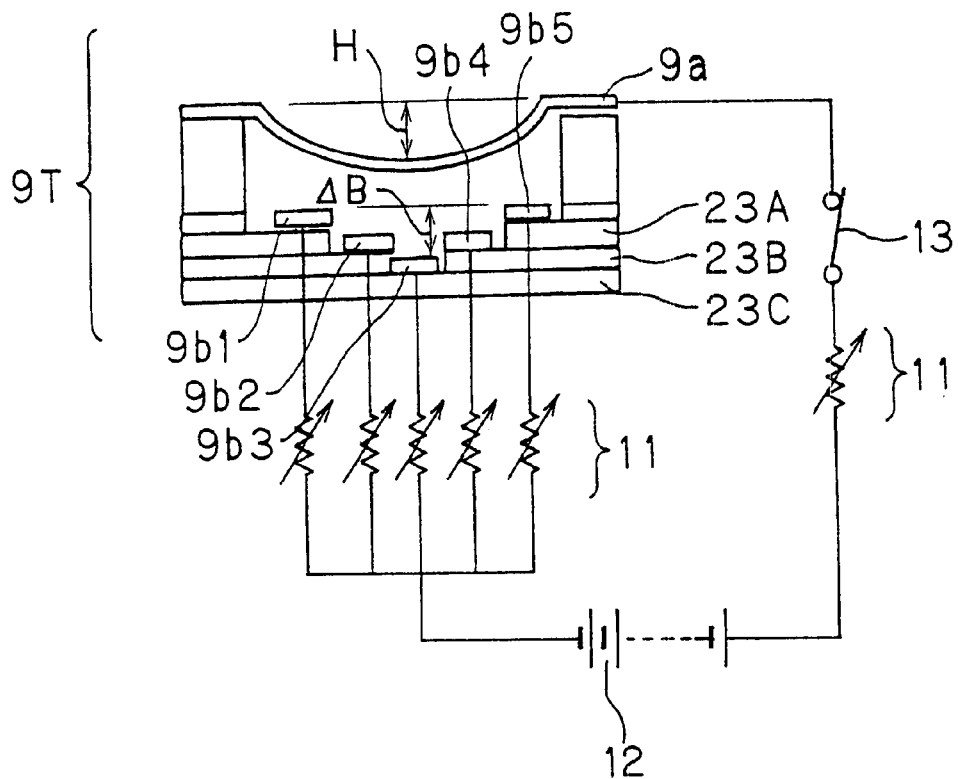
FIG. 19 is illustrative of one specific embodiment of the electrostatically driven mirror used in the present invention.

FIG. 19 is illustrative of one specific embodiment of an electrostatically driven mirror 9T used in the present invention. This mirror is characterized in that electrodes $9b1$, $9b2$, $9b3$, $9b4$ and $9b5$ are not positioned on the same planar shape. The electrodes $9b1$, $9b2$, $9b3$, $9b4$ and $9b5$ are formed on different substrates 23A, 23B and 23C positioned on different planes. The merit of this mirror is that even when a thin film $9a$ is dented upon voltage applied on the electrostatically driven mirror 9T, the distance of the thin film $9a$ from the middle electrode $9b3$ is not largely reduced so that the intensity of an electric field between the thin film $9a$ and the electrode $9b3$ remains moderate and, hence, it is easy to gain shape control of the thin film $9a$.

Now assume that the potential difference between the positive and the negative electrode, which is to be applied on the electrostatically driven mirror 9T, is fixed to a certain value, and $\Delta B$ is the maximum height of the electrodes $9b1$, $9b2$, $9b3$, $9b4$ and $9b5$. When the following expression (5).

$$\Delta B = (1/2) \times H \quad (5)$$

is satisfied, the change in the electric field upon transformation of the thin film $9a$ is minimized. Here H is the maximum quantity of a shape change.

Practically, the electrodes $9b1$, $9b2$, $9b3$, $9b4$ and $9b5$ should be arranged with a proper choice of $\Delta$ within the range given by the following expression (6):

$$(1/1000) \times H \leq \Delta B \leq 10H \quad (6)$$

If $\Delta B$ is selected in such a way as to satisfy the following expression (7):

$$(1/10) \times H \leq \Delta B \leq 2H \quad (7)$$

it is generally easy to control the thin film $9a$.

Referring to exressions (6) and (7), when $\Delta B$ exceeds the upper limit, it is difficult to control the thin film $9a$, and when $\Delta B$ falls short of the lower limit, the effect due to the difference in height among the electrodes $9b1$, $9b2$, $9b3$, $9b4$ and $9b5$ becomes slender.

Figure 20:
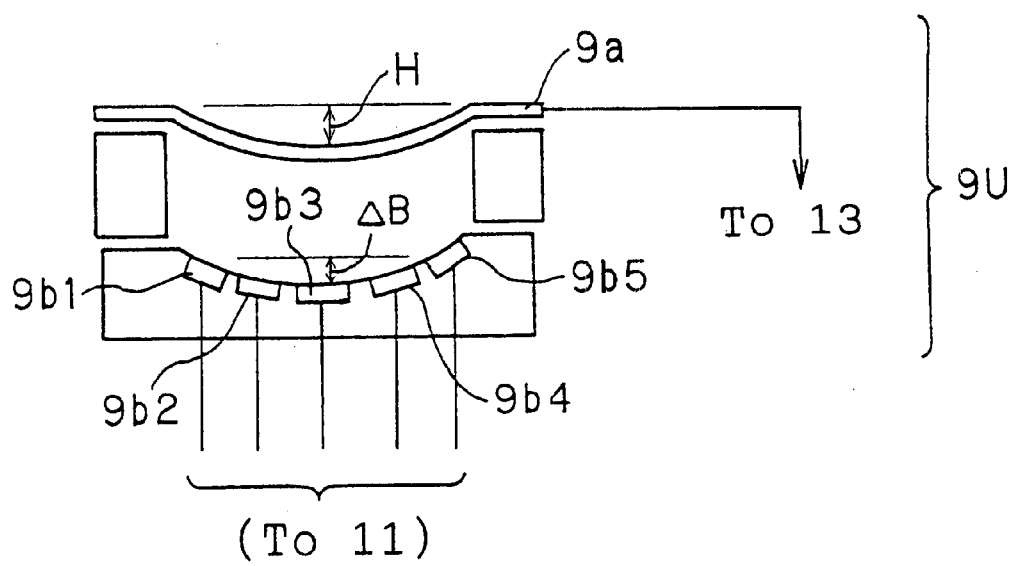
FIG. 20 is illustrative of an electrostatically driven mirror wherein electrodes are formed on a curved surface.

FIG. 20 is illustrative of an electrostatically driven mirror 9U comprising electrodes $9b1$, $9b2$, $9b3$, $9b4$ and $9b5$ formed on a curved surface. This mirror is equivalent in action to the FIG. 19 mirror. Expressions (5) to (7) go true for the mirror 9U. How to transform a thin film $9a$ may be controlled by shifting the positions of a plurality of electrodes $9b1$, $9b2$, $9b3$, $9b4$ and $9b5$ from the same plane.

Figure 21:
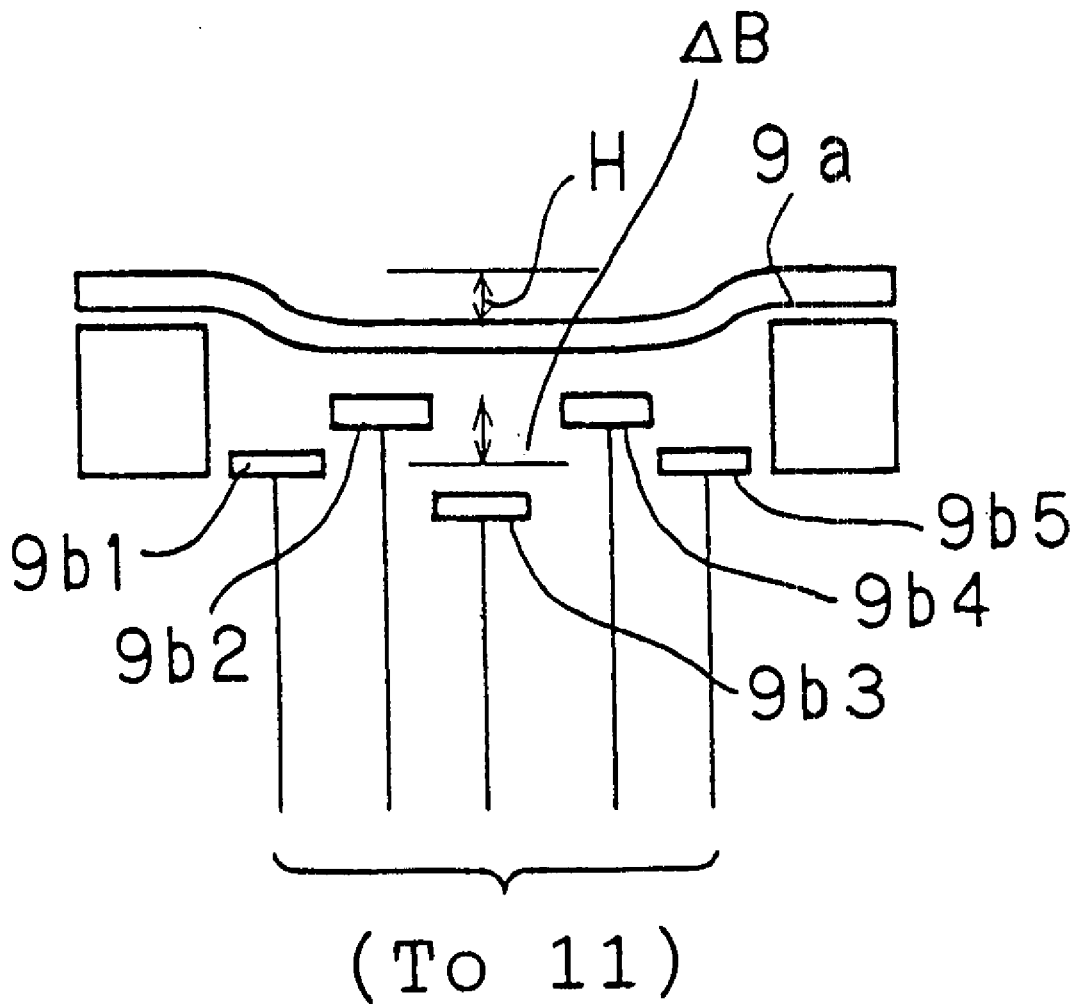
FIG. 21 is illustrative of one specific of controlling how to transform the thin film by shifting a plurality of electrodes from the same plane.

FIG. 21 is illustrative of one specific embodiment of control of how to transform the thin film $9a$, wherein the quantity of transformation of an intermediate portion of the thin film $9a$ is increased while the quantity of transformation of a middle portion thereof is decreased. In this case, $\Delta B$ is defined by the quantity of a shift of the maximum electrode from the average height of the electrodes $9b1$, $9b2$, $9b3$, $9b4$ and $9b5$. In this case, too, expressions (5) to (7) hold true.

This technique for shifting the positions of a plurality of electrodes from the plane to make shape control of the variable mirror easy may be applied to other variable mirrors of the present invention, i.e., an electromagnetic mirror, a liquid crystal variable mirror, a mirror making use of a piezoelectric element, etc. In this case, too, expressions (5) to (7) hold true.

Figure 22:
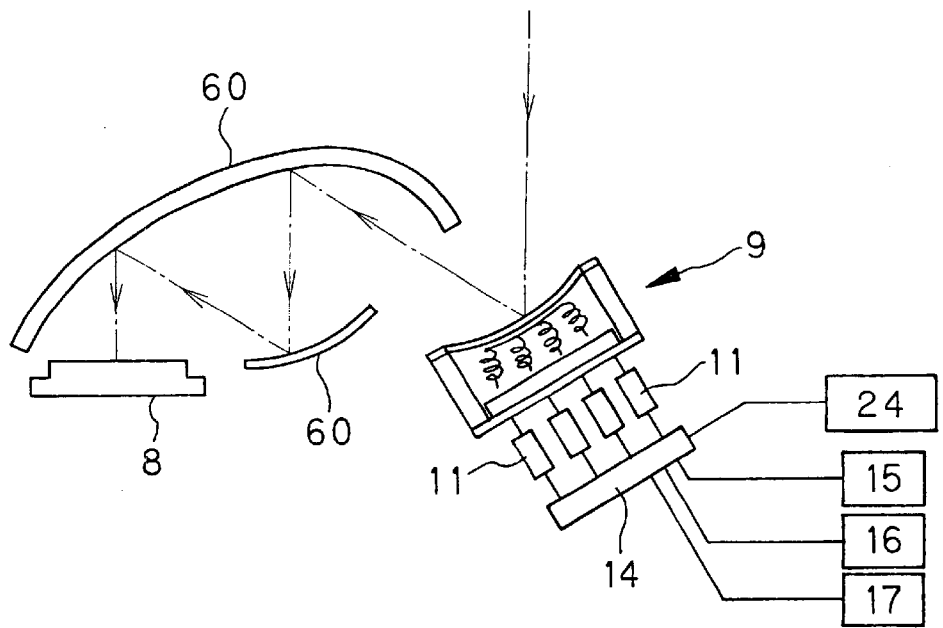
FIG. 22 is illustrative of the construction of one specific embodiment of the optical apparatus using a reflector including an extended curved surface.
Figure 23:
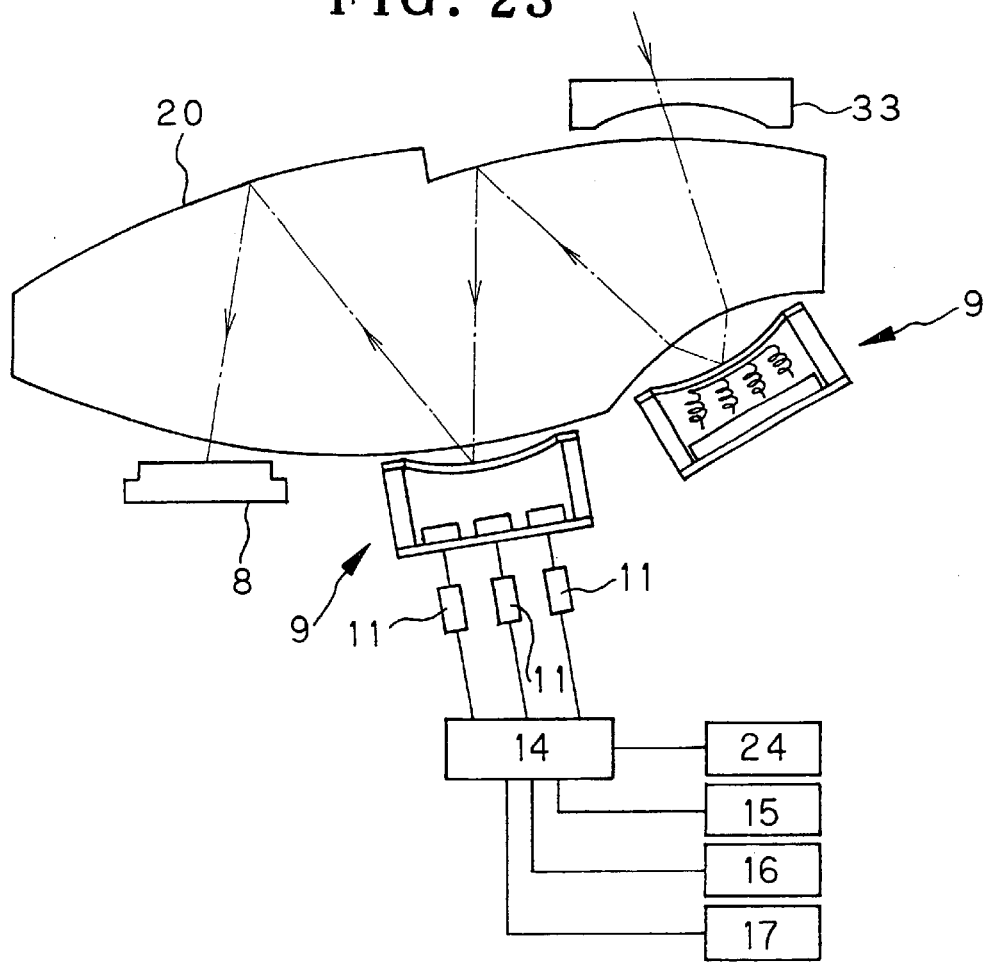
FIG. 23 is illustrative of the construction of one exemplary optical system designed using two or more variable mirrors.

In some embodiments of the present invention, the extended curved surface prisms 4, 5, 30, etc. are used. Instead of these, it is acceptable to use a reflector 60 having an extended curved surface as shown in FIG. 22. The shape of the reflecting surface of the reflector 60 is defined by an extended curved surface. An advantage of this reflector 60 over the extended curved surface prism is that weight reductions are achievable due to its hollowness. FIG. 22 is illustrative of one specific embodiment of the electronic image pickup apparatus according to the present invention (e.g., a digital or TV camera). With a variable mirror 9, it is possible to achieve focus adjustment, prevention of apparatus shake, etc. As shown in FIG. 23, it is also possible to form an optical system using two or more variable mirrors according to the present invention. In this case, for instance, focus adjustment and the prevention of apparatus shake may be carried out by means of separate variable mirrors 9, resulting in an increase in the degree of freedom in optical designs. In addition, two or more variable mirrors 9 according to the present invention may be used on one optical system for the zooming of the optical system, focus adjustment, prevention of system shake, etc. FIG. 23 is illustrative of one specific embodiment of the digital camera. Reference numeral 20 indicates an extended curved surface prism and 33 a lens.

It is also acceptable to phototake one image while the reflecting surface of the variable mirror 9 is fixed to one shape during phototaking, and then transform the reflecting surface of the variable mirror 9 to phototake another image. If two such images are superposed one upon another in a staggered manner, it is then possible to obtain an image with improved resolving power. In this case, the two images should preferably be staggered apart by about one-half one pixel on an image pickup device. Similarly, two or more images may be phototaken in a staggered manner and synthesized into one image.

Commonly throughout the optical apparatus of the present invention, it is preferable to locate the variable mirror in the vicinity of a stop in an optical system. Since the height of light rays is so low in the vicinity of the stop that the size of the variable mirror can be reduced, this is advantageous in terms of response speed, cost and weight.

Figure 24:
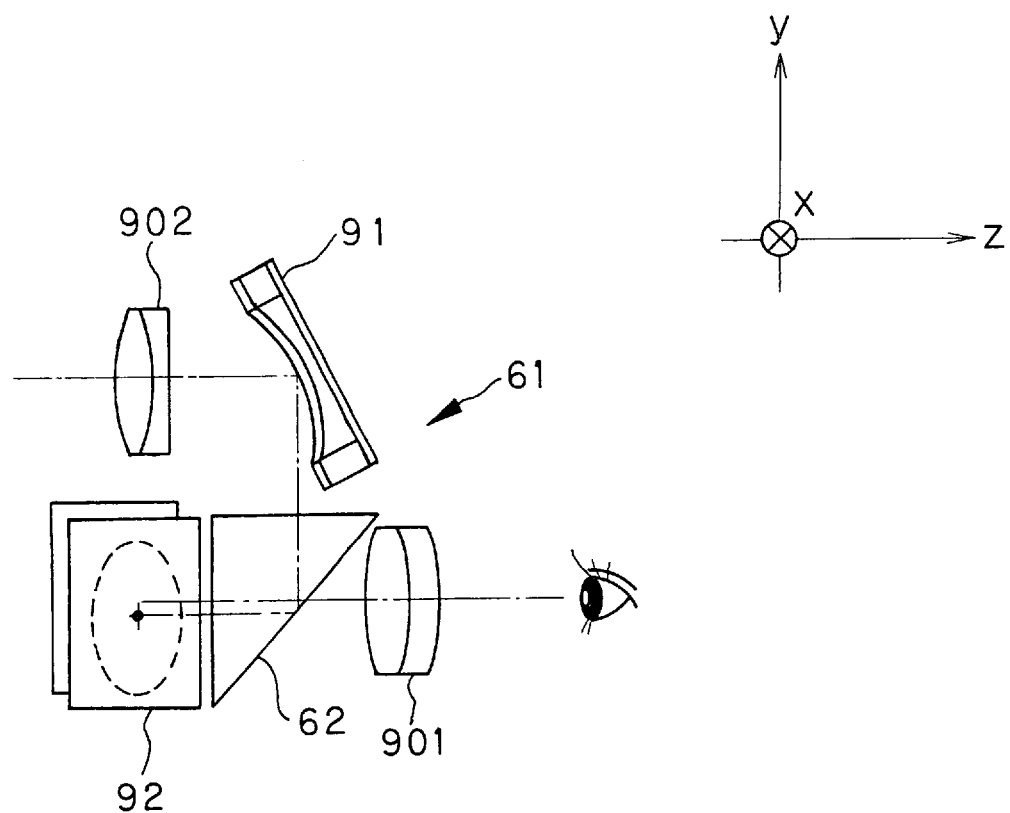
FIG. 24 is illustrative of the construction of a zoom finder that is one specific embodiment of the present invention.
Figure 25:
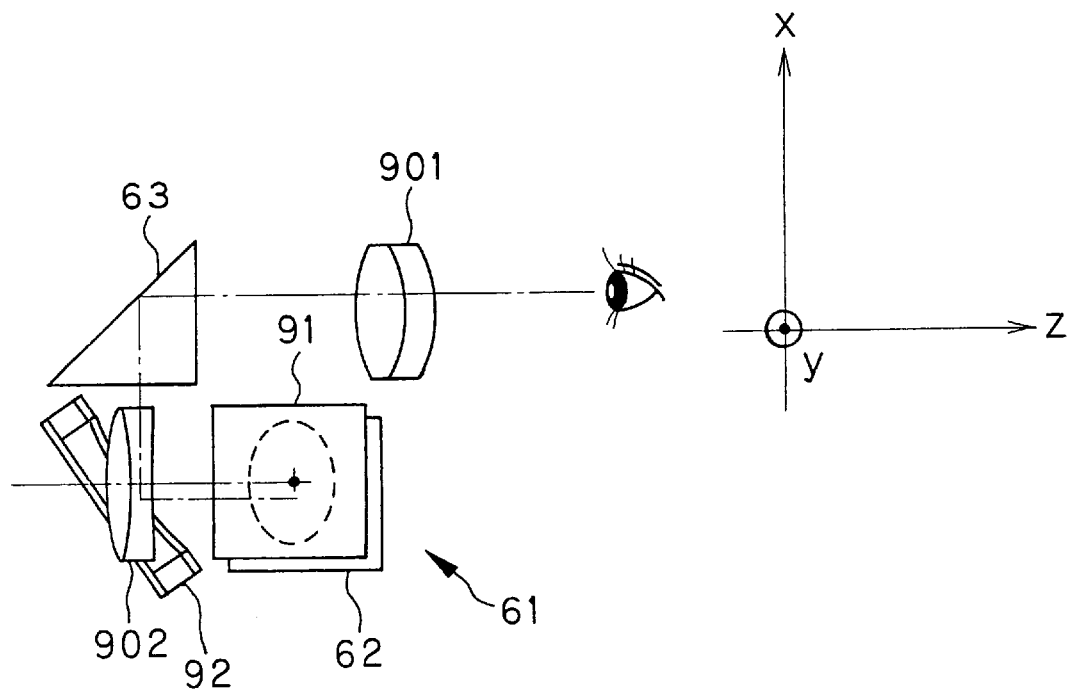
FIG. 25 is a schematic of FIG. 24, as viewed from another direction.

FIG. 24 is illustrative of one specific embodiment of a zoom finder 61 for use on cameras, digital cameras or moving image recorders, for instance, camcorders, as viewed from its -x direction. FIG. 25 is illustrative of the zoom finder 61 as viewed from its +y direction.

Prisms 62, 63 and two variable mirrors 91, 92 are used to form a turned-back optical path as in the case of a Porro I prism. This zoom finder is an example of the viewing apparatus using a Keplerian optical system. For each of the prisms 62 and 63, an ordinary triangular prism may be used with any one of its surfaces defined by an extended curved surface.

By changing the surface form of the variable mirrors 91 and 92, it is possible to achieve both zooming and diopter adjustment. One merit of this zoom finder is that zooming and diopter adjustment are achievable with no movement of a lens. Another merit is that there is no noise during zooming because of no movement of the lens. This is particularly convenient for a camcorder finder designed to record sounds.

A specific merit of this zoom finder is that even when a variable mirror is used with the image pickup system of the camcorder, there is no sound.

These merits are also obtainable in the case of moving image recorders and electronic moving image recorders other than camcorders.

Figure 26:
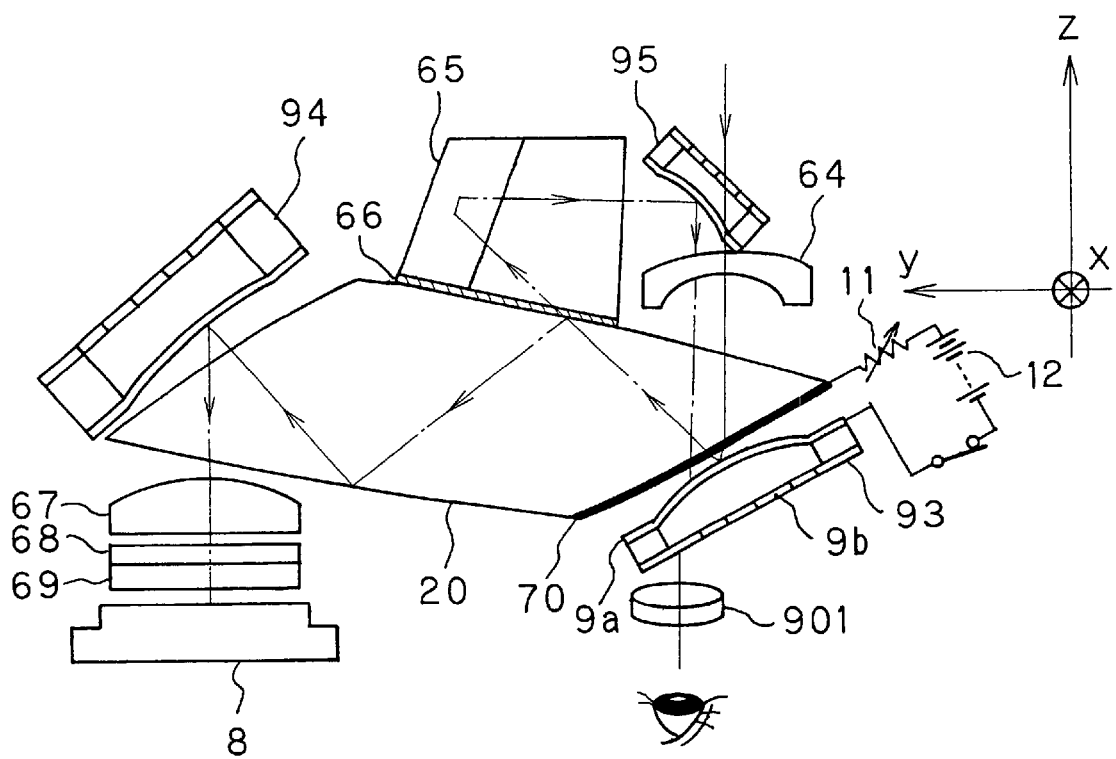
FIG. 26 is illustrative of the construction of a single-lens reflex optical system for digital cameras, which is one specific embodiment of the present invention.

FIG. 26 is illustrative of a single-lens reflex optical system for digital cameras, which is one specific embodiment of the present invention. In this embodiment, variable mirrors and optical elements are located on both sides of a free-form surface prism in its longitudinal direction. An image pickup device is located on one side of the free-form surface prism in the longitudinal direction, and provided on the opposite side with a variable mirror and an optical element. With variable mirrors 93 and 94, zooming and auto-focusing are performed to form an image on a solid-state image pickup device 8. Instead of the zooming function, the variable mirrors 93 and 94 may have a vari-focus adjustment function combined with a separate focus adjustment function.

With the variable mirrors 93 and 95, the zooming and diopter adjustment of a Keplerian finder are performed. A finder optical path is then defined by the sequence of lens 64→variable mirror 93→prism 20→prism 65 (through which the optical path changes direction toward the back side of the prism 20)→variable mirror 95→eyepiece lens 901.

Reference numeral 66 represents a semi-transmitting coating. An image pickup optical path is then defined by the sequence of lens 64→variable mirror 93→prism 20→variable mirror 94→lens 67→crystal low-pass filter 68→infrared cut filter 69→solid-state image pickup device 8. Reference numeral 70 indicates a transparent electrode. By applying voltage between the electrode 70 and a thin film 9a, it is possible for the thin film 9a to take the form of a convex surface, or a concave surface as is the case with the already explained variable mirror 9.

Thus, the variable mirror 93 can act as a largely transformable, variable mirror. Each surface of the prism 20 is defined by an extended curved surface. Each surface of the prism 65 may be defined by either a planar surface or an extended curved surface.

An additional merit of the FIG. 26 embodiment is that there is no noise even upon zooming. The optical system of FIG. 26 may also be used on camcorders, and TV cameras.

Commonly throughout the present invention, the extended curved surface prisms, lenses, prisms, mirrors and extended curved surface mirrors and frames for supporting them as well as an image pickup device-supporting frame should preferably be formed of synthetic resins such as plastics because they can be fabricated at low costs. Deterioration in the optical performance of the synthetic resins due to temperature and humidity changes should then preferably be corrected by changing the light polarization of optical elements having variable optical properties such as variable mirrors.

Figure 27:
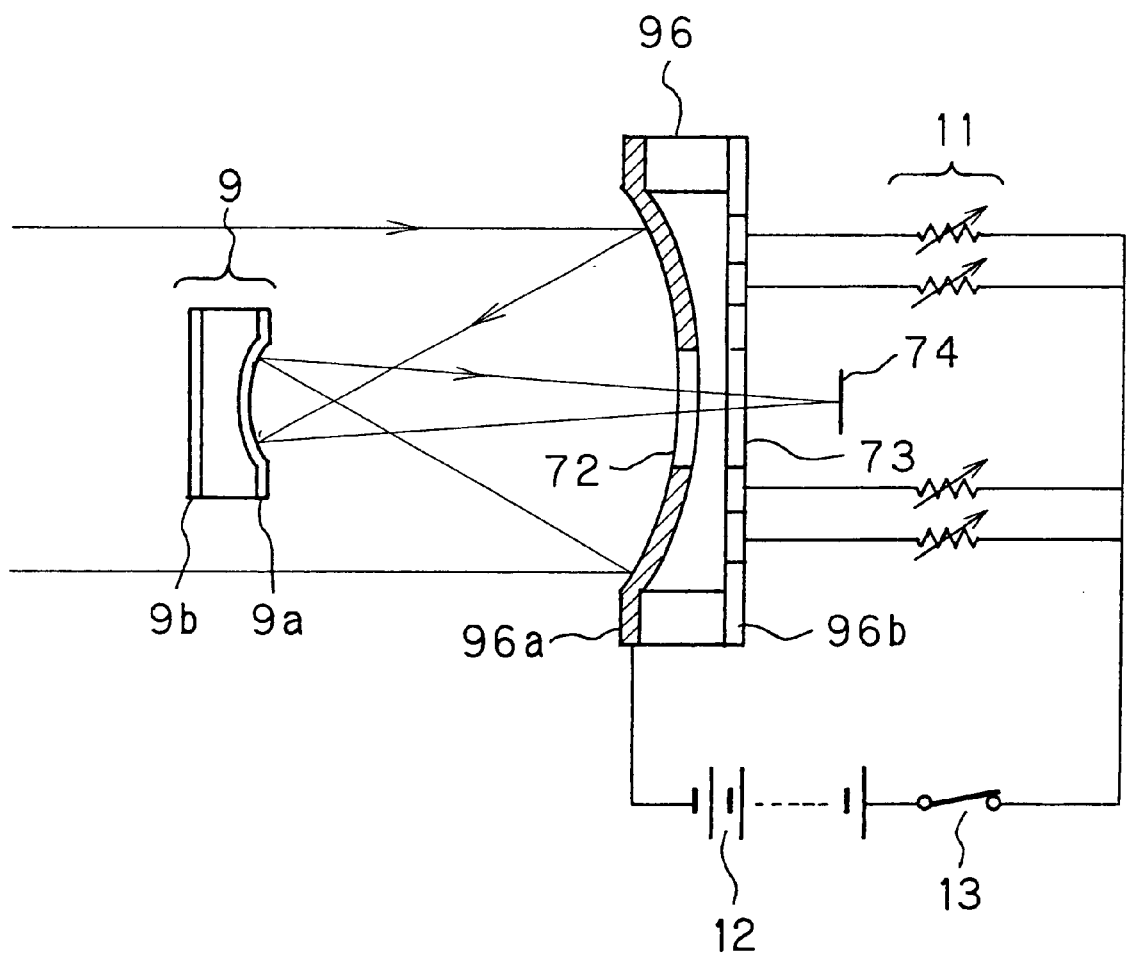
FIG. 27 is illustrative of the construction of a Gregorian reflecting telescope that is another specific embodiment of the present invention.

FIG. 27 is illustrative of a Gregorian reflecting telescope using a variable mirror 96 having a light-transmitting portion, which is another specific embodiment of the present invention. A reflecting film 96a of the variable mirror 96 is not provided on its portion 72 with a reflection coating. An electrode 96b is also provided at its middle position with a transparent portion 73. This portion may be free from any electrode or provided with a transparent electrode. A variable mirror 9 and the variable mirror 96 form together a telescope capable of both zooming and focusing. If an image pickup device is placed on a focal plane 74, images can be picked up, and if an eyepiece lens 901 is placed in the rear of the focal plane 74, visual observation can be made.

Figure 28:
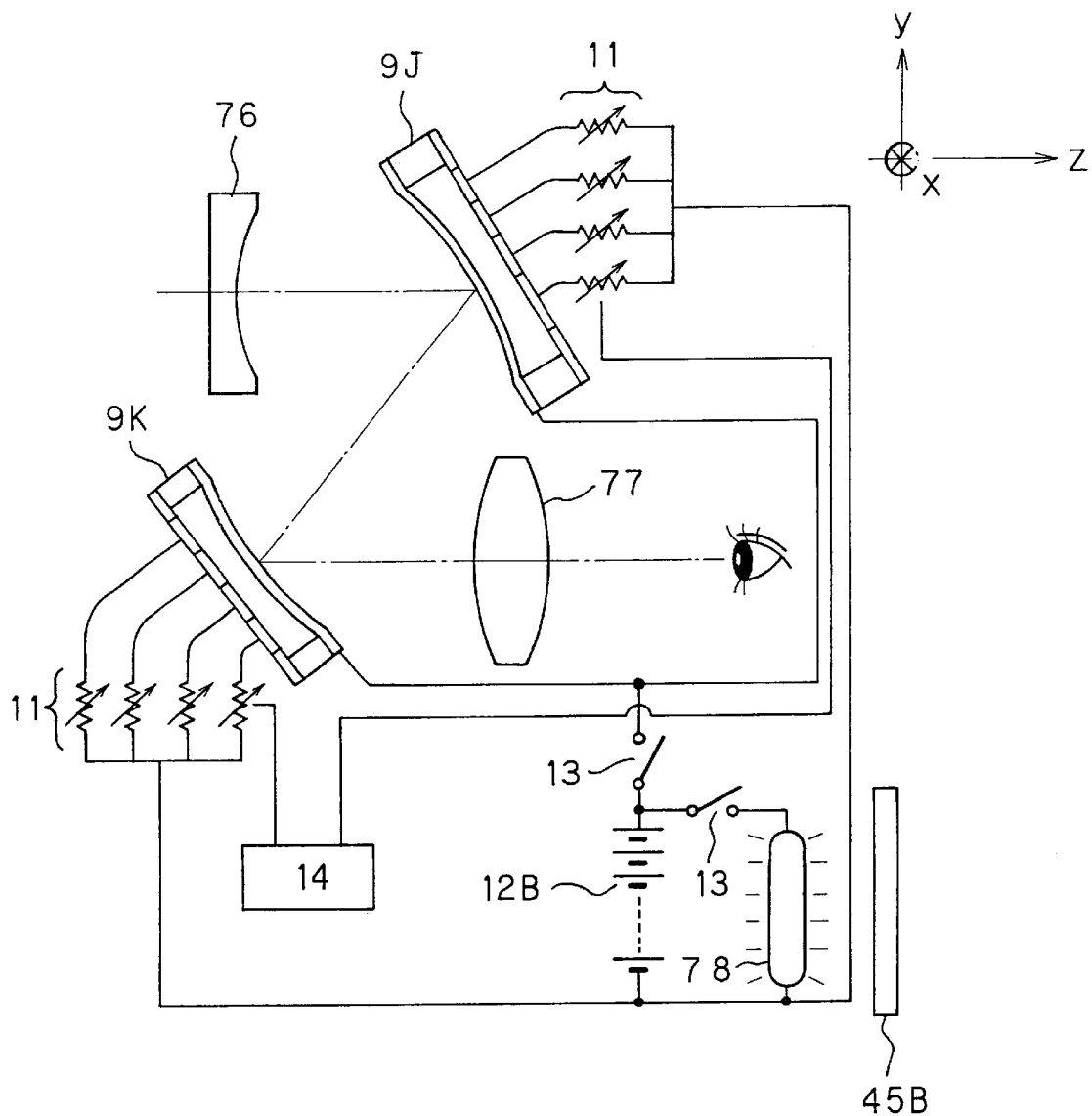
FIG. 28 is illustrative of the construction of one specific embodiment of a zoom type Galilean finder using an electrostatically driven variable mirror.

FIG. 28 is illustrative of one specific embodiment of a zoom type Galilean finder using electrostatically driven variable mirrors 9J and 9K or one specific embodiment of a viewing apparatus using a Galilean optical system, which may be used on cameras, digital cameras, opera glasses, etc. An object light takes an optical path defined by concave lens 76→variable mirror 9J→variable mirror 9K→convex lens 77, striking on the eye. A power source 12B for the variable mirrors 9K and 9J is also used for an illumination device 78 for a liquid crystal display 45B. Such a common power source is convenient for making the finder compact. Instead of the power source for the illumination device 78, a power source for other electric devices such as a strobe may be used as the power source for the variable mirrors 9J and 9K. The variable mirrors 9J and 9K are controlled by an operating unit 14 in such a way that the optical system of FIG. 28 is adjusted to a viewer's diopter, e.g., minus 2 diopter.

When the action of the variable mirror 9J as a concave reflecting surface is weak and the action of the variable mirror 9K as a concave reflecting surface is strong, the finder works as a wide-angle Galilean finder, and when the action of the variable mirror 9J as a concave reflecting surface is strong and the action of the variable mirror 9K as a concave reflecting surface is weak, the finder works as a telephoto Galilean finder.

Figure 29:
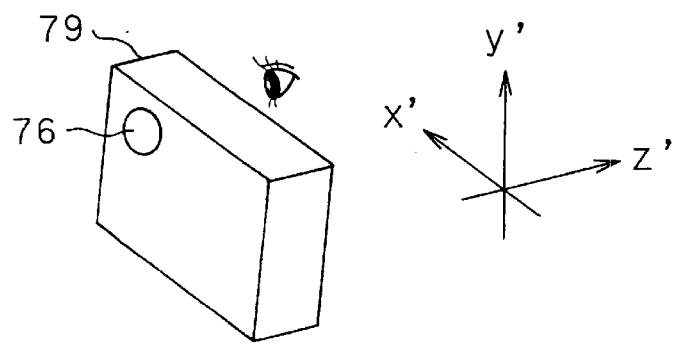
FIG. 29 is illustrative of the viewing direction of the FIG. 28 finder optical system.

If the finder optical system of FIG. 28 is mounted on a camera or digital camera 79 while its viewing direction (the minus z-axis direction in FIG. 28) is parallel with the thickness direction of the camera 79 (the z'-axis direction in FIG. 29) within 20° as shown in FIG. 29, the size of the camera 79 can then be advantageously reduced.

Figure 30:
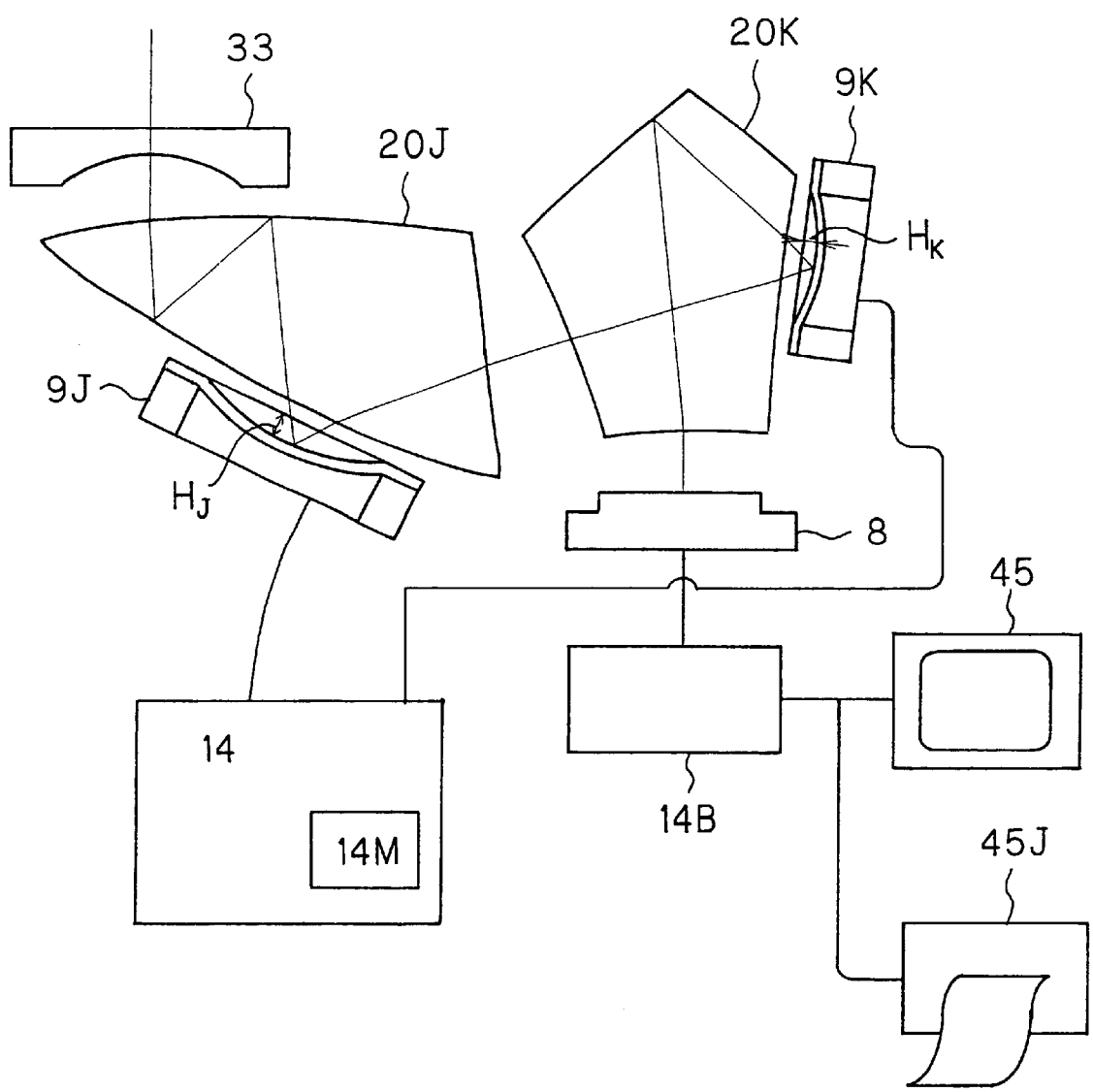
FIG. 30 is illustrative of one specific example of an image pickup optical system using mirrors having variable optical properties.

FIG. 30 is illustrative of one specific embodiment of an image pickup apparatus, i.e., an image pickup optical system for digital cameras or VTR cameras, using mirrors 9J and 9K having variable optical properties. Two extended curved surface prisms 20J and 20K and variable mirrors 9J and 9K are used to set up an image pickup apparatus having an odd number of, or five, reflecting surfaces. As is the case with the examples so far explained, zooming (only a vari-focus) and focusing are achievable with the extended curved surface prisms 20J and 20K. An odd number of reflections cause a reversed (mirror) image to be formed on a solid-state image pickup device 8. However, this image is inverted into an erected image through an inverting portion 14B, and the thus erected image is outputted to an LCD 45 or printer 45J.

It is here preferable to satisfy the following expression (8):

$$0.0001 \leq |HJ/HK| < 10000 \tag{8}$$

where HJ and HK are the maximum quantities of transformation of the variable mirrors 9J and 9K, respectively. This is because any deviation from the range defined by expression (8) causes the quantity of transformation of one variable mirror to become too large to fabricate and control the mirror.

It is more preferable to satisfy the following expression (8-1):

$$0.001 \leq |HJ/HK| < 1000 \tag{8-1}$$

This is because the mirrors are easier to fabricate.

It is most preferable to satisfy the following expression (9):

$$0.1 \leq |HJ/HK| < 10 \tag{9}$$

This is because with, within such a range as defined above, two identical variable mirrors can be used.

Expressions (8) and (9) hold true for an arrangement comprising three or more variable mirrors, provided that HK represents the maximum quantity of transformation and HJ indicates the minimum quantity of transformation.

Shape control of the variable mirrors 9J and 9K is performed by an operating unit 14. However, it is preferable to acquire the shape control according to the information on the shape of the variable mirrors 9J and 9K determined by focal length and object distance, which information is stored as a lookup table or the like in a memory 14M.

Figure 31:
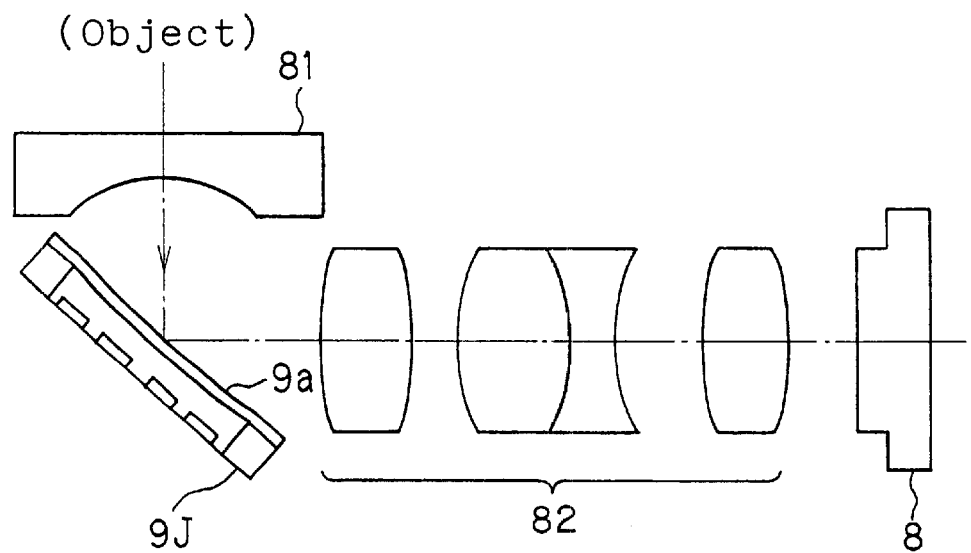
FIG. 31 is illustrative of the construction of one specific embodiment of the present invention, i.e., an image pickup apparatus for digital cameras or a lateral-type of electronic endoscopes using an electrostatically driven variable mirror.

FIG. 31 is illustrative of one specific embodiment of the present invention, i.e., an image pickup apparatus for digital cameras or a lateral-view type of electronic endoscopes, using an electrostatically driven variable mirror 9J. In FIG. 31, reference numerals 81 and 82 are each an optical element having a rotationally symmetric curved surface, i.e., an ordinary spherical lens, an aspheric lens or the like. By changing the shape of a thin film 9a in association with fluctuations of an object distance, it is possible to perform focus adjustment, and make correction for fluctuations of aberrations with focus adjustment, etc. A merit of this image pickup apparatus over conventional optical systems is that there is no need of driving lenses mechanically. Since one single reflecting surface alone is used, a reversed image is formed on a solid-state image pickup device 8. However, this reversed image may be inverted electrically or by image processing.

Figure 32:
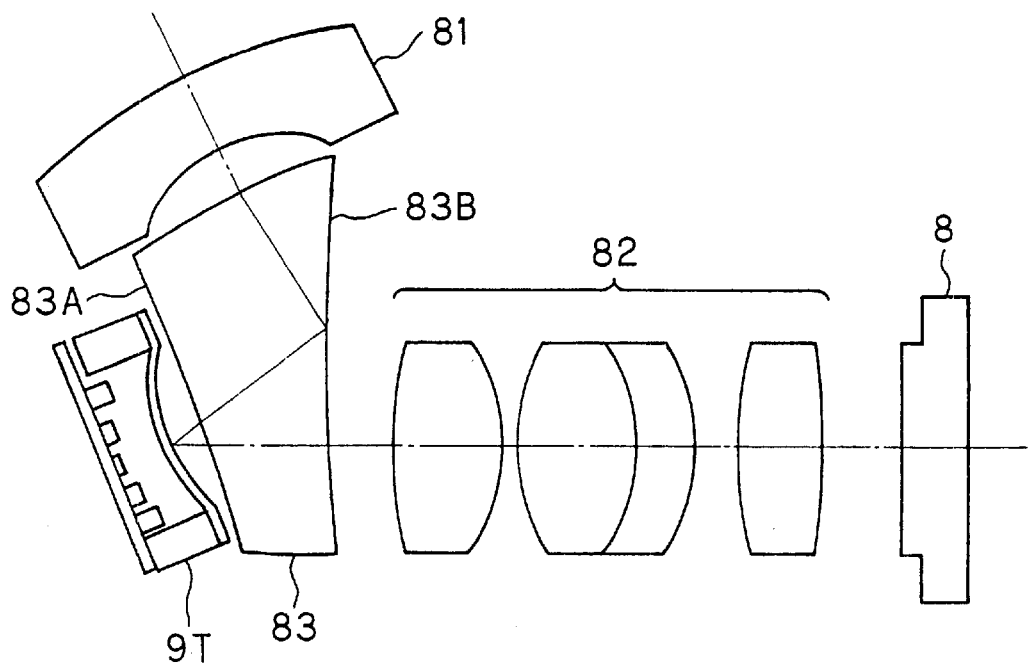
FIG. 32 is illustrative of the construction of one specific embodiment of the present invention, i.e., an oblique-view type of electronic endoscope designed to perform focus adjustment using an electrostatically driven variable mirror.

FIG. 32 is illustrative of one specific embodiment of the present invention, i.e., an oblique-view type of electronic endoscope wherein focus adjustment is performed using an electrostatically driven variable mirror 9T. The variable mirror 9T is located in opposition to the transmitting surface 83A of a prism 83. Light is totally reflected at the surface 83B of the prism 83, and so there is no need of providing an aluminum coat thereon. The merit of this embodiment is that any mechanical lens driving is not required with no formation of any reversed image due to an even number of reflections.

Figure 33:
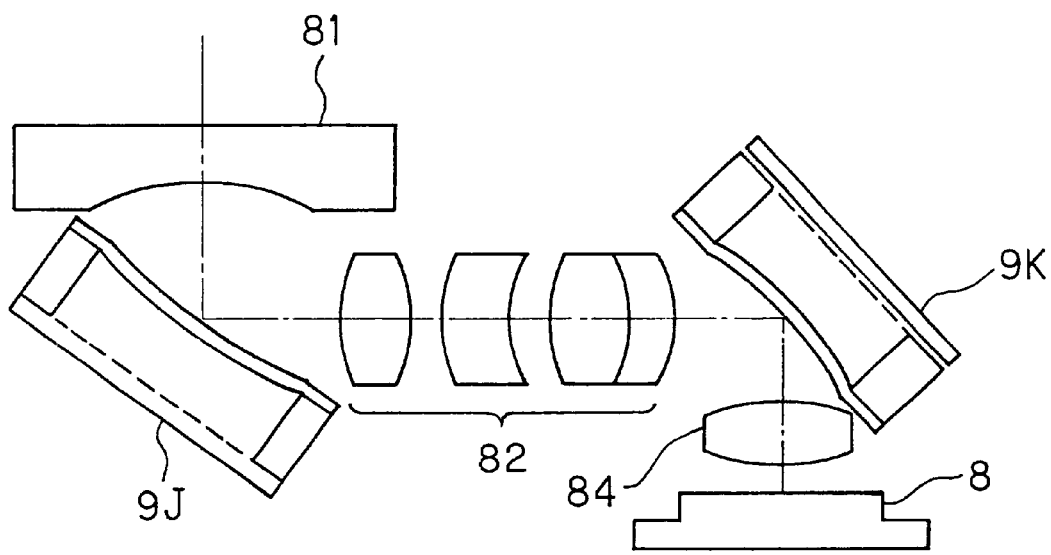
FIG. 33 is illustrative of the construction of another specific embodiment of the present invention, i.e., an image pickup apparatus for zoom digital cameras or electronic endoscopes using two electrostatically driven variable mirrors.

FIG. 33 is illustrative of another specific embodiment of the present invention, i.e., an image pickup apparatus for zoom digital cameras or electronic endoscopes using two electrostatically driven variable mirrors 9J and 9K. This may also be used on VTR or TV cameras. In FIG. 33, reference numerals 81, 82 and 84 are each a lens having a rotationally symmetric surface. By changing the shape of the reflecting surfaces of the variable mirrors 9J and 9K, it is possible to change the angle of view simultaneously with focus adjustment. While, in FIG. 33, the normals to the surfaces of the variable mirrors 9J and 9K are shown to be substantially parallel with each other, it is understood that the variable mirrors 9J and 9K may be positioned in such a way that the two normals may have a twisted relation to each other. Then, the optical system of FIG. 33 is out of symmetry of plane and the image pickup surface of a solid-state image pickup device 8 is not perpendicular with respect to the paper. In the FIG. 31, and FIG. 32 embodiment, the optical system is symmetric with respect to the paper.

Figure 34:
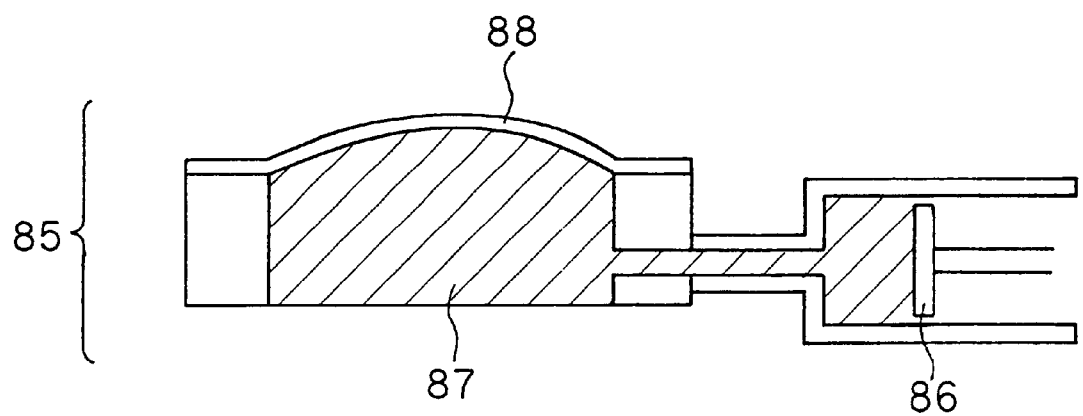
FIG. 34 is illustrative of the construction of one specific embodiment of the fluid variable mirror.

Commonly throughout the present invention, it is acceptable to use such a variable mirror 85 as shown in FIG. 34, wherein its reflecting surface is transformed using a fluid such as air. A piston 86 is moved to vary the amount of a fluid 87, so that the shape of a reflecting surface 88 can be changed. The merit of this variable mirror is that the reflecting surface can be transformed into both concave and convex surfaces.

Commonly throughout the present invention, when auto-focusing is performed using a variable mirror for image pickup apparatus using a solid-state image pickup device, e.g., TV or digital cameras, it is preferable to change the current or voltage applied to the variable mirror on the basis of distance information obtained from a distance sensor or the like.

Alternatively, auto-focusing may be performed at the time the image of an object phototaken while the current or voltage applied to the variable mirror is changed is found to have a maximum contrast. In this case, it is particularly advantageous to detect the peak of the contrast in view of the contrast of a high-frequency component in the image.

Commonly throughout the present invention, when the shape of the electrostatically driven variable mirror is controlled, it is advantageous to find an electrostatic capacity between positive and negative electrodes, then acquire information on the distance between the positive and negative electrodes, and finally determine the shape of the variable mirror to control the variable mirror in such a way that its shape is approximate to that given by the design value. To find an electrostatic capacity between two electrodes, for instance, it is convenient to detect changes-with-time of the current after the application of voltage between the two electrodes.

Commonly throughout the present invention, it is preferable to use a power source for a liquid crystal or other display or a strobe as that for driving the variable mirror, because cost and weight reductions, etc. can be advantageously achieved.

Figure 35:
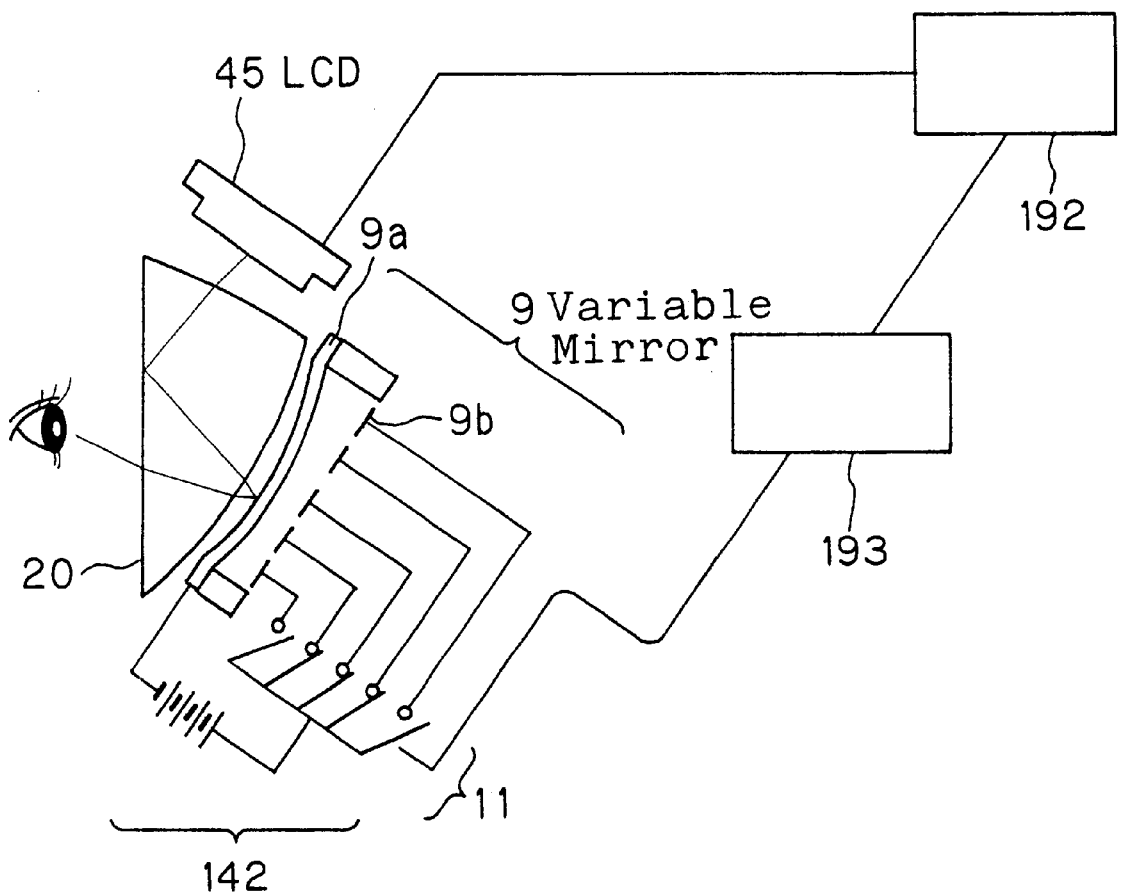
FIG. 35 is illustrative of the construction of one specific embodiment of a head mounted display with the variable mirror used therewith.
Figure 36:
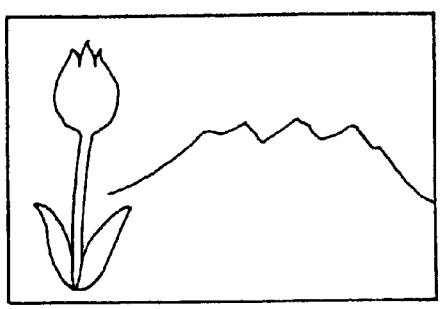
FIG. 36 is illustrative of one specific embodiment of an image displayed on the LCD in FIG. 35 and including a nearby object and a remote object.

FIG. 35 is illustrative of one specific embodiment of the use of a variable mirror 9 on a head mounted display (HMD for short) 142. It is not only possible to perform diopter adjustment by changing the voltage applied on an electrode 9b but also to provide perspective observation of an image displayed on an LCD 45. Here assume that such images of a flower and a mountain as depicted in FIG. 36 are displayed on the LCD 45 via a display electronic circuit 192. The flower is at a near distance and the mountain is at a far distance. Accordingly, if a thin film 9a is transformed by controlling the voltage applied on the electrode 9b via a driving circuit 193 in such a way that the diopter for the flower is minus and the diopter for the mountain is set at nearly zero, it is then possible to obtain perspective observation of the image.

Figure 37:
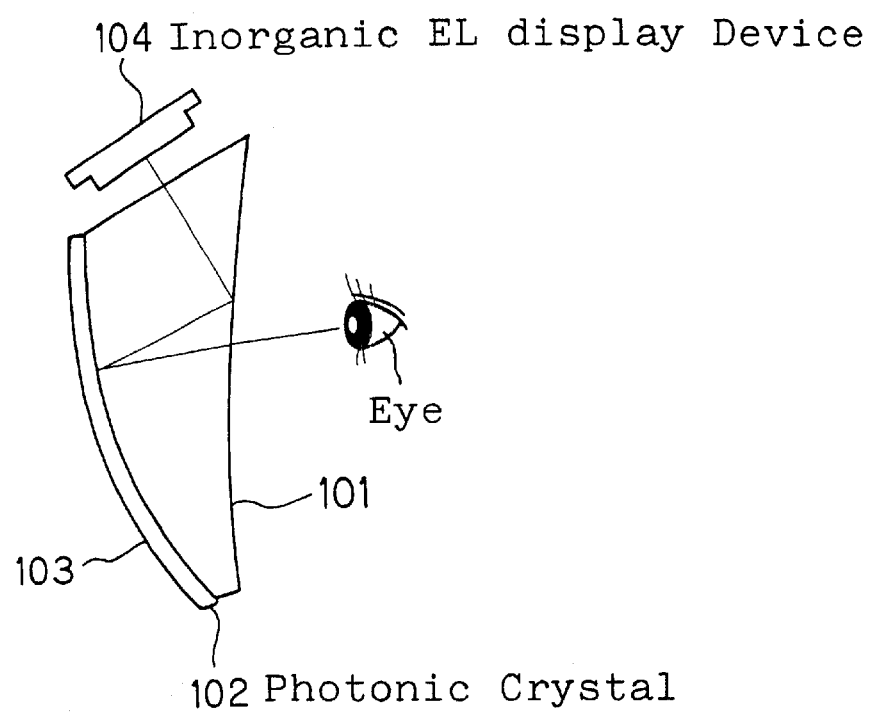
FIG. 37 is illustrative of the construction of one specific embodiment of the present invention, wherein a hologram reflector made of photonic crystals is formed on the surface of an extended curved surface prism.

FIG. 37 is illustrative of one specific embodiment of the present invention, i.e., an HMD 142 wherein a hologram reflector 103 made of photonic crystals 102 is formed on the surface of an extended curved surface prism 101. The hologram reflector 103, because of being capable of reflecting light rays that do not conform to the ordinary reflection law, is convenient for increasing the degree of freedom in designing HMDs, making effective correction for aberrations, etc.

Figure 38:
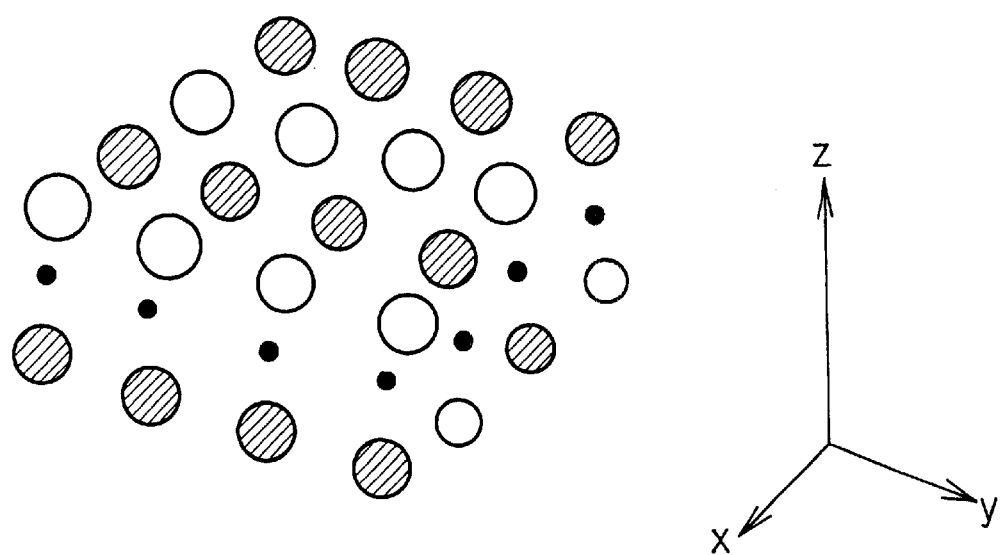
FIG. 38 is a schematic illustrative of the structure of photonic crystals.

As shown in FIG. 38, the photonic crystals 102 comprise regularly lined-up crystal units (white dots, black dots and hatched dots) of sizes equal to or less than different wavelengths, and may be produced by lithography, molding or other methods. The photonic crystals 102 are more improved over photographic photosensitive materials, photopolymers, etc. in that holograms can be mass-produced precisely.

Figure 39:
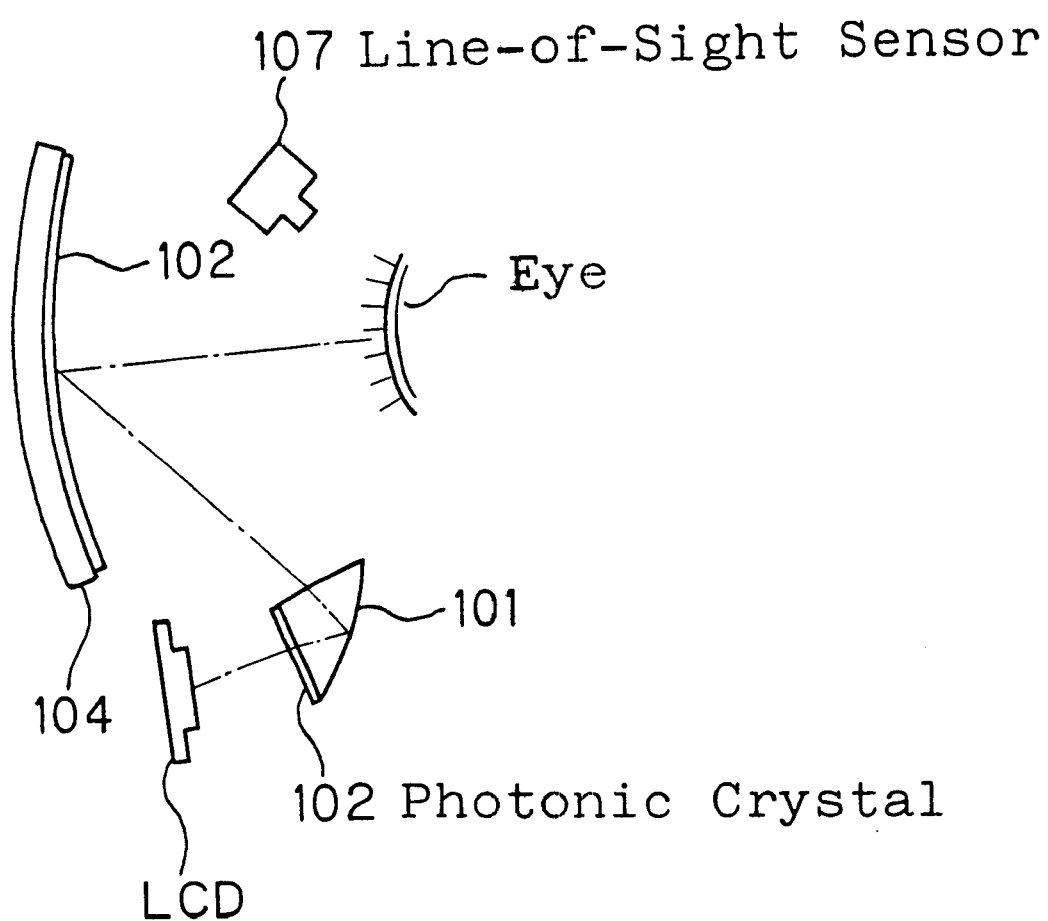
FIG. 39 is illustrative of a modification of the FIG. 37 embodiment using an extended curved surface mirror.

FIG. 39 is illustrative of an extended curved surface mirror 104 usable in place of the extended curved surface prism 101. A merit of this mirror over the prism of FIG. 37 is that much more weight reductions are achievable. A photonic crystal 102 on the extended curved surface prism 101 is a transmission type photonic crystal having substantially the same features as those of a reflection type photonic crystal.

Outside of that, it is understood that the optical element comprising photonic crystals may also be used for image pickup optical systems for digital cameras, endoscopes, etc., display optical systems such as viewfinders, and viewing optical systems such as optical microscopes wherein optical signals are to be processed and transmitted.

The photonic crystals may be formed on the surfaces of optical elements such as lenses and filters. If they are formed on the surface of a lens, it is then possible to obtain an optical element that combines a lens function with a function similar to that of a hologram optical element (HOE) or the like. If the refractive index of photonic crystals is designed to be lower than that of the optical element, an antireflection effect, too, can then be added thereto.

Commonly to the embodiments of FIGS. 35, 37 and 39, it is favorable to add a line-of-sight detector to an HMD designed to provide three-dimensional observation of different images entered into the left and right eyes, thereby conforming the diopter of the HMD to an object distance in the field of both eyes. This enables the images observed by both eyes to be so fused together that a natural 3D image can be observed.

Figure 40:
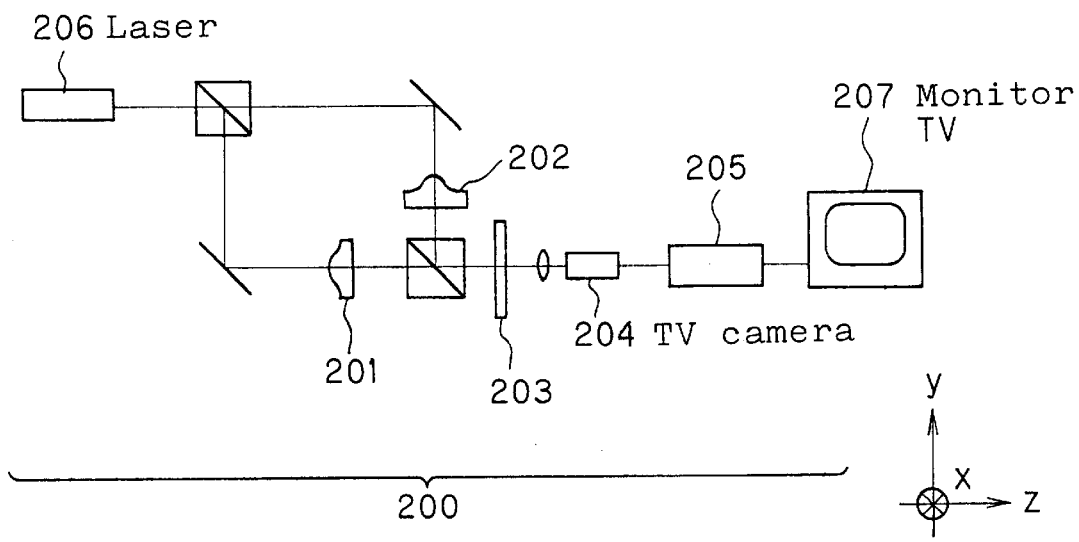
FIG. 40 is illustrative of how to measure an optical element comprising an aspheric lens and an extended curved surface used in the inventive embodiments.
Figure 41:
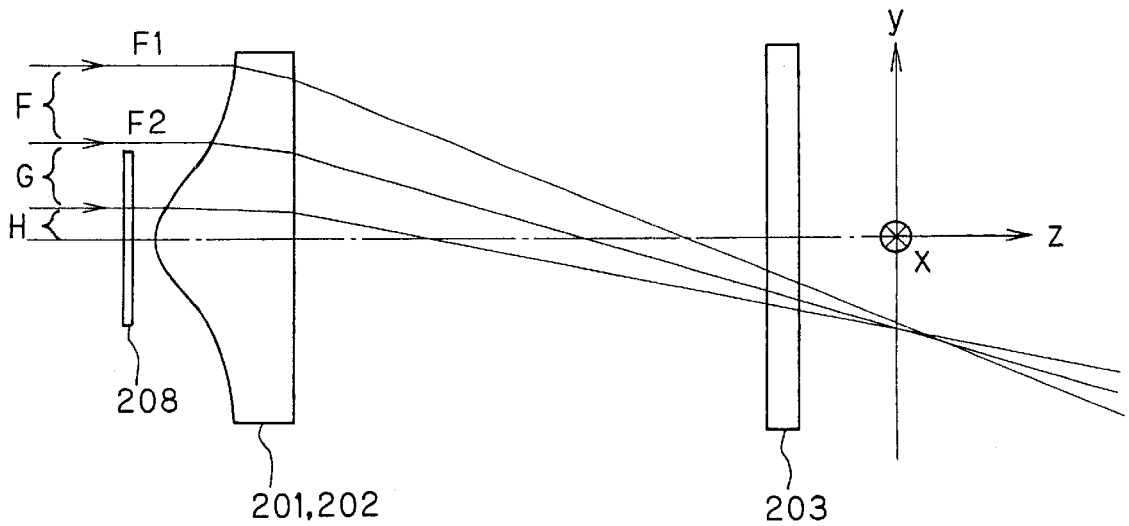
FIG. 41 is illustrative of image processing for the FIG. 40 measurement.

FIG. 40 relates to an improvement in measuring the physical properties of an optical element comprising an aspheric lens and an extended curved surface used herein. FIG. 40 is illustrative of one specific embodiment of measuring the shape, refractive index profile, decentration, etc. of an aspheric lens with the use of a Mach-Zehnder interferometer 200. Differences in shape, refractive index, etc. of a sample lens 202 from a reference lens 201 are recorded in the form of interference fringes on a screen 203. Often in this case, a light beam F passing through the marginal area of a lens 201, 202 is flipped over and focused on the screen 203, as shown in FIG. 41. The "flipped-over" used herein is understood to imply that an upper light ray F1 in the light beam F comes close to the optical axis (Z-axis) on the screen 203 and a lower light ray F2 goes off the optical axis on the screen 203. In this state, it has been considered impossible to measure the surface shape, etc. of the sample lens 202.

According to the present invention, signals of the light beam F captured by a computer 205 into a TV camera 204 are inverted by image processing and distortion, etc. are corrected as well. If such interference fringes are processed as conventional, it is then possible to determine the differences in surface shape, refractive index profile, refractive index, decentration, etc. of the sample lens 202 from the reference lens 201. In FIG. 40, reference numeral 206 indicates a laser light source for the interferometer and 206 stands for a monitor TV.

Figure 42:
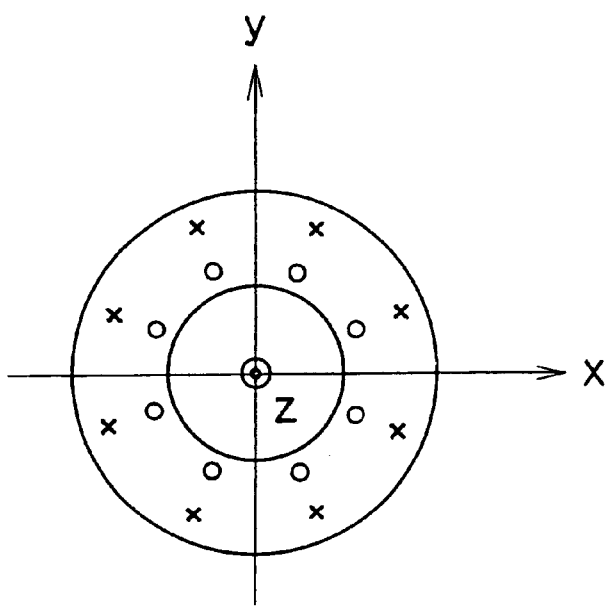
FIG. 42 is illustrative of the positions of light rays in FIG. 41 on a screen.
Figure 43:
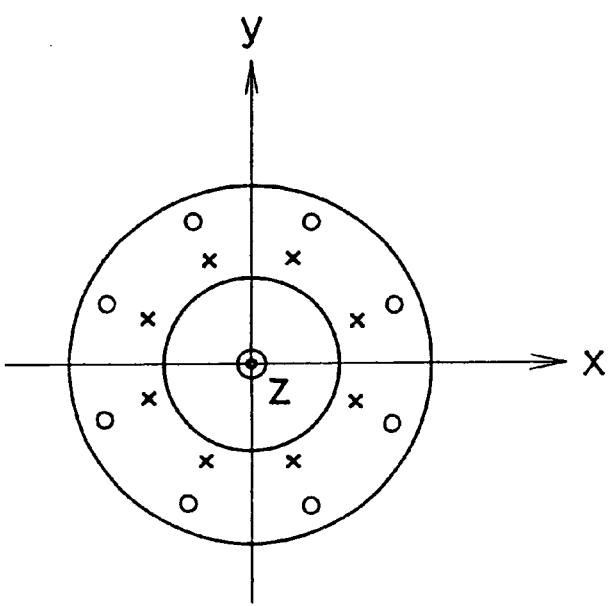
FIG. 43 is illustrative of image processing in the case of FIG. 42.

In FIG. 42, the positions of light rays in the light beam F on the screen 203 are shown by o and X. The aforesaid image processing is performed at those positions by the computer 205 to invert the light rays as shown in FIG. 43.

It is here noted that when troubles occur by superposition of inner light beams G, H, etc. on the light beam F on the screen 203, it is favorable to place a shield 208 on the optical axis as shown in FIG. 41.

Figure 44:
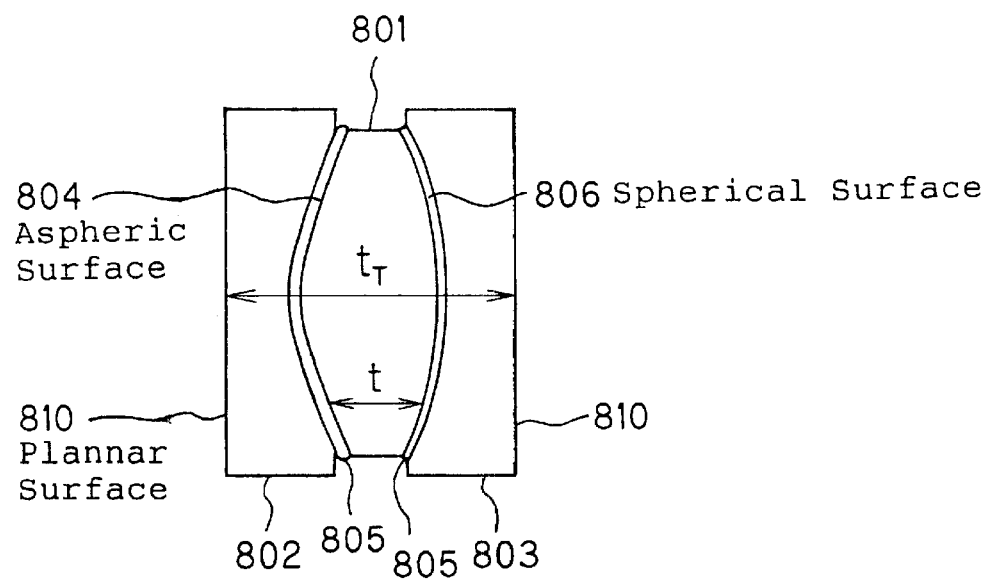
FIG. 44 is illustrative of how to measure the refracting index, refractive index change and refractive index profile of an aspheric lens or the like used in the present invention.

FIG. 44 is illustrative of how to measure the refractive index, refractive index change and refractive index profile of an aspheric lens, a free-form surface lens, a free-form surface prism, an extended curved surface lens, an extended curved surface prism or an extended curved surface optical element 801 which may be used in the present invention. To reduce influences by refraction of light at the surface of a sample lens 801 during interference measurement, the sample lens 801 is sandwiched on both its sides between a canceller 802 whose one surface is substantially opposite in shape to the aspheric surface 804 of the sample lens 801 and a canceller 803 whose one surface is substantially opposite in shape to the spherical surface 806 of the sample lens 801. In FIG. 44, reference numeral 805 represents a matching oil having a refractive index nearly equal to that of the sample lens 801. Note that this matching oil is not always necessary. The outside surfaces 810 of the cancellers 802 and 803 are each defined by a planar surface.

Figure 45:
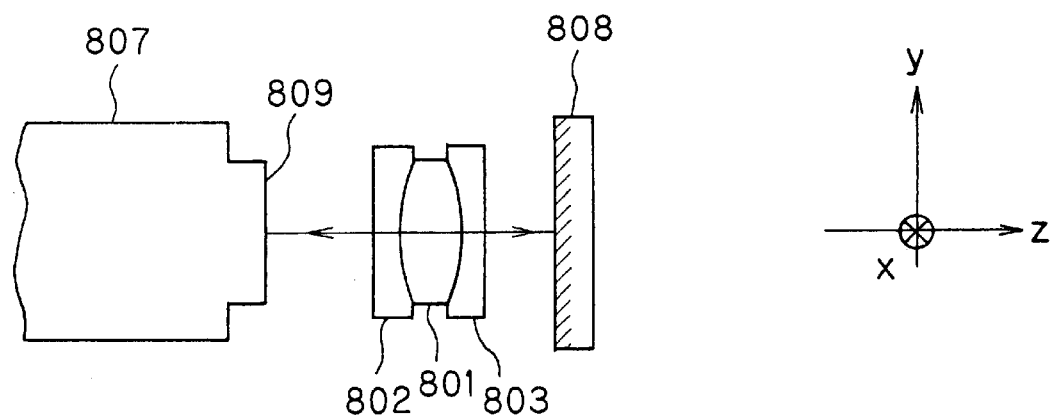
FIG. 45 is illustrative of a measuring arrangement in the case of FIG. 44.

This combination of canceller 802, sample lens 801 and canceller 803 is placed in an optical path for a Fezeau interferometer 807 as shown in FIG. 45, thereby measuring a transmission wavefront W(x, y) reflected from a mirror 808 with the Fizeau interferometer 807. In FIG. 45, reference numeral 809 stands for a reference surface. Then, the transmission wavefront W(x, y) is given by $$W(x, y) \approx 2\{(t_T - t)n_c + t\underline{n}\} \quad (10)$$

where t(x, y) is the thickness of the sample lens 801 in the z-axis direction, n(x, y) is the mean value of the refractive index of the sample lens 801 in the z-axis direction, $n_c$ is the refractive index of the canceller 802, and canceller 803, and $t_T$ is the total thickness of the canceller 802, sample lens 801 and canceller 803. It is here noted that the thickness of the matching oil 805 is thin and so can be neglected.

Obtaining a solution of expression (10) with respect to $\underline{n}$ gives $$\underline{n} \approx (W/2 - t_T n_c)/t + n_c \quad (11)$$

It is thus possible to find n(x, y) of the sample lens 801 from expression (11).

Figure 46:
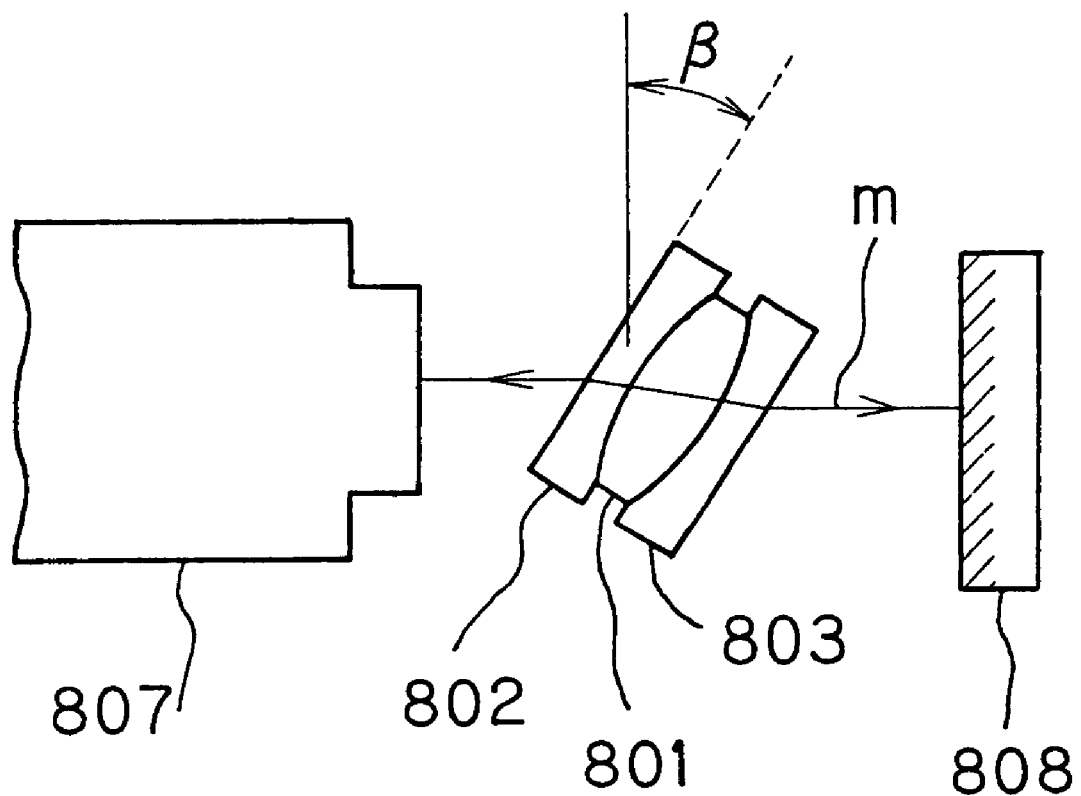
FIG. 46 is illustrative of how to measure a sample in an inclined state.

While the combination of canceller 802, sample lens 801 and canceller 803 is inclined by β with respect to the z-axis as shown in FIG. 46, the transmission wavefront is measured. Then, this wavefront is analyzed according to the same concept as in expression (11), so that the mean value $\underline{n}_m(\beta)$ of the refractive index of the sample lens with respect to the direction along a light ray m can be found.

By finding $\underline{n}_m(\beta)$ with respect to various β values, it is thus possible to find the refractive index profile n(x, y, z) of the sample lens 801 by X-ray CT methods, e.g., radon transformation.

Besides, it is possible to find the decentration of the sample lens or optical element through analysis of the transmission wavefront.

Given below are Examples A to X wherein specific examples and numerical examples of optical systems using variable mirrors are explained.

EXAMPLE A

Figure 47A:
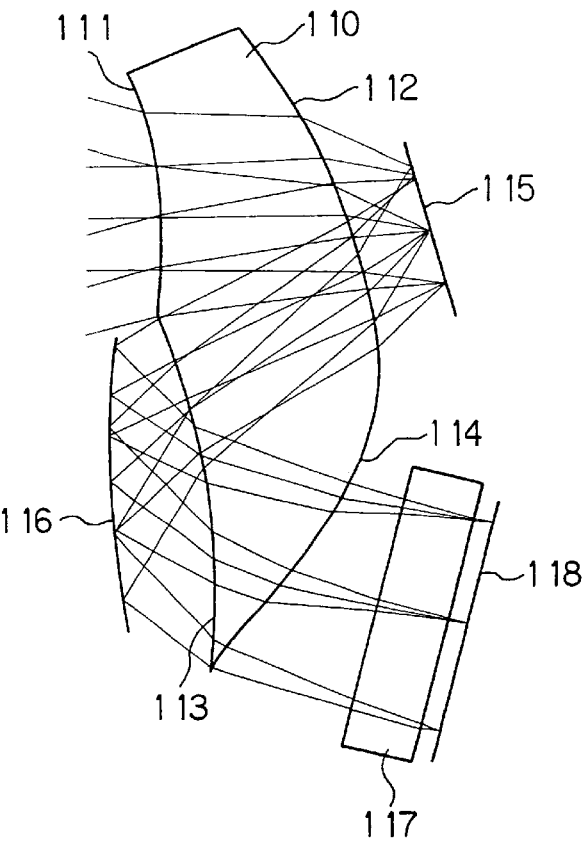
FIG. 47 is illustrative in section of the optical system according to Example A of the present invention at its wide-angle and telephoto ends.
Figure 47B:
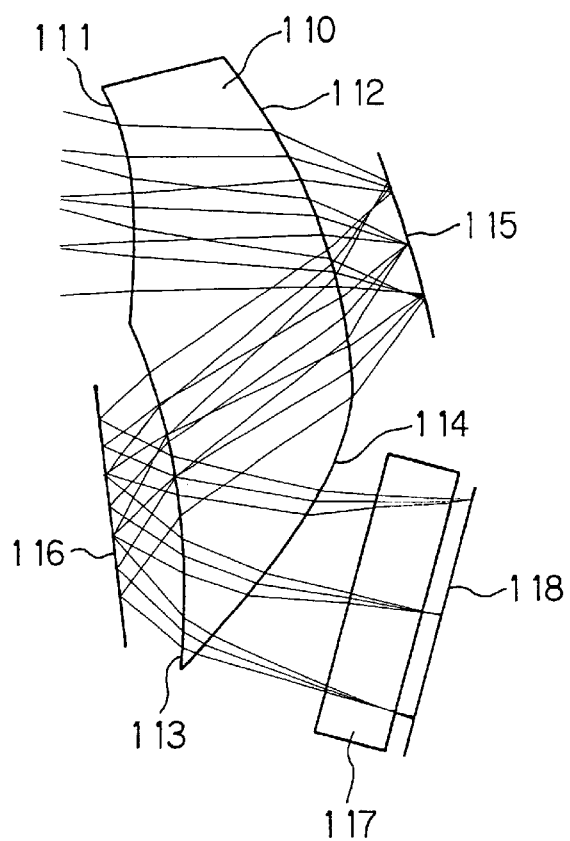

This example is directed to an optical system for an electronic image pickup system which, as shown in the sectional schematics of FIG. 47(a) at its wide-angle end and FIG. 47(b) at its telephoto end, is made up of a free-form surface prism 110 having four refracting surfaces 111 to 114, each defined by a free-form surface, and two free-form surface variable mirrors 115 and 116 which are located on both sides of the prism 110 in its longitudinal direction and face the refracting surfaces 112 and 113, respectively, so that both zooming and focus adjustment can be performed with size reductions. In FIGS. 47(a) and 47(b), reference numeral 117 stands for a plane-parallel plate such as a filter and 118 indicates an image pickup (imaging) surface. A stop is located on, or in the vicinity of, the surface of the first variable mirror 115. The stop may be constructed by applying a black coating on the marginal area of the reflecting surface of the variable mirror 115.

During zooming, one 115 of the two variable mirrors 115 and 116 is transformed from a planar surface to a concave surface and another 116 is transformed from a concave surface to a planar surface. Alternatively, one of the two variable mirrors 115 and 116 may be transformed from a convex to a concave surface, and vice versa. This is because both variable mirrors are transformed in opposite directions.

The image pickup surface 118 is located in the longitudinal direction of the free-form surface prism 110 and in opposition to one variable mirror 116 with the free-form surface prism 110 interposed therebetween, and on the same side of the free-form surface prism 110 in its longitudinal direction, on which another variable mirror 115 is located. With this arrangement, it is possible to reduce the overall size of the optical system.

It is here noted that the first variable mirror 115 is also transformable on focusing. The merit of this variable mirror is that the viewing angle is less likely to change even upon transformation, because it is located on the stop surface. The second variable mirror 116 is transformed on zooming. Since the height of a chief light ray is larger than the radius of a light beam, it is possible to perform zooming (or scaling) with no large focus change. On zooming, the first variable mirror 115 may also be transformed (see the numerical data enumerated later).

The numerical data on this example will be enumerated later. It is noted, however, that the F-number is 4.6 at the wide-angle end and 5.8 at the telephoto end, the focal length $f_{TOT}$ is 5.8 mm at the wide-angle end and 9.4 mm at the telephoto end, the image pickup surface size is 3.86×2.9 mm, and the diagonal, short-side direction and long-side direction viewing angles are 45°, 28° and 36.8°, respectively, at the wide-angle end and 28°, 18° and 23°, respectively, at the telephoto end.

It is desired that at least one of the inventive variable mirrors inclusive of that in the instant example satisfy the following expression (12) or (13) in at least one operating state:

$$0 \leq |P_I/P_{TOT}| < 1000 \qquad (12)$$

$$0 \leq |P_V/P_{TOT}| < 1000 \qquad (13)$$

Here $P_I$ is the reciprocal of a radius of primary curvature near to the entrance surface out of the radii of primary curvature of the variable mirror in the vicinity of the optical axis, $P_V$ is the reciprocal of a radius of primary curvature farther from the entrance surface out of the radii of primary curvature of the variable mirror in the vicinity of the optical axis (when a certain free-form surface is represented by expression (a), given later, and has only one plane of symmetry parallel with the Y-Z plane, for instance, $P_I = 2_{C6}$ and $P_V = 2_{C4}$), and $P_{TOT} = 1/f_{TOT}$ where $f_{TOT}$ is the focal length of the optical system.

One reason is that the closer $|P_I/P_{TOT}|$ or $|P_V/P_{TOT}|$ to the lower limit of 0 to expression (12) or (13), the closer the surface shape of the variable mirror is to a planar or cylindrical shape and so the easier surface shape control is. Another reason is that at greater than the upper limit of 1000, it is difficult to make correction for aberrations and fabricate the variable mirror.

For applications where higher precision is needed, it is desired that the following expressions (12-1) and (13-1) be satisfied in place of expressions (12) and (13).

$$0 \leq |P_I/P_{TOT}| < 100 \qquad (12\text{-}1)$$

$$0 \leq |P_V/P_{TOT}| < 100 \qquad (13\text{-}1)$$

It is desired that the variable mirrors used in the optical systems of the present invention, inclusive of that in the instant example, satisfy the following expression (14) or (15) in at least one operating state:

$$0.00001 < |\Delta P_I/P_{TOT}| < 1000 \qquad (14)$$

$$0.00001 < |\Delta P_V/P_{TOT}| < 1000 \qquad (15)$$

Here $\Delta P_I$ and $\Delta P_V$ are the quantities of change of $P_I$ and $P_V$, respectively.

When the value of $|\Delta P_I/P_{TOT}|$ or $|\Delta P_V/P_{TOT}|$ is less than the lower limit of 0.00001, the effect of the variable mirror becomes slender. On the other hand, when that value is greater than the upper limit of 1000, it is difficult to correct the mirror for aberrations and fabricate the mirror.

For applications where much higher precision is desired, it is preferable to satisfy the following expressions (14-1) and (15-1) in place of expressions (14) and (15).

$$0.00001 < |\Delta P_I/P_{TOT}| < 100 \qquad (14\text{-}1)$$

$$0.00001 < |\Delta P_V/P_{TOT}| < 100 \qquad (15\text{-}1)$$

It is desired that the variable mirrors used in the optical systems of the present invention, inclusive of that in the instant example, satisfy the following two expressions (16) and (17) in a certain operating state:

$$0.00001 < |P_I| < 100 \ (mm^{-1}) \qquad (16)$$

$$0.00001 < |P_V| < 100 \ (mm^{-1}) \qquad (17)$$

When $|P_I|$ or $|P_V|$ is greater than the upper limits of 100, the mirror becomes too small to fabricate, and when $|P_I|$ or $|P_V|$ is less than the lower limits of 0.00001, the effect of the variable mirror vanishes.

For applications where high precision is needed, it is more desired to satisfy the following expressions (16-1) and (17-1) instead of expression (16) and (17).

$$0.001 < |P_I| < 100 \ (mm^{-1}) \qquad (16\text{-}1)$$

$$0.001 < |P_V| < 100 \ (mm^{-1}) \qquad (17\text{-}1)$$

It is most desired to satisfy the following expressions (16-2) and (17-2) instead of expressions (16-1) and (17-1).

$$0.005 < |P_I| < 100 \ (mm^{-1}) \qquad (16\text{-}2)$$

$$0.005 < |P_V| < 100 \ (mm^{-1}) \qquad (17\text{-}2)$$

It is desired that at least one of the variable mirrors used in the optical systems of the present invention, inclusive of that in the instant example, satisfy at least one of the following two expressions (18) and (19) in a certain operating state:

$$0.0001 < |\Delta P_I| < 100 \ (mm^{-1}) \qquad (18)$$

$$0.0001 < |\Delta P_V| < 100 \ (mm^{-1}) \qquad (19)$$

When the value of $|\Delta P_I|$ or $|\Delta P_V|$ is greater than the respective upper limits of 100, the mirror often breaks down due to too a large quantity of transformation. On the other hand, when the lower limits of 0.0001 are not reached, the effect of the variable mirror becomes slender.

For applications where higher precision is needed, it is more desired to satisfy the following expressions (18-1) and (19-1) instead of expressions (18) and (19):

$$0.0005 < |\Delta P_I| < 10 \ (mm^{-1}) \qquad (18\text{-}1)$$

$$0.0005 < |\Delta P_V| < 10 \ (mm^{-1}) \qquad (19\text{-}1)$$

It is most desired to satisfy the following expressions (18-2) and (19-2) in lieu of expressions (18-1) and (19-1):

$$0.002 < |\Delta P_I| < 10 \ (mm^{-1}) \tag{18-2}$$

$$0.002 < |\Delta P_V| < 10 \ (mm^{-1}) \tag{19-2}$$

It is desired that at least one of the variable mirrors used in the optical systems of the present invention, inclusive of that in the instant example, satisfy the following expression (20) in a certain operating state:

$$0 \leq |P_I/(P_V \cos \phi)| < 100 \tag{20}$$

Here φ is the angle of incidence of an axial ray on the surface of the mirror.

When $|P_I/(P_V \cos \phi)|$ is greater than the upper limit of 100, it is difficult to correct the mirror for astigmatism. It is noted that when the shape of the surface is close to a cylindrical surface, the value is close to the lower limit of zero.

For applications where precision is much more needed, it is preferable to satisfy the following expression (20-1) instead of expression (20):

$$0 \leq |P_I/(P_V \cos \phi)| < 25 \tag{20-1}$$

It is here noted that when, in expressions (20) and (20-1), $P_V=0$ and $P_I\neq 0$, i.e., in the case of a planar surface, $P_I/(P_V \cos \phi)$ should be replaced by $1/\cos \phi$.

When, in expressions (20) and (20-1), $P_I \neq 0$ and $P_V=0$, $P_V \cos \phi$ should be replaced by 1.

For the purpose of correction of astigmatism, it is similarly preferable for at least one of the variable mirrors to satisfy the following expression (21) in a certain operation state:

$$|P_V| \geq |P_I| \tag{21}$$

The aforesaid expressions (12) to (15-1) hold true for all Examples A–D and G–O of the present invention, and the aforesaid expressions (16) to (21) go true for Examples A–O of the present invention as well.

EXAMPLE B

Figure 48:
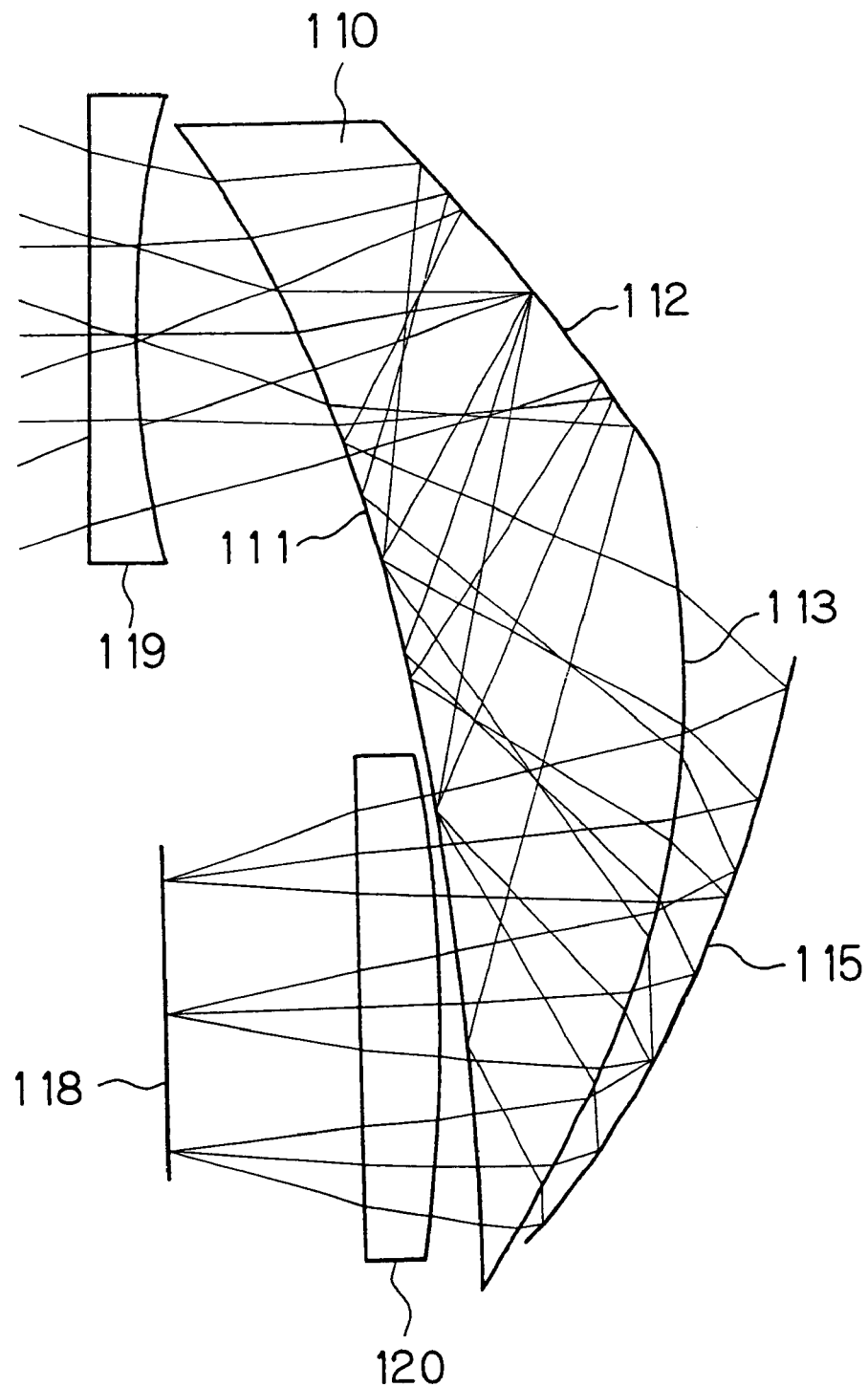
FIG. 48 is illustrative in section of the optical system according to Example B of the present invention when focused on a far object.

This example is directed to an electronic image pickup system wherein, as shown in section in FIG. 48, there are provided one variable mirror 115 and an image pickup surface 118 of an image pickup device, between which a free-form surface prism 110 is interposed in its longitudinal direction for focusing purposes, said prism 110 comprising three refracting surfaces 111 to 113 defined by free-form surfaces. It is a matter of course that this example may be applied to film cameras, etc.

With this example, a wide-angle of 66° is achieved by locating a concave lens 119 on the object side of the free-form surface prism 110 and a convex lens 120 on the image side of the free-form surface prism 110. A stop is located on the second surface 112 of the free-form surface prism 110 or in the vicinity thereof. It is here noted that the first surface 111 of the free-form surface prism 110 has combined actions, an action of refracting light from the concave lens 119 and entering the light into the prism, an action of totally reflecting light reflected at the second surface 112 and an action of refracting light re-entered from the third surface 113 into the prism and allowing the light to leave the prism.

In this example, a variable mirror 115 is located in the rear of the stop for focusing purposes.

With this example, the aberrations of the optical system can be reduced because the force of the variable mirror 115 to converge a light beam is strong. Since the concave lens 119 and convex lens 120 are positioned in the longitudinal direction of the free-form surface prism 110 and on the same side as the image pickup device, the size and thickness of the optical system can be reduced.

The numerical data on this example will be enumerated later. It is noted, however, that the F-number is 2.2, the focal length $f_{TOT}$ is 3.8 mm, the image pickup surface size is 3.64×2.85 mm, and the diagonal, short-side direction and long-side direction viewing angles are 66°, 40° and 52°, respectively.

EXAMPLE C

Figure 49:
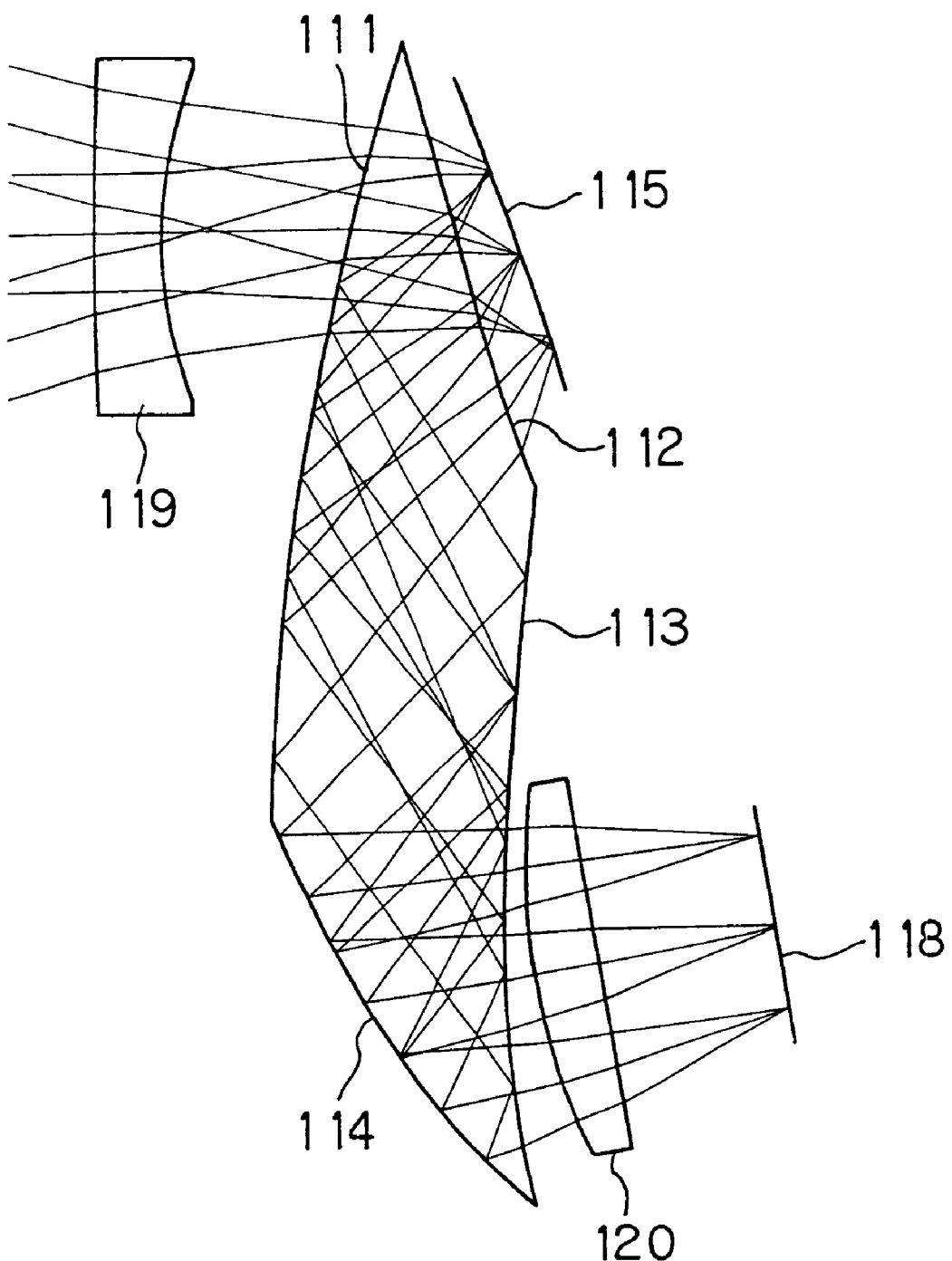
FIG. 49 is illustrative in section of the optical system according to Example C of the present invention when focused on a near object.

This example is directed to an image pickup system wherein, as shown in section in FIG. 49, a free-form surface prism 110 comprising four refracting surfaces 111 to 114, each defined by a free-form surface, is provided with a concave lens 119 and a convex lens 120 on both sides of its longitudinal direction, and an image pickup surface 118 of an image pickup device and a variable mirror 115 are positioned on one side of the longitudinal direction of the free-form surface prism 110. Focusing is performed by the variable mirror 115.

It is here noted that the first surface 111 of the free-form surface prism 110 has combined actions, i.e., an action of refracting light from the concave lens 119 and entering the light into the prism and an action of totally reflecting light re-entered from the second surface 112 into the prism, and the third surface 113 of the prism 110 has combined actions, i.e., an action of totally reflecting light reflected at the first surface 111 and an action of refracting light reflected at the fourth surface 114 and allowing the light to leave the prism.

The merit of this example is that focus adjustment can be performed with no viewing angle change, because a stop is placed on the surface of the variable mirror 115 and a chief ray is almost vertically incident on an image plane 118.

This optical system is slimmed down by locating the variable mirror 115 and image pickup surface 118 on the same side of the longitudinal direction of the free-form surface prism 110 and positioning the concave lens 119 on the opposite side in such a manner that the optical system also serves as a cover glass for a digital camera or the like.

The numerical data on this example will be enumerated later. It is noted, however, that the F-number is 2.6, the focal length $f_{TOT}$ is 4.8 mm, the image pickup surface size is 3.5×2.67 mm, and the diagonal, short-side direction and long-side direction viewing angles are 50°, 32° and 40°, respectively.

EXAMPLE D

Figure 50:
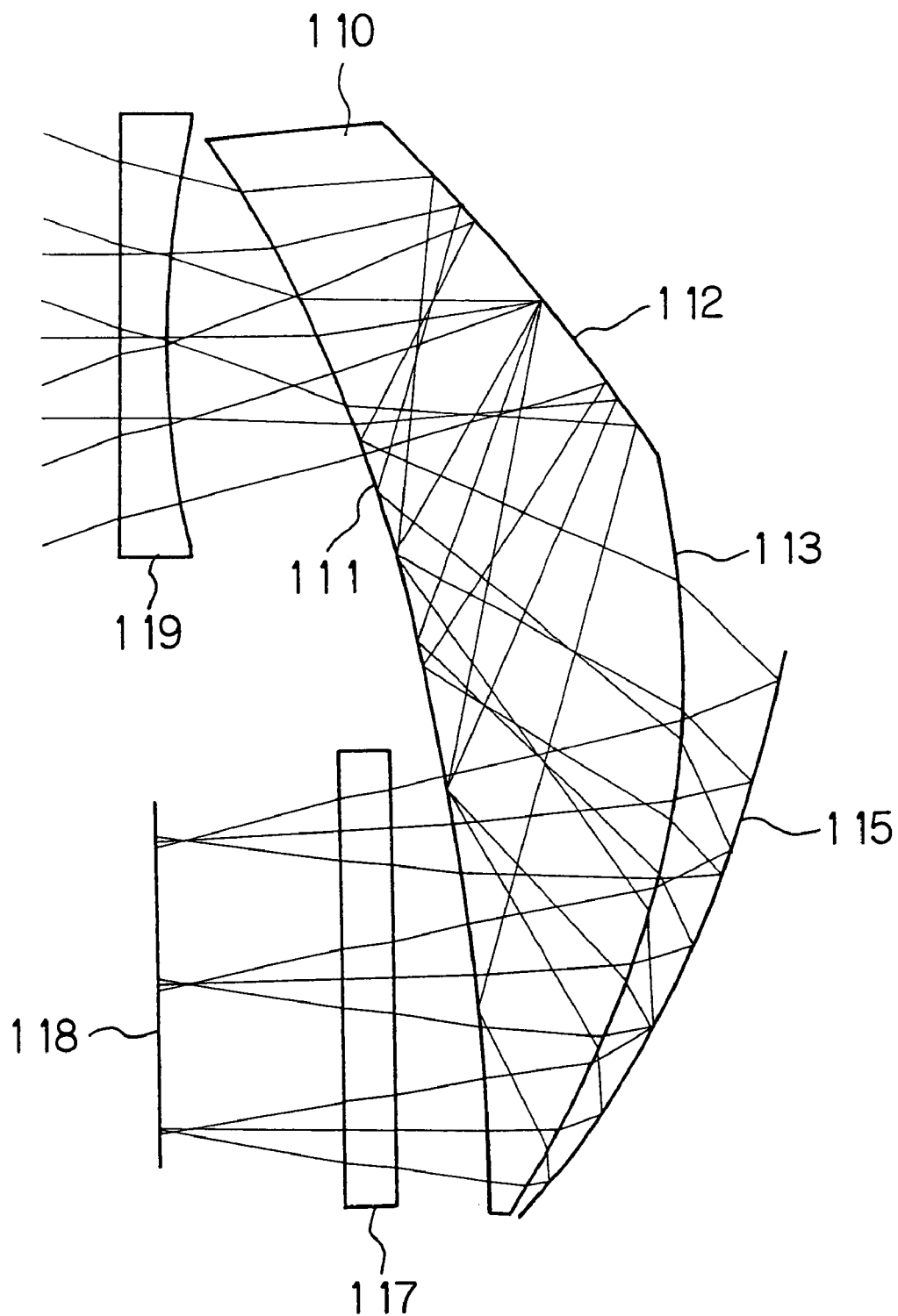
FIG. 50 is illustrative in section of the optical system according to Example D of the present invention when focused on a far object.

This example is directed to an image pickup optical system wherein, as shown in section in FIG. 50, a free-form surface prism 110 having three refracting surfaces 111 to 113, each defined by a free-form surface, is provided with one concave lens 119 on the object side of its longitudinal direction, an image pickup surface 118 of an image pickup device on the same side as the lens 119, and a variable mirror 115 on the opposite side. The merit of this optical system is that a wide viewing angle of 63° is achieved by use of a reduced number of lenses.

A plane-parallel plate shown at 117 is understood to include an infrared cut filter, a low-pass filter, a cover glass for the image pickup device, etc.

It is here noted that the first surface 111 of the free-form surface prism 110 has combined actions, i.e., an action of refracting light from the concave lens 119 and entering the light into the prism, and an action of totally reflecting light reflected at the second surface 112.

The numerical data on this example will be enumerated later. It is noted, however, that the F-number is 2.8, the focal length $f_{TOT}$ is 4.2 mm, the image pickup surface size is 4.1×3.2 mm, and the diagonal, short-side direction and long-side direction viewing angles are 63°, 40.4° and 52.2°, respectively.

Commonly through Examples A–D and G–M, each optical system should preferably satisfy the absolute value of the $f_N$-to-$f_{TOT}$ ratio with respect to at least one optical element, given by the following expression (22):

$$0.1 < |f_N/f_{TOT}| \tag{22}$$

Here $f_N$ is the focal length of an N-th optical element other than the free-form surface optical element and $f_{TOT}$ is the focal length of the optical system. Note that this optical element may include a cemented lens in which no care is taken of a separation(s) and a variable mirror. When the lower limit of 0.1 to $|f_N/f_{TOT}|$ is not reached, it is difficult to correct the optical system for aberrations.

For applications where high performance is desired, it is preferable to satisfy:

$$0.5 < |f_N/f_{TOT}| \tag{22-1}$$

EXAMPLE E

Figure 51A:
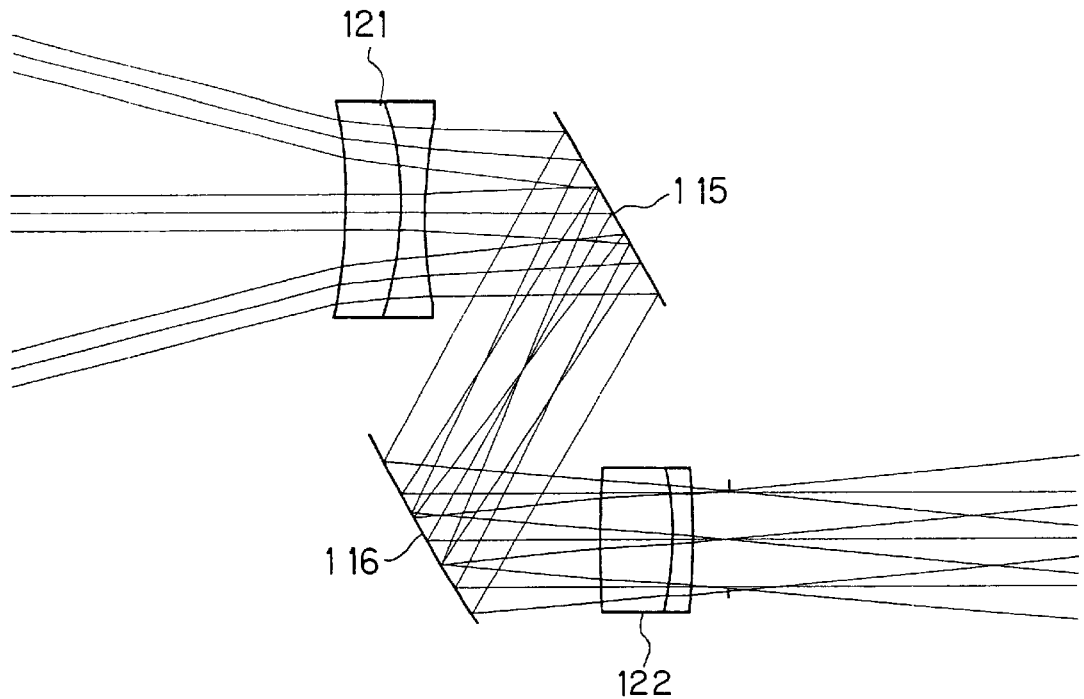
FIG. 51 is illustrative in section of the optical system according to Example E of the present invention at its wide-angle and telephoto ends.
Figure 51B:
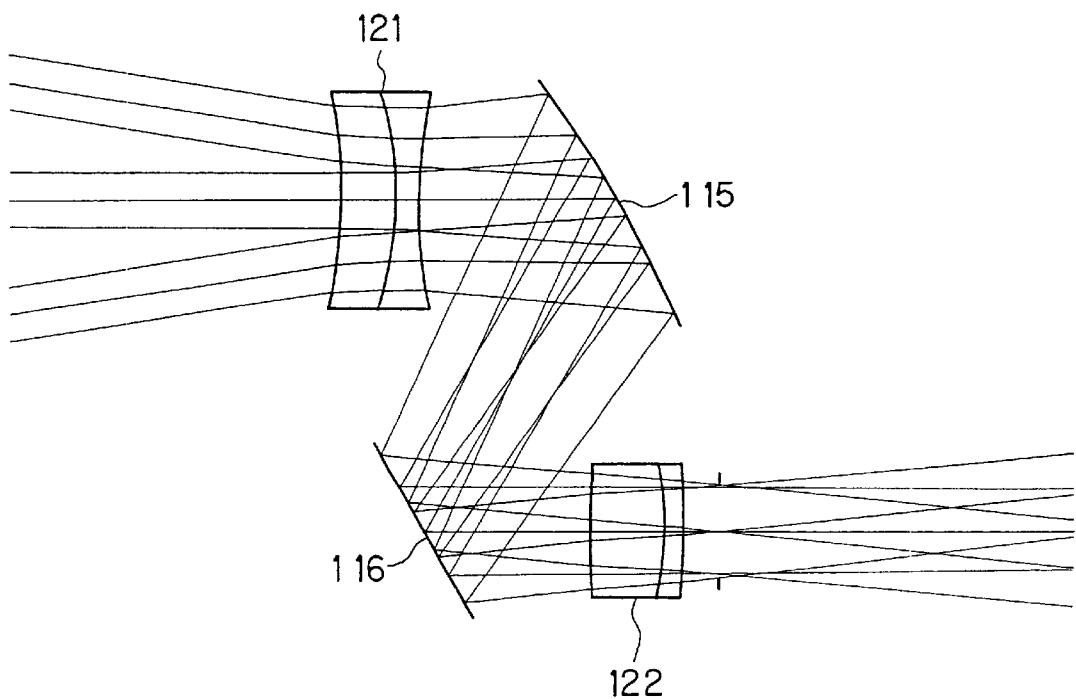

This example is directed to a zoom type Galilean finder using two variable mirrors 115 and 116, as shown in FIGS. 51(a) and 51(b) that are sectional schematics of the finder at its wide-angle (a) and telephoto end (b). The first variable mirror 115 and second variable mirror 116 are provided between an objective lens 121 of concave power and an eyepiece lens 122 of convex power to form an optical path that is turned back in a Z-shaped manner. On zooming, one of the variable mirrors 115 and 116 is transformed from a concave surface comprising a toric surface to a planar surface, and another is transformed from a planar surface to a concave surface comprising a toric surface in the reverse direction. This in turn causes a power shift through the lens system so that zooming is achievable. This finder is then characterized in that the optical elements 121 and 122 other than the variable mirrors 115 and 116 remain at rest, and so the mechanical structure involved is simplified.

In addition to zooming, the finder may be focused on objects at different distances by changing the curvatures of the two variable mirrors 115 and 116.

The numerical data about this example will be given later. It is noted, however, that the object-side half-viewing angle, angular magnification and pupil diameter ϕ are 14.5°, 0.38 and 5.25 mm at the wide-angle end and 8.7°, 0.6 and 5.25 mm at the telephoto end.

Here let $|f_m|$ represent the absolute value of the focal length of an optical element having the shortest focal length in such an optical system (note that for a cemented lens, $|f_m|$ is defined as the focal length of the lens in a cemented state), and $|P_m|$ be equal to $1/|f_m|$. Then, it is desired that the following expression (23) or (24) holds for either one of the variable mirrors 115 and 116 forming the optical system in its certain operating state:

$$0.0001 < |P_I|/|P_m| < 100 \tag{23}$$

$$0.0001 < |P_V|/|P_m| < 100 \tag{24}$$

When $|P_I|/|P_m|$ or $|P_V|/|P_m|$ does not reach the lower limit of 0.0001 to these expressions, the quantity of transformation of the variable mirror becomes too small to contribute to zooming, focusing or the like. When the upper limit of 100 is exceeded, it is difficult to make correction for aberrations produced at the variable mirror.

To obtain an optical system with well-corrected aberrations, on which the variable mirror used has a great effect, it is desired to meet at least one of the following expressions (23-1) and (24-1) instead of expressions (23) and (24).

$$0.001 < |P_I|/|P_m| < 10 \tag{23-1}$$

$$0.001 < |P_V|/|P_m| < 10 \tag{24-1}$$

EXAMPLE F

Figure 52:
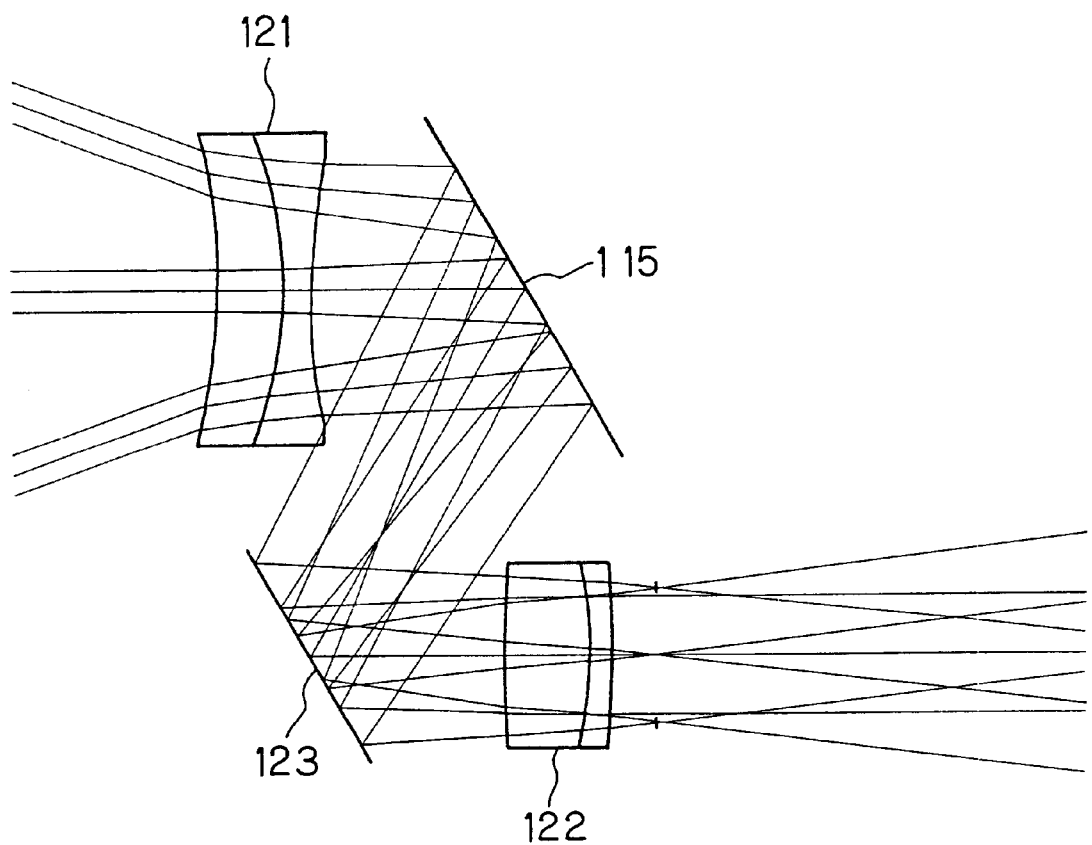
FIG. 52 is illustrative in section of the optical system according to Example F of the present invention when focused on a near object.

This example is directed to a Galilean finder using one vari-focus mirror 115 as shown in section in FIG. 52. The variable mirror 115 and a fixed mirror 123 are provided between an objective lens 121 of concave power and an eyepiece lens 122 of convex power to form an optical path that is turned back in a Z-shaped manner. As an object approaches from a far point to a near point, the variable mirror 115 placed in front of a stop (pupil) is transformed from a planar surface to a concave surface comprising a toric surface. Expressions (23) to (24-1) hold true for Examples A–M.

The numerical data about this example will be given later. It is noted, however, that the object-side half-viewing angle, angular magnification and pupil diameter ϕ are 20°, 0.34 and 6 mm, respectively.

EXAMPLE G

Figure 53A:
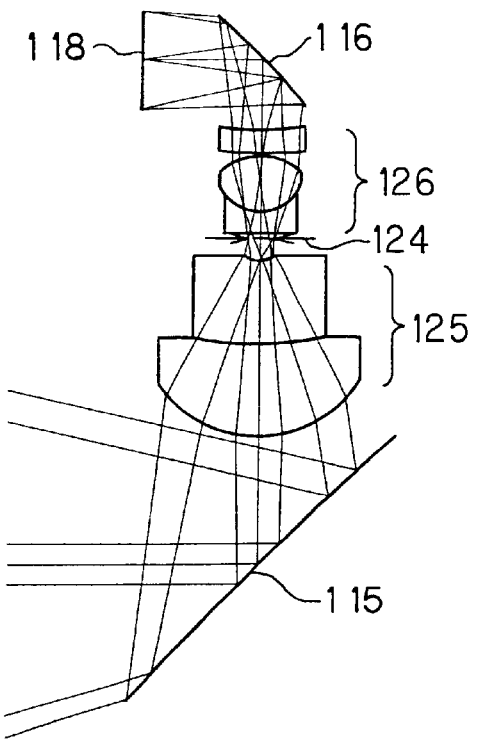
FIG. 53 is illustrative in section of the optical system according to Example G of the present invention at its wide-angle and telephoto ends.
Figure 53B:
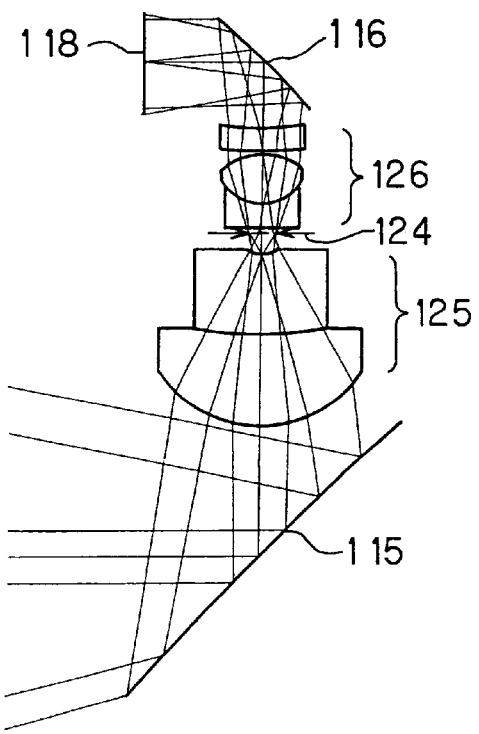

This example is directed to a rotationally symmetric lens system comprising a front lens group 125 having negative power and consisting of a doublet, a stop 124 and a rear lens group 126 having positive power and consisting of a doublet and one lens, as shown in FIGS. 53(a) and 53(a) that are sectional schematic of the system at its wide-angle (a) and telephoto end (b). A first variable mirror 115 is located on the object side of the lens system, and a second variable mirror 116 is interposed between an imaging surface 118 and the lens system, so that zooming is performed by changing the aspheric shapes of the two variable mirrors 115 and 116 in a cooperation manner.

According to this example, a vari-focus objective optical system for digital cameras is constructed by exclusively using spherical surfaces for the lenses and rotationally symmetric aspheric surfaces for the variable mirrors 115 and 116 without recourse to free-form surfaces.

The numerical data about this example will be given later. It is noted, however, that the image height is 2 mm, the F-number is 3.1 to 3.5, and the focal length is 6.76 to 8.73 mm.

EXAMPLE H

Figure 54A:
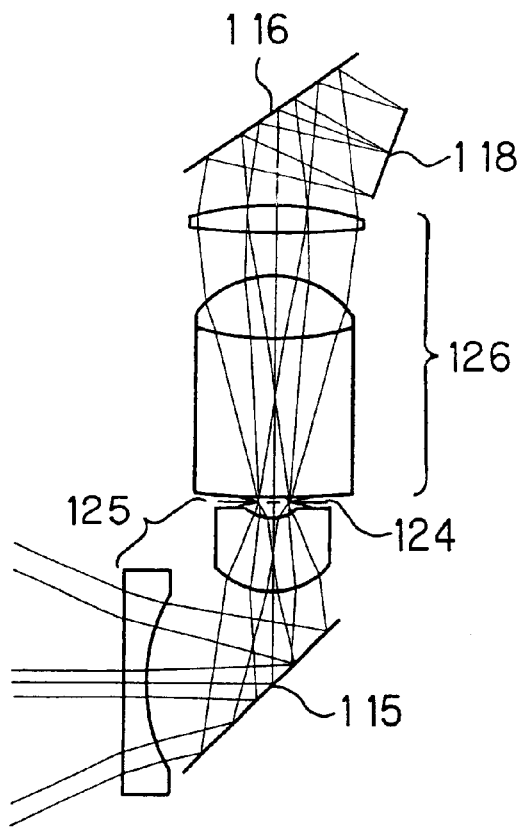
FIG. 54 is illustrative in section of the optical system according to Example H of the present invention at its wide-angle and telephoto ends.
Figure 54B:
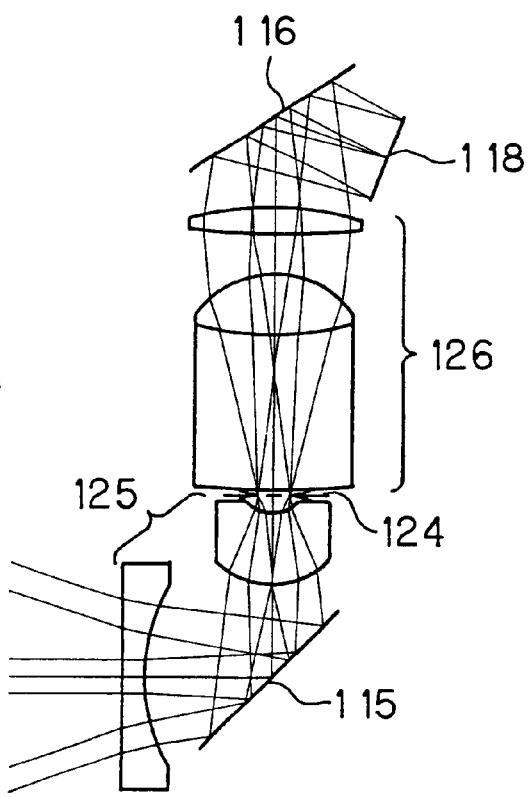

This example is directed to a rotationally symmetric lens system comprising a front lens group 125 having negative power and consisting of two concave lenses, a stop 124, and a rear lens group having positive power and consisting of a doublet and one positive lens, as shown in FIGS. 54(a) and 54(b) that are sectional schematics of the lens system at its wide-angle (a) and telephoto end (b). A first variable mirror 115 is interposed between the lenses in the first lens group 125, and a second variable mirror 116 is interposed between an imaging surface 118 and the rear lens group 126, so that zooming is performed by changing the aspheric shapes of the two variable mirrors 115 and 116 in a cooperation manner.

According to this example, a vari-focus objective optical system for digital cameras is constructed by exclusively using anamorphic or spherical surfaces for the lenses and rotationally symmetric aspheric surfaces for the variable mirrors 115 and 116 without recourse to free-form surfaces.

The numerical data about this example will be given later. It is noted, however, that the image height is 2 mm, the F-number is 3.6 to 4.48, and the focal length is 4.51 to 6.49 mm.

EXAMPLE I

Figure 55A:
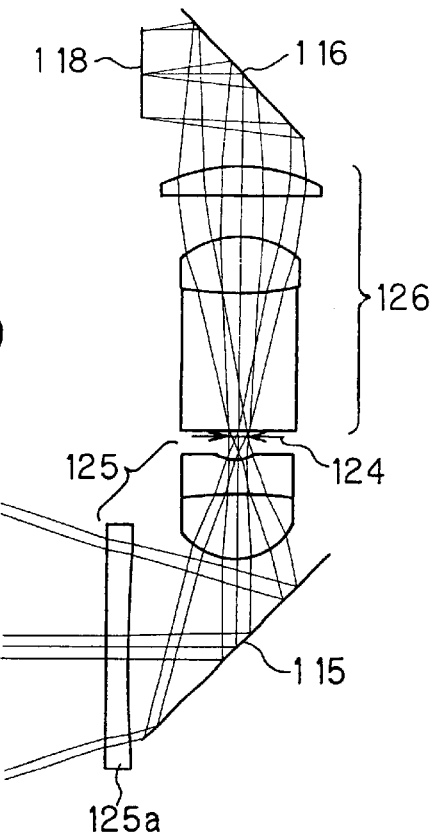
FIG. 55 is illustrative in section of the optical system according to Example I of the present invention at its wide-angle and telephoto ends.
Figure 55B:
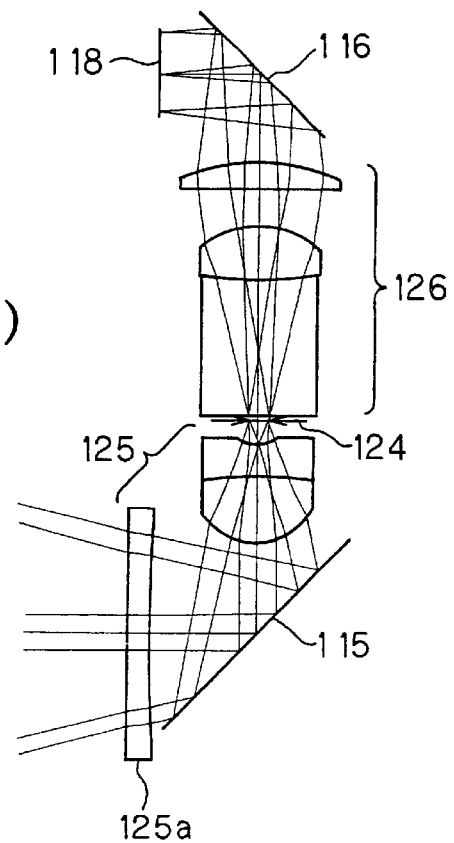
Figure 56A:
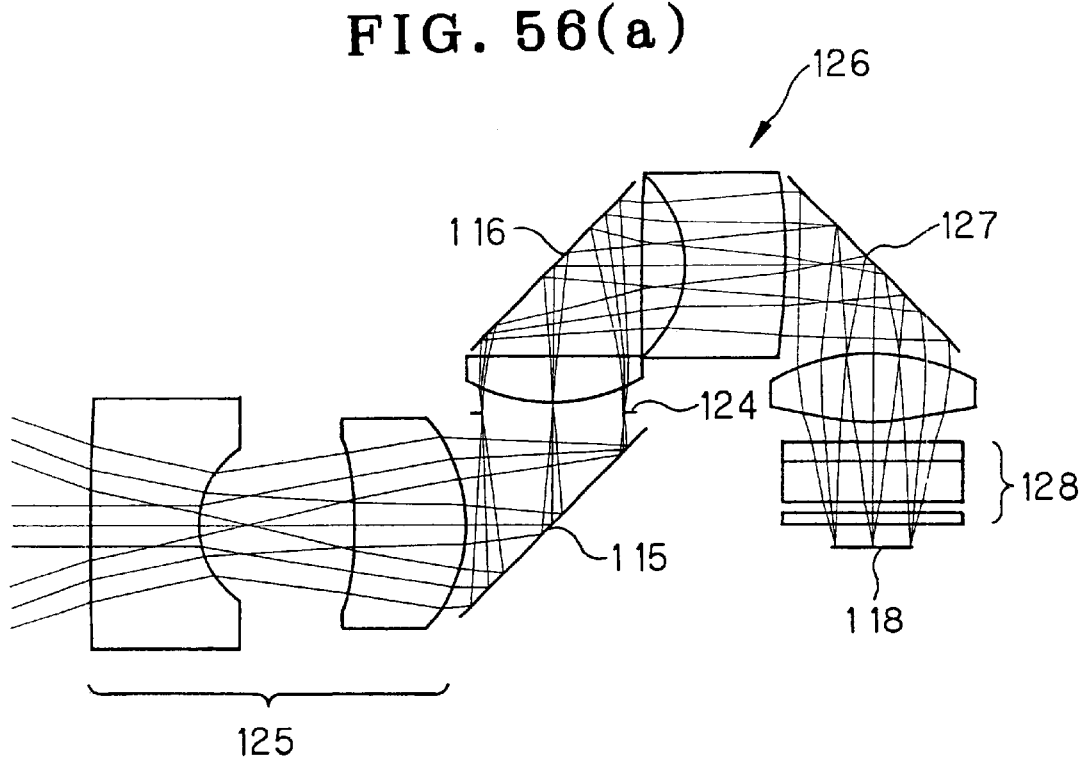
FIG. 56 is illustrative in section of the optical system according to Example J of the present invention at its wide-angle and telephoto ends.
Figure 56B:
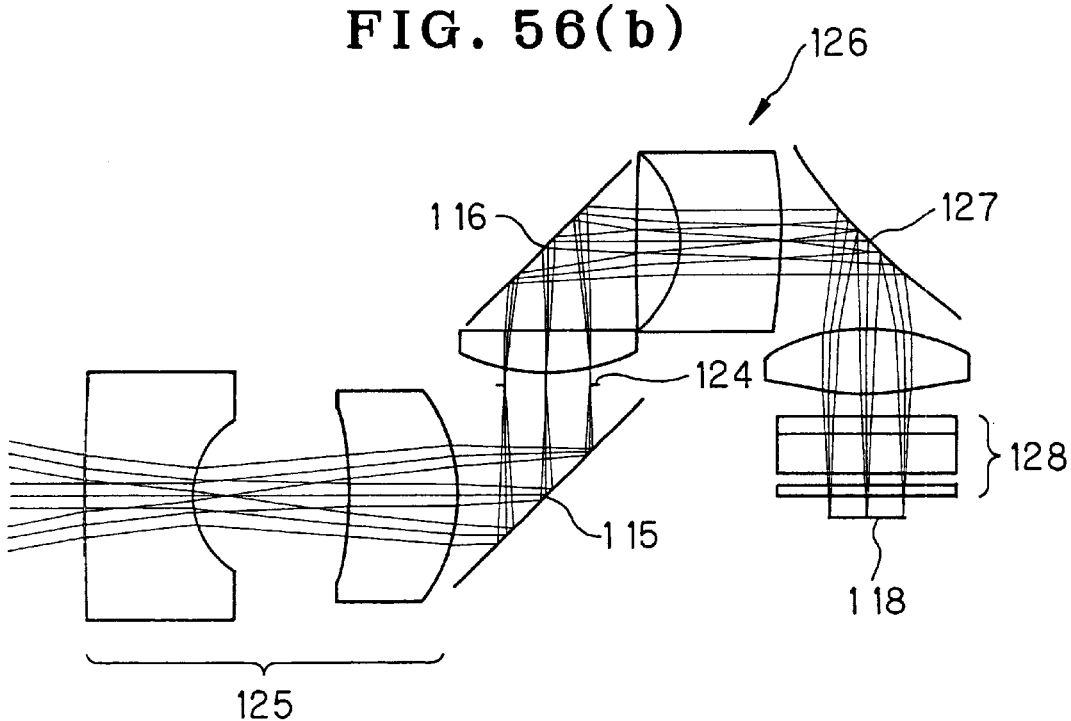
Figure 57A:
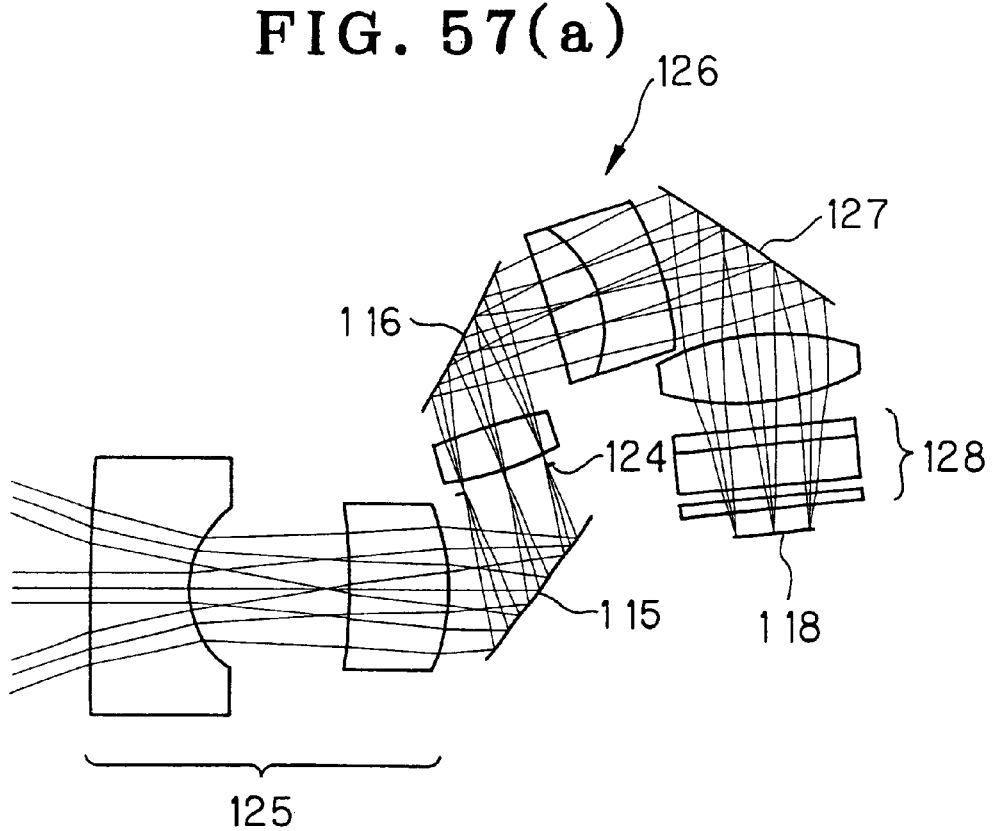
FIG. 57 is illustrative in section of the optical system according to Example K of the present invention at its wide-angle and telephoto ends.
Figure 57B:
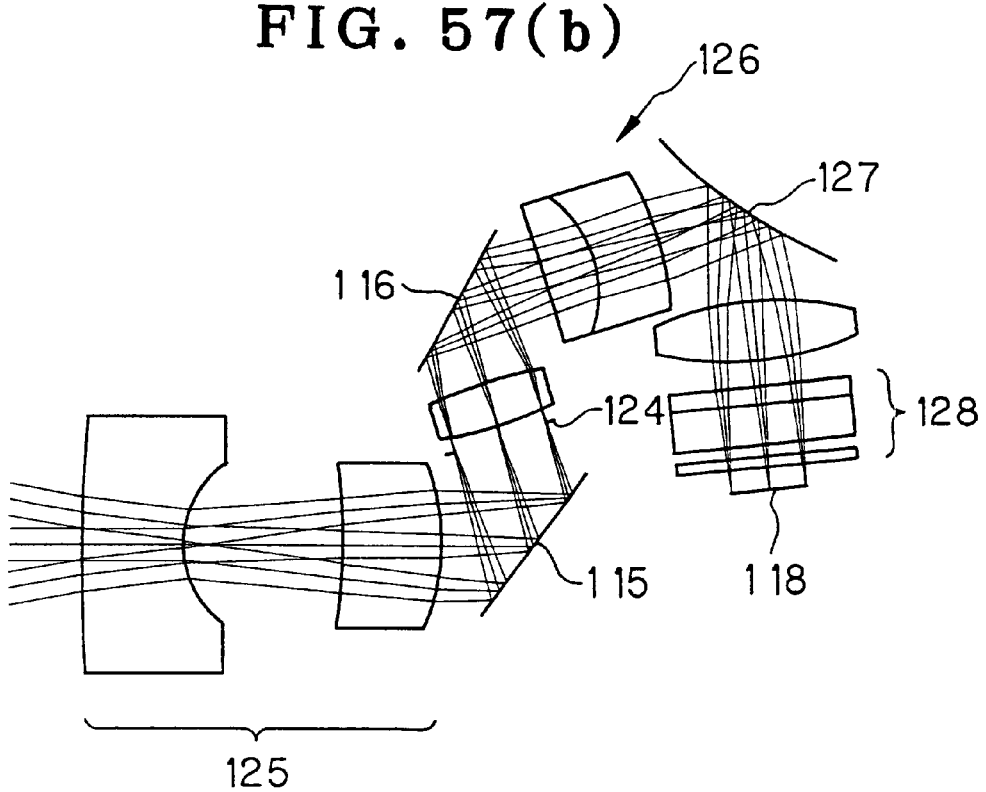

This example is directed to a lens system comprising a front lens group 125 having negative power and consisting of a lens 125a with the second surface comprising an anamorphic surface and a doublet, a stop 124, and a rear lens group 126 having positive power and consisting of a doublet and one positive lens, as shown in FIGS. 55(a) and 55(b) that are sectional schematics of the lens system at its wide-angle (a) and telephoto end (b). A first variable mirror 115 is interposed between the lenses in the front lens group 125 and a second variable mirror 116 is interposed between an imaging surface 118 and the rear lens group 126, so that zooming is performed by changing the aspheric shapes of the two variable mirrors 115 and 116 in a cooperation manner.

According to this example, a vari-focus objective optical system for digital cameras is constructed by exclusively using anamorphic or spherical surfaces for the lenses and rotationally symmetric aspheric surfaces for the variable mirrors 115 and 116 without recourse to free-form surfaces.

The numerical data about this example will be given later. It is noted, however, that the image height is 2 mm, the F-number is 4.38 to 5.43, and the focal length is 5.89 to 8.86 mm.

EXAMPLE J

This example is directed to a lens system comprising a front lens group 125 having negative power and consisting of a negative lens and a positive lens, a stop 124, a first variable mirror 115 interposed between the front lens group 125 and the stop 124, and a rear lens group 126 interposed between the stop 124 and an imaging surface 118 and consisting of a convex lens, a doublet and a convex lens. A second variable mirror 116 is interposed between the convex lens and the doublet, and a third variable mirror 127 is interposed between the doublet and the final concave lens. Thus, the three variable mirrors 115, 116 and 127 are provided to deflect an optical path three times in all, 90° for each time, so that zooming is performed by changing the free-form surface shapes of three such variable mirrors in an independent yet cooperation manner.

According to this example, a vari-focus objective optical system for digital cameras, etc. is constructed by using spherical surfaces and rotationally symmetric aspheric surfaces for the lenses other than the variable mirrors.

It is here noted that a plane-parallel plate group 128 between the rear lens group 126 and the imaging surface 118 comprises a filter, a cover glass and so on.

The numerical data on this example will be given later. It is noted, however, that the aspect ratio of the image pickup surface is 3:4, the maximum image height is 2.8 mm, the F-number is 2.56 to 8.34, the focal length is 4.69 to 9.33 mm, the X-direction viewing angle is 25.50° to 13.50°, and the Y-direction viewing angle is 19.70° to 10.20°.

EXAMPLE K

This example is directed to a lens system comprising a front lens group 125 having negative power and consisting of a negative lens and a positive lens, a stop 124, a first variable mirror 115 interposed between the front lens group 125 and the stop 124, and a rear lens group 126 interposed between the stop 124 and an imaging surface 118 and consisting of a convex lens, a doublet and a convex lens. A second variable mirror 116 is interposed between the convex lens and the doublet, and a third variable mirror 127 is interposed between the doublet and the final convex lens. Thus, the three variable mirrors 115, 116 and 127 are provided to deflect the optical path, so that zooming is performed by changing the free-form surface shapes of three such variable mirrors in an independent yet cooperation manner. This example is different from Example J in that the optical path is not deflected 90° at the variable mirrors 115 and 127.

According to this example, a vari-focus objective optical system for digital cameras, etc. is constructed by using spherical surfaces and rotationally symmetric aspheric surfaces for the lenses other than the variable mirrors.

It is here noted that a plane-parallel plate group 128 interposed between the rear lens group 126 and the imaging surface 118 comprises a filter, a cover glass and so on.

The numerical data on this example will be given later. It is noted, however, that the aspect ratio of the image pickup surface is 3:4, the maximum image height is 2.8 mm, the F-number is 3.67 to 6.69, the focal length is 4.69 to 9.33 mm, the X-direction viewing angle is 25.50° to 13.50°, and the Y-direction viewing angle is 19.70° to 10.20°.

EXAMPLE L

Figure 58A:
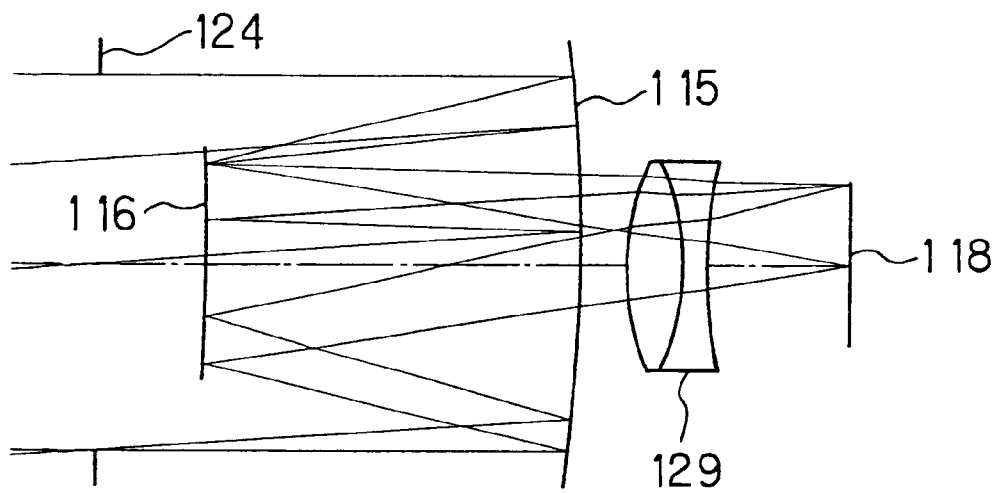
FIG. 58 is illustrative in section of the optical system according to Example M of the present invention at its wide-angle and telephoto ends.
Figure 58B:
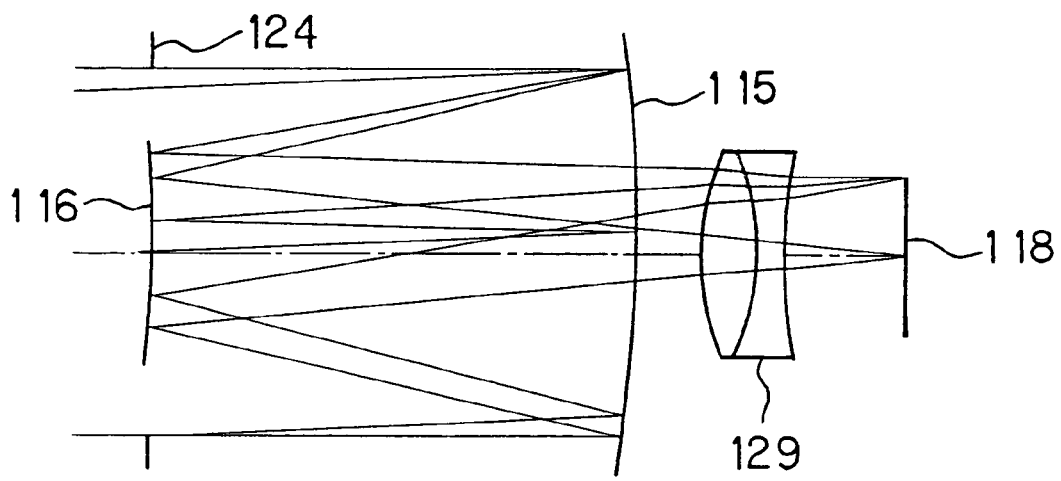

This example is directed to a zoom system using variable mirrors for two mirrors of the catadioptric optical system comprising a doublet 129 added to the image side of a Cassegrainian or Ritchey-Chrentien telescope comprising a rotationally symmetric main mirror 115 and a subordinate mirror 116, as shown in FIGS. 58(a) and 58(b) that are sectional schematics of the zoom system at its wide-angle (a) and telephoto end (b). The distance from a stop 124 to an imaging surface 118 is fixed, and rotationally symmetric aspheric surfaces are used for variable mirrors 115 and 116. The variable mirror 116 and a doublet 129 are designed to be axially moved in cooperation with the transformation of the rotationally symmetric aspheric surfaces, thereby constructing a vari-focus objective optical system. Focus adjustment may be performed by changing the shape of the variable mirror 116, moving the variable mirror 116 or doublet 129, or moving the doublet 129 while changing the shape of the variable mirror 116. This example is characterized in that the optical element is axially moved for zooming, and the variable mirror is transformed or the optical element is moved for focus adjustment. It is here noted that the variable mirror is a sort of optical element. Zooming is understood to include scaling as well. The movement of the optical element may be effected either by a motor or the like or manually.

The numerical data on this example will be given later. It is noted, however, that the aspect ratio of the image pickup surface is 3:4, the maximum image height is 2.8 mm, the F-number is 3.08 to 4.62, the focal length is 40.0 to 60.0 mm, the X-direction viewing angle is 3.20° to 2.14°, and the Y-direction viewing angle is 2.40° to 1.60°.

EXAMPLE M

Figure 59:
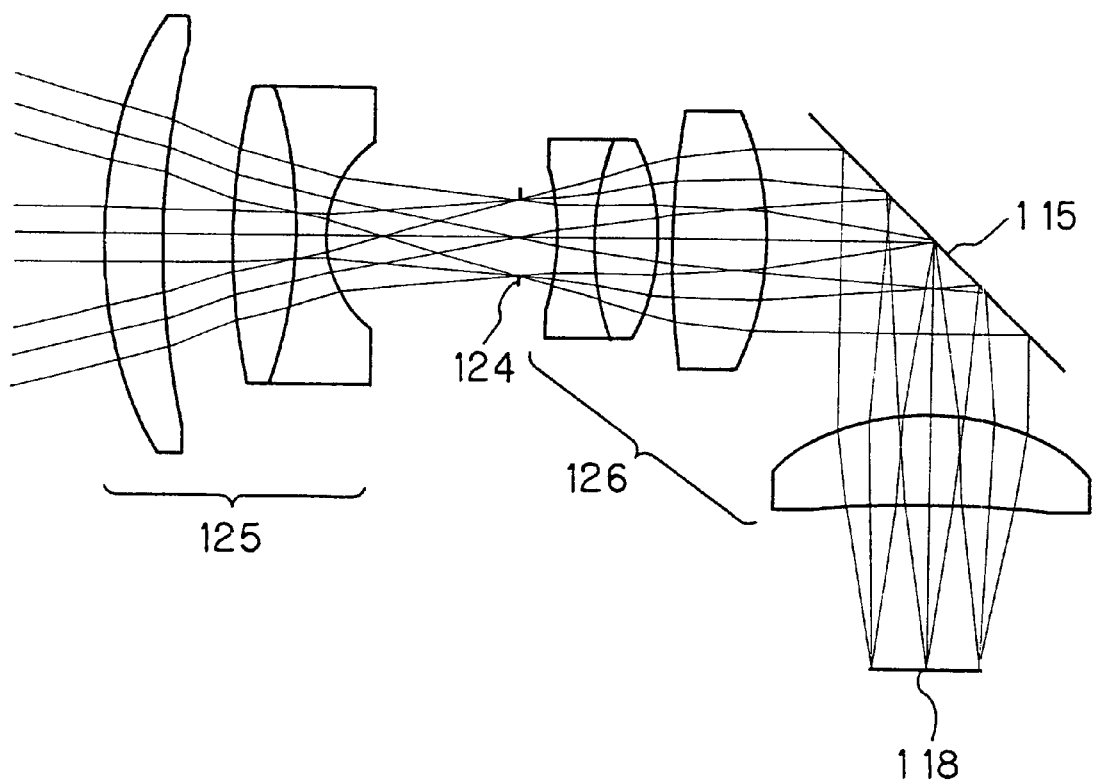
FIG. 59 is illustrative in section of the optical system according to Example M of the present invention when focused on a far object.

This example is directed to a so-called double-Gauss type lens system comprising a front lens group 125 consisting of a positive lens and a doublet, a stop 124 and a rear lens group 126 consisting of a doublet and two positive lenses, as shown in section in FIG. 59. This lens system provides an image pickup optical system for electronic image pickup systems, etc., wherein focusing is performed with a variable mirror 115 interposed between both positive lenses in the rear lens group 126.

This example is focused on a nearby object by transforming the variable mirror 115 from a planar surface to a free-form surface.

The numerical data on this example will be given later. It is noted, however, that the aspect ratio of the image pickup surface is 3:4, the maximum image height is 2.8 mm, the F-number is 3.5, the focal length is 6.4 mm, the X-direction viewing angle is 21.58°, and the Y-direction viewing angle is 16.52°.

EXAMPLE N

Figure 60A:
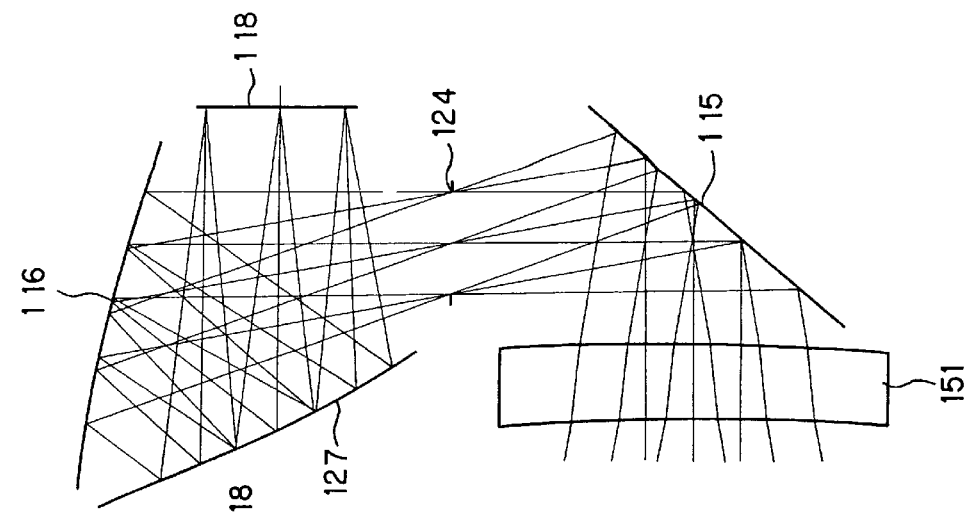
FIG. 60 is illustrative in section of the optical system according to Example N of the present invention at its wide-angle end, standard setting and telephoto end.
Figure 60B:
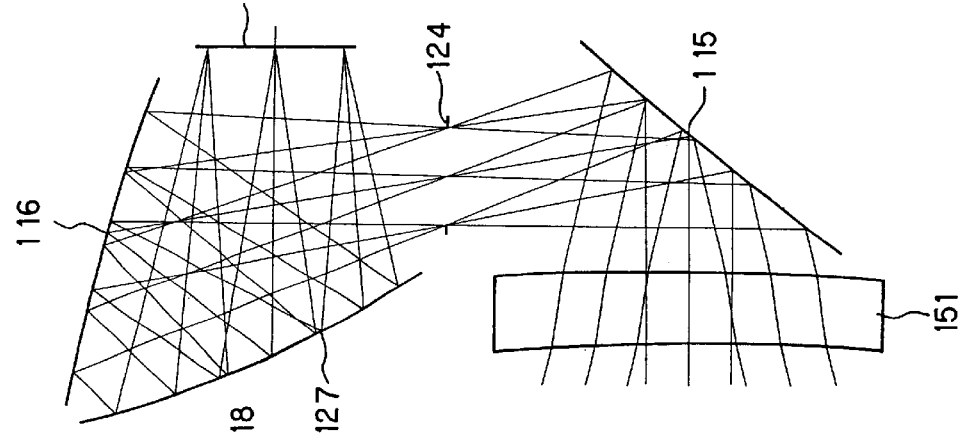
Figure 60C:
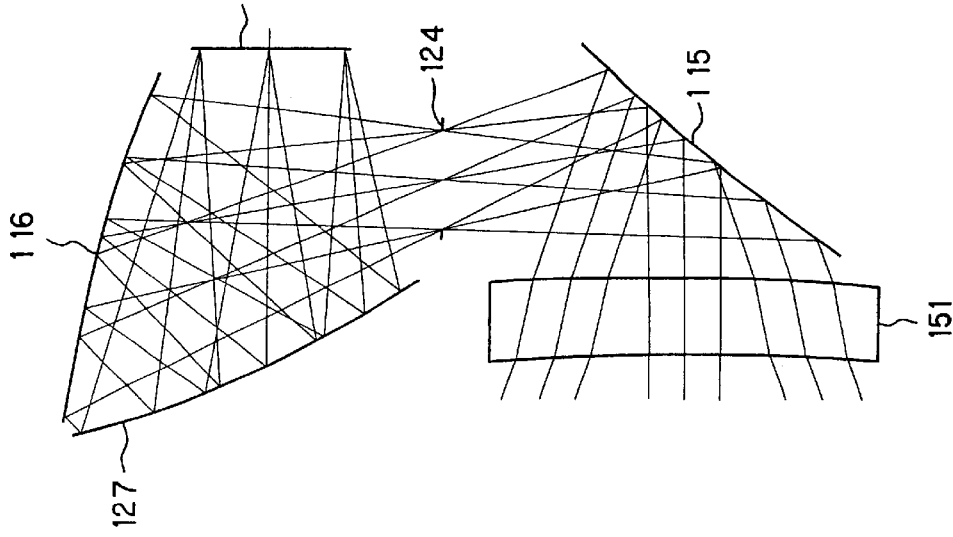
Figure 62:
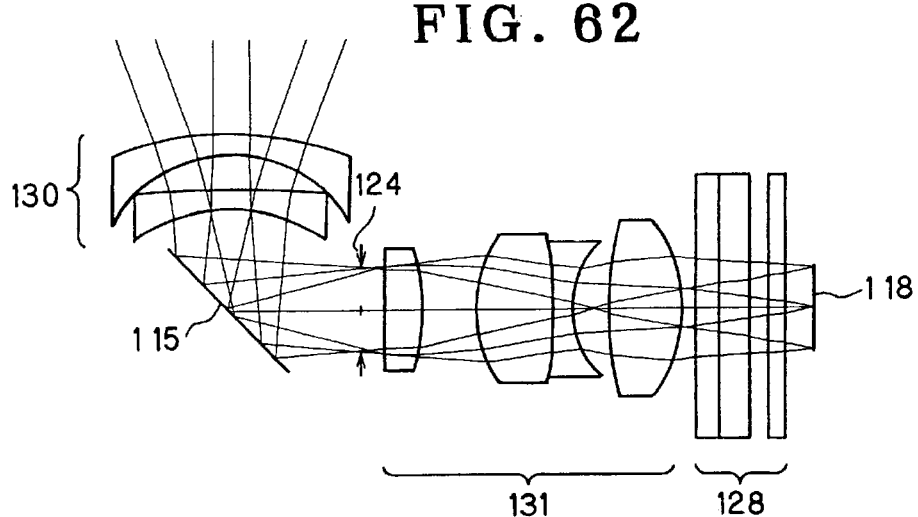
FIG. 62 is illustrative in section of the optical system according to Example P of the present invention.

This example is directed to a zoom system comprising, in order from its object side, a first lens 151 with both surfaces defined by free-form surfaces, a first variable mirror 115 that transforms in response to scaling, an aperture stop 124, a second variable mirror 116 that transforms in response to scaling and a third variable mirror 127 that transforms in response to scaling, as shown in FIGS. 60(a), 60(b) and 60(c) that are sectional schematics of the zoom system at its wide-angle end (a), standard setting (b) and telephoto end (c), so that zooming is performed by changing the free-form surface shapes of the three variable mirrors 115, 116 and 127 in an independent yet cooperation manner. An optical path is deflected upwardly by the first variable mirror 115, deflected obliquely and forwardly by the second variable mirror 116, and deflected by the third variable mirror 127 in such a way that the optical path crosses an optical path entered into the second variable mirror 116 and then goes backward.

Among the component parameters to be referred to later, the axial chief ray is defined by a light ray propagating from the center of an object through the center of the stop 124 to the center of an image plane 118 according to forward ray tracing, and the point of origin of a decentration optical surface of a decentration optical system is defined by the position of intersection of the axial chief ray with the first surface of the optical system located nearest to the object side.

The numerical data about this example will be given later. It is noted, however, that the image pickup surface size is 3.6 mm×2.7 mm, the horizontal and vertical viewing angles are 50° and 39°, respectively, at the wide-angle end, the horizontal and vertical viewing angles are 35° and 27°, respectively, at the standard setting and the horizontal and vertical viewing angles are 26° and 20°, respectively, at the telephoto end. At each setting, the entrance pupil diameter φ is 1.41 mm.

In this example, since the variable mirrors 115, 116 and 127 are fixed in the vicinity of their centers and movable at their peripheral areas, the values of the origins of the coordinates of the variable mirrors 115, 116 and 127 remain unchanged.

This example can be provide a high-performance imaging optical system which, albeit being a zoom lens system having a zoom ratio of about 2, can have an image pickup device slimmed down very largely in its vertical direction.

EXAMPLE O

This example is directed to a zoom system comprising, in order from its object side, a first lens 151 with both surfaces defined by free-form surfaces, a first variable mirror 115 that transforms in response to scaling, a second lens 152 with both surfaces defined by free-form surfaces, an aperture stop 124, a third lens 153 with both surfaces defined by free-form surfaces, a second variable mirror 116 that transforms in response to scaling and a third variable mirror 127 that transforms in response to scaling, as shown in FIGS. 61(a), 61(b) and 61(c) that are sectional schematics of the zoom system at its wide-angle end (a), standard setting (b) and telephoto end (c), so that zooming is performed by changing the free-form surface shapes of the three variable mirrors 115, 116 and 127 in an independent yet cooperation manner. An optical path is deflected upwardly by the first variable mirror 115, deflected obliquely and forwardly by the second variable mirror 116, and deflected by the third variable mirror 127 in such a way that the optical path crosses an optical path entered into the second variable mirror 116 and then goes backward.

Among the component parameters to be referred to later, the axial chief ray is defined by a light ray propagating from the center of an object through the center of the stop 124 to the center of an image plane 118 according to forward ray tracing, and the point of origin of a decentration optical surface of a decentration optical system is defined by the position of intersection of the axial chief ray with the first surface of the optical system located nearest to the object side.

The numerical data about this example will be given later. It is noted, however, that the image pickup surface size is 3.6 mm×2.7 mm, the horizontal and vertical viewing angles are 50° and 39°, respectively, at the wide-angle end, the horizontal and vertical viewing angles are 35° and 27°, respectively, at the standard setting and the horizontal and vertical viewing angles are 26° and 20°, respectively, at the telephoto end. At each setting, the entrance pupil diameter φ is 1.41 mm.

In this example, since the variable mirrors 115, 116 and 127 are fixed in the vicinity of their centers and movable at their peripheral areas, the values of the origins of the coordinates of the variable mirrors 115, 116 and 127 remain unchanged.

This example can be provide a high-performance imaging optical system which, albeit being a zoom lens system having a zoom ratio of about 2, can have an image pickup device slimmed down very largely in its vertical direction.

EXAMPLE P

This example is directed to a variable-shape mirror 115 comprising, in order from its object side, a negative, first lens group 130, a stop 124 and a positive, second lens group 131. A reflecting surface 115 is interposed between the first lens group 130 and the second lens group 131, so that the focal length of the mirror 115 is changed by changing the shape of the reflecting surface 115.

It is here noted that a plane-parallel plate group 128 between the second lens group 131 and an imaging surface 118 comprises a filter, a cover glass and so on.

This arrangement performs a focusing function by changing the focal length of the variable-shape mirror 115. For this reason, there is no need of displacing the lenses for focusing, and so any driving mechanism can be dispensed with, resulting in the achievement of size and cost reductions.

Upon focused on an object point at infinity, the variable-shape mirror 115 is transformed into a substantially planar shape, and when focused on a nearest object point, the variable-shape mirror 115 is transformed into a free-form concave surface shape.

The first lens group 130 consists of a negative and a negative lens or two lenses, and the second lens group 131 consists of a positive lens, a positive and negative doublet and a positive lens, or three subgroups or four lenses in all.

In this example, the acceptance surface of an image pickup device located on an imaging surface 118 is of rectangular shape where its short-side direction is parallel to the paper. This arrangement is favorable for correction of aberrations, because the asymmetric direction of the reflecting surface of the variable-shape mirror 115 is in coincidence with that short side.

It is here noted that the surface of the variable-shape mirror 115 may be configured in such a way as to make correction for a deterioration of its imaging capability due to fabrication errors. The surface of the variable-shape mirror 115 may also be configured in such a way as to make correction for focus displacements due to fabrication errors.

The numerical data about this example will be given later. It is noted, however, that the image height is 2.8 mm, the F-number is 2.85, the focal length is 4.90 mm, and the viewing angle is 66.3°.

EXAMPLE Q

Figure 63:
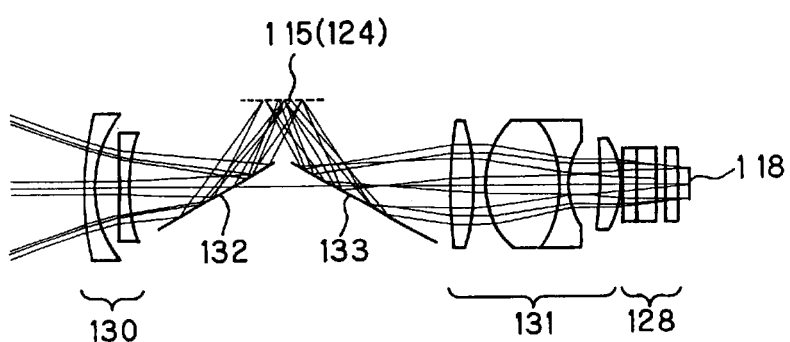
FIG. 63 is illustrative in section of the optical system according to Example Q of the present invention.
Figure 64:
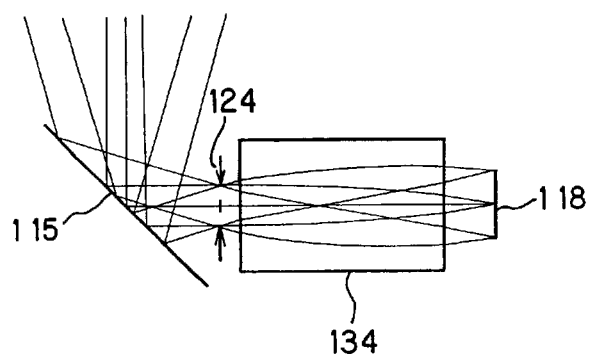
FIG. 64 is illustrative in section of the optical system according to Example R of the present invention.

This example is directed to a variable-shape mirror system comprising, in order from its object side, a negative, first lens group 130, a variable-shape mirror 115 which also serves as a stop 124 and a positive, second lens group 131, as shown in section in FIG. 63. Between the first lens group 130 and the second lens group 131, three reflecting surfaces or, in order from the object side, a fixed mirror 132, the variable-shape mirror 115 and a fixed mirror 133 are so provided that the focal length of the system is changed by changing the shape of the variable-shape mirror 115.

It is here noted that a plane-parallel plate group 128 between the second lens group 131 and an imaging surface 118 comprises a filter, a cover glass and so on.

This arrangement performs a focusing function by changing the focal length of the variable-shape mirror 115. For this reason, there is no need of displacing the lenses for focusing, and so any driving mechanism can be dispensed with, resulting in the achievement of size and cost reductions.

Upon focused on an object point at infinity, the variable-shape mirror 115 is transformed into a substantially planar shape, and when focused on a nearest object point, the variable-shape mirror 115 is transformed into a free-form concave surface shape.

The fixed mirror 132, 133 is a reflecting surface of planar shape. By using two reflecting surfaces remaining unchanged in shape, it is thus possible to keep the direction of light rays incident on the center of an image pickup surface substantially in coincidence with that of light rays on incident on the optical system. It is a matter of course that the fixed mirror 132, 133 may be formed of a variable-shape mirror.

As mentioned above, it is noted that the position of the variable-shape mirror 115 is substantially in coincidence with the position of the aperture stop 124 in the optical system.

The first lens group 130 consists of a negative lens and a negative lens or two lenses, and the second lens group 131 consists of a positive lens, a positive and negative doublet and a positive lens, or three subgroups or four lenses in all.

In this example, the acceptance surface of an image pickup device located on an imaging surface 118 is of rectangular shape where its short-side direction is parallel to the paper. This arrangement is favorable for correction of aberrations, because the asymmetric direction of the reflecting surface of the variable-shape mirror 115 is in coincidence with that short side.

It is here noted that the surface of the variable-shape mirror 115 may be configured in such a way as to make correction for a deterioration of its imaging capability due to fabrication errors. The surface of the variable-shape mirror 115 may also be configured in such a way as to make correction for focus displacements due to fabrication errors.

The variable mirror system can also perform a scaling function by moving the position of the variable-shape mirror 115. In addition, it is possible for the variable mirror system to have combined actions, i.e., a scaling action, a focusing action and a fabrication error-correcting action by moving the position, and changing the shape of the variable-shape mirror 115.

The numerical data about this example will be given later. It is noted, however, that the image height is 2.82 mm, the F-number is 2.78, the focal length is 4.49 mm, and the viewing angle is 69.7°. It is noted that the variable-shape mirror 115 is located at a position of 9.333 mm in the direction parallel with the optical axis and in the Y-direction (the direction perpendicular to the optical axis).

EXAMPLE R

This example is directed to a variable-shape mirror system comprising, in order from its object side, a variable-shape mirror 115, a stop 124 and a positive lens group, so that the focal length of the system is changed by changing the shape of the variable-shape mirror 115.

The positive lens group is composed of one gradient index lens 134 having a refractive index profile. The gradient index lens 134, because its medium has a refractive index profile from the optical axis in a radial direction and so has refracting power, has a lens action in spite of the fact that both surfaces are of planar shape.

This arrangement performs a focusing function by changing the focal length of the variable-shape mirror 115. For this reason, there is no need of displacing the lenses for focusing, and so any driving mechanism can be dispensed with, resulting in the achievement of size and cost reductions.

Upon focused on an object point at infinity, the variable-shape mirror 115 is transformed into a substantially planar shape, and when focused on a nearest object point, the variable-shape mirror 115 is transformed into a free-form concave surface shape.

In accordance with this example, an image pickup system of simplified construction is achievable with the gradient index lens 134 and variable-shape mirror 115.

The numerical data on this example will be enumerated below. It is noted, however, that the image height is 2.82 mm, the F-number is 2.82, the focal length is 6.1 mm, and the viewing angle is 52.5°.

EXAMPLE S

Figure 65A:
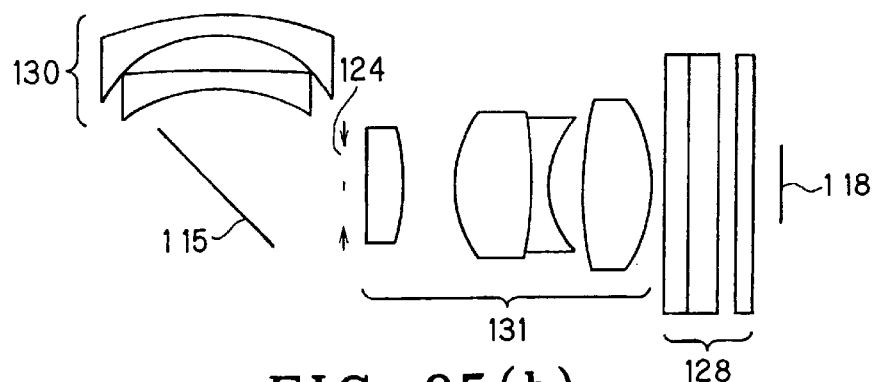
FIG. 65 is illustrative in section of the optical system according to Example S of the present invention when it is used and collapsed for storage.

This example is directed to a variable-shape mirror system comprising much the same arrangement as the optical system of Example P or comprising, in order from its object side, a negative, first lens group 130, a stop 124 and a positive, second lens group 131 with a reflecting surface 115 between the first lens group 130 and the second lens group 131, as shown in section in FIG. 65(a). By allowing the reflecting surface or variable-shape mirror 115 to transform, its focal length changes. A plane-parallel plate group 128 comprising a filter, a cover glass or the like is interposed between the second lens group 131 and an imaging surface 118.

Figure 65B:
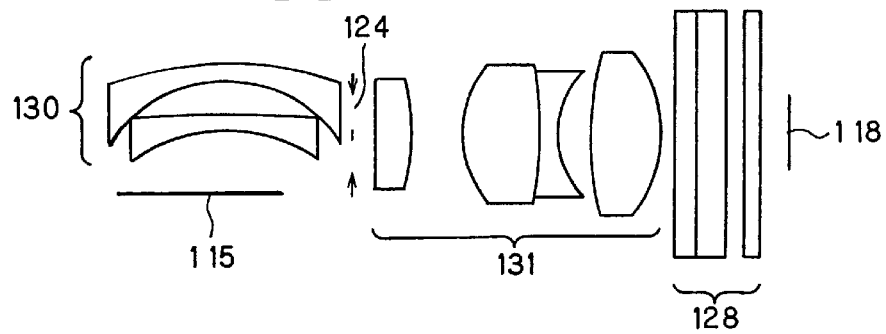

To collapse the optical system, the variable-shape mirror 115 is moved to a horizontal state, as shown in FIG. 65(*b*), thereby securing a space for collapsing the first lens group 130. In other words, after the surface of the variable-shape mirror 115 is placed in a horizontal state, the first lens group 130 collapses.

According to this example, it is thus possible to achieve a compactly collapsible optical system.

EXAMPLE T

Figure 66A:
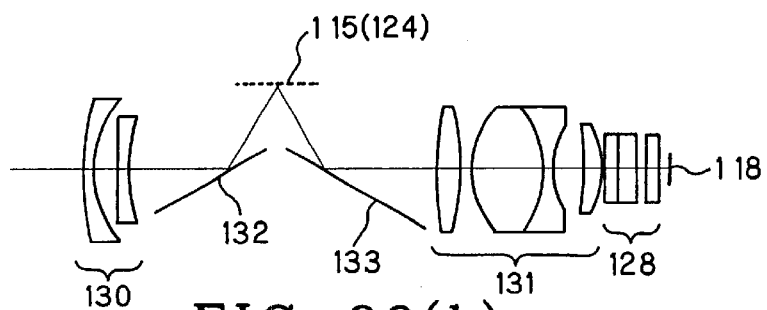
FIG. 66 is illustrative in section of the optical system according to Example T of the present invention when it is used and collapsed for storage.
Figure 66B:
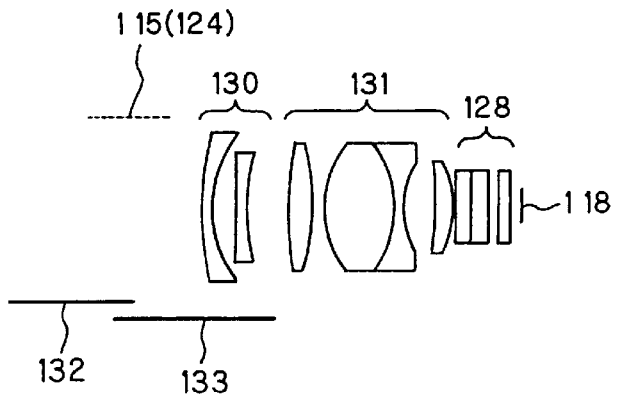

This example is directed to an optical system comprising much the same arrangement as the optical system of Example Q or comprising, in order from its object side, a negative, first lens group 130, a variable-shape mirror 115 which also serves as a stop 124 and a positive, second lens group 131, as shown in section in FIG. 66(*a*). Between the first lens group 130 and the second lens group 131, three reflecting surfaces or a fixed mirror 132, the variable-shape mirror 115 and a fixed mirror 133 are provided in order from the object side, so that the focal length of the optical system can be changed by changing the shape of the variable-shape mirror 115. A plane-parallel plate group 128 comprising a filter, a cover glass, etc. is interposed between the second lens group 131 and an imaging surface 118.

To collapse the optical system, the fixed mirror 132, variable-shape mirror 115 and fixed mirror 133 are moved to horizontal states, as shown in FIG. 66(*b*), thereby securing a space for collapsing the first lens group 130. In other words, after the surfaces of the three mirrors are placed in their horizontal states, the first lens group 130 collapses. Unlike Example S, this first lens group 130 collapses in the axial direction. It is thus possible to achieve a compactly collapsible optical system.

EXAMPLE U

Figure 67A:
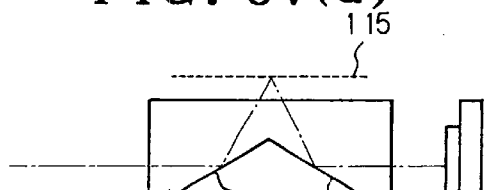
FIG. 67 is illustrative in section of the optical systems according to Examples U, V and W of the present invention.
Figure 67B:
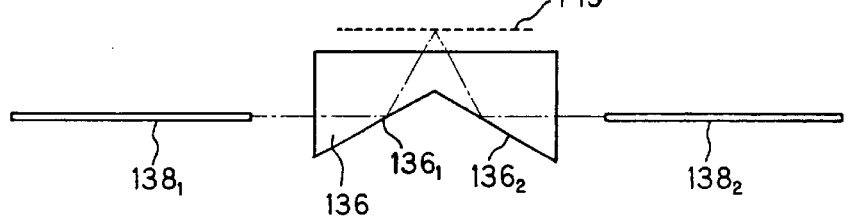
Figure 67C:
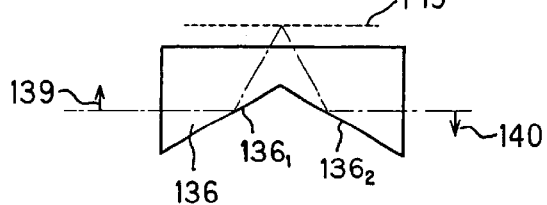

This example is directed to an optical system comprising a prism 136 having a lens action, a variable-shape mirror 115 and an image pickup device 137, as shown in section in FIG. 67(*a*). The variable-shape mirror 115 has a focal length changeable by its transformation. The prism 136 has two reflecting surfaces 136$_1$ and 136$_2$.

By using three reflecting surfaces in this optical system, it is thus possible to keep the direction of light rays incident on the center of the image pickup surface of the image pickup device 137 substantially in coincidence with the direction of light rays incident on the optical system.

Such an optical system as embodied in this example may find applications to digital cameras, endoscopes, portable telephones, personal digital assistants (PDAs), etc.

EXAMPLE V

This example is directed to an optical system comprising a prism 136 having a lens action, a variable-shape mirror 115 and optical fibers 138$_1$ and 138$_2$, as shown in section in FIG. 67(*b*). This optical system is to guide light rays entered into one optical fiber 138$_1$ to another optical fiber 138$_2$, and the variable-shape mirror 115 has a focal length changeable by its transformation. The prism 136 has two reflecting surfaces 136$_1$ and 136$_2$.

In this optical system, any displacement due to fabrication errors of the position of the optical fiber 138$_2$ on which light is condensed is corrected by changing the shape of the variable-shape mirror 115.

By using three reflecting surfaces in this optical system, it is possible to keep the direction of light rays entered into one optical fiber 138$_2$ substantially in coincidence with the direction of light rays leaving another optical fiber 138$_1$.

EXAMPLE W

This example is directed to an optical system comprising a prism 136 having a lens action and a variable-shape mirror 115, as shown in section in FIG. 67(*c*). This optical system is to form an image of an object 139 at an imaging position 140 substantially with life-size, and the variable-shape mirror 115 has a focal length changeable by its transformation. The prism 136 has two reflecting surfaces 136$_1$ and 136$_2$.

In this optical system, any displacement due to fabrication errors, etc. of an image formed at the imaging position 140 is corrected by changing the shape of the variable-shape mirror 115.

By using three reflecting surfaces in this optical system, it is possible to keep the direction of light rays incident on the imaging position 140 substantially in coincidence with the direction of light rays leaving the object 139. Switching may also be made to change the shape of the variable-shape mirror 115 in such a way that no image is formed at the imaging position 140.

EXAMPLE X

Figure 68A:
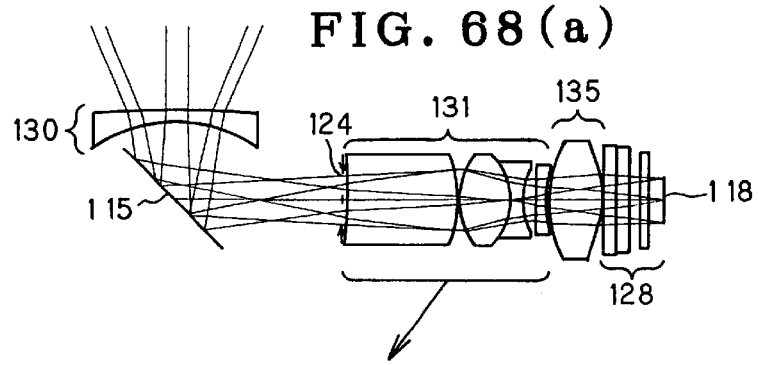
FIG. 68 is illustrative in section of the optical system according to Example X of the present invention at its wide-angle and telephoto ends.
Figure 68B:
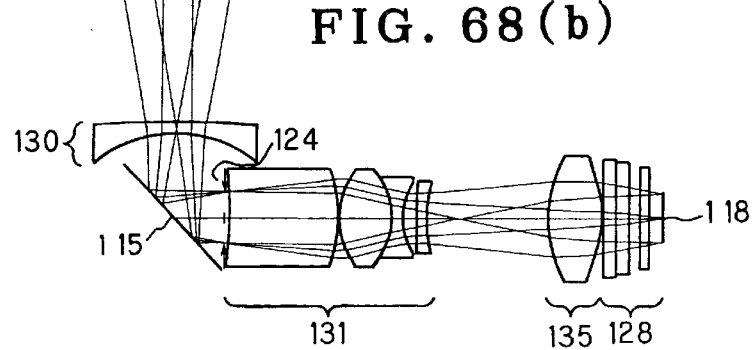

This example is directed to an optical system comprising, in order from its object side, a negative, first lens group 130, a positive, second lens group 131 and a positive, third lens group 135, as shown in FIGS. 68(*a*) and 68(*b*) that are sectional schematics of the optical system at its wide-angle (a) and telephoto end (b). A reflecting surface 115 is interposed between the first lens group 130 and the second lens group 131. The reflecting surface 115 is formed of a variable-shape mirror 115 having a focal length changeable by its transformation. This optical system performs a scaling action by moving the positive, second lens group 131 on the optical axis.

The optical system performs a focusing function by changing the focal length of the variable-shape mirror 115. For this reason, there is no need of displacing the lenses for focusing, and so any driving mechanism can be dispensed with, resulting in the achievement of size and cost reductions.

Upon focused on an object point at infinity, the variable-shape mirror 115 is transformed into a substantially planar shape, and when focused on a nearest object point, the variable-shape mirror 115 is transformed into a free-form concave surface shape.

In this zoom optical system, the first lens group 130 is made up of one negative lens, the second lens group 131 is made up of a positive lens, a positive and negative doublet and a negative lens, or three subgroups or four lenses in all, and the third lens group 135 is made up of one positive lens. A plane-parallel plate group 128 comprising a filter, a cover glass, etc. is interposed between the third lens group 135 and an imaging surface 118.

In this example, the acceptance surface of an image pickup device located on the imaging surface 118 is of rectangular shape where its short-side direction is parallel to the paper. This arrangement is favorable for correction of aberrations, because the asymmetric direction of the reflecting surface of the variable-shape mirror 115 is in coincidence with that short side.

It is here noted that the surface of the variable-shape mirror 115 may be configured in such a way as to make correction for a deterioration of its imaging capability due to fabrication errors. The surface of the variable-shape mirror 115 may also be configured in such a way as to make correction for focus displacements due to fabrication errors.

In addition, the surface shape of the variable-shape mirror 115 may be configured in such a way as to make correction for focus displacements in association with the movement of the second lens group 131.

As mentioned above, the action of the variable mirror on the reflection of light rays changes in such a way as to make correction for focus position or aberration fluctuations. For instance, the variable-shape mirror transforms in such a way as to make correction for focus position or aberration fluctuations upon a change of object distance.

It is also acceptable to perform scaling by insertion or removal or decentration of a part of the lens system, and correct focus displacements or aberration fluctuations with scaling using the variable mirror.

The numerical data about this example will be given later. It is noted, however, that the image height is 2.82 mm, the F-number is 2.77 to 4.05, the focal length is 4.58 to 8.94 mm, and the viewing angle is 72.8° to 34.6°.

FIGS. 47 to 64 and FIG. 68 illustrative of the aforesaid Examples A to R and X are all Y-Z sectional schematics. In these examples, if the overall lens group is considered as being one single moving unit, scaling may then be performed by changing the shape of the variable mirror 115 while moving the unit upwardly (in the direction spaced away from the imaging surface 118).

Commonly throughout the present invention, the term "zoom optical system" includes a scaling optical system. In some cases, however, the term "zoom optical system" is used as an equivalent to the term "scaling optical system".

Throughout the present disclosure, all the units in the examples are given in mm.

Throughout Examples A to X, the variable mirror or mirrors transform continuously upon zooming or focusing. However, it is acceptable to perform zooming or focusing discontinuously at some places.

For instance, Example A, C, E, and F is designed in such a way that the peripheral area of the variable mirror is fixed with respect to other optical elements, and the center area thereof is transformed. Accordingly, the apex area of the variable mirror changes with the transformation thereof.

For instance, Example B, D, N, and O is designed in such a way that the variable mirror is fixed in the vicinity of its center and movable at its peripheral area. In this case, the value of the origin of the coordinates for the variable mirror remains unchanged inasmuch as the lens data are concerned.

In Example G, H, I, J, and K, for instance, it is acceptable to arrange the variable mirrors and other optical elements in such a way that the normals to at least two variable mirrors have a twisted relation to each other. This is because aberrations remain unchanged.

Outside of the foregoing, it is acceptable to fix the intermediate or other area of the variable mirror or allow the variable mirror to remain unfixed. This is because if the mirror is transformed, focusing, scaling, etc. may then be achieved in much the same manner as in these examples. The reason is that the influence of errors in the position of the variable mirror on the imaging capability is not as large as that of errors in the surface shape thereof.

For the optical systems using variable mirrors, it is preferable to satisfy either one of the following expressions (16-3) and (17-3) in a certain operating state:

$$0 \leq |P_I| \leq 0.01 \ (mm^{-1}) \quad (16\text{-}3)$$

$$0 \leq |P_V| \leq 0.01 \ (mm^{-1}) \quad (17\text{-}3)$$

These two expressions indicate that, in that operating state, the curvature of one variable mirror is close to a planar surface. The advantages of the planar surface are easy shape control, less power consumption, etc. The aforesaid two expressions hold true for Examples A to M.

The component parameters in the aforesaid Examples A–R and X will be given later. It is noted, however, that the term "free-form surface" used herein is defined by the following expression. In this defining expression, the axis of the free-form surface is given by this defining expression.

$$Z = cr^2 / [1 + \sqrt{\{1 - (1+k)c^2 r^2\}}] + \sum_{j=2}^{66} C_j X^m Y^n \quad (a)$$

In expression (a), the first term is a spherical surface term and the second term is a free-form surface term.

In the spherical term, c: the curvature of an apex, k: the conic constant, and $r = \sqrt{(X^2 + Y^2)}$.

The free-form surface term is:

$$\sum_{j=2}^{66} C_j X^m Y^n = C_2 X + C_3 Y + C_4 X^2 + C_5 XY + C_6 Y^2 + C_7 X^3 +$$

$$C_8 X^2 Y + C_9 XY^2 + C_{10} Y^3 + C_{11} X^4 + C_{12} X^3 Y +$$

$$C_{13} X^2 Y^2 + C_{14} XY^3 + C_{15} Y^4 + C_{16} X^5 +$$

$$C_{17} X^4 Y + C_{18} X^3 Y^2 + C_{19} X^2 Y^3 + C_{20} XY^4 +$$

$$C_{21} Y^5 + C_{22} X^6 + C_{23} X^5 Y + C_{24} X^4 Y^2 + C_{25} X^3 Y^3 +$$

$$C_{26} X^2 Y^4 + C_{27} XY^5 + C_{28} Y^6 + C_{29} X^7 +$$

$$C_{30} X^6 Y + C_{31} X^5 Y^2 + C_{32} X^4 Y^3 + C_{33} X^3 Y^4 +$$

$$C_{34} X^2 Y^5 + C_{35} XY^6 + C_{36} Y^7 \ldots$$

Here $C_j$ is a coefficient, where j is an integer of 2 or more.

In the aforesaid free-form surface, both the X-Z plane and the Y-Z plane have generally no symmetric surface. However, by reducing all odd-numbered terms with respect to X to zero, the free-form surface can be transformed into one having only one symmetric plane parallel with the Y-Z plane. Similarly, by reducing all odd-numbered terms with respect to Y, the free-form surface can be transformed into one having only one symmetric plane parallel with the X-Z plane.

The free-form surface that is a surface having such a rotationally asymmetric surface shape as mentioned above may also be defined by Zernike polynomial. The shape of this surface is defined by the following expression (b). In this defining expression (b), the axis of Zernike polynomial is given by the Z axis. The rationally asymmetric surface is defined by the polar coordinates for the height of the Z axis with respect to the X-Y plane. Here A is a distance from the Z-axis within the X-Y plane, and R is an azimuth around the Z-axis, as expressed by the angle of rotation measured from the Z-axis.

$$x = R \times \cos(A)$$
$$y = R \times \sin(A)$$
$$Z = D_2 + D_3 R \cos(A) + D_4 R \sin(A) + D_5 R^2 \cos(2A) + D_6 (R^2 - 1) + D_7 R^2 \sin(2A)$$
$$+ D_8 R^3 \cos(3A) + D_9 (3R^3 - 2R)\cos(A) + D_{10} (3R^3 - 2R)\sin(A) + D_{11} R^3 \sin(3A) + D_{12} R^4 \cos(4A) + D_{13} (4R^4 - 3R^2)\cos(2A) + D_{14} (6R^4 - 6R^2 + 1) + D_{15} (4R^4 - 3R^2)\sin(2A)$$
$$+ D_{16} R^4 \sin(4A) + D_{17} R^5 \cos(5A) + D_{18} (5R^5 - 4R^3)\cos(3A) + D_{19} (10R^5 - 12R^3 + 3R)\cos(A)$$
$$+ D_{20}(10R^5 - 12R^3 + 3R)\sin(A)$$
$$+ D_{21}(5R^5 - 4R^3)\sin(3A)$$
$$+ D_{22} R^5 \sin(5A) + D_{23} R^6 \cos(6A) + D_{24}(6R^6 - 5R^4)\cos(4A) + D_{25}(15R^6 - 20R^4 + 6R^2)\cos(2A) + D_{26}(20R^6 - 30R^4 + 12R^2 - 1) + D_{27}(15R^6 - 20R^4 + 6R^2)\sin(2A)$$
$$+ D_{28}(6R^6 - 5R^4)\sin(4A)$$
$$+ D_{29} R^6 \sin(6A) \quad \text{(b)}$$

Here Dm is a coefficient, wherein m is an integer of 2 or more. It is noted that in order to design the free-form surface for an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$, ... are used.

The aforesaid defining expression is illustrative of the rotationally asymmetric free-form surface. It is as a matter of course that the same effects are obtainable even when any other defining expressions are used. The free-form surface may be expressed by mathematically equivalent definitions other than the foregoing.

For instance, the free-form surface may be defined by the following expression (c):

$$Z = \Sigma\Sigma C_{nm} XY$$

Given k=7 (the seventh-order term) as an example, this expression may be expanded as follows:

$$Z = C_2 + C_3 Y + C_4 |X|$$
$$+ C_5 Y^2 + C_6 Y|X| + C_7 X^2$$
$$+ C_8 Y^3 + C_9 Y^2 |X|$$
$$+ C_{10} YX^2 + C_{11}|X^3|$$
$$+ C_{12} Y^4 + C_{13} Y^3 |X|$$
$$+ C_{14} Y^2 X^2 + C_{15} Y|X^3|$$
$$+ C_{16} X^4 + C_{17} Y^5 + C_{18} Y^4 |X| + C_{19} Y^3 X^2 + C_{20} Y^2 |X^3| + C_{21} YX^4 + C_{22} X^5$$
$$+ C_{23} Y^6 + C_{24} Y^5 |X|$$
$$+ C_{25} Y^4 X^2 + C_{26} Y^3 |X^3|$$
$$+ C_{27} Y^2 X^4 + C_{28} Y|X^5|$$
$$+ C_{29} X^6 + C_{30} Y^7$$
$$+ C_{31} Y^6 |X| + C_{32} Y^5 X^2$$
$$+ C_{33} Y^4 |X^3| + C_{34} Y^3 X^4 + C_{35} Y^2 |X^5|$$
$$+ C_{36} YX^6 + C_{37}|X^7| \quad \text{(c)}$$

The aspheric surface is a rotationally symmetric aspheric surface given by the following defining expression:

$$Z = (Y^2/R)/[1 + \{1 - (1+K)Y^2/R^2\}^{1/2}] + AY^4 + BY^6 + CY^8 + DY^{10} + \quad \text{(d)}$$

where Z is an optical axis provided that the direction of propagation of light is positive (axial chief ray), and Y is a direction perpendicular to the optical axis. It is here noted that R is a paraxial radius of curvature, K is a conical constant, and A, B, C, D, . . . are the fourth-, sixth-, eighth-, tenth-order aspheric coefficients. The axis of the rotationally symmetric aspheric surface is given by the Z-axis in this defining expression.

The shape of an anamorphic surface is defined by the following expression. The axis of the anamorphic surface is given by a straight line passing through the origin of the surface shape and vertical with respect to an optical surface.

$$Z = (Cx \cdot X^2 + Cy \cdot Y^2)/[1 + \{1 - (1+Kx)Cx^2 \cdot X^2 - (1+Ky)Cy^2 \cdot Y^2\}^{1/2}] + \Sigma Rn\{(1-Pn)X^2 + (1+Pn)Y^2\}^{(n+1)}$$

Given n=4 (the fourth-order term) as an example, this expression may be expanded as follows:

$$Z = (Cx \cdot X^2 + Cy \cdot Y^2)/[1 + \{1 - (1+Kx)Cx^2 \cdot X^2 - (1+Ky)Cy^2 \cdot Y^2\}^{1/2}] + R1$$
$$(1-P1)X^2 + (1+P1)Y^2$$
$$\}^2 + R2(1-P2)X^2 + (1+P2)Y^2\}^3 + R3$$
$$(1-P3)X^2 + (1+P3)Y^2$$
$$\}^4 + R4(1-P4)X^2 + (1+P4)Y^2\}^5 \quad \text{(e)}$$

Here, Z is the quantity of a displacement of the anamorphic surface from a tangent plane with respect to the origin of the surface shape, Cx is the curvature of the anamorphic surface in the X-axis direction, Cy is the curvature of the anamorphic surface in the Y-axis direction, Kx is the conical coefficient of the anamorphic surface in the X-axis direction, Ky is the conical coefficient of the anamorphic surface in the Y-axis direction, Rn is the rotationally symmetric component of the aspheric term, and Pn is the rotationally asymmetric component of the aspheric term. It is then noted that the radii of curvature, Rx and Ry, of the anamorphic surface in the X- and Y-axis directions and the curvatures Cx and Cy have relations given by Rx=1/Cx and Ry=1/Cy.

The toric surface includes an X-toric surface and a Y-toric surface defined by the following expressions. The axis of the toric surface is given by a straight line passing through the origin of the surface shape and perpendicular with respect to an optical surface. The X-toric surface is given by $$F(X) = (Cx \cdot X^2/[1+\{1-(1+Kx)Cx^2 \cdot X^2\}^{1/2}] + AX^4 + BX^6 + CX^8 + DX^{10} \ldots$$
$$Z = F(X) + (1/2)Cy\{Y^2 + Z^2 - F(X)^2\} \quad (f)$$

Then, the X-toric surface passes through the center of curvature in the Y-direction and rotates around the X-axis. As a result, that surface becomes an aspheric surface in the X-Z plane and a circle in the Y-Z plane.

The Y-toric surface is given by $$F(Y) = (Cy \cdot Y^2/[1+\{1-(1+K)Cy^2 \cdot Y^2\}^{1/2}] + AY^4 + BY^6 + CY^8 + DY^{10} \ldots$$
$$Z = F(Y) + (1/2)Cx\{X^2 + Z^2 - F(Y)^2\} \quad (g)$$

Then, the Y-toric surface passes through the center of curvature in the X-direction and rotates around the Y-axis. As a result, that surface becomes an aspheric surface in the Y-Z plane and a circle in the X-Z plane.

However, it is noted that Z is the quantity of a displacement of the toric surface from a tangent plane with respect to the origin of the surface shape, Cx is the curvature of the toric surface in the X-axis direction, Cy is the curvature of the toric surface in the Y-axis direction, K is the conical coefficient of the toric surface, and A, B, C and D are aspheric coefficients of the toric surface. It is then noted that the radii of curvature, Rx and Ry, of the toric surface in the X- and Y-axis directions and the curvatures Cx and Cy have relations given by Rx=1/Cx and Ry=1/Cy.

It is noted that given to a decentration surface are the quantity of decentration of the apex position of the surface from the center of a reference surface for an optical surface (X, Y and Z represents the X-, Y- and Z-axis directions) and the angles of inclination ($\alpha$, $\beta$, $\gamma$ (°)) of the center axis of the surface (that is the Z-axis of the aforesaid expression (a) for the free-form surface, the Z-axis of the aforesaid expression (d) for the aspheric surface, the Z-axis of the aforesaid expression (e) for the anamorphic surface, and the Z-axis of the aforesaid expression (f) or (g) for the toric surface) with respect to the respective X-, Y- and Z-axes. In this case, the positive sign for $\alpha$ and $\beta$ means a counterclockwise roration with respect to the positive direction of the respective axes, and the positive sign for g means a clockwise rotation with respect to the positive direction of the Z-axis. Referring to the rotation by $\alpha$, $\beta$, $\gamma$ of the surface around the center axis, the center axis of the surface and an XYZ orthogonal coordinate system thereof are first rotated counterclockwise by $\alpha$ around the X-axis. Then, the center axis of the rotated surface is rotated counterclockwise by $\beta$ around the Y-axis of a new coordinate system and the once rotated coordinate system is rotated counterclockwise by $\beta$ around the Y-axis as well. Finally, the center axis of the twice rotated surface is rotated clockwise by $\gamma$ around the Z-axis of a new coordinate system.

When only the inclination of a reflecting surface is shown, too, the angle of inclination of the center axis of that surface is given in the form of the quantity of decentration.

The refractive index profile n(r) of a radial gradient index lens is given by the following expression:

$$n(r) = N_0 + N_1 r^2 + N_2 r^4 + N_3 r^6 + \ldots \quad (A)$$

Here $N_0$ is the axial refractive index of the lens at a reference wavelength, Ni (i=1, 2, 3, ...) is a coefficient indicative of the refractive index profile of the lens at the reference wavelength, and r is the distance of the lens from the optical axis in the vertical direction. Here the reference wavelength is a d-line on condition that $N_0$, $N_1$, $N_2$ and $N_3$ are given by $N_{0d}$, $N_{1d}$, $N_{2d}$ and $N_{3d}$.

The Abbe constant of the radial gradient index lens is given by the following expression:

$$V_0 = (N_{0d}-1)/(N_{0F}-N_{0C}) \quad (B)$$

$$V_i = (N_{id}-1)/(N_{iF}-N_{iC})(i=1, 2, 3, \ldots) \quad (C)$$

Here $N_{0d}$, $N_{0F}$, $N_{0C}$, $N_{id}$, $N_{iF}$ and $N_{iC}$ (i=1, 2, 3, ...) are coefficients indicative of the refractive index profiles of the lens at a wavelength $\lambda$, and subscripts d, C and F are indicative of d-line, C-line and F-line, respectively.

It is noted that the terms with respect to the free-form surfaces, aspheric surfaces, etc. on which no data are given, are zero. The refractive index is given with respect to d-line (587.56 nm wavelength). The unit of length is mm.

Enumerated below are the component parameters in the foregoing examples A–R and X. In the following tables, "FFS" is an abbreviation of free-form surface, "ASS" is an abbreviation of aspheric surface, "RP" is an abbreviation of reference plane, "HRP" indicates a virtual plane, "DM" indicates a variable mirror, "XTR" is indicative of an abbreviation of X-toric surface, "ANM" stands for an anamorphic surface, and "GRIN" represents a gradient index lens. Referring to the surface shape and decentration, "WE", "ST" and "TE" are indicative of wide-angle end, standard setting and telephoto end, respectively. "OD" is an abbreviation of object distance and "f" is indicative of focal length.

EXAMPLE A

| Surface No. | Radius of curvature | Surface separation | Displacement and tilt | Refractive index | Abbe's No. |
|---|---|---|---|---|---|
| Object plane | ∞ | 1000.00 | | | |
| 1 | ∞ (HRP, RP) | | (1) | | |
| 2 | FFS ① | | (2) | 1.5254 | 56.2 |
| 3 | FFS ② | | (3) | | |
| 4 | FFS ③ (Stop) (DM 1) | | (4) | | |
| 5 | FFS ② | | (3) | 1.5254 | 56.2 |
| 6 | FFS ④ | | (5) | | |
| 7 | FFS ⑤ (DM 2) | | (6) | | |
| 8 | FFS ④ | | (5) | 1.5254 | 56.2 |
| 9 | FFS ⑥ | | (7) | | |
| 10 | ∞ | | (8) | 1.5163 | 64.1 |
| 11 | ∞ | | (9) | | |
| Image plane | ∞ | | (10) | | |

FFS ①

| $C_4$ | $-6.7765 \times 10^{-2}$ | $C_6$ | $-6.2321 \times 10^{-2}$ | $C_8$ | $-2.2954 \times 10^{-2}$ |
| $C_{10}$ | $-1.9491 \times 10^{-2}$ | $C_{11}$ | $-3.1101 \times 10^{-3}$ | $C_{13}$ | $-6.5957 \times 10^{-3}$ |
| $C_{15}$ | $-2.9764 \times 10^{-3}$ | | | | |

-continued

| Surface No. | Radius of curvature | Surface separation | Displacement and tilt | Refractive index | Abbe's No. |
|---|---|---|---|---|---|
| FFS ② | | | | | |

$C_4$ $-7.7519 \times 10^{-2}$  $C_6$ $-6.0590 \times 10^{-2}$  $C_8$ $-5.9666 \times 10^{-3}$
$C_{10}$ $-2.6208 \times 10^{-3}$  $C_{11}$ $-7.4511 \times 10^{-4}$  $C_{13}$ $-4.5909 \times 10^{-4}$
$C_{15}$ $-4.2617 \times 10^{-5}$

FFS ③

WE: ∞ (Plane)
TE:
$C_4$ $-1.7971 \times 10^{-2}$  $C_6$ $-1.8050 \times 10^{-2}$  $C_8$ $3.0008 \times 10^{-5}$
$C_{10}$ $-1.3132 \times 10^{-3}$  $C_{11}$ $-3.4160 \times 10^{-4}$  $C_{13}$ $-7.3683 \times 10^{-4}$
$C_{15}$ $-3.1388 \times 10^{-4}$

FFS ④

$C_4$ $-6.8810 \times 10^{-2}$  $C_6$ $-5.6218 \times 10^{-2}$  $C_8$ $1.0316 \times 10^{-3}$
$C_{10}$ $-4.5924 \times 10^{-4}$  $C_{11}$ $-3.0583 \times 10^{-3}$  $C_{13}$ $-5.7663 \times 10^{-4}$
$C_{15}$ $8.8386 \times 10^{-4}$

FFS ⑤

WE:
$C_4$ $5.1461 \times 10^{-2}$  $C_6$ $3.7863 \times 10^{-2}$  $C_8$ $-3.0012 \times 10^{-3}$
$C_{10}$ $-6.4390 \times 10^{-4}$  $C_{11}$ $1.8790 \times 10^{-3}$  $C_{13}$ $2.5101 \times 10^{-3}$
$C_{15}$ $6.3665 \times 10^{-4}$
TE: ∞ (Plane)

FFS ⑥

$C_4$ $-4.1970 \times 10^{-2}$  $C_6$ $-7.0058 \times 10^{-2}$  $C_8$ $-1.5784 \times 10^{-2}$
$C_{10}$ $-1.6308 \times 10^{-2}$  $C_{11}$ $-2.8968 \times 10^{-3}$  $C_{13}$ $4.4919 \times 10^{-3}$
$C_{15}$ $-1.1667 \times 10^{-3}$ Displacement and tilt(1)

| X | 0.00 | Y | 0.00 | Z | 0.00 |
| α | 0.00 | β | 0.00 | γ | 0.00 |

Displacement and tilt(2)

| X | 0.00 | Y | −0.03 | Z | 0.33 |
| α | 1.73 | β | 0.00 | γ | 0.00 |

Displacement and tilt(3)

| X | 0.00 | Y | −0.10 | Z | 2.94 |
| α | 19.43 | β | 0.00 | γ | 0.00 |

Displacement and tilt(4)

WE:
| X | 0.00 | Y | −0.26 | Z | 4.08 |
| α | 16.93 | β | 0.00 | γ | 0.00 |
TE:
| X | 0.00 | Y | −0.26 | Z | 4.12 |
| α | 16.93 | β | 0.00 | γ | 0.00 |

Displacement and tilt(5)

| X | 0.00 | Y | −3.83 | Z | 1.02 |
| α | 8.48 | β | 0.00 | γ | 0.00 |

Displacement and tilt(6)

WE:
| X | 0.00 | Y | −4.80 | Z | −0.22 |
| α | 8.00 | β | 0.00 | γ | 0.00 |
TE:
| X | 0.00 | Y | −4.80 | Z | 0.20 |
| α | 8.00 | β | 0.00 | γ | 0.00 |

Displacement and tilt(7)

| X | 0.00 | Y | −4.33 | Z | 2.61 |
| α | −34.51 | β | 0.00 | γ | 0.00 |

Displacement and tilt(8)

| X | 0.00 | Y | −6.16 | Z | 3.17 |
| α | −13.93 | β | 0.00 | γ | 0.00 |

Displacement and tilt(9)

| X | 0.00 | Y | −6.40 | Z | 4.14 |
| α | −13.93 | β | 0.00 | γ | 0.00 |

-continued

| Surface No. | Radius of curvature | Surface separation | Displacement and tilt | Refractive index | Abbe's No. |
|---|---|---|---|---|---|

Displacement and tilt(10)

| X | 0.00 | Y | −6.46 | Z | 4.39 |
| α | −13.93 | β | 0.00 | γ | 0.00 |

EXAMPLE B

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (RP) | | (1) | 1.5168 | 64.1 |
| 2 | | 10.00 | (2) | | |
| 3 | FFS ① | | (3) | 1.5254 | 56.2 |
| 4 | FFS ② (Stop) (RE) | | (4) | 1.5254 | 56.2 |
| 5 | FFS ① (RE) | | (3) | 1.5254 | 56.2 |
| 6 | FFS ③ | | (5) | | |
| 7 | FFS ④ (DM) | | (6) | | |
| 8 | FFS ③ | | (5) | 1.5254 | 56.2 |
| 9 | FFS ① | | (3) | | |
| 10 | −17.00 | | (7) | 1.8080 | 40.6 |
| 11 | ∞ | | (8) | | |
| Image plane | ∞ | | (9) | | |

FFS ①

$C_4$ $-4.7020 \times 10^{-2}$  $C_6$ $-1.8559 \times 10^{-2}$  $C_8$ $-2.1989 \times 10^{-2}$
$C_{10}$ $-1.3752 \times 10^{-3}$  $C_{11}$ $-6.3011 \times 10^{-4}$  $C_{13}$ $-2.3538 \times 10^{-4}$
$C_{15}$ $-1.2872 \times 10^{-4}$

FFS ②

$C_4$ $-3.5411 \times 10^{-2}$  $C_6$ $-2.2443 \times 10^{-2}$  $C_8$ $-4.5396 \times 10^{-4}$
$C_{10}$ $-6.6517 \times 10^{-4}$  $C_{11}$ $4.4891 \times 10^{-4}$  $C_{13}$ $2.2297 \times 10^{-4}$
$C_{15}$ $-9.9027 \times 10^{-5}$

FFS ③

$C_4$ $-6.3691 \times 10^{-2}$  $C_6$ $-5.2302 \times 10^{-2}$  $C_8$ $2.0046 \times 10^{-3}$
$C_{10}$ $-1.4613 \times 10^{-3}$  $C_{11}$ $-5.9788 \times 10^{-4}$  $C_{13}$ $-2.5449 \times 10^{-4}$
$C_{15}$ $1.5212 \times 10^{-4}$

FFS ④

OD: ∞
$C_4$ $-3.2044 \times 10^{-2}$  $C_6$ $-3.4056 \times 10^{-2}$  $C_8$ $-1.1269 \times 10^{-3}$
$C_{10}$ $9.3234 \times 10^{-4}$  $C_{11}$ $-8.2793 \times 10^{-5}$  $C_{13}$ $-9.5598 \times 10^{-4}$
$C_{15}$ $-4.0391 \times 10^{-4}$
OD: 100
$C_4$ $-3.9028 \times 10^{-2}$  $C_6$ $-3.7848 \times 10^{-2}$  $C_8$ $-1.0212 \times 10^{-3}$
$C_{10}$ $1.0709 \times 10^{-3}$  $C_{11}$ $2.4511 \times 10^{-4}$  $C_{13}$ $-5.0708 \times 10^{-4}$
$C_{15}$ $-3.2267 \times 10^{-4}$ Displacement and tilt(1)

| X | 0.00 | Y | 0.00 | Z | 0.00 |
| α | 0.00 | β | 0.00 | γ | 0.00 |

Displacement and tilt(2)

| X | 0.00 | Y | 0.00 | Z | 0.50 |
| α | 0.00 | β | 0.00 | γ | 0.00 |

Displacement and tilt(3)

| X | 0.00 | Y | −3.37 | Z | 3.23 |
| α | 12.78 | β | 0.00 | γ | 0.00 |

Displacement and tilt(4)

| X | 0.00 | Y | 0.37 | Z | 4.59 |
| α | 39.33 | β | 0.00 | γ | 0.00 |

-continued

| Surface No. | Radius of curvature | Surface separation | Displacement and tilt | Refractive index | Abbe's No. |
|---|---|---|---|---|---|
| | | Displacement and tilt(5) | | | |
| X | 0.00 | Y | −5.99 | Z | 5.91 |
| α | −13.67 | β | 0.00 | γ | 0.00 |
| | | Displacement and tilt(6) | | | |
| OD: ∞ | | | | | |
| X | 0.00 | Y | −6.78 | Z | 6.28 |
| α | −24.23 | β | 0.00 | γ | 0.00 |
| OD: 100 | | | | | |
| X | 0.00 | Y | −6.82 | Z | 6.28 |
| α | −24.23 | β | 0.00 | γ | 0.00 |
| | | Displacement and tilt(7) | | | |
| X | 0.00 | Y | −7.10 | Z | 3.60 |
| α | 1.02 | β | 0.00 | γ | 0.00 |
| | | Displacement and tilt(8) | | | |
| X | 0.00 | Y | −7.11 | Z | 2.80 |
| α | 1.02 | β | 0.00 | γ | 0.00 |
| | | Displacement and tilt(9) | | | |
| X | 0.00 | Y | −7.15 | Z | 0.80 |
| α | 1.02 | β | 0.00 | γ | 0.00 |

EXAMPLE C

| Surface No. | Radius of curvature | Surface separation | Displacement and tilt | Refractive index | Abbe's No. |
|---|---|---|---|---|---|
| Object plane | ∞ | ∞ | | | |
| 1 | 100.00 (RP) | | (1) | 1.5168 | 64.1 |
| 2 | 7.00 | | (2) | | |
| 3 | FFS ① | | (3) | 1.5254 | 56.2 |
| 4 | FFS ② | | (4) | | |
| 5 | FFS ③ (Stop) (DM) | | (5) | | |
| 6 | FFS ② | | (4) | 1.5254 | 56.2 |
| 7 | FFS ① (RE) | | (3) | 1.5254 | 56.2 |
| 8 | FFS ④ (RE) | | (6) | 1.5254 | 56.2 |
| 9 | FFS ⑤ (RE) | | (7) | 1.5254 | 56.2 |
| 10 | FFS ④ | | (6) | | |
| 11 | 10.00 | | (8) | 1.5163 | 64.1 |
| 12 | ∞ | | (9) | | |
| Image plane | ∞ | | (10) | | |

FFS ①

| $C_4$ | $1.8163 \times 10^{-2}$ | $C_6$ | $1.1651 \times 10^{-2}$ | $C_8$ | $3.0002 \times 10^{-3}$ |
| $C_{10}$ | $-3.5383 \times 10^{-4}$ | $C_{11}$ | $-3.3122 \times 10^{-4}$ | $C_{13}$ | $1.2716 \times 10^{-4}$ |
| $C_{15}$ | $9.7268 \times 10^{-6}$ | | | | |

FFS ②

| $C_4$ | $-4.5005 \times 10^{-3}$ | $C_6$ | $9.0138 \times 10^{-4}$ | $C_8$ | $4.5271 \times 10^{-3}$ |
| $C_{10}$ | $-1.5303 \times 10^{-3}$ | $C_{11}$ | $3.3446 \times 10^{-4}$ | $C_{13}$ | $5.9680 \times 10^{-4}$ |
| $C_{15}$ | $2.3049 \times 10^{-4}$ | | | | |

FFS ③

OD: ∞
| $C_4$ | $5.0000 \times 10^{-3}$ | $C_6$ | 0 | $C_8$ | $2.1463 \times 10^{-3}$ |
| $C_{10}$ | $1.5585 \times 10^{-3}$ | $C_{11}$ | $-4.7817 \times 10^{-4}$ | $C_{13}$ | $1.3106 \times 10^{-4}$ |
| $C_{15}$ | $-1.0174 \times 10^{-4}$ | | | | |

OD: 200
| $C_4$ | $3.9636 \times 10^{-3}$ | $C_6$ | $-2.1776 \times 10^{-3}$ | $C_8$ | $2.1463 \times 10^{-3}$ |
| $C_{10}$ | $1.5585 \times 10^{-3}$ | $C_{11}$ | $-4.7817 \times 10^{-4}$ | $C_{13}$ | $1.3106 \times 10^{-4}$ |
| $C_{15}$ | $-1.0174 \times 10^{-4}$ | | | | |

-continued

| Surface No. | Radius of curvature | Surface separation | Displacement and tilt | Refractive index | Abbe's No. |
|---|---|---|---|---|---|
| | | FFS ④ | | | |
| $C_4$ | $4.3696 \times 10^{-2}$ | $C_6$ | $1.0430 \times 10^{-2}$ | $C_8$ | $7.1557 \times 10^{-3}$ |
| $C_{10}$ | $-1.2829 \times 10^{-3}$ | $C_{11}$ | $-9.5494 \times 10^{-5}$ | $C_{13}$ | $4.0730 \times 10^{-5}$ |
| $C_{15}$ | $6.5262 \times 10^{-5}$ | | | | |
| | | FFS ⑤ | | | |
| $C_4$ | $4.4714 \times 10^{-2}$ | $C_6$ | $2.5659 \times 10^{-2}$ | $C_8$ | $1.9530 \times 10^{-3}$ |
| $C_{10}$ | $-2.1893 \times 10^{-3}$ | $C_{11}$ | $1.9650 \times 10^{-4}$ | $C_{13}$ | $-9.0025 \times 10^{-5}$ |
| $C_{15}$ | $2.2762 \times 10^{-4}$ | | | | |
| | | Displacement and tilt(1) | | | |
| X | 0.00 | Y | 0.00 | Z | 0.00 |
| α | 0.00 | β | 0.00 | γ | 0.00 |
| | | Displacement and tilt(2) | | | |
| X | 0.00 | Y | 0.00 | Z | 1.00 |
| α | 0.00 | β | 0.00 | γ | 0.00 |
| | | Displacement and tilt(3) | | | |
| X | 0.00 | Y | −3.33 | Z | 3.14 |
| α | −9.55 | β | 0.00 | γ | 0.00 |
| | | Displacement and tilt(4) | | | |
| X | 0.00 | Y | −0.13 | Z | 5.47 |
| α | 15.33 | β | 0.00 | γ | 0.00 |
| | | Displacement and tilt(5) | | | |
| OD: ∞ | | | | | |
| X | 0.00 | Y | −0.35 | Z | 6.415 |
| α | 20.19 | β | 0.00 | γ | 0.00 |
| OD: 200 | | | | | |
| X | 0.00 | Y | −0.35 | Z | 6.42 |
| α | 20.19 | β | 0.00 | γ | 0.00 |
| | | Displacement and tilt(6) | | | |
| X | 0.00 | Y | −8.71 | Z | 6.22 |
| α | −3.45 | β | 0.00 | γ | 0.00 |
| | | Displacement and tilt(7) | | | |
| X | 0.00 | Y | −11.69 | Z | 4.00 |
| α | 30.06 | β | 0.00 | γ | 0.00 |
| | | Displacement and tilt(8) | | | |
| X | 0.00 | Y | −11.39 | Z | 6.60 |
| α | 9.61 | β | 0.00 | γ | 0.00 |
| | | Displacement and tilt(9) | | | |
| X | 0.00 | Y | −11.22 | Z | 7.59 |
| α | 9.61 | β | 0.00 | γ | 0.00 |
| | | Displacement and tilt(10) | | | |
| X | 0.00 | Y | −10.77 | Z | 10.25 |
| α | 9.61 | β | 0.00 | γ | 0.00 |

EXAMPLE D

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (RP) | | (1) | 1.5168 | 64.1 |
| 2 | 10.00 | | (2) | | |
| 3 | ∞ | | (3) | | |
| 4 | FFS ① | | (4) | 1.5254 | 56.2 |
| 5 | FFS ② (Stop) (RE) | | (5) | 1.5254 | 56.2 |
| 6 | FFS ① (RE) | | (4) | 1.5254 | 56.2 |
| 7 | FFS ③ | | (6) | | |

-continued

| Surface No. | Radius of curvature | Surface separation | Displacement and tilt | Refractive index | Abbe's No. |
|---|---|---|---|---|---|
| 8 | FFS ④ (DM) | | (7) | | |
| 9 | FFS ③ | | (6) | 1.5254 | 56.2 |
| 10 | FFS ① | | (4) | | |
| 11 | ∞ | | (8) | 1.5163 | 64.1 |
| 12 | ∞ | | (9) | | |
| Image plane | ∞ | | (10) | | |

FFS ①

| | | | | | |
|---|---|---|---|---|---|
| $C_4$ | $-4.7148 \times 10^{-2}$ | $C_6$ | $-1.8559 \times 10^{-2}$ | $C_8$ | $-2.1989 \times 10^{-3}$ |
| $C_{10}$ | $-1.3752 \times 10^{-3}$ | $C_{11}$ | $6.3011 \times 10^{-4}$ | $C_{13}$ | $-2.3538 \times 10^{-4}$ |
| $C_{15}$ | $-1.2872 \times 10^{-4}$ | | | | |

FFS ②

| | | | | | |
|---|---|---|---|---|---|
| $C_4$ | $-3.5411 \times 10^{-2}$ | $C_6$ | $-2.2443 \times 10^{-2}$ | $C_8$ | $-4.5396 \times 10^{-4}$ |
| $C_{10}$ | $-6.6517 \times 10^{-4}$ | $C_{11}$ | $4.4891 \times 10^{-4}$ | $C_{13}$ | $2.2297 \times 10^{-4}$ |
| $C_{15}$ | $-9.9027 \times 10^{-5}$ | | | | |

FFS ③

| | | | | | |
|---|---|---|---|---|---|
| $C_4$ | $-6.3691 \times 10^{-2}$ | $C_6$ | $-5.2302 \times 10^{-2}$ | $C_8$ | $2.0046 \times 10^{-3}$ |
| $C_{10}$ | $-1.4613 \times 10^{-3}$ | $C_{11}$ | $-5.9788 \times 10^{-4}$ | $C_{13}$ | $2.5449 \times 10^{-4}$ |
| $C_{15}$ | $1.5212 \times 10^{-4}$ | | | | |

FFS ④

OD: ∞

| | | | | | |
|---|---|---|---|---|---|
| $C_4$ | $-3.2044 \times 10^{-2}$ | $C_6$ | $-3.4056 \times 10^{-2}$ | $C_8$ | $-1.1269 \times 10^{-3}$ |
| $C_{10}$ | $9.3234 \times 10^{-4}$ | $C_{11}$ | $-8.2793 \times 10^{-5}$ | $C_{13}$ | $-9.5598 \times 10^{-4}$ |
| $C_{15}$ | $-4.0391 \times 10^{-4}$ | | | | |

OD: 100

| | | | | | |
|---|---|---|---|---|---|
| $C_4$ | $-3.6403 \times 10^{-2}$ | $C_6$ | $-3.5596 \times 10^{-2}$ | $C_8$ | $-9.3276 \times 10^{-4}$ |
| $C_{10}$ | $1.0425 \times 10^{-3}$ | $C_{11}$ | $1.7142 \times 10^{-4}$ | $C_{13}$ | $-6.2756 \times 10^{-4}$ |
| $C_{15}$ | $-3.7675 \times 10^{-4}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 0.50 |
|---|---|---|---|---|---|
| α | 0.00 | β | 0.00 | γ | 0.00 |

Displacement and tilt(3)

| X | 0.00 | Y | 0.00 | Z | 4.20 |
|---|---|---|---|---|---|
| α | 0.00 | β | 0.00 | γ | 0.00 |

Displacement and tilt(4)

| X | 0.00 | Y | -3.37 | Z | 3.23 |
|---|---|---|---|---|---|
| α | 12.78 | β | 0.00 | γ | 0.00 |

Displacement and tilt(5)

| X | 0.00 | Y | 0.37 | Z | 4.59 |
|---|---|---|---|---|---|
| α | 39.33 | β | 0.00 | γ | 0.00 |

Displacement and tilt(6)

| X | 0.00 | Y | -5.99 | Z | 5.91 |
|---|---|---|---|---|---|
| α | -13.67 | β | 0.00 | γ | 0.00 |

Displacement and tilt(7)

OD: ∞

| X | 0.00 | Y | -6.78 | Z | 6.28 |
|---|---|---|---|---|---|
| α | -24.23 | β | 0.00 | γ | 0.00 |

OD: 100

| X | 0.00 | Y | -6.78 | Z | 6.28 |
|---|---|---|---|---|---|
| α | -24.23 | β | 0.00 | γ | 0.00 |

Displacement and tilt(8)

| X | 0.00 | Y | -7.10 | Z | 2.99 |
|---|---|---|---|---|---|
| α | 1.02 | β | 0.00 | γ | 0.00 |

Displacement and tilt(9)

| X | 0.00 | Y | -7.11 | Z | 2.44 |
|---|---|---|---|---|---|
| α | 1.02 | β | 0.00 | γ | 0.00 |

Displacement and tilt(10)

| X | 0.00 | Y | -7.15 | Z | 0.44 |
|---|---|---|---|---|---|
| α | 1.02 | β | 0.00 | γ | 0.00 |

EXAMPLE E

| Surface No. | Radius of curvature | Surface separation | Displacement and tilt | Refractive index | Abbe's No. |
|---|---|---|---|---|---|
| Object plane | ∞ | 1000.00 | | | |
| 1 | -30.00(RP) | | (1) | 1.5168 | 64.1 |
| 2 | -19.75 | | (2) | 1.6727 | 32.2 |
| 3 | 30.00 | | (3) | | |
| 4 | XTR ① (DM 1) | | (4) | | |
| 5 | XTR ② (DM 2) | | (5) | | |
| 6 | 100.0 | | (6) | 1.5168 | 64.1 |
| 7 | -20.0 | | (7) | 1.6727 | 32.2 |
| 8 | -120.0 | | (8) | | |
| 9 | ∞ (Stop) | | (9) | | |
| Image plane | ∞ | | | | |

XTR ①

WE: ∞ (Plane)
TE: Ry -70.0
    Rx -60.622

XTR ②

WE: Ry 125.0
    Rx 108.253
TE: ∞ (Plane)

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 3.00 |
|---|---|---|---|---|---|
| α | 0.00 | β | 0.00 | γ | 0.00 |

Displacement and tilt(3)

| X | 0.00 | Y | 0.00 | Z | 4.30 |
|---|---|---|---|---|---|
| α | 0.00 | β | 0.00 | γ | 0.00 |

Displacement and tilt(4)

WE:
| X | 0.00 | Y | 0.00 | Z | 14.30 |
|---|---|---|---|---|---|
| α | -30.00 | β | 0.00 | γ | 0.00 |

TE:
| X | 0.00 | Y | 0.00 | Z | 15.009 |
|---|---|---|---|---|---|
| α | -30.00 | β | 0.00 | γ | 0.00 |

Displacement and tilt(5)

WE:
| X | 0.00 | Y | -17.465 | Z | 4.217 |
|---|---|---|---|---|---|
| α | -30.00 | β | 0.00 | γ | 0.00 |

TE:
| X | 0.00 | Y | -17.934 | Z | 4.6546 |
|---|---|---|---|---|---|
| α | -30.00 | β | 0.00 | γ | 0.00 |

Displacement and tilt(6)

| X | 0.00 | Y | -17.934 | Z | 13.655 |
|---|---|---|---|---|---|
| α | 0.00 | β | 0.00 | γ | 0.00 |

-continued

| Surface No. | Radius of curvature | Surface separation | Displacement and tilt | | Refractive index | Abbe's No. |
|---|---|---|---|---|---|---|
| | | Displacement and tilt(7) | | | | |
| X | 0.00 | Y | −17.934 | Z | 17.655 | |
| α | 0.00 | β | 0.00 | γ | 0.00 | |
| | | Displacement and tilt(8) | | | | |
| X | 0.00 | Y | −17.934 | Z | 18.655 | |
| α | 0.00 | β | 0.00 | γ | 0.00 | |
| | | Displacement and tilt(9) | | | | |
| X | 0.00 | Y | −17.934 | Z | 20.655 | |
| α | 0.00 | β | 0.00 | γ | 0.00 | |

-continued

| Surface No. | Radius of curvature | Surface separation | Displacement and tilt | | Refractive index | Abbe's No. |
|---|---|---|---|---|---|---|
| | | Displacement and tilt(7) | | | | |
| X | 0.00 | Y | −17.32 | Z | 17.30 | |
| α | 0.00 | β | 0.00 | γ | 0.00 | |
| | | Displacement and tilt(8) | | | | |
| X | 0.00 | Y | −17.32 | Z | 18.30 | |
| α | 0.00 | β | 0.00 | γ | 0.00 | |
| | | Displacement and tilt(9) | | | | |
| X | 0.00 | Y | −17.32 | Z | 20.30 | |
| α | 0.00 | β | 0.00 | γ | 0.00 | |

EXAMPLE F

| Surface No. | Radius of curvature | Surface separation | Displacement and tilt | Refractive index | Abbe's No. |
|---|---|---|---|---|---|
| Object plane | ∞ | 10000.00 | | | |
| 1 | −30.00 (RP) | | (1) | 1.5168 | 64.1 |
| 2 | −19.75 | | (2) | 1.6727 | 32.2 |
| 3 | 30.00 | | (3) | | |
| 4 | XTR ① (DM) | | (4) | | |
| 5 | ∞ (RE) | | (5) | | |
| 6 | 50.0 | | (6) | 1.5168 | 64.1 |
| 7 | −20.0 | | (7) | 1.6727 | 32.2 |
| 8 | −60.0 | | (8) | | |
| 9 | ∞ (Stop) | | (9) | | |
| Image plane | ∞ | | | | |

XTR ①

OD: 10000.00
  ∞ (Plane)
OD: 1000.00
TE: Ry −400
    Rx −346.4

| | | Displacement and tilt(1) | | | |
|---|---|---|---|---|---|
| X | 0.00 | Y | 0.00 | Z | 0.00 |
| α | 0.00 | β | 0.00 | γ | 0.00 |
| | | Displacement and tilt(2) | | | |
| X | 0.00 | Y | 0.00 | Z | 3.00 |
| α | 0.00 | β | 0.00 | γ | 0.00 |
| | | Displacement and tilt(3) | | | |
| X | 0.00 | Y | 0.00 | Z | 4.30 |
| α | 0.00 | β | 0.00 | γ | 0.00 |
| | | Displacement and tilt(4) | | | |

OD: 10000.00
| X | 0.00 | Y | 0.00 | Z | 14.176 |
| α | −30.00 | β | 0.00 | γ | 0.00 |

OD: 1000.00
| X | 0.00 | Y | 0.00 | Z | 14.300 |
| α | −30.00 | β | 0.00 | γ | 0.00 |

| | | Displacement and tilt(5) | | | |
| X | 0.00 | Y | −17.32 | Z | 4.30 |
| α | −30.00 | β | 0.00 | γ | 0.00 |
| | | Displacement and tilt(6) | | | |
| X | 0.00 | Y | −17.32 | Z | 13.30 |
| α | 0.00 | β | 0.00 | γ | 0.00 |

EXAMPLE G

| Surface No. | Radius of curvature | Surface separation | Displacement and tilt | Refractive index | Abbe's No. |
|---|---|---|---|---|---|
| Object plane | ∞ | ∞ | | | |
| 1 | ASS ① (DM 1) | 5.5000 | (1) | | |
| 2 | 5.2581 | 3.8903 | | 1.88300 | 40.76 |
| 3 | 15.4927 | 3.4495 | | 1.72151 | 29.23 |
| 4 | 0.9691 | 1.0000 | | | |
| 5 | ∞ (Stop) | 0.2000 | | | |
| 6 | −40.7277 | 1.0035 | | 1.88300 | 40.76 |
| 7 | 1.9125 | 2.2294 | | 1.83481 | 42.72 |
| 8 | −2.6031 | 0.1000 | | | |
| 9 | 17.9219 | 0.9949 | | 1.88300 | 40.76 |
| 10 | 8.8386 | 2.9405 | | | |
| 11 | ASS ② (DM 2) | $d_1$ | (2) | | |
| Image plane | ∞ | | | | |

ASS①

WE:
R   106.39172
K   0.0000
A   $-6.5400 \times 10^{-5}$
B   $1.8807 \times 10^{-6}$
C   $-2.1512 \times 10^{-8}$
D   $1.0292 \times 10^{-10}$
TE:
R   240.85450
K   0.0000
A   $2.8699 \times 10^{-5}$
B   $-7.6530 \times 10^{-7}$
C   $1.8985 \times 10^{-8}$
D   $-1.5367 \times 10^{-10}$

ASS②

WE:
R   −24.73983
K   0.0000
A   $2.0754 \times 10^{-3}$
B   $-2.7716 \times 10^{-4}$
C   $1.7647 \times 10^{-5}$
TE:
R   −49.19751
K   0.0000
A   $-6.0663 \times 10^{-4}$
B   $1.8049 \times 10^{-4}$
C   $-1.0921 \times 10^{-5}$ Variable space $d_1$
WE:   5.54732
TE:   5.54510

-continued

| Surface No. | Radius of curvature | Surface separation | Displacement and tilt | Refractive index | Abbe's No. |
|---|---|---|---|---|---|
| Displacement and tilt(1) | | | | | |
| X | 0.00 | Y | 0.00 | Z | 0.00 |
| α | 45.00 | β | 0.00 | γ | 0.00 |
| Displacement and tilt(2) | | | | | |
| X | 0.00 | Y | 0.00 | Z | 0.00 |
| α | 45.00 | β | 0.00 | γ | 0.00 |

EXAMPLE H

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | 1.0000 | | 1.51633 | 64.14 |
| 2 | 8.4105 | 5.5000 | | | |
| 3 | ASS ① (DM 1) | 4.0000 | (1) | | |
| 4 | 3.2414 | 3.2454 | | 1.88300 | 40.76 |
| 5 | 1.5926 | 0.8213 | | | |
| 6 | ∞ (Stop) | 0.2000 | | | |
| 7 | 32.9618 | 7.0342 | | 1.84666 | 23.78 |
| 8 | 11.5062 | 2.7774 | | 1.51633 | 64.14 |
| 9 | −4.4027 | 1.8078 | | | |
| 10 | 36.1618 | 1.2403 | | 1.72916 | 54.68 |
| 11 | −13.6093 | 4.1642 | | | |
| 12 | ASS ② (DM 2) | $d_1$ | (2) | | |
| Image plane | ∞ | | | | |

ASS①

WE:
R   109.58316
K   0.0000
A   −6.1107 × 10⁻⁴
B   6.6969 × 10⁻⁵
C   −3.1575 × 10⁻⁶
D   5.5493 × 10⁻⁸
TE:
R   −175.10236
K   0.0000
A   3.7168 × 10⁻⁴
B   −3.0985 × 10⁻⁵
C   1.1219 × 10⁻⁶
D   −7.0811 × 10⁻²⁷

ASS②

WE:
R   −89.25156
K   0.0000
A   5.9040 × 10⁻⁴
B   −3.5468 × 10⁻⁵
C   9.0208 × 10⁻⁷
TE:
R   91.42433
K   0.0000
A   −4.5028 × 10⁻⁴
B   5.5916 × 10⁻⁵
C   −2.4949 × 10⁻⁶
Variable space $d_1$
WE:   5.49484
TE:   5.50021

| Displacement and tilt(1) | | | | | |
|---|---|---|---|---|---|
| X | 0.00 | Y | 0.00 | Z | 0.00 |
| α | 45.00 | β | 0.00 | γ | 0.00 |

| Displacement and tilt(2) | | | | | |
|---|---|---|---|---|---|
| X | 0.00 | Y | 0.00 | Z | 0.00 |
| α | −34.372 | β | 0.00 | γ | 0.00 |

EXAMPLE I

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | 1.0000 | | 1.51633 | 64.14 |
| 2 | ANM ① | 5.0000 | | | |
| 3 | ASS ① (DM 1) | 4.0000 | (1) | | |
| 4 | 3.0102 | 3.0708 | | 1.51633 | 64.14 |
| 5 | −24.9459 | 1.5539 | | 1.88300 | 40.76 |
| 6 | 1.9584 | 1.0818 | | | |
| 7 | ∞ (Stop) | 0.2000 | | | |
| 8 | −295.2763 | 6.3253 | | 1.84666 | 23.78 |
| 9 | 15.8702 | 2.6272 | | 1.51633 | 64.14 |
| 10 | −4.2027 | 1.7630 | | | |
| 11 | −206.7394 | 1.2972 | | 1.72916 | 54.68 |
| 12 | −9.3156 | 4.1451 | | | |
| 13 | ASS ② (DM 2) | $d_1$ | (2) | | |
| Image plane | ∞ | | | | |

ANM①

Ry   41.4008
Rx   61.2166
Ky   0.0000
Kx   0.0000
R1   −1.5273 × 10⁻³
R2   1.1686 × 10⁻⁴
R3   −3.7464 × 10⁻⁶
R4   4.7549 × 10⁻⁸
P1   2.4721 × 10⁻²
P2   −3.8239 × 10⁻³
P3   −5.9130 × 10⁻³
P4   1.1138 × 10⁻²

ASS①

WE:
R   149.96177
K   0.0000
A   −7.0601 × 10⁻⁵
B   2.2751 × 10⁻⁶
C   −4.7356 × 10⁻⁸
D   3.6529 × 10⁻¹⁰
TE:
R   −186.85340
K   0.0000
A   3.7389 × 10⁻⁴
B   −1.6633 × 10⁻⁵
C   2.5291 × 10⁻⁷
D   −7.0811 × 10⁻²⁷

ASS②

WE:
R   −51.51621
K   0.0000
A   7.0673 × 10⁻⁴
B   −3.4212 × 10⁻⁵
C   7.2662 × 10⁻⁷
TE:
R   196.67374
K   0.0000
A   −1.0661 × 10⁻³

-continued

| Surface No. | Radius of curvature | Surface separation | Displacement and tilt | Refractive index | Abbe's No. |
|---|---|---|---|---|---|
| B | $1.3376 \times 10^{-4}$ | | | | |
| C | $-5.2193 \times 10^{-6}$ | | | | |
| Variable sapce $d_1$ | | | | | |
| WE: | 5.43122 | | | | |
| TE: | 5.45627 | | | | |

Displacement and tilt(1)

| | | | | | |
|---|---|---|---|---|---|
| X | 0.00 | Y | 0.00 | Z | 0.00 |
| α | 45.00 | β | 0.00 | γ | 0.00 |

Displacement and tilt(2)

| | | | | | |
|---|---|---|---|---|---|
| X | 0.00 | Y | 0.00 | Z | 0.00 |
| α | 45.00 | β | 0.00 | γ | 0.00 |

EXAMPLE J

| Surface No. | Radius of curvature | Surface separation | Displacement and tilt | Refractive index | Abbe's No. |
|---|---|---|---|---|---|
| Object plane | ∞ | ∞ | | | |
| 1 | 188.01 | 4.86 | | 1.7093 | 54.3 |
| 2 | ASS ① | 7.00 | | | |
| 3 | -16.52 | 5.00 | | 1.5268 | 65.8 |
| 4 | -7.53 | 4.00 | | | |
| 5 | FFS ① (DM 1) | 5.00 | (1) | | |
| 6 | ∞ (Stop) | 0.50 | | | |
| 7 | ASS ② | 2.00 | | 1.4875 | 70.2 |
| 8 | -728.98 | 4.00 | | | |
| 9 | FFS ② (DM 2) | 4.00 | (2) | | |
| 10 | 118.60 | 1.95 | | 1.4875 | 70.2 |
| 11 | -5.57 | 4.53 | | 1.8467 | 23.8 |
| 12 | -26.99 | 4.00 | | | |
| 13 | FFS ③ (DM 3) | 4.00 | (3) | | |
| 14 | -9.15 | 3.00 | | 1.5263 | 65.9 |
| 15 | ASS ③ | 1.00 | | | |
| 16 | ∞ | 0.80 | | 1.5163 | 64.1 |
| 17 | ∞ | 1.80 | | 1.5477 | 62.8 |
| 18 | ∞ | 0.50 | | | |
| 19 | ∞ | 0.50 | | 1.5163 | 64.1 |
| 20 | ∞ | 1.00 | | | |
| Image plane | ∞ | | | | |

ASS①

| R | 3.68 |
|---|---|
| K | 0.0000 |
| A | $-3.0236 \times 10^{-4}$ |
| B | $-2.4721 \times 10^{-4}$ |
| C | $1.9293 \times 10^{-5}$ |
| D | $-1.7320 \times 10^{-6}$ |

ASS②

| R | -9.14 |
|---|---|
| K | 0.0000 |
| A | $4.7221 \times 10^{-6}$ |
| B | $2.5368 \times 10^{-6}$ |
| C | $-2.0457 \times 10^{-7}$ |
| D | $6.2856 \times 10^{-9}$ |

ASS③

| R | 12.33 |
|---|---|
| K | 0.0000 |
| A | $-5.7706 \times 10^{-4}$ |
| B | $1.6455 \times 10^{-5}$ |
| C | $-2.7671 \times 10^{-6}$ |
| D | $9.5513 \times 10^{-8}$ |

FFS ①

WE:
| $C_4$ | $1.3195 \times 10^{-3}$ | $C_6$ | $1.6555 \times 10^{-4}$ | $C_8$ | $2.5372 \times 10^{-5}$ |
|---|---|---|---|---|---|
| $C_{10}$ | $-2.9788 \times 10^{-6}$ | $C_{11}$ | $9.7932 \times 10^{-6}$ | $C_{13}$ | $3.8809 \times 10^{-6}$ |
| $C_{15}$ | $1.2337 \times 10^{-6}$ | | | | |

TE:
| $C_4$ | $-1.1656 \times 10^{-2}$ | $C_6$ | $-9.1985 \times 10^{-4}$ | $C_8$ | $4.6664 \times 10^{-5}$ |
|---|---|---|---|---|---|
| $C_{10}$ | $4.0729 \times 10^{-5}$ | $C_{11}$ | $3.4607 \times 10^{-6}$ | $C_{13}$ | $-2.1879 \times 10^{-6}$ |
| $C_{15}$ | $-1.0285 \times 10^{-6}$ | | | | |

FFS ②

WE:
| $C_4$ | $1.8423 \times 10^{-3}$ | $C_6$ | $-1.4463 \times 10^{-4}$ | $C_8$ | $1.5642 \times 10^{-4}$ |
|---|---|---|---|---|---|
| $C_{10}$ | $-2.5385 \times 10^{-5}$ | $C_{11}$ | $-1.3512 \times 10^{-6}$ | $C_{13}$ | $4.2397 \times 10^{-3}$ |
| $C_{15}$ | $-2.8277 \times 10^{-6}$ | | | | |

TE:
| $C_4$ | $-2.5101 \times 10^{-2}$ | $C_6$ | $1.7952 \times 10^{-3}$ | $C_8$ | $-1.3478 \times 10^{-3}$ |
|---|---|---|---|---|---|
| $C_{10}$ | $2.2259 \times 10^{-4}$ | $C_{11}$ | $4.1435 \times 10^{-6}$ | $C_{13}$ | $-9.2639 \times 10^{-5}$ |
| $C_{15}$ | $8.7872 \times 10^{-6}$ | | | | |

FFS ③

WE:
| $C_4$ | $-7.6689 \times 10^{-5}$ | $C_6$ | $-1.1461 \times 10^{-3}$ | $C_8$ | $1.0248 \times 10^{-4}$ |
|---|---|---|---|---|---|
| $C_{10}$ | $-2.2888 \times 10^{-5}$ | $C_{11}$ | $-3.2560 \times 10^{-5}$ | $C_{13}$ | $2.3921 \times 10^{-6}$ |
| $C_{15}$ | $-5.6394 \times 10^{-6}$ | | | | |

TE:
| $C_4$ | $7.4185 \times 10^{-3}$ | $C_6$ | $1.7664 \times 10^{-2}$ | $C_8$ | $-8.0810 \times 10^{-4}$ |
|---|---|---|---|---|---|
| $C_{10}$ | $5.1976 \times 10^{-4}$ | $C_{11}$ | $-4.7072 \times 10^{-5}$ | $C_{13}$ | $-1.8546 \times 10^{-4}$ |
| $C_{15}$ | $2.7899 \times 10^{-5}$ | | | | |

Displacement and tilt(1)

| | | | | | |
|---|---|---|---|---|---|
| X | 0.00 | Y | 0.00 | Z | 0.00 |
| α | -45.00 | β | 0.00 | γ | 0.00 |

Displacement and tilt(2)

| | | | | | |
|---|---|---|---|---|---|
| X | 0.00 | Y | 0.00 | Z | 0.00 |
| α | 45.00 | β | 0.00 | γ | 0.00 |

Displacement and tilt(3)

| | | | | | |
|---|---|---|---|---|---|
| X | 0.00 | Y | 0.00 | Z | 0.00 |
| α | 45.00 | β | 0.00 | γ | 0.00 |

EXAMPLE K

| Surface No. | Radius of curvature | Surface separation | Displacement and tilt | Refractive index | Abbe's No. |
|---|---|---|---|---|---|
| Object plane | ∞ | ∞ | | | |
| 1 | 99.38 | 4.38 | | 1.6480 | 57.6 |
| 2 | ASS ① | 7.00 | | | |
| 3 | -23.52 | 4.38 | | 1.5272 | 49.3 |
| 4 | -8.83 | 4.00 | | | |
| 5 | FFS ① (DM1) | 5.00 | (1) | | |
| 6 | ∞ (Stop) | 0.50 | | | |
| 7 | ASS ② | 2.00 | | 1.4875 | 70.2 |
| 8 | 27.63 | 4.00 | | | |
| 9 | FFS ② (DM2) | 4.00 | (2) | | |
| 10 | -88.03 | 2.33 | | 1.6162 | 59.3 |
| 11 | -5.12 | 2.97 | | 1.8467 | 23.8 |
| 12 | -13.95 | 4.00 | | | |
| 13 | FFS ③ (DM3) | 4.00 | (3) | | |
| 14 | -13.06 | 3.00 | | 1.4875 | 70.2 |
| 15 | ASS ③ | 1.00 | | | |
| 16 | ∞ | 0.80 | | 1.5163 | 64.1 |
| 17 | ∞ | 1.80 | | 1.5477 | 62.8 |
| 18 | ∞ | 0.50 | | | |

-continued

| Surface No. | Radius of curvature | Surface separation | Displacement and tilt | Refractive index | Abbe's No. |
|---|---|---|---|---|---|
| 19 | ∞ | 0.50 | | 1.5163 | 64.1 |
| 20 | ∞ | 1.00 | | | |
| Image plane | ∞ | | | | |

ASS①

R   3.78
K   0.0000
A   $-9.9411 \times 10^{-4}$
B   $-1.2686 \times 10^{-4}$
C   $7.9744 \times 10^{-6}$
D   $-1.1175 \times 10^{-6}$

ASS②

R   $-17.37$
K   0.0000
A   $1.9221 \times 10^{-5}$
B   $-4.7245 \times 10^{-5}$
C   $1.4660 \times 10^{-5}$
D   $-1.6412 \times 10^{-6}$

ASS③

R   9.37
K   0.0000
A   $-1.1445 \times 10^{-3}$
B   $7.2645 \times 10^{-5}$
C   $-4.4423 \times 10^{-6}$
D   $9.7740 \times 10^{-8}$

FSS①

WE:
$C_4$ $-1.0242 \times 10^{-3}$   $C_6$ $-2.9132 \times 10^{-3}$   $C_8$ $-1.7482 \times 10^{-5}$
$C_{10}$ $-5.8646 \times 10^{-6}$   $C_{11}$ $-6.7499 \times 10^{-6}$   $C_{13}$ $-1.6480 \times 10^{-5}$
$C_{15}$ $-5.3516 \times 10^{-6}$
TE:
$C_4$ $-1.1888 \times 10^{-2}$   $C_6$ $-2.5578 \times 10^{-3}$   $C_8$ $7.4643 \times 10^{-5}$
$C_{10}$ $3.3620 \times 10^{-5}$   $C_{11}$ $-5.6066 \times 10^{-6}$   $C_{13}$ $-1.4296 \times 10^{-5}$
$C_{15}$ $-5.1085 \times 10^{-6}$

FSS②

WE:
$C_4$ $-1.2349 \times 10^{-3}$   $C_6$ $-4.8627 \times 10^{-3}$   $C_8$ $-9.3065 \times 10^{-5}$
$C_{10}$ $-2.7168 \times 10^{-4}$   $C_{11}$ $1.3448 \times 10^{-5}$   $C_{13}$ $-1.6792 \times 10^{-5}$
$C_{15}$ $-2.3260 \times 10^{-5}$
TE:
$C_4$ $-2.1788 \times 10^{-2}$   $C_6$ $1.6763 \times 10^{-3}$   $C_8$ $-9.0487 \times 10^{-4}$
$C_{10}$ $1.7415 \times 10^{-4}$   $C_{11}$ $-1.0766 \times 10^{-4}$   $C_{13}$ $9.6712 \times 10^{-5}$
$C_{15}$ $4.3032 \times 10^{-6}$

FSS③

WE:
$C_4$ $3.6425 \times 10^{-4}$   $C_6$ $-3.3124 \times 10^{-3}$   $C_8$ $-6.6428 \times 10^{-5}$
$C_{10}$ $-1.4832 \times 10^{-4}$   $C_{11}$ $1.7998 \times 10^{-6}$   $C_{13}$ $5.7814 \times 10^{-6}$
$C_{15}$ $-5.4564 \times 10^{-6}$
TE:
$C_4$ $1.0087 \times 10^{-2}$   $C_6$ $2.0630 \times 10^{-2}$   $C_8$ $6.9625 \times 10^{-4}$
$C_{10}$ $3.5904 \times 10^{-4}$   $C_{11}$ $-3.6557 \times 10^{-5}$   $C_{13}$ $-1.3505 \times 10^{-4}$
$C_{15}$ $2.8988 \times 10^{-5}$

Displacement and tilt(1)

| X | 0.00 | Y | 0.00 | Z | 0.00 |
|---|---|---|---|---|---|
| α | $-36.00$ | β | 0.00 | γ | 0.00 |

Displacement and tilt(2)

| X | 0.00 | Y | 0.00 | Z | 0.33 |
|---|---|---|---|---|---|
| α | 45.00 | β | 0.00 | γ | 0.00 |

Displacement and tilt(3)

| X | 0.00 | Y | 0.00 | Z | 2.94 |
|---|---|---|---|---|---|
| α | 39.00 | β | 0.00 | γ | 0.00 |

EXAMPLE L

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | 17.00 | | | |
| 2 | ASS① (DM1) | $d_1$ | | | |
| 3 | ASS② (DM2) | $d_2$ | | | |
| 4 | 10.17 | 1.80 | | 1.5713 | 52.9 |
| 5 | $-9.11$ | 1.00 | | 1.7725 | 49.6 |
| 6 | 18.98 | $d_3$ | | | |
| Image plane | ∞ | | | | |

ASS①

WE:
R   $-56.07$
K   $-6.6587 \times 10^{-1}$
A   $1.4016 \times 10^{-6}$
B   $5.4841 \times 10^{-9}$
C   $-7.2045 \times 10^{-11}$
D   $4.8599 \times 10^{-13}$
TE:
R   $-57.25$
K   $-2.3246 \times 10^{-1}$
A   $8.4461 \times 10^{-7}$
B   $-4.0454 \times 10^{-10}$
C   $5.5081 \times 10^{-12}$
D   $1.6847 \times 10^{-15}$

ASS②

WE:
R   $-83.86$
K   $-2.4760 \times 10$
A   $1.5233 \times 10^{-5}$
B   $3.3907 \times 10^{-7}$
C   $-2.8012 \times 10^{-8}$
D   $8.0957 \times 10^{-10}$
TE:
R   $-41.56$
K   $-2.5160 \times 10$
A   $2.4200 \times 10^{-5}$
B   $1.1173 \times 10^{-6}$
C   $-8.1069 \times 10^{-8}$
D   $2.5583 \times 10^{-9}$ Variable space $d_1$
WE: $-13.268$
TE: $-17.000$
Variable space $d_2$
WE: 15.000
TE: 19.457
Variable space $d_3$
WE: 5.000
TE: 4.275

EXAMPLE M

| Surface No. | Radius of curvature | Surface separation | Displacement and tilt | Refractive index | Abbe's No. |
|---|---|---|---|---|---|
| Object plane | ∞ | ∞ | | | |
| 1 | 14.04 | 1.85 | | 1.8467 | 23.8 |
| 2 | 24.90 | 2.21 | | | |
| 3 | 21.02 | 1.94 | | 1.7891 | 25.4 |
| 4 | $-16.31$ | 1.00 | | 1.7725 | 49.6 |
| 5 | 3.88 | 6.18 | | | |
| 6 | ∞ (Stop) | 1.33 | | | |
| 7 | $-7.30$ | 1.11 | | 1.8204 | 28.8 |
| 8 | 9.09 | 2.12 | | 1.6698 | 56.6 |
| 9 | $-7.00$ | 0.50 | | | |

-continued

| Surface No. | Radius of curvature | Surface separation | Displacement and tilt | Refractive index | Abbe's No. |
|---|---|---|---|---|---|
| 10 | 29.43 | 3.00 | | 1.6835 | 56.0 |
| 11 | −10.92 | 5.50 | | | |
| 12 | FFS① (DM) | 5.50 | (1) | | |
| 13 | −7.85 | 3.00 | | 1.5568 | 63.2 |
| 14 | −37.04 | 5.43 | | | |
| Image plane | ∞ | | | | |

FSS①

OD: ∞ (Plane)
OD: 100
$C_4$ −1.0215 × 10⁻³  $C_6$ −5.3693 × 10⁻⁴  $C_8$ 7.2810 × 10⁻⁶
$C_{10}$ 9.5760 × 10⁻⁶  $C_{11}$ 3.2283 × 10⁻⁶  $C_{13}$ 4.2419 × 10⁻⁶
$C_{15}$ 5.7400 × 10⁻⁷

Displacement and tilt(1)

| X | 0.00 | Y | 0.00 | Z | 0.00 |
|---|---|---|---|---|---|
| α | 45.00 | β | 0.00 | γ | 0.00 |

EXAMPLE N

| Surface No. | Radius of curvature | Surface separation | Displacement and tilt | Refractive index | Abbe's No. |
|---|---|---|---|---|---|
| Object plane | ∞ | ∞ | | | |
| 1 | FFS① (RP) | | | 1.5163 | 64.1 |
| 2 | FFS② | | (1) | | |
| 3 | FFS③ (DM1) | | (2) | | |
| 4 | ∞ (Stop) | | (3) | | |
| 5 | FFS④ (DM2) | | (4) | | |
| 6 | FFS⑤ (DM3) | | (5) | | |
| Image plane | ∞ | | (6) | | |

FSS①
$C_4$ −2.7232 × 10⁻²  $C_6$ −9.0100 × 10⁻³  $C_{11}$ −7.5054 × 10⁻⁴
$C_{13}$ 2.1618 × 10⁻³  $C_{15}$ 1.4549 × 10⁻⁵

FSS②
$C_4$ 9.4468 × 10⁻³  $C_6$ −2.8157 × 10⁻³  $C_{11}$ −8.9741 × 10⁻⁴
$C_{13}$ 1.9448 × 10⁻³  $C_{15}$ −3.3780 × 10⁻⁴

FSS③
WE:
$C_4$ 1.9919 × 10⁻³  $C_6$ 1.2928 × 10⁻²  $C_8$ 1.5372 × 10⁻³
$C_{10}$ 1.0348 × 10⁻³  $C_{11}$ 1.0484 × 10⁻⁴  $C_{13}$ 1.4866 × 10⁻⁴
$C_{15}$ 1.9176 × 10⁻⁴  $C_{17}$ −1.7543 × 10⁻⁴  $C_{19}$ −3.2877 × 10⁻⁵
$C_{21}$ 2.0962 × 10⁻⁵
ST:
$C_4$ −5.6151 × 10⁻³  $C_6$ 3.8192 × 10⁻³  $C_8$ −1.3772 × 10⁻⁴
$C_{10}$ 3.0595 × 10⁻⁴  $C_{11}$ −3.0302 × 10⁻⁵  $C_{13}$ 3.0639 × 10⁻⁴
$C_{15}$ 1.1915 × 10⁻⁴  $C_{17}$ 2.6589 × 10⁻⁵  $C_{19}$ 2.5239 × 10⁻⁵
$C_{21}$ 1.4172 × 10⁻⁵
TE:
$C_4$ 1.0483 × 10⁻²  $C_6$ −5.4008 × 10⁻⁴  $C_8$ −6.4000 × 10⁻⁴
$C_{10}$ −9.2325 × 10⁻⁵  $C_{11}$ −6.8142 × 10⁻⁵  $C_{13}$ 3.1459 × 10⁻⁴
$C_{15}$ 9.0778 × 10⁻⁵  $C_{17}$ 1.4915 × 10⁻⁴  $C_{19}$ 1.4624 × 10⁻⁴
$C_{21}$ 9.0719 × 10⁻⁶

FSS④
WE:
$C_4$ 2.1674 × 10⁻²  $C_6$ 2.0348 × 10⁻²  $C_8$ 1.1708 × 10⁻³
$C_{10}$ 1.0584 × 10⁻³  $C_{11}$ −9.7033 × 10⁻⁵  $C_{13}$ 1.7073 × 10⁻⁵
$C_{15}$ −8.8757 × 10⁻⁵  $C_{17}$ −8.4597 × 10⁻⁵  $C_{19}$ −1.0497 × 10⁻⁴
$C_{21}$ 1.0517 × 10⁻⁵
ST:
$C_4$ 2.1396 × 10⁻²  $C_6$ 1.4238 × 10⁻²  $C_8$ −1.6385 × 10⁻⁴
$C_{10}$ 7.9385 × 10⁻⁴  $C_{11}$ 3.9764 × 10⁻⁵  $C_{13}$ −1.9831 × 10⁻⁵
$C_{15}$ −6.5284 × 10⁻⁵  $C_{17}$ 3.1492 × 10⁻⁵  $C_{19}$ −1.9969 × 10⁻⁵
$C_{21}$ 8.3870 × 10⁻⁶
TE:
$C_4$ 2.1691 × 10⁻²  $C_6$ 1.3825 × 10⁻²  $C_8$ −2.0053 × 10⁻³
$C_{10}$ −5.6071 × 10⁻⁴  $C_{11}$ 1.2464 × 10⁻⁴  $C_{13}$ 6.5649 × 10⁻⁵
$C_{15}$ 1.2384 × 10⁻⁴  $C_{17}$ 1.9740 × 10⁻⁴  $C_{19}$ 3.4085 × 10⁻⁴
$C_{21}$ −2.0413 × 10⁻⁵

FSS⑤
WE:
$C_4$ 2.4519 × 10⁻²  $C_6$ 2.0736 × 10⁻²  $C_8$ 1.1245 × 10⁻³
$C_{10}$ 5.6883 × 10⁻⁴  $C_{11}$ 1.9501 × 10⁻⁴  $C_{13}$ −6.5199 × 10⁻⁵
$C_{15}$ 6.9428 × 10⁻⁵  $C_{17}$ −1.0562 × 10⁻⁴  $C_{19}$ −1.1938 × 10⁻⁴
$C_{21}$ 8.1141 × 10⁻⁶
ST:
$C_4$ 1.8684 × 10⁻²  $C_6$ 2.3160 × 10⁻²  $C_8$ −9.6757 × 10⁻⁴
$C_{10}$ 7.3922 × 10⁻⁵  $C_{11}$ 9.3663 × 10⁻⁶  $C_{13}$ 6.9280 × 10⁻⁵
$C_{15}$ 8.6884 × 10⁻⁵  $C_{17}$ 3.0229 × 10⁻⁵  $C_{19}$ −2.3266 × 10⁻⁵
$C_{21}$ 4.7456 × 10⁻⁶
TE:
$C_4$ 1.1252 × 10⁻²  $C_6$ 1.7687 × 10⁻²  $C_8$ −4.0478 × 10⁻³
$C_{10}$ −1.4871 × 10⁻³  $C_{11}$ −1.9722 × 10⁻⁴  $C_{13}$ 1.2636 × 10⁻⁵
$C_{15}$ −9.7565 × 10⁻⁵  $C_{17}$ 3.0055 × 10⁻⁴  $C_{19}$ 3.9212 × 10⁻⁴
$C_{21}$ −3.3346 × 10⁻⁵

Displacement and tilt(1)
| X | 0.00 | Y | 0.00 | Z | 1.53 |
|---|---|---|---|---|---|
| α | −0.90 | β | 0.00 | γ | 0.00 |

Displacement and tilt(2)
| X | 0.00 | Y | 0.02 | Z | 4.40 |
|---|---|---|---|---|---|
| α | −39.83 | β | 0.00 | γ | 0.00 |

Displacement and tilt(3)
| X | 0.00 | Y | 4.95 | Z | 3.54 |
|---|---|---|---|---|---|
| α | 90.00 | β | 0.00 | γ | 0.00 |

Displacement and tilt(4)
| X | 0.00 | Y | 11.79 | Z | 2.35 |
|---|---|---|---|---|---|
| α | −104.17 | β | 0.00 | γ | 0.00 |

Displacement and tilt(5)
| X | 0.00 | Y | 8.47 | Z | −0.26 |
|---|---|---|---|---|---|
| α | 25.90 | β | 0.00 | γ | 0.00 |

Displacement and tilt(6)
| X | 0.00 | Y | 8.47 | Z | 6.22 |
|---|---|---|---|---|---|
| α | 0.00 | β | 0.00 | γ | 0.00 |

EXAMPLE O

| Surface No. | Radius of curvature | Surface separation | Displacement and tilt | Refractive index | Abbe's No. |
|---|---|---|---|---|---|
| Object plane | ∞ | ∞ | | | |
| 1 | FFS① (RP) | | | 1.5163 | 64.1 |
| 2 | FFS② | | (1) | | |
| 3 | FFS③ (DM1) | | (2) | | |
| 4 | FFS④ | | (3) | 1.5254 | 56.2 |
| 5 | FFS⑤ | | (4) | | |
| 6 | ∞ (Stop) | | (5) | | |
| 7 | FFS⑥ | | (6) | 1.5254 | 56.2 |
| 8 | FFS⑦ | | (7) | | |
| 9 | FFS⑧ (DM2) | | (8) | | |

-continued

| Surface No. | Radius of curvature | Surface separation | Displacement and tilt | Refractive index | Abbe's No. |
|---|---|---|---|---|---|
| 10 | FFS⑨ (DM3) | | (9) | | |
| Image plane | ∞ | | (10) | | |

FSS①

| $C_4$ | $-9.2951 \times 10^{-3}$ | $C_6$ | $8.0409 \times 10^{-4}$ | $C_8$ | $-7.0817 \times 10^{-4}$ |
| $C_{13}$ | $1.7646 \times 10^{-3}$ | $C_{15}$ | $4.2842 \times 10^{-5}$ | | |

FSS②

| $C_4$ | $-1.5539 \times 10^{-2}$ | $C_6$ | $5.6025 \times 10^{-3}$ | $C_8$ | $-5.3551 \times 10^{-4}$ |
| $C_{13}$ | $1.6951 \times 10^{-3}$ | $C_{15}$ | $2.3094 \times 10^{-4}$ | | |

FSS③

WE:
| $C_4$ | $2.2236 \times 10^{-3}$ | $C_6$ | $1.5264 \times 10^{-2}$ | $C_8$ | $7.8902 \times 10^{-4}$ |
| $C_{10}$ | $5.3881 \times 10^{-4}$ | $C_{11}$ | $-6.3868 \times 10^{-5}$ | $C_{13}$ | $2.1726 \times 10^{-5}$ |
| $C_{15}$ | $-7.6546 \times 10^{-6}$ | $C_{17}$ | $-3.2425 \times 10^{-5}$ | $C_{19}$ | $-2.6274 \times 10^{-6}$ |
| $C_{21}$ | $1.0399 \times 10^{-6}$ | | | | |

ST:
| $C_4$ | $-2.0803 \times 10^{-3}$ | $C_6$ | $9.4434 \times 10^{-3}$ | $C_8$ | $-1.0580 \times 10^{-4}$ |
| $C_{10}$ | $2.3347 \times 10^{-4}$ | $C_{11}$ | $-7.9920 \times 10^{-5}$ | $C_{13}$ | $8.9948 \times 10^{-6}$ |
| $C_{15}$ | $-3.5464 \times 10^{-5}$ | $C_{17}$ | $-6.7409 \times 10^{-6}$ | $C_{19}$ | $-4.7506 \times 10^{-6}$ |
| $C_{21}$ | $-1.8168 \times 10^{-6}$ | | | | |

TE:
| $C_4$ | $-5.1698 \times 10^{-3}$ | $C_6$ | $6.7279 \times 10^{-3}$ | $C_8$ | $-5.2429 \times 10^{-4}$ |
| $C_{10}$ | $1.0527 \times 10^{-4}$ | $C_{11}$ | $-1.0392 \times 10^{-4}$ | $C_{13}$ | $2.6594 \times 10^{-5}$ |
| $C_{15}$ | $-2.8093 \times 10^{-5}$ | $C_{17}$ | $1.5735 \times 10^{-5}$ | $C_{19}$ | $9.5770 \times 10^{-6}$ |
| $C_{21}$ | $-2.1426 \times 10^{-6}$ | | | | |

FSS④

| $C_4$ | $1.2336 \times 10^{-2}$ | $C_6$ | $1.8353 \times 10^{-3}$ | $C_{11}$ | $1.2800 \times 10^{-3}$ |
| $C_{13}$ | $3.0975 \times 10^{-3}$ | $C_{15}$ | $-8.2651 \times 10^{-4}$ | | |

FSS⑤

| $C_4$ | $-1.7592 \times 10^{-2}$ | $C_6$ | $7.8216 \times 10^{-3}$ | $C_{11}$ | $2.3713 \times 10^{-3}$ |
| $C_{13}$ | $1.9223 \times 10^{-3}$ | $C_{15}$ | $-6.2229 \times 10^{-4}$ | | |

FSS⑥

| $C_4$ | $1.7395 \times 10^{-2}$ | $C_6$ | $-5.5055 \times 10^{-3}$ | $C_{11}$ | $-8.2336 \times 10^{-4}$ |
| $C_{13}$ | $-2.9848 \times 10^{-3}$ | $C_{15}$ | $-1.1571 \times 10^{-4}$ | | |

FSS⑦

| $C_4$ | $-1.5934 \times 10^{-2}$ | $C_6$ | $6.8262 \times 10^{-3}$ | $C_{11}$ | $-2.2743 \times 10^{-3}$ |
| $C_{13}$ | $-2.8081 \times 10^{-3}$ | $C_{15}$ | $-3.7139 \times 10^{-4}$ | | |

FSS⑧

WE:
| $C_4$ | $1.7994 \times 10^{-2}$ | $C_6$ | $1.2425 \times 10^{-2}$ | $C_8$ | $5.8439 \times 10^{-4}$ |
| $C_{10}$ | $4.9538 \times 10^{-4}$ | $C_{11}$ | $1.8489 \times 10^{-5}$ | $C_{13}$ | $-2.1534 \times 10^{-5}$ |
| $C_{15}$ | $-3.6774 \times 10^{-5}$ | $C_{17}$ | $-8.6604 \times 10^{-5}$ | $C_{19}$ | $-1.5870 \times 10^{-5}$ |
| $C_{21}$ | $4.6424 \times 10^{-6}$ | | | | |

ST:
| $C_4$ | $1.8435 \times 10^{-2}$ | $C_6$ | $1.0069 \times 10^{-2}$ | $C_8$ | $2.0087 \times 10^{-4}$ |
| $C_{10}$ | $3.4157 \times 10^{-4}$ | $C_{11}$ | $4.7497 \times 10^{-5}$ | $C_{13}$ | $2.2192 \times 10^{-6}$ |
| $C_{15}$ | $2.8412 \times 10^{-6}$ | $C_{17}$ | $9.9176 \times 10^{-6}$ | $C_{19}$ | $-6.6908 \times 10^{-6}$ |
| $C_{21}$ | $2.9090 \times 10^{-6}$ | | | | |

TE:
| $C_4$ | $1.8396 \times 10^{-2}$ | $C_6$ | $1.2332 \times 10^{-2}$ | $C_8$ | $-4.9320 \times 10^{-4}$ |
| $C_{10}$ | $-7.8112 \times 10^{-5}$ | $C_{11}$ | $9.0357 \times 10^{-5}$ | $C_{13}$ | $3.2904 \times 10^{-5}$ |
| $C_{15}$ | $4.4914 \times 10^{-5}$ | $C_{17}$ | $5.0928 \times 10^{-5}$ | $C_{19}$ | $3.3220 \times 10^{-5}$ |
| $C_{21}$ | $1.3764 \times 10^{-6}$ | | | | |

FSS⑨

| $C_4$ | $2.4903 \times 10^{-2}$ | $C_6$ | $1.8053 \times 10^{-2}$ | $C_8$ | $-3.9393 \times 10^{-5}$ |
| $C_{10}$ | $2.5539 \times 10^{-4}$ | $C_{11}$ | $4.1462 \times 10^{-5}$ | $C_{13}$ | $7.0562 \times 10^{-5}$ |
| $C_{15}$ | $4.7991 \times 10^{-5}$ | $C_{17}$ | $-1.4088 \times 10^{-5}$ | $C_{19}$ | $-1.8766 \times 10^{-5}$ |
| $C_{21}$ | $4.9410 \times 10^{-6}$ | | | | |

ST:
| $C_4$ | $2.2500 \times 10^{-2}$ | $C_6$ | $1.8790 \times 10^{-2}$ | $C_8$ | $-6.1360 \times 10^{-4}$ |
| $C_{10}$ | $-6.0596 \times 10^{-6}$ | $C_{11}$ | $1.6537 \times 10^{-5}$ | $C_{13}$ | $6.5442 \times 10^{-5}$ |
| $C_{15}$ | $1.8884 \times 10^{-5}$ | $C_{17}$ | $4.5767 \times 10^{-6}$ | $C_{19}$ | $-8.1477 \times 10^{-6}$ |
| $C_{21}$ | $3.4001 \times 10^{-6}$ | | | | |

TE:
| $C_4$ | $2.0449 \times 10^{-2}$ | $C_6$ | $1.2722 \times 10^{-2}$ | $C_8$ | $-1.7221 \times 10^{-3}$ |
| $C_{10}$ | $-5.1330 \times 10^{-4}$ | $C_{11}$ | $-3.4927 \times 10^{-5}$ | $C_{13}$ | $4.5005 \times 10^{-5}$ |

-continued

| Surface No. | Radius of curvature | Surface separation | Displacement and tilt | Refractive index | Abbe's No. |
|---|---|---|---|---|---|
| $C_{15}$ | $-2.7393 \times 10^{-5}$ | $C_{17}$ | $5.5827 \times 10^{-5}$ | $C_{19}$ | $4.7122 \times 10^{-5}$ |
| $C_{21}$ | $2.6247 \times 10^{-6}$ | | | | |

Displacement and tilt(1)

| X | 0.00 | Y | 0.00 | Z | 0.66 |
| α | 0.00 | β | 0.00 | γ | 0.00 |

Displacement and tilt(2)

| X | 0.00 | Y | −0.00 | Z | 6.28 |
| α | −39.68 | β | 0.00 | γ | 0.00 |

Displacement and tilt(3)

| X | 0.00 | Y | 4.82 | Z | 5.37 |
| α | −81.82 | β | 0.00 | γ | 0.00 |

Displacement and tilt(4)

| X | 0.00 | Y | 5.92 | Z | 5.18 |
| α | −64.50 | β | 0.00 | γ | 0.00 |

Displacement and tilt(5)

| X | 0.00 | Y | 8.68 | Z | 5.12 |
| α | −88.89 | β | 0.00 | γ | 0.00 |

Displacement and tilt(6)

| X | 0.00 | Y | 9.59 | Z | 5.11 |
| α | −72.61 | β | 0.00 | γ | 0.00 |

Displacement and tilt(7)

| X | 0.00 | Y | 10.44 | Z | 5.00 |
| α | −88.36 | β | 0.00 | γ | 0.00 |

Displacement and tilt(8)

| X | 0.00 | Y | 18.47 | Z | 3.66 |
| α | −108.37 | β | 0.00 | γ | 0.00 |

Displacement and tilt(9)

| X | 0.00 | Y | 14.62 | Z | −0.37 |
| α | 21.87 | β | 0.00 | γ | 0.00 |

Displacement and tilt(10)

| X | 0.00 | Y | 14.62 | Z | 8.19 |
| α | 0.00 | β | 0.00 | γ | 0.00 |

EXAMPLE P

| Surface No. | Radius of curvature | Surface separation | Displacement and tilt | Refractive index | Abbe's No. |
|---|---|---|---|---|---|
| Object plane | ∞ | ∞ | | | |
| 1 | 15.6075 | 0.8002 | | 1.48749 | 70.23 |
| 2 | 5.1199 | 1.4597 | | | |
| 3 | 30.3986 | 0.8004 | | 1.48749 | 70.23 |
| 4 | 7.5347 | 4.1718 | | | |
| 5 | FFS① (DM) | 6.9621 | (1) | | |
| 6 | ∞ (Stop) | 0.3360 | | | |
| 7 | 626.6718 | 2.1758 | | 1.69680 | 55.53 |
| 8 | ASS① | 3.6686 | | | |
| 9 | 5.0635 | 3.3883 | | 1.61272 | 58.72 |
| 10 | −18.3551 | 0.8253 | | 1.80518 | 25.42 |
| 11 | 4.0990 | 0.8955 | | | |
| 12 | 15.5062 | 2.5511 | | 1.58913 | 61.14 |
| 13 | ASS② | 0.5731 | | | |
| 14 | ∞ | 1.0000 | | 1.51633 | 64.14 |
| 15 | ∞ | 1.2900 | | 1.54771 | 62.84 |
| 16 | ∞ | 0.8000 | | | |
| 17 | ∞ | 0.7500 | | 1.51633 | 64.14 |
| 18 | ∞ | 0.1510 | | | |
| Image plane | ∞ | | | | |

-continued

| Surface No. | Radius of curvature | Surface separation | Displacement and tilt | Refractive index | Abbe's No. |
|---|---|---|---|---|---|

ASS①

| | | | | | |
|---|---|---|---|---|---|
| R | −8.6614 | | | | |
| K | 0 | | | | |
| A | $2.3478 \times 10^{-4}$ | | | | |
| B | $-1.0108 \times 10^{-6}$ | | | | |
| C | $2.4614 \times 10^{-7}$ | | | | |
| D | 0 | | | | |

ASS②

| | | | | | |
|---|---|---|---|---|---|
| R | −6.9955 | | | | |
| K | 0 | | | | |
| A | $1.1406 \times 10^{-3}$ | | | | |
| B | $-1.5164 \times 10^{-5}$ | | | | |
| C | $4.0125 \times 10^{-6}$ | | | | |
| D | $-3.1897 \times 10^{-7}$ | | | | |

FSS①

OD: ∞ (Plane)
OD: 200
$C_4 \quad 6.2652 \times 10^{-4} \quad C_6 \quad 3.1632 \times 10^{-4} \quad C_8 \quad -8.9706 \times 10^{-6}$
$C_{10} \quad -3.8433 \times 10^{-6} \quad C_{11} \quad -1.1125 \times 10^{-5} \quad C_{13} \quad -4.8135 \times 10^{-6}$
$C_{15} \quad -1.9722 \times 10^{-6} \quad C_{17} \quad 3.0915 \times 10^{-6} \quad C_{19} \quad 1.3352 \times 10^{-6}$
$C_{21} \quad 9.3039 \times 10^{-7}$ Displacement and tilt(1)

| X | 0.00 | Y | 0.00 | Z | 0.00 |
|---|---|---|---|---|---|
| α | −45.00 | β | 0.00 | γ | 0.00 |

EXAMPLE Q

| Surface No. | Radius of curvature | Surface separation | Displacement and tilt | Refractive index | Abbe's No. |
|---|---|---|---|---|---|
| Object plane | ∞ | ∞ | | | |
| 1 | 36.5899 | 1.0000 | | 1.48749 | 70.23 |
| 2 | 12.1684 | 2.7677 | | | |
| 3 | −341.4943 | 1.0000 | | 1.48749 | 70.23 |
| 4 | 18.2089 | 11.0000 | (1) | | |
| 5 | ∞ (RP) | 5.3891 | (2) | | |
| 6 | FFS① (DM Stop) | 5.3891 | (3) | | |
| 7 | ∞ (RP) | 12.0000 | | | |
| 8 | 41.9025 | 2.6878 | | 1.72916 | 54.68 |
| 9 | ASS① | 1.0662 | | | |
| 10 | 10.1322 | 8.0670 | | 1.61272 | 58.72 |
| 11 | −11.8044 | 0.8000 | | 1.80518 | 25.42 |
| 12 | 8.4876 | 3.5437 | | | |
| 13 | −41.3432 | 2.2642 | | 1.65160 | 58.55 |
| 14 | ASS② | 0.1000 | | | |
| 15 | ∞ | 1.5000 | | 1.51633 | 64.14 |
| 16 | ∞ | 2.0000 | | 1.54771 | 62.84 |
| 17 | ∞ | 1.0000 | | | |
| 18 | ∞ | 1.4000 | | 1.51633 | 64.14 |
| 19 | ∞ | 1.1889 | | | |
| Image plane | ∞ | | | | |

ASS①

| | | | | | |
|---|---|---|---|---|---|
| R | −24.4119 | | | | |
| K | 0 | | | | |
| A | $2.2044 \times 10^{-5}$ | | | | |
| B | $5.6822 \times 10^{-9}$ | | | | |
| C | $-2.9191 \times 10^{-9}$ | | | | |
| D | 0 | | | | |

ASS②

| | | | | | |
|---|---|---|---|---|---|
| R | −7.7623 | | | | |
| K | 0 | | | | |
| A | $8.7558 \times 10^{-4}$ | | | | |
| B | $-3.4464 \times 10^{-5}$ | | | | |
| C | $2.0637 \times 10^{-6}$ | | | | |
| D | $-4.6864 \times 10^{-8}$ | | | | |

FSS①

OD: ∞ (Plane)
OD: 100
$C_4 \quad -4.7587 \times 10^{-4} \quad C_6 \quad -3.5628 \times 10^{-4} \quad C_8 \quad 1.3013 \times 10^{-5}$
$C_{11} \quad 3.3631 \times 10^{-6} \quad C_{13} \quad 8.7671 \times 10^{-6} \quad C_{19} \quad -1.4865 \times 10^{-6}$ Displacement and tilt(1)

| X | 0.00 | Y | 0.00 | Z | 0.00 |
|---|---|---|---|---|---|
| α | −60.00 | β | 0.00 | γ | 0.00 |

Displacement and tilt(2)

| X | 0.00 | Y | 0.00 | Z | 0.00 |
|---|---|---|---|---|---|
| α | 30.00 | β | 0.00 | γ | 0.00 |

Displacement and tilt(3)

| X | 0.00 | Y | 0.00 | Z | 0.00 |
|---|---|---|---|---|---|
| α | −60.00 | β | 0.00 | γ | 0.00 |

EXAMPLE R

| Surface No. | Radius of curvature | Surface separation | Displacement and tilt | Refractive index | Abbe's No. |
|---|---|---|---|---|---|
| Object plane | ∞ | ∞ | | | |
| 1 | FFS① (DM) | 5.0000 | (1) | | |
| 2 | ∞ (Stop) | 1.0000 | | | |
| 3 | ∞ (GRIN) | 10.4196 | | 1.70000 | 45.00 |
| 4 | ∞ | 2.7002 | | | |
| Image plane | ∞ | | | | |

GRIN

| i | $N_{id}$ | $V_i$ |
|---|---|---|
| 0 | 1.700000 | 45.00 |
| 1 | $-9.7233 \times 10^{-3}$ | $2.0000 \times 10^{+2}$ |
| 2 | $4.9818 \times 10^{-5}$ | $2.0000 \times 10^{+2}$ |

FSS①

OD: ∞ (Plane)
OD: 100
$C_4 \quad 3.5663 \times 10^{-3} \quad C_6 \quad 1.7743 \times 10^{-3} \quad C_8 \quad -2.8386 \times 10^{-4}$
$C_{10} \quad -2.2509 \times 10^{-4} \quad C_{11} \quad 1.4302 \times 10^{-5} \quad C_{13} \quad -8.7736 \times 10^{-5}$
$C_{15} \quad 1.9729 \times 10^{-5} \quad C_{17} \quad 1.3450 \times 10^{-6} \quad C_{19} \quad 1.9968 \times 10^{-5}$
$C_{21} \quad -1.2486 \times 10^{-6}$ Displacement and tilt(1)

| X | 0.00 | Y | 0.00 | Z | 0.00 |
|---|---|---|---|---|---|
| α | −45.00 | β | 0.00 | γ | 0.00 |

EXAMPLE X

| Surface No. | Radius of curvature | Surface separation | Displacement and tilt | Refractive index | Abbe's No. |
|---|---|---|---|---|---|
| Object plane | ∞ | ∞ | | | |
| 1 | 476.8290 | 0.8277 | | 1.72916 | 54.68 |
| 2 | 10.7073 | 6.0011 | | | |
| 3 | FFS① (DM) | $d_1$ | | | |

-continued

| Surface No. | Radius of curvature | Surface separation | Displacement and tilt | Refractive index | Abbe's No. |
|---|---|---|---|---|---|
| 4 | ∞ (Stop) | 0.3360 | | | |
| 5 | −40.5577 | 9.3684 | (1) | 1.84666 | 23.78 |
| 6 | ASS① | 0.1208 | | | |
| 7 | 5.6560 | 4.1371 | | 1.74400 | 44.78 |
| 8 | −4.8138 | 0.7991 | | 1.84666 | 23.78 |
| 9 | 4.5743 | 0.8756 | | | |
| 10 | 25.1834 | 0.7990 | | 1.48749 | 70.23 |
| 11 | 7.2677 | $d_2$ | | | |
| 12 | 9.5169 | 3.9925 | | 1.48749 | 70.23 |
| 13 | ASS② | 0.1082 | | | |
| 14 | ∞ | 1.0000 | | 1.51633 | 64.14 |
| 15 | ∞ | 1.0000 | | 1.54771 | 62.84 |
| 16 | ∞ | 0.8000 | | | |
| 17 | ∞ | 0.7000 | | 1.51633 | 64.14 |
| 18 | ∞ | 1.1481 | | | |
| Image plane | ∞ | | | | |

ASS①

R  −11.2460
K  0
A  $2.6399 \times 10^{-5}$
B  $-1.2889 \times 10^{-6}$
C  $-2.9976 \times 10^{-7}$
D  0

ASS②

R  −6.7051
K  0
A  $2.1356 \times 10^{-3}$
B  $-8.1548 \times 10^{-5}$
C  $5.2649 \times 10^{-6}$
D  $-1.4375 \times 10^{-7}$

FSS①

OD: ∞ (Plane) (Common to WE & TE)
OD: 200
(Common to WE & TE)
$C_4$  $7.9679 \times 10^{-4}$  $C_6$  $3.9819 \times 10^{-4}$  $C_8$  $-1.4844 \times 10^{-5}$
$C_{10}$  $4.5528 \times 10^{-6}$  $C_{11}$  $2.5483 \times 10^{-6}$  $C_{13}$  $5.2212 \times 10^{-6}$
$C_{15}$  $1.0676 \times 10^{-6}$  $C_{17}$  $2.7915 \times 10^{-6}$  $C_{19}$  $-2.9692 \times 10^{-6}$
$C_{21}$  $6.4967 \times 10^{-7}$ Displacement and tilt(1)

| X | 0.00 | Y | 0.00 | Z | 0.00 |
| α | −45.00 | β | 0.00 | γ | 0.00 |

Variable space  $d_1$
WE:  3.79978
TE:  12.3435
Variable space  $d_2$
WE:  8.7426
TE:  0.2000

Figure 69:
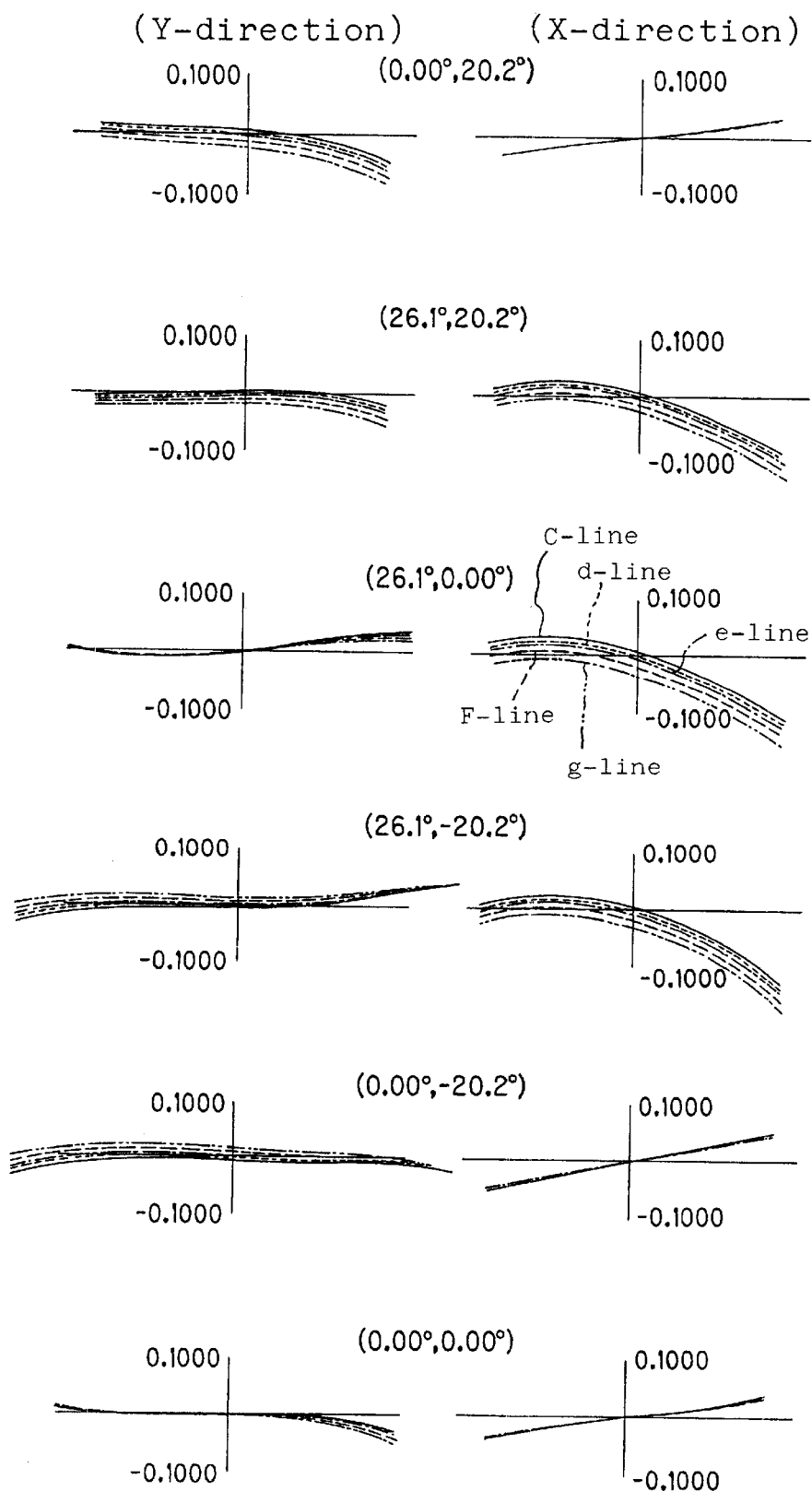
FIG. 69 is a transverse aberration diagram for Example B of the present invention when focused on a far point.
Figure 70:
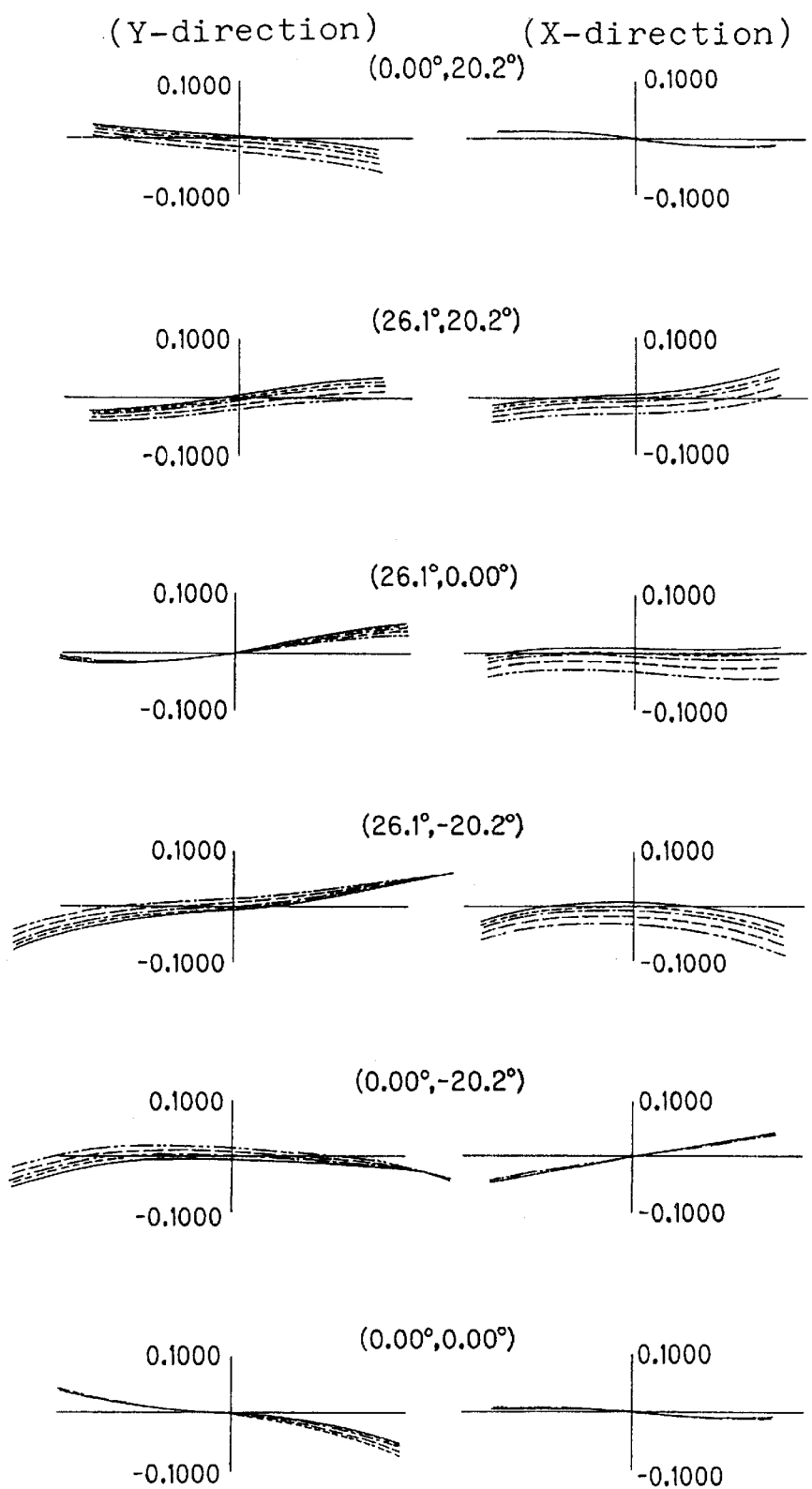
FIG. 70 is a transverse aberration diagram for Example B of the present invention when focused on a near point.
Figure 71:
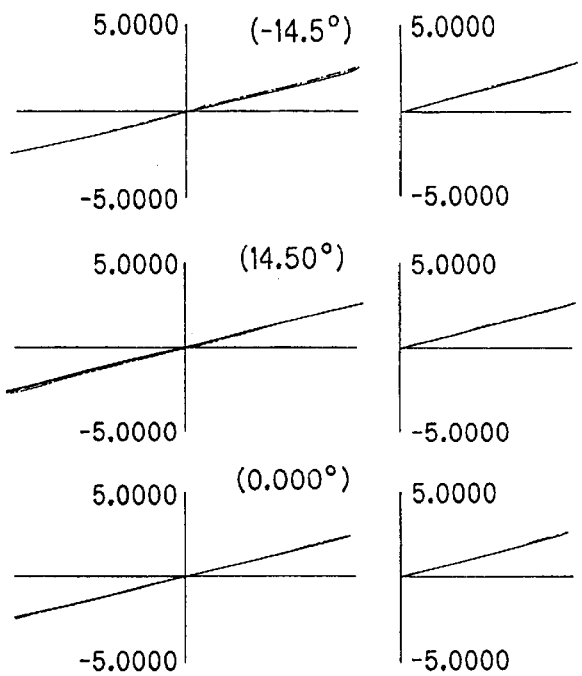
FIG. 71 is a transverse aberration diagram for Example E of the present invention at its wide-angle end.
Figure 72:
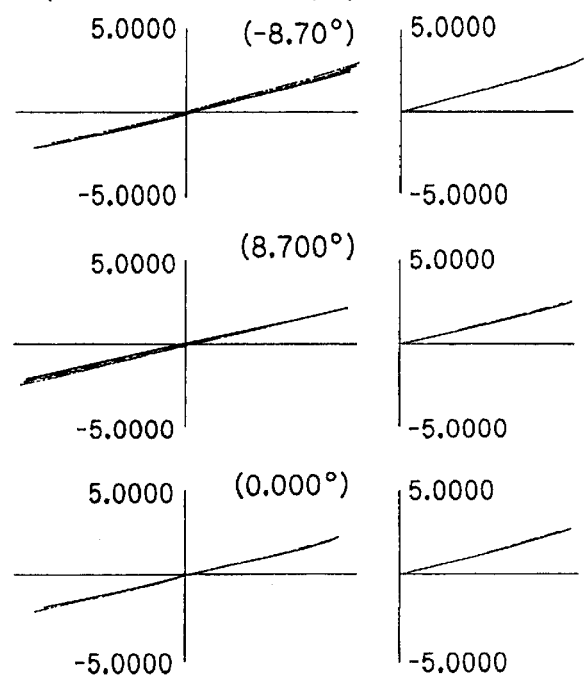
FIG. 72 is a transverse aberration diagram for Example E of the present invention at its telephoto end.
Figure 73:
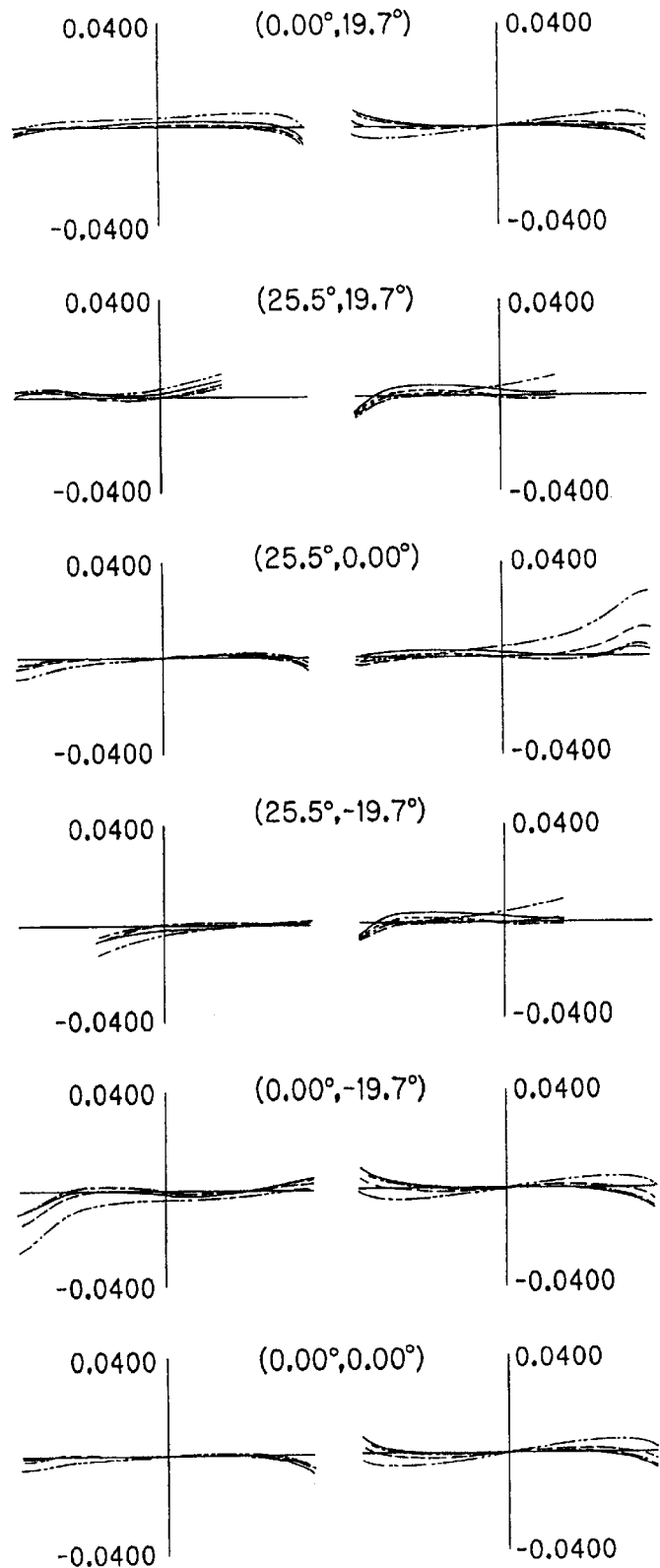
FIG. 73 is a transverse aberration diagram for Example K of the present invention at its wide-angle end.
Figure 74:
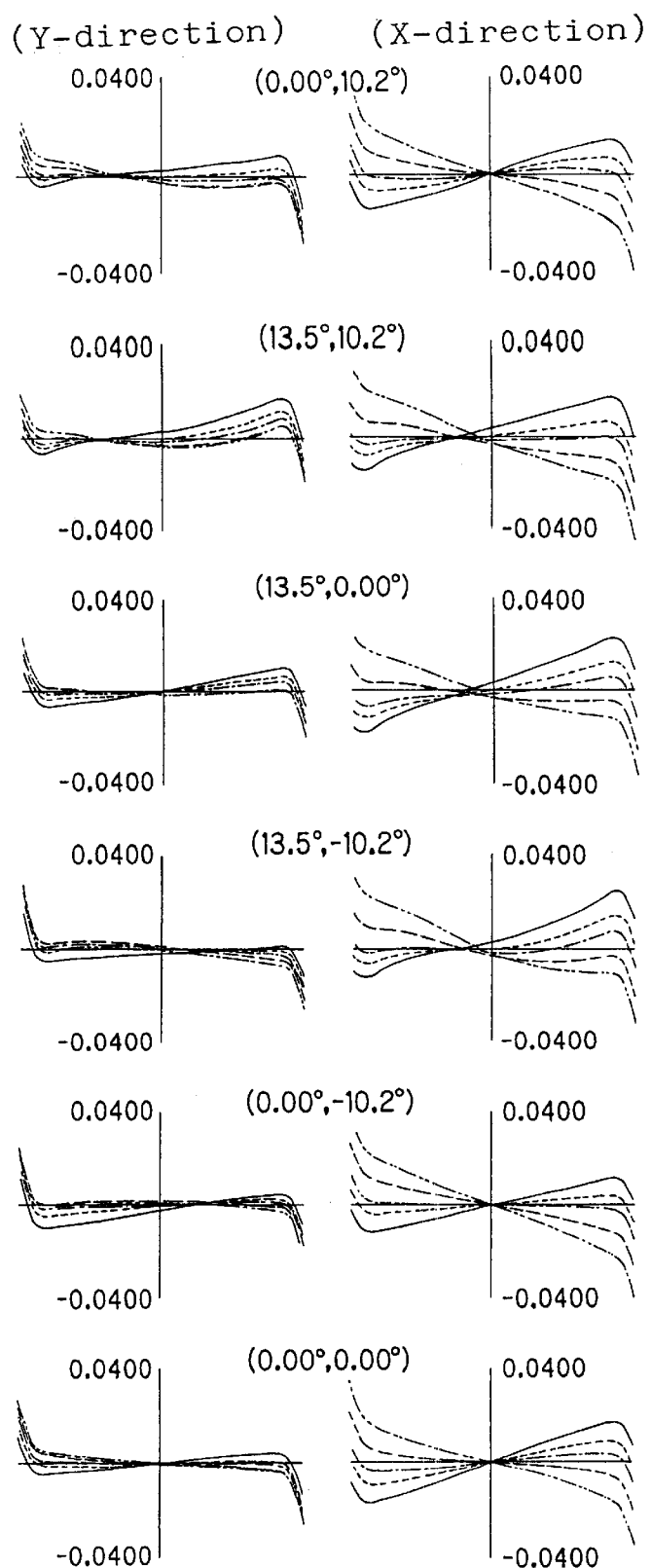
FIG. 74 is a transverse aberration diagram for Example K of the present invention at its telephoto end.
Figure 75:
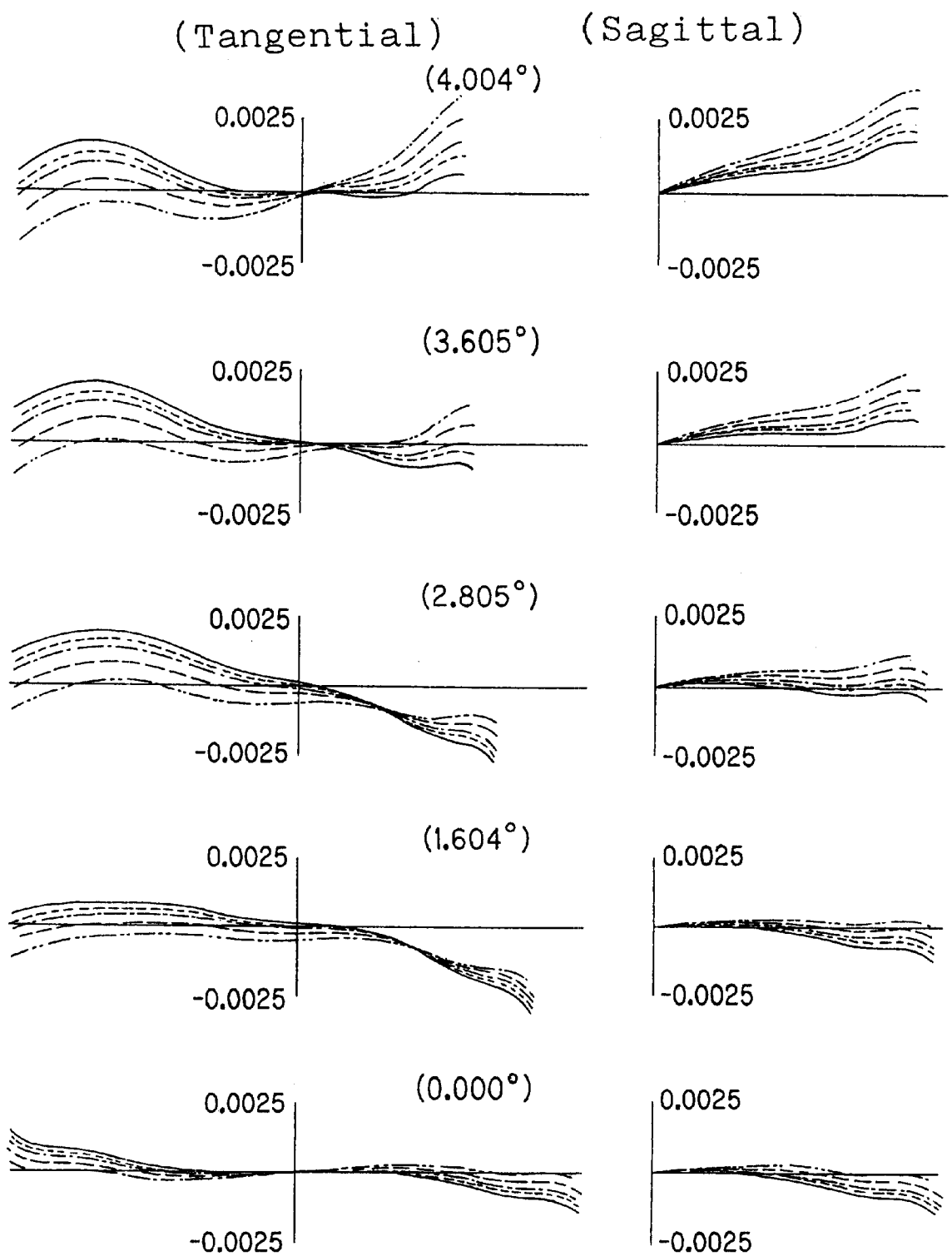
FIG. 75 is a transverse aberration diagram for Example L of the present invention at its wide-angle end.
Figure 76:
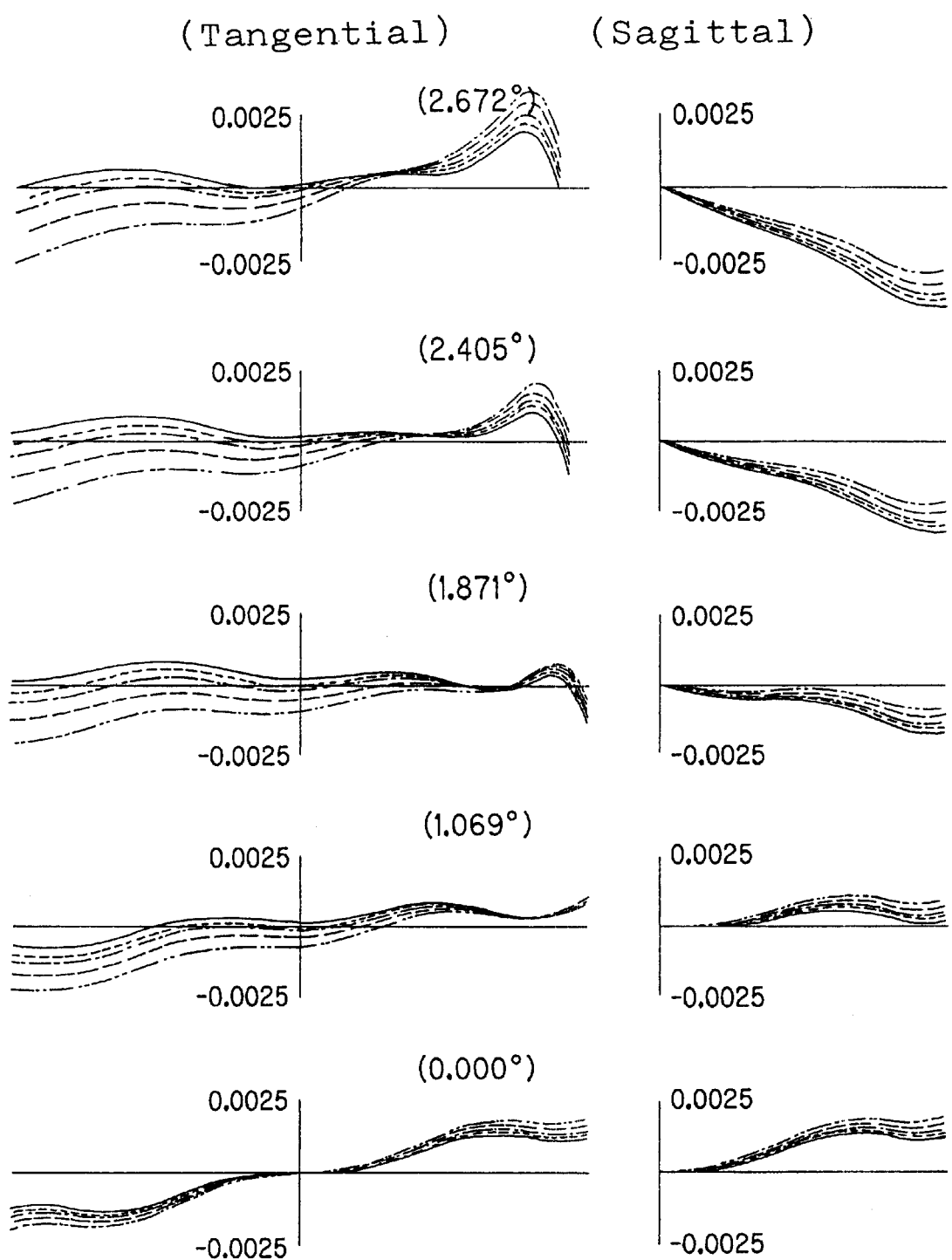
FIG. 76 is a transverse aberration diagram for Example L of the present invention at its telephoto end.
Figure 77:
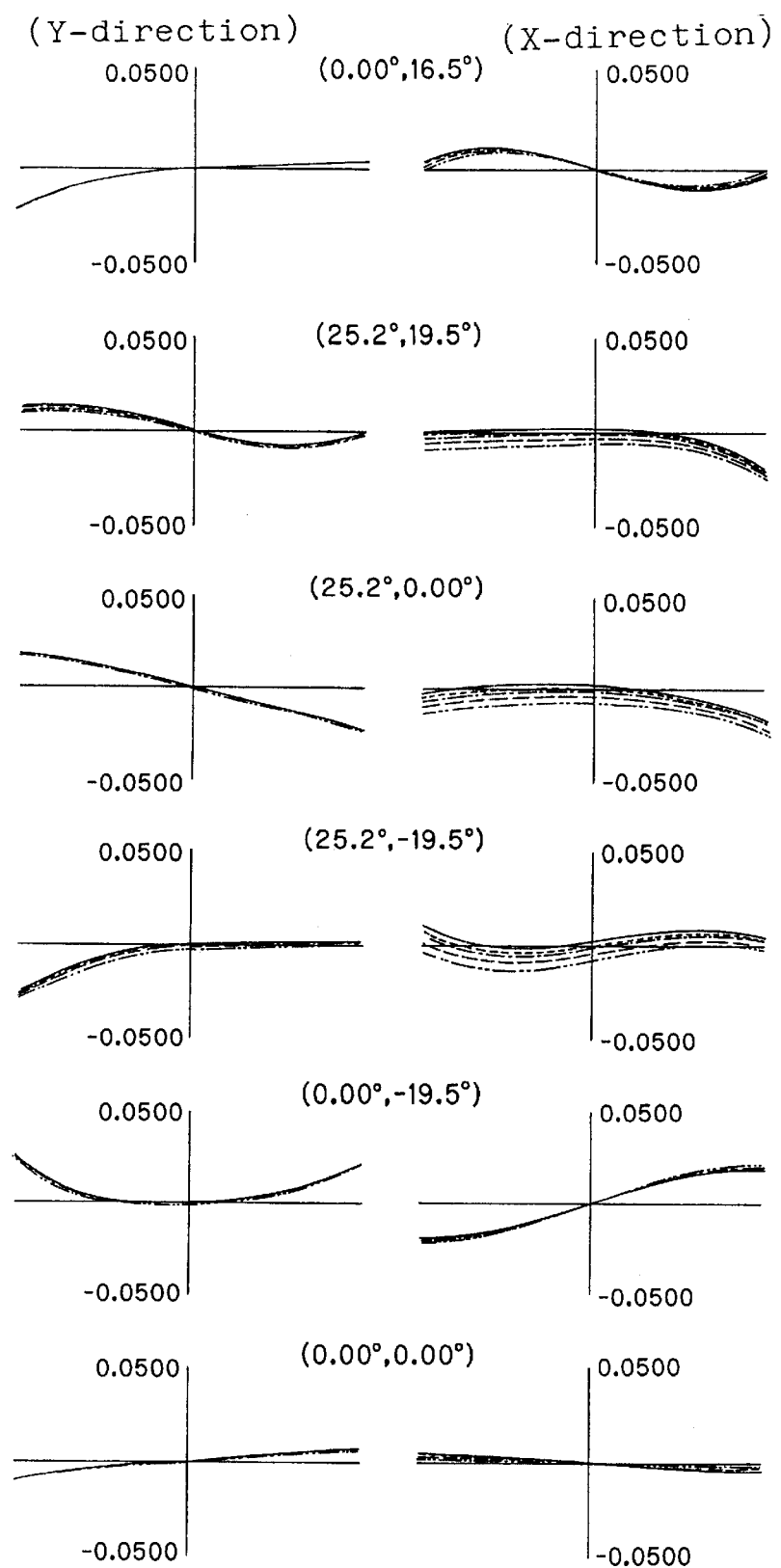
FIG. 77 is a transverse aberration diagram for Example N of the present invention at its telephoto end.
Figure 78:
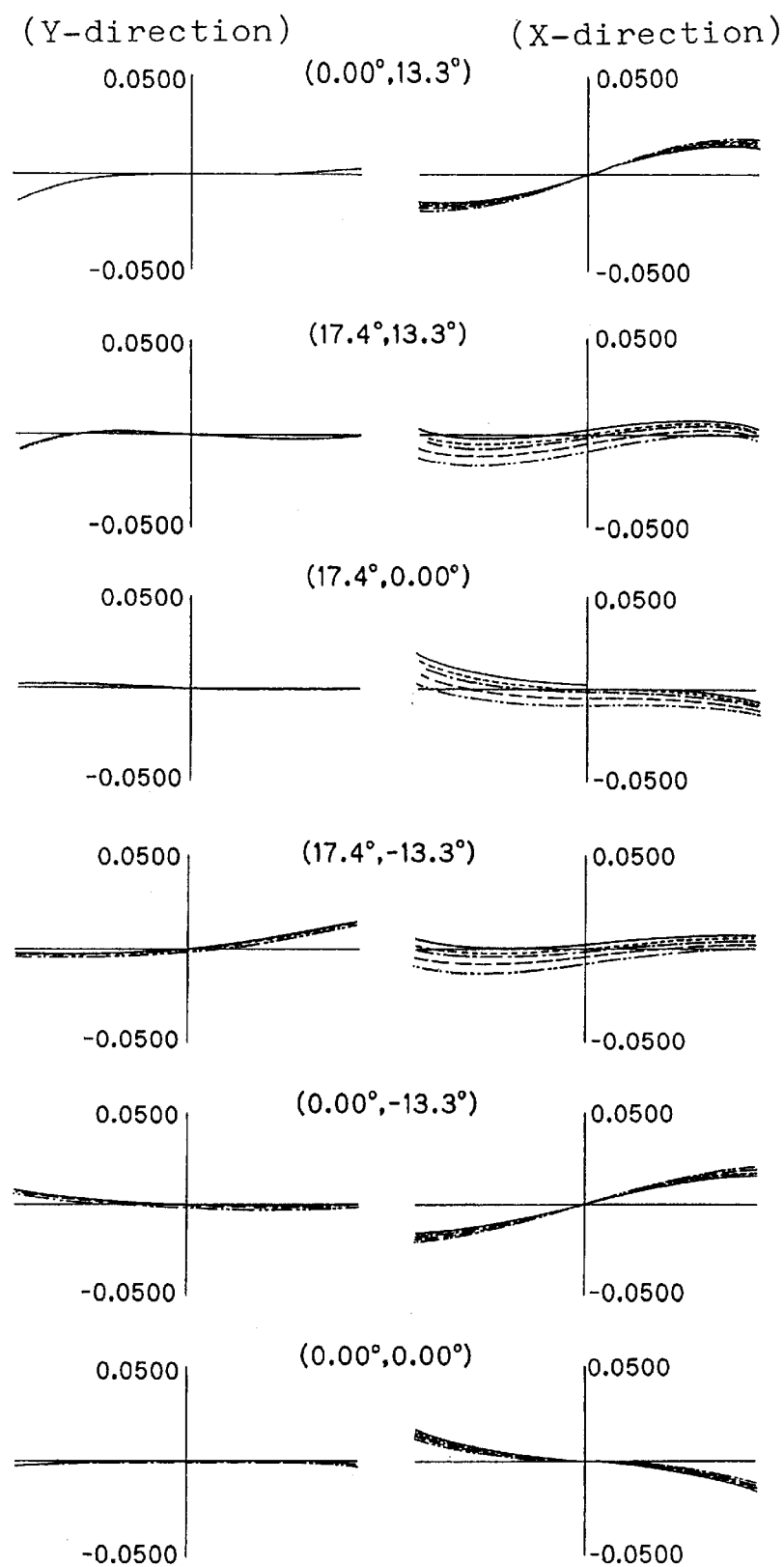
FIG. 78 is a transverse aberration diagram for Example N of the present invention at its standard setting.
Figure 79:
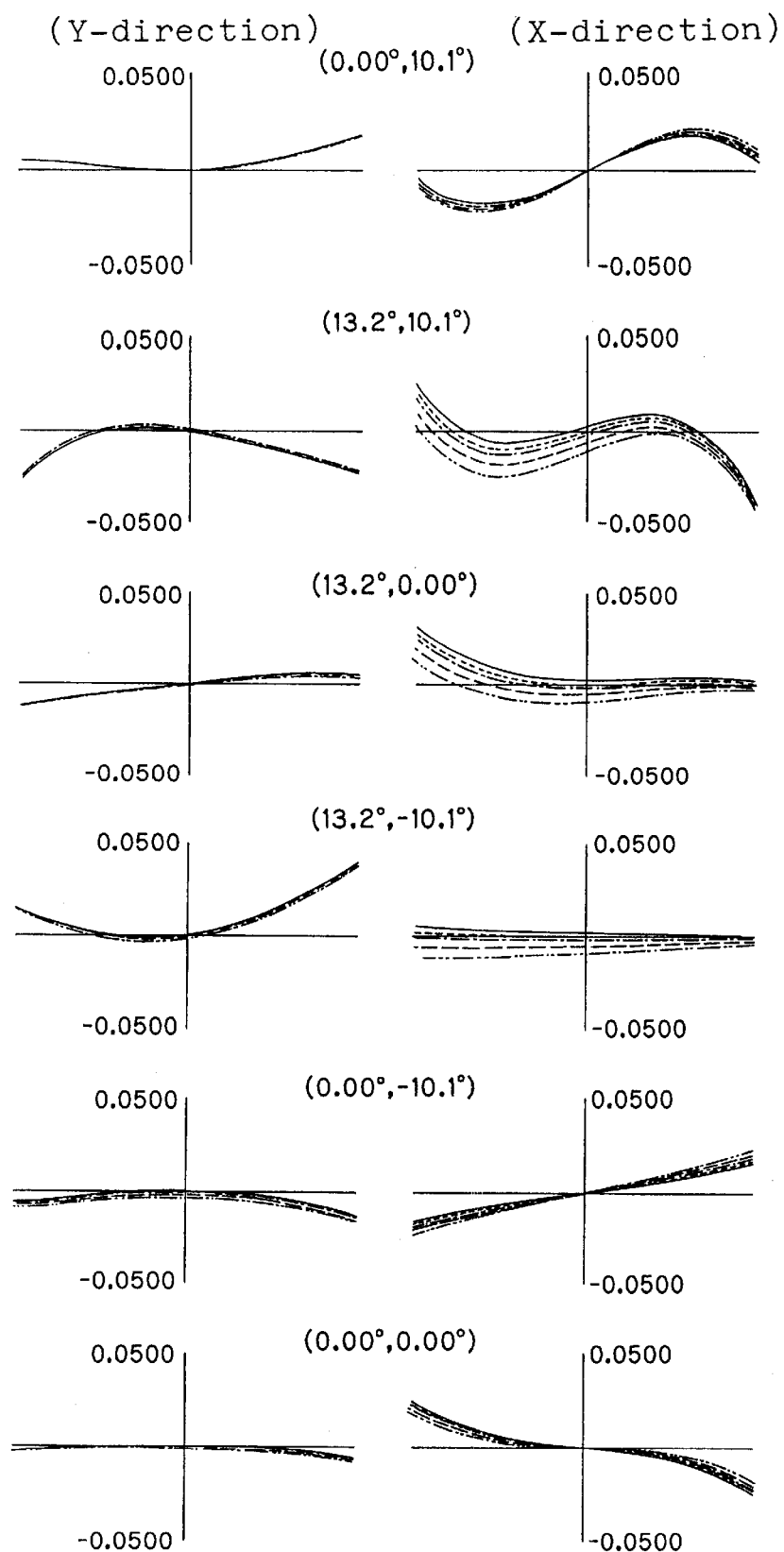
FIG. 79 is a transverse aberration diagram for Example N of the present invention at its wide-angle end.
Figure 80:
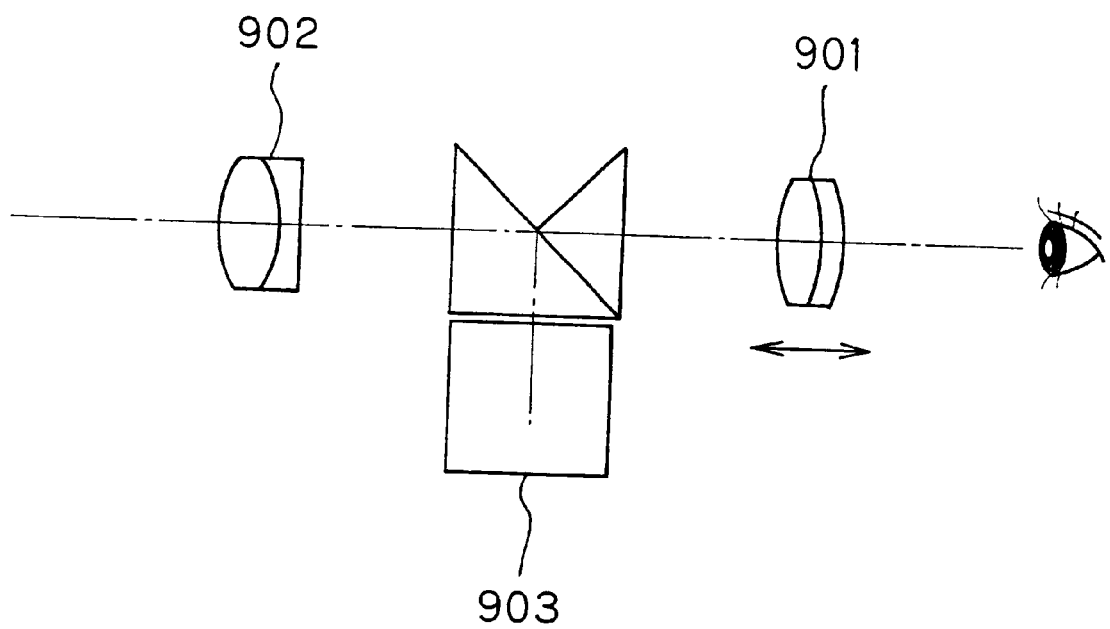
FIG. 80 is illustrative of how an eyepiece lens is moved for diopter adjustment in a prior art finder.

Transverse aberration diagrams for Examples B, E, K, L and N are shown in FIGS. 69 to 79. More specifically, FIGS. 69 and 70 are the transverse aberration diagrams for Example B upon focused on a far point and a near point, FIGS. 71 and 72 are the transverse aberration diagrams for Example E at its wide-angle end and telephoto end, FIGS. 73 and 74 are the transverse aberration diagrams for Example K at its wide-angle end and telephoto end, FIGS. 75 and 76 are the transverse aberration diagrams for Example L at its wide-angle end and telephoto end, and FIGS. 77, 78 and 79 are the transverse aberration diagrams for Example N at its wide-angle end, standard setting and telephoto end. In these transverse aberration diagrams, the bracketed figures are indicative of horizontal (X-direction) and vertical (Y-direction) viewing angles, indicating transverse aberrations at those viewing angles. It is here noted that the transverse aberrations in Example E are aberrations at virtual planes.

Given out are the values of conditions (2), (8) and (12)–(24) in Examples A to O. D is the diameter of a circle having an area equal to that of a portion of the variable mirror through which a light beam passes.

EXAMPLE A

| Variable Mirror | 1 | 2 |
|---|---|---|
| State | TE-WE | TE-WE |
| Shape of potion through which light beam passes | Ellipse 1.63 × 1.7 | Square 3.6 × 3.6 |
| Δ | 0.016 | 0.0740 |
| (1/5) × D | 0.332 | 0.8 |
| H | 0.04 | 0.042 |
| HJ/HK | 0.0952 | |
| φ | 27 | 40 |
| $P_I$ | −0.0361 | 0.0757 |
| $P_V$ | −0.0359 | 0.1029 |
| $\Delta P_I$ | −0.0361 | −0.0757 |
| $\Delta P_V$ | −0.0359 | −0.1029 |
| $|P_I/(P_V \cos\phi)|$ | 1.1273 | 0.9604 |
| $|P_I/P_{TOT}|$ | 0.2094 | 0.4392 |
| $|P_V/P_{TOT}|$ | 0.2085 | 0.5969 |
| $|\Delta P_I/P_{TOT}|$ | 0.2094 | 0.4392 |
| $|\Delta P_V/P_{TOT}|$ | 0.2085 | 0.5969 |

EXAMPLE B

| State Shape of potion through which light beam passes | Near point Rectangle with round angles | Far point Rectangle with round angles |
|---|---|---|
| Δ | 0.006 | 0.01 |
| (1/5) × D | 1.42 | 1.42 |
| H | 0.09 | 0.09 |
| φ | 40 | 40 |
| $P_I$ | −0.0757 | −0.0681 |
| $P_V$ | −0.0781 | −0.0641 |
| $\Delta P_I$ | −0.0078 | |
| $\Delta P_V$ | −0.0140 | |
| $|P_I/(P_V \cos\phi)|$ | 1.2659 | 1.3877 |
| $|P_I/P_{TOT}|$ | 0.2876 | 0.2589 |
| $|P_V/P_{TOT}|$ | 0.2966 | 0.2435 |
| $|\Delta P_I/P_{TOT}|$ | 0.0288 | |
| $|\Delta P_V/P_{TOT}|$ | 0.0531 | |
| $|f_1/f_{TOT}|$ | 5.0919 | |
| $|f_2/f_{TOT}|$ | 5.5366 | |

EXAMPLE C

| State Shape of potion through which light beam passes | Near point Ellipse 2.3 × 2.8 | Far point Ellipse 2.3 × 2.8 |
|---|---|---|
| Δ | 0.005 | 0.007 |
| (1/5) × D | 0.508 | 0.508 |
| H | 0.005 | 0.005 |
| φ | 37 | 37 |
| $P_I$ | −0.0044 | 0 |
| $P_V$ | 0.0079 | 0.01 |
| $\Delta P_I$ | −0.0044 | |
| $\Delta P_V$ | −0.0021 | |
| $|P_I/(P_V \cos\phi)|$ | 0.6879 | 0 |
| $|P_I/P_{TOT}|$ | 0.0209 | 0 |
| $|P_V/P_{TOT}|$ | 0.0381 | 0.048 |
| $|\Delta P_I/P_{TOT}|$ | 0.0209 | |
| $|\Delta P_V/P_{TOT}|$ | 0.0099 | |
| $|f_1/f_{TOT}|$ | 3.0454 | |
| $|f_2/f_{TOT}|$ | 4.0348 | |

EXAMPLE D

| State<br>Shape of potion through<br>which light beam passes | Near point<br>Rectangle with<br>round angles | Far point<br>Rectangle with<br>round angles |
|---|---|---|
| $\Delta$ | 0.01 | 0.1 |
| $(1/5) \times D$ | 1.46 | 1.46 |
| H | 0.06 | 0.06 |
| $\phi$ | 41 | 41 |
| $P_I$ | −0.0712 | −0.0681 |
| $P_V$ | −0.0728 | −0.0641 |
| $\Delta P_I$ | −0.0031 | |
| $\Delta P_V$ | −0.0087 | |
| $\|P_I/(P_V\cos\phi)\|$ | 1.2956 | 1.4082 |
| $\|P_I/P_{TOT}\|$ | 0.2990 | 0.2861 |
| $\|P_V/P_{TOT}\|$ | 0.3058 | 0.2692 |
| $\|\Delta P_I/P_{TOT}\|$ | 0.0129 | |
| $\|\Delta P_V/P_{TOT}\|$ | 0.0366 | |
| $\|f_1/f_{TOT}\|$ | 4.607 | |

EXAMPLE E

| Variable Mirror<br>State<br>Shape of potion through<br>which light beam passes | 1<br>TE-WE<br>Ellipse | 2<br>TE-WE<br>Ellipse |
|---|---|---|
| $\Delta$ | 0.001 | 0.00003 |
| $(1/5) \times D$ | 2.6 | 1.72 |
| H | 0.62 | 0.14 |
| $\phi$ | 30 | 30 |
| HJ/HK | 4.4286 | |
| $P_I$ | −0.0143 | −0.008 |
| $P_V$ | −0.0165 | −0.0092 |
| $\Delta P_I$ | −0.0143 | 0.008 |
| $\Delta P_V$ | −0.0165 | 0.0092 |
| $\|P_I/(P_V\cos\phi)\|$ | 1.0007 | 0.9997 |
| $\|P_I/P_m\|$ | −0.2917 | −0.1632 |
| $\|P_V/P_m\|$ | −0.3366 | −0.1885 |

EXAMPLE F

| State<br>Shape of potion through<br>which light beam passes | Near point<br>Ellipse<br>11.1 × 12.8 | Far point<br>Ellipse<br>11.1 × 12.8 |
|---|---|---|
| $\Delta$ | 0.000003 | 0.000003 |
| $(1/5) \times D$ | 2.38 | 2.38 |
| H | 0.05 | 0.05 |
| $\phi$ | 30 | 30 |
| $P_I$ | −0.0025 | 0 |
| $P_V$ | −0.0029 | 0 |
| $\Delta P_I$ | −0.0025 | |
| $\Delta P_V$ | −0.0029 | |
| $\|P_I/(P_V\cos\phi)\|$ | 0.9954 | 1.1547 |
| $\|P_I/P_m\|$ | −0.051 | 0 |
| $\|P_V/P_m\|$ | −0.0592 | 0 |

EXAMPLE G

| Variable Mirror<br>State | 1<br>TE-WE | 2<br>TE-WE |
|---|---|---|
| $\Delta$ | 0.0041 | 0.0818 |
| $(1/5) \times D$ | 1.62 | 0.54 |
| H | 0.1534 | 0.0200 |

-continued

| Variable Mirror<br>State | 1<br>TE-WE | 2<br>TE-WE |
|---|---|---|
| HJ/HK | 7.684 | |
| $\phi$ | 45.0 | 45.0 |
| $P_I$ | 0.0094 | −0.0404 |
| $P_V$ | 0.0094 | −0.0404 |
| $\Delta P_I$ | 0.0094 | −0.0404 |
| $\Delta P_V$ | 0.0094 | −0.0404 |
| $\|P_I/(P_V\cos\phi)\|$ | 1.4142 | 1.4142 |
| $\|P_I/P_{TOT}\|$ | 0.0639 | 0.3517 |
| $\|P_V/P_{TOT}\|$ | 0.0639 | 0.3517 |
| $\|\Delta P_I/P_{TOT}\|$ | 0.0639 | 0.3517 |
| $\|\Delta P_V/P_{TOT}\|$ | 0.0639 | 0.3517 |
| $\|f_m\|$ | 3.4 | 3.4 |
| $\|P_I\|/\|P_m\|$ | 0.0318 | 0.1367 |
| $\|P_V\|/\|P_m\|$ | 0.0318 | 0.1367 |
| $\|f_1\|/\|f_{TOT}\|$ | 1.74 | 1.36 |
| $\|f_2\|/\|P_{TOT}\|$ | 7.82 | 6.11 |
| $\|f_3\|/\|f_{TOT}\|$ | 0.50 | 0.39 |
| $\|f_4\|/\|P_{TOT}\|$ | 3.06 | 2.39 |
| $\|f_5\|/\|P_{TOT}\|$ | 1.82 | 1.42 |

EXAMPLE H

| Variable Mirror<br>State | 1<br>TE-WE | 2<br>TE-WE |
|---|---|---|
| $\Delta$ | 0.0365 | 0.0650 |
| $(1/5) \times D$ | 1.00 | 1.60 |
| H | 0.0300 | 0.0625 |
| HJ/HK | 0.480 | |
| $\phi$ | 45.0 | 34.4 |
| $P_I$ | 0.0091 | −0.0112 |
| $P_V$ | 0.0091 | −0.0112 |
| $\Delta P_I$ | 0.0091 | −0.0112 |
| $\Delta P_V$ | 0.0091 | −0.0112 |
| $\|P_I/(P_V\cos\phi)\|$ | 1.4142 | 1.2116 |
| $\|P_I/P_{TOT}\|$ | 0.0411 | 0.0728 |
| $\|P_V/P_{TOT}\|$ | 0.0411 | 0.0728 |
| $\|\Delta P_I/P_{TOT}\|$ | 0.0411 | 0.0728 |
| $\|\Delta P_V/P_{TOT}\|$ | 0.0411 | 0.0728 |
| $\|f_m\|$ | 9.5 | 9.5 |
| $\|P_I\|/\|P_m\|$ | 0.0864 | 0.1061 |
| $\|P_V\|/\|P_m\|$ | 0.0864 | 0.1061 |
| $\|f_1\|/\|f_{TOT}\|$ | 3.62 | 2.51 |
| $\|f_2\|/\|P_{TOT}\|$ | 12.18 | 8.43 |
| $\|f_3\|/\|P_{TOT}\|$ | 10.23 | 7.08 |
| $\|f_4\|/\|P_{TOT}\|$ | 2.10 | 1.46 |
| $\|f_5\|/\|P_{TOT}\|$ | 3.05 | 2.11 |
| $\|f_6\|/\|P_{TOT}\|$ | 9.92 | 6.87 |

EXAMPLE I

| Variable Mirror<br>State | 1<br>TE-WE | 2<br>TE-WE |
|---|---|---|
| $\Delta$ | 0.0562 | 0.1279 |
| $(1/5) \times D$ | 1.22 | 0.82 |
| H | 0.0210 | 0.0836 |
| HJ/HK | 0.251 | |
| $\phi$ | 45.0 | 45.0 |
| $P_I$ | 0.0067 | −0.0194 |
| $P_V$ | 0.0067 | −0.0194 |
| $\Delta P_I$ | 0.0067 | −0.0194 |
| $\Delta P_V$ | 0.0067 | −0.0194 |
| $\|P_I/(P_V\cos\phi)\|$ | 1.4142 | 1.4142 |
| $\|P_I/P_{TOT}\|$ | 0.0393 | 0.1728 |
| $\|P_V/P_{TOT}\|$ | 0.0393 | 0.1728 |

-continued

| Variable Mirror State | 1 TE-WE | 2 TE-WE |
|---|---|---|
| $|\Delta P_I/P_{TOT}|$ | 0.0393 | 0.1728 |
| $|\Delta P_V/P_{TOT}|$ | 0.0393 | 0.1728 |
| $|f_m|$ | 9.5 | 9.5 |
| $|P_I|/|P_m|$ | 0.0634 | 0.1844 |
| $|P_V|/|P_m|$ | 0.0634 | 0.1844 |
| $|f_1|/|f_{TOT}|$ | 13.59 | 9.01 |
| $|f_2|/|f_{TOT}|$ | 12.71 | 8.42 |
| $|f_3|/|f_{TOT}|$ | 2.35 | 1.56 |
| $|f_4|/|f_{TOT}|$ | 1.61 | 1.07 |
| $|f_5|/|f_{TOT}|$ | 2.26 | 1.50 |
| $|f_6|/|f_{TOT}|$ | 4.37 | 2.89 |

EXAMPLE J

| Variable Mirror State | 1 TE-WE | 2 TE-WE | 3 TE-WE |
|---|---|---|---|
| $\Delta$ | 0.0012 | 0.0101 | 0.0111 |
| $(1/5) \times D$ | 2.12 | 1.84 | 1.96 |
| H | 0.3300 | 0.4740 | 0.3470 |
| HI/HJ | 0.696 | | |
| HJ/HK | | 1.366 | |
| HK/HI | | | 1.052 |
| $\phi$ | 45.0 | 45.0 | 45.0 |
| $P_I$ | 0.0003 | −0.0003 | −0.0023 |
| $P_V$ | 0.0026 | 0.0037 | −0.0002 |
| $\Delta P_I$ | 0.0003 | 0.0003 | −0.0023 |
| $\Delta P_V$ | 0.0026 | −0.0037 | −0.0002 |
| $|P_I/(P_V \cos\phi)|$ | 0.1774 | 0.1110 | 21.1351 |
| $|P_I/P_{TOT}|$ | 0.0016 | 0.0014 | 0.0108 |
| $|P_V/P_{TOT}|$ | 0.0124 | 0.0173 | 0.0007 |
| $|\Delta P_I/P_{TOT}|$ | 0.0016 | 0.0014 | 0.0108 |
| $|\Delta P_V/P_{TOT}|$ | 0.0124 | 0.0173 | 0.0007 |
| $|f_m|$ | 5.4 | 5.4 | 5.4 |
| $|P_I|/|P_m|$ | 0.0018 | 0.0016 | 0.0124 |
| $|P_V|/|P_m|$ | 0.0143 | 0.0199 | 0.0008 |
| $|f_1|/|f_{TOT}|$ | 1.14 | 1.14 | 1.14 |
| $|f_2|/|f_{TOT}|$ | 4.70 | 4.70 | 4.70 |
| $|f_3|/|f_{TOT}|$ | 4.05 | 4.05 | 4.05 |
| $|f_4|/|f_{TOT}|$ | 8.82 | 8.82 | 8.82 |
| $|f_5|/|f_{TOT}|$ | 2.24 | 2.24 | 2.24 |

EXAMPLE K

| Variable Mirror State | 1 TE-WE | 2 TE-WE | 3 TE-WE |
|---|---|---|---|
| $\Delta$ | 0.0012 | 0.0101 | 0.0111 |
| $(1/5) \times D$ | 1.36 | 1.28 | 1.68 |
| H | 0.0980 | 0.1960 | 0.4290 |
| HI/HJ | 0.500 | | |
| HJ/HK | | 0.457 | |
| HK/HI | | | 4.378 |
| $\phi$ | 36.0 | 45.0 | 39.0 |
| $P_I$ | −0.0058 | −0.0097 | −0.0066 |
| $P_V$ | −0.0020 | −0.0025 | −0.0007 |
| $\Delta P_I$ | −0.0058 | −0.0097 | −0.0066 |
| $\Delta P_V$ | −0.0020 | −0.0025 | 0.0007 |
| $|P_I/(P_V \cos\phi)|$ | 3.5158 | 5.5688 | 11.7015 |
| $|P_I/P_{TOT}|$ | 0.0273 | 0.0456 | 0.0311 |
| $|P_V/P_{TOT}|$ | 0.0096 | 0.0116 | 0.0034 |
| $|\Delta P_I/P_{TOT}|$ | 0.0273 | 0.0456 | 0.0311 |
| $|\Delta P_V/P_{TOT}|$ | 0.0096 | 0.0116 | 0.0034 |
| $|f_m|$ | 6.2 | 6.2 | 6.2 |
| $|P_I|/|P_m|$ | 0.0361 | 0.0603 | 0.0411 |
| $|P_V|/|P_m|$ | 0.0127 | 0.0153 | 0.0045 |

-continued

| Variable Mirror State | 1 TE-WE | 2 TE-WE | 3 TE-WE |
|---|---|---|---|
| $|f_1|/|f_{TOT}|$ | 1.32 | 1.32 | 1.32 |
| $|f_2|/|f_{TOT}|$ | 5.18 | 5.18 | 5.18 |
| $|f_3|/|f_{TOT}|$ | 4.73 | 4.73 | 4.73 |
| $|f_4|/|f_{TOT}|$ | 15.24 | 15.24 | 15.24 |
| $|f_5|/|f_{TOT}|$ | 2.50 | 2.50 | 2.50 |

EXAMPLE L

| Variable Mirror State | 1 TE-WE | 2 TE-WE |
|---|---|---|
| $\Delta$ | 0.0037 | 0.0025 |
| $(1/5) \times D$ | 2.80 | 1.40 |
| H | 0.0067 | 0.0970 |
| HJ/HK | 0.069 | |
| $\phi$ | 0.0 | 0.00 |
| $P_I$ | −0.0178 | −0.0119 |
| $P_V$ | −0.0178 | −0.0119 |
| $\Delta P_I$ | −0.0178 | −0.0119 |
| $\Delta P_V$ | −0.0178 | −0.0119 |
| $|P_I/(P_V \cos\phi)|$ | 1.0000 | 1.0000 |
| $|P_I/P_{TOT}|$ | 0.7135 | 0.4770 |
| $|P_V/P_{TOT}|$ | 0.7135 | 0.4770 |
| $|\Delta P_I/P_{TOT}|$ | 0.7135 | 0.4770 |
| $|\Delta P_V/P_{TOT}|$ | 0.7135 | 0.4770 |
| $|fm|$ | 28.0 | 28.6 |
| $|P_I|/|P_m|$ | 0.5000 | 0.3414 |
| $|P_V|/|P_m|$ | 0.5000 | 0.3414 |
| $|f_1|/|f_{TOT}|$ | 0.70 | 0.70 |
| $|f_2|/|f_{TOT}|$ | 1.05 | 1.05 |
| $|f_3|/|f_{TOT}|$ | 14.17 | 14.17 |

EXAMPLE M

| State | Near point | Ear point |
|---|---|---|
| $\Delta$ | 0 | 0.0015 |
| $(1/5) \times D$ | 1.86 | 1.86 |
| H | 0.0000 | 0.0177 |
| $\phi$ | 45.0 | 45.0 |
| $P_I$ | 0.0000 | −0.0011 |
| $P_V$ | 0.0000 | −0.0020 |
| $\Delta P_I$ | | −0.0011 |
| $\Delta P_V$ | | −0.0020 |
| $|P_I/(P_V \cos\phi)|$ | 1.4142 | 0.7434 |
| $|P_I/P_{TOT}|$ | 0.0000 | 0.0069 |
| $|P_V/P_{TOT}|$ | 0.0000 | 0.0131 |
| $|\Delta P_I/P_{TOT}|$ | 0.0000 | 0.0069 |
| $|\Delta P_V/P_{TOT}|$ | 0.0000 | 0.0131 |
| $|f_m|$ | 6.7 | 6.7 |
| $|P_I|/|P_m|$ | 0.0000 | 0.0072 |
| $|P_V|/|P_m|$ | 0.0000 | 0.0138 |
| $|f_1|/|f_{TOT}|$ | 5.51 | 5.51 |
| $|f_2|/|f_{TOT}|$ | 1.05 | 1.05 |
| $|f_3|/|f_{TOT}|$ | 13.09 | 13.09 |
| $|f_4|/|f_{TOT}|$ | 1.88 | 1.88 |
| $|f_5|/|f_{TOT}|$ | 2.70 | 2.70 |

EXAMPLE N

| Variable Mirror | 1 | 2 | 3 |
|---|---|---|---|
| State | TE-WE | TE-WE | TE-WE |
| Shape of portions through which light beam passes | Trapezoid with round angles 5.6 × 4.7 | Square with round angles 6.8 × 6.8 | Rectangle with round angles 7.1 × 7.5 |
| Δ(WE) | 0.035 | 0.058 | 0.078 |
| Δ(TE) | 0.038 | 0.176 | 0.169 |
| (1/5) × D | 1.16 | 1.54 | 1.66 |
| H | 0.1917 | 0.1388 | 0.4527 |
| HI/HJ | 1.3804 | | |
| HJ/HK | | 0.3067 | |
| HK/HI | | | 2.3620 |
| φ | 40.2 | 24.0 | 25.9 |
| $P_I$(WE) | 0.0259 | 0.0407 | 0.0415 |
| $P_V$(WE) | 0.0040 | 0.0433 | 0.0490 |
| $P_I$(TE) | −0.0210 | 0.0434 | 0.0225 |
| $P_V$(TE) | −0.0011 | 0.0277 | 0.0354 |
| $\Delta P_I$ | −0.0468 | 0.0027 | −0.0190 |
| $\Delta P_V$ | −0.0051 | −0.0157 | −0.0137 |
| $|P_I/(P_V \cos\phi)|$ | 8.4974 | 1.0277 | 0.9401 |
| $|P_I/P_{TOT}|$ | 0.1179 | 0.1856 | 0.1891 |
| $|P_V/P_{TOT}|$ | 0.0182 | 0.1977 | 0.2236 |
| $|\Delta P_I/P_{TOT}|$ | 0.2135 | 0.0122 | 0.0865 |
| $|\Delta P_V/P_{TOT}|$ | 0.0006 | 0.0029 | 0.0026 |

EXAMPLE O

| Variable Mirror | 1 | 2 | 3 |
|---|---|---|---|
| State | TE-WE | TE-WE | TE-WE |
| Shape of portions through which light beam passes | Trapezoid with round angles 6.3 × 8.0 | Rectangle with round angles 8.0 × 11.5 | Rectangle with round angles 7.9 × 12.4 |
| Δ(WE) | 0.043 | 0.059 | 0.227 |
| Δ(TE) | 0.032 | 0.352 | 0.178 |
| (1/5) × D | 1.60 | 2.16 | 2.24 |
| H | 0.2503 | 0.3219 | 0.6600 |
| HI/HJ | 0.7775 | | |
| HJ/HK | | 0.4878 | |
| HK/HI | | | 2.6368 |
| φ | 39.7 | 27.9 | 21.8 |
| $P_I$(WE) | 0.0305 | 0.0249 | 0.0361 |
| $P_V$(WE) | 0.0044 | 0.0360 | 0.0498 |
| $P_I$(TE) | −0.0103 | 0.0368 | 0.0409 |
| $P_V$(TE) | 0.0135 | 0.0247 | 0.0254 |
| $\Delta P_I$ | −0.0409 | 0.0119 | 0.0048 |
| $\Delta P_V$ | 0.0090 | −0.0113 | −0.0244 |
| $|P_I/(P_V \cos\phi)|$ | 8.9219 | 0.7813 | 0.7808 |
| $|P_I/P_{TOT}|$ | 0.1569 | 0.1277 | 0.1856 |
| $|P_V/P_{TOT}|$ | 0.0229 | 0.1850 | 0.2560 |
| $|\Delta P_I/P_{TOT}|$ | 0.2101 | 0.0614 | 0.0246 |
| $|\Delta P_V/P_{TOT}|$ | 0.0014 | 0.0014 | 0.0045 |

While, in several examples, the variable mirror is transformed with its center area fixed in place, it is understood that the variable mirror may be transformed with its peripheral area fixed in place.

The definitions of the terms used herein are now explained.

The term "optical apparatus" used throughout the disclosure is understood to refer to that including an optical system or element. In the present invention, it is not always required to operate the optical apparatus in its entirety; that is, this apparatus may form a part of equipment of some kind.

Thus, the optical apparatus encompasses image pickup apparatus, viewing apparatus, display apparatus, illumination apparatus, signal processors, and so on.

Exemplary image pickup apparatus are film cameras, digital cameras, TV cameras, moving image recorders, electronic moving image recorders, camcorders, VTR cameras, and electronic endoscopes.

Exemplary viewing apparatus are microscopes, telescopes, spectacles, binoculars, loupes, fiber scopes, finders, and viewfinders.

Exemplary displays are liquid crystal displays, viewfinders, head-mounted displays or HMDs, and PDAs (personal digital assistants).

Exemplary illumination apparatus are camera strobes, motorcar headlights, light sources for endoscopes, and light sources for microscopes.

Exemplary signal processors are optical disk read/write devices, and operating units for optical calculators.

For instance, the image pickup device used throughout the disclosure is understood to refer to CCDs, camera tubes, solid-state image pickup devices, photographic films, etc., and the plane-parallel plate is understood to be included in one of prisms. The viewer changes are understood to include diopter changes. The subject changes are understood to include changes in the distance of objects that are subjects, the movement, motion, vibration, shake, etc. of objects, and so on.

In accordance with the present invention as explained above, for instance, it is possible to achieve optical elements variable in terms of such optical properties as focal lengths. By taking advantage of these optical elements, it is possible to achieve optical apparatus having focusing and zooming functions and capable of size reductions, shake prevention, various corrections, etc. By use of photonic crystals, it is possible to achieve more improved HMDs. According to the present invention, it is also possible to measure the shape and decentration of optical elements and systems, the refractive index, refractive index profiles, etc. of optical elements, and so on.

What we claim is:

1. An optical system comprising a variable mirror, characterized in that at least one of transformation of the variable mirror or movement of an optical element is performed for zooming, and at least one of the movement the optical element or the transformation of the variable mirror is performed for focus adjustment.

2. An optical system comprising a variable mirror, characterized in that an optical element is moved for zooming, and at least one of movement of the optical element or transformation of the variable mirror is performed for focus adjustment.

3. An optical system comprising a variable mirror, characterized in that the variable mirror is transformed for zooming, and at least one of movement of an optical element or transformation of the variable mirror is performed for focus adjustment.

4. An optical system comprising a variable mirror, characterized in that at least one of transformation of the variable mirror, movement of a lens or movement of the variable mirror is performed for zooming, and at least one of the movement of the lens or the variable mirror or the transformation of the variable mirror is performed for focus adjustment.

5. An optical system comprising a variable mirror, characterized in that a lens is moved for zooming, and at least one of movement of the lens or transformation of the variable mirror is performed for focus adjustment.

6. An optical system comprising a variable mirror, characterized in that the variable mirror is transformed for zooming, and at least one of movement of a lens, movement of the variable mirror or transformation of the variable mirror is performed for focus adjustment.

7. An optical system comprising a variable mirror, characterized in that the variable mirror is transformed for zooming, and at least one of movement of a lens or transformation of the variable mirror is performed for focus adjustment.

8. An optical system comprising a variable mirror, characterized in that a lens is moved for zooming, and transformation of the variable mirror is performed for focus adjustment.

9. An optical system comprising a variable mirror, characterized in that movement of a lens and transformation of the variable mirror are performed for zooming, and the transformation of the variable mirror is performed for focus adjustment.

10. An optical system comprising a plurality of lens groups and at least one variable-shape mirror whose focal length is changed by transformation of a reflecting surface thereof, characterized in that at least one lens group is moved on an optical axis of said optical system for scaling, and a displacement of a focus position of said optical system with scaling is corrected by said variable-shape mirror.

11. The optical system according to claim 10, characterized in that said optical system is made up of, in order from an object side thereof, a negative, first group, a positive, second group, and a subsequent group or groups, wherein said second lens group is moved on an optical axis of said optical system for scaling.

12. The optical system according to claim 10, characterized in that a reflecting surface is interposed between the first group and the second group.

13. The optical system according to claim 10, characterized in that when an object point is nearly at infinity, the variable-shape mirror has a substantially planar surface.

14. The optical system according to claim 10, characterized in that the variable-shape mirror has a free-form surface shape.

15. An optical system comprising lens groups and a variable mirror, characterized in that at least one lens group is moved on an optical axis of said optical system for scaling, and displacements of a focus position with object distance changes or scaling or fluctuations of aberrations with object distance changes or scaling are corrected by said variable mirror.

16. An optical system comprising lens groups and a variable mirror, characterized in that at least one lens group is moved on an optical axis of said optical system for zooming, and when focus adjustment is performed, an action of said variable mirror on reflection of a light ray changes.

17. An optical system comprising lens groups and a variable mirror, characterized in that at least one lens group is moved for scaling, and displacements of a focus position of said optical system with object distance changes or scaling or fluctuations of aberrations with object distance changes or scaling are corrected by said variable mirror.

18. An optical system comprising lens groups and a variable mirror, characterized in that at least one lens group is moved for zooming, and when focus adjustment is performed, an action of said variable mirror on reflection of a light ray changes.

* * * * *